United States Patent
Chasteen et al.

(10) Patent No.: US 12,540,028 B2
(45) Date of Patent: Feb. 3, 2026

(54) SHIPPING SYSTEM FOR TEMPERATURE-SENSITIVE MATERIALS

(71) Applicant: Cold Chain Technologies, LLC, Franklin, MA (US)

(72) Inventors: James R. Chasteen, Grosse Pointe Farms, MI (US); Brian Paul Skocypec, North Attleboro, MA (US); Peter Martino, Danbury, NH (US); William D. Robertson, Charlton, MA (US); Amanda Lynn Longley, Hudson, MA (US); Stephanie Jean Pazniokas, Franklin, MA (US); Brandon James MacDonald, Foxborough, MA (US); Theodore Smith, Concord, MA (US); Matthew Dunham, Bristol, RI (US)

(73) Assignee: COLD CHAIN TECHNOLOGIES, LLC, Franklin, MA (US)

( * ) Notice: Subject to any disclaimer, the term of this patent is extended or adjusted under 35 U.S.C. 154(b) by 1039 days.

(21) Appl. No.: 17/013,574

(22) Filed: Sep. 5, 2020

(65) Prior Publication Data

US 2021/0070539 A1     Mar. 11, 2021

Related U.S. Application Data

(60) Provisional application No. 63/010,406, filed on Apr. 15, 2020, provisional application No. 62/915,576, (Continued)

(51) Int. Cl.
B65D 88/74     (2006.01)
B65D 88/12     (2006.01)
(Continued)

(52) U.S. Cl.
CPC ........... B65D 88/744 (2013.01); B65D 88/12 (2013.01); B65D 90/028 (2013.01);
(Continued)

(58) Field of Classification Search
CPC .. B65D 88/744; B65D 90/028; B65D 90/046; F16K 15/031
See application file for complete search history.

(56) References Cited

U.S. PATENT DOCUMENTS 2,024,397 A    12/1935   Snyder
3,940,890 A     3/1976   Postlethwaite
(Continued)

FOREIGN PATENT DOCUMENTS

CN    209196135 U  *  8/2019
DE     10058565 A1    2/2002
(Continued)

OTHER PUBLICATIONS

Zhang (CN 209196135 U), English Translation, Aug. 2, 2019, Whole Document (Year: 2019).*

(Continued)

*Primary Examiner* — Jerry-Daryl Fletcher
*Assistant Examiner* — Keith Stanley Myers
(74) *Attorney, Agent, or Firm* — KRIEGSMAN & KRIEGSMAN

(57) ABSTRACT

Shipping system for temperature-sensitive materials. In one embodiment, the shipping system includes a frame defining an enclosure. The frame includes a bottom, a top, a front, a rear, a left side, a right side, a left corner gusset, and a right corner gusset. The front serves as a door. Thermal breaks are provided in one or more of the bottom, the front, the left corner gusset, and the right corner gusset. Vacuum insulated panels are positioned along all sides of the frame. Many of the vacuum insulated panels are encapsulated between the (Continued)

frame and an outer shell. A plurality of phase-change material assemblies are positioned within the frame along all sides. Heat-spreaders are positioned interior to the phase-change material assemblies. The shipping system are dimensioned so that four such shipping systems are seated on a prorate manual cargo sheet.

40 Claims, 88 Drawing Sheets

Related U.S. Application Data filed on Oct. 15, 2019, provisional application No. 62/901,686, filed on Sep. 17, 2019, provisional application No. 62/897,847, filed on Sep. 9, 2019, provisional application No. 62/896,629, filed on Sep. 6, 2019, provisional application No. 62/896,513, filed on Sep. 5, 2019.

(51) Int. Cl.
*B65D 90/02* (2019.01)
*B65D 90/04* (2006.01)

(52) U.S. Cl.
CPC ........ *B65D 90/046* (2013.01); *B65D 2588/12* (2013.01); *B65D 2588/74* (2013.01); *B65D 2590/046* (2013.01)

(56) References Cited

U.S. PATENT DOCUMENTS

| | | | |
|---|---|---|---|
| 3,993,811 A | 11/1976 | Walles et al. |
| 4,145,895 A | 3/1979 | Hjertstrand et al. |
| 4,407,133 A | 10/1983 | Edmonson |
| 4,638,383 A | 1/1987 | McGinlay et al. |
| 4,745,015 A | 5/1988 | Cheng et al. |
| 4,914,874 A | 4/1990 | Graham |
| 5,082,335 A | 1/1992 | Cur et al. |
| 5,246,128 A | 9/1993 | Uitz |
| 5,252,408 A | 10/1993 | Bridges et al. |
| 5,669,233 A | 9/1997 | Cook et al. |
| 5,671,611 A | 9/1997 | Quigley |
| 5,899,088 A | 5/1999 | Purdum |
| 5,900,299 A | 5/1999 | Wynne |
| 5,924,302 A | 7/1999 | Derifield |
| 6,037,033 A | 3/2000 | Hunter |
| 6,106,449 A | 8/2000 | Wynne |
| 6,116,042 A | 9/2000 | Purdum |
| 6,158,227 A | 12/2000 | Seeley |
| 6,189,330 B1 | 2/2001 | Retallick et al. |
| 6,192,703 B1 | 2/2001 | Salyer et al. |
| 6,212,901 B1 | 4/2001 | Pint et al. |
| 6,237,361 B1 | 5/2001 | Broussard |
| 6,244,458 B1 | 6/2001 | Frysinger et al. |
| 6,260,360 B1 | 7/2001 | Wheeler |
| 6,281,797 B1 | 8/2001 | Forster et al. |
| 6,308,518 B1 | 10/2001 | Hunter |
| 6,401,461 B1 | 6/2002 | Harrison et al. |
| D466,294 S | 12/2002 | Ekerot et al. |
| D467,730 S | 12/2002 | Ekerot et al. |
| 6,666,032 B1 | 12/2003 | Rickson et al. |
| 6,771,183 B2 | 8/2004 | Hunter |
| 6,832,562 B2 | 12/2004 | Tabor et al. |
| 6,860,115 B2 | 3/2005 | Norelius et al. |
| 6,863,949 B2 | 3/2005 | Ehrmanntraut |
| 6,868,982 B2 | 3/2005 | Gordon |
| 6,875,486 B2 | 4/2005 | Miller |
| 7,028,504 B2 | 4/2006 | Derifield |
| 7,043,935 B2 | 5/2006 | Hunter |
| 7,057,527 B2 | 6/2006 | Hunter |
| 7,094,192 B2 | 8/2006 | Schoenberger et al. |
| 7,140,768 B2 | 11/2006 | Prabhakar |
| 7,229,677 B2 | 6/2007 | Miller |
| 7,240,513 B1 | 7/2007 | Conforti |
| 7,257,963 B2 | 8/2007 | Mayer |
| 7,263,855 B2 | 9/2007 | Meyer et al. |
| 7,294,374 B2 | 11/2007 | Romero |
| 7,328,583 B2 | 2/2008 | Hillman et al. |
| 7,357,271 B2 | 4/2008 | Hase et al. |
| 7,422,143 B2 | 9/2008 | Mayer |
| 7,449,227 B2 | 11/2008 | Echigoya et al. |
| 7,501,944 B2 | 3/2009 | Hyde |
| 7,607,542 B1 | 10/2009 | Hseih |
| 7,721,566 B1 | 5/2010 | Wilken |
| 7,908,870 B2 | 3/2011 | Williams et al. |
| 7,913,511 B2 | 3/2011 | Meyer et al. |
| 8,250,835 B2 | 8/2012 | Kenneally |
| 8,250,882 B2 | 8/2012 | Mustafa et al. |
| 8,281,558 B2 | 10/2012 | Hiemeyer et al. |
| 8,424,335 B2 | 4/2013 | Corder et al. |
| 8,443,623 B2 | 5/2013 | Matta et al. |
| 8,539,790 B1 | 9/2013 | Budd |
| 8,607,581 B2 | 12/2013 | Williams et al. |
| 8,672,137 B2 | 3/2014 | Seagle et al. |
| 8,763,423 B2 | 7/2014 | Tattam |
| 8,763,811 B2 | 7/2014 | Lantz |
| 8,822,005 B2 | 9/2014 | Hiemeyer et al. |
| 8,887,515 B2 | 11/2014 | Patstone |
| 8,938,986 B2 | 1/2015 | Matta et al. |
| 9,022,249 B2 | 5/2015 | Ranade |
| 9,045,278 B2 | 6/2015 | Mustafa et al. |
| 9,139,319 B2 | 9/2015 | Crespo et al. |
| 9,151,531 B2 | 10/2015 | Wengreen et al. |
| 9,180,998 B2 | 11/2015 | Banks et al. |
| 9,267,722 B2 | 2/2016 | Blezard et al. |
| 9,272,475 B2 | 3/2016 | Ranade et al. |
| 9,272,811 B1 | 3/2016 | Ranade et al. |
| 9,321,237 B2 | 4/2016 | Hiemeyer et al. |
| 9,366,469 B2 | 6/2016 | Chapman, Jr. |
| 9,366,483 B2 | 6/2016 | Eckhoff et al. |
| 9,376,605 B2 | 6/2016 | Matta et al. |
| 9,513,067 B2 | 12/2016 | Ahmed |
| 9,556,373 B2 | 1/2017 | Formato et al. |
| 9,573,754 B2 | 2/2017 | Ahmed et al. |
| 9,581,374 B2 | 2/2017 | Kuhn et al. |
| 9,598,622 B2 | 3/2017 | Formato et al. |
| 9,688,048 B2 | 6/2017 | Caps |
| 9,688,454 B2 | 6/2017 | Ranade |
| 9,688,455 B2 | 6/2017 | Nehring |
| 9,689,602 B2 | 6/2017 | Emond et al. |
| 9,707,156 B2 | 7/2017 | Wengreen et al. |
| 9,718,608 B2 | 8/2017 | Tattam et al. |
| 9,733,006 B2 | 8/2017 | Siudzinski et al. |
| 9,738,420 B2 | 8/2017 | Miller |
| 9,751,682 B2 | 9/2017 | Mayer et al. |
| 9,758,299 B2 | 9/2017 | Ahmed et al. |
| 9,814,651 B2 | 11/2017 | Wengreen et al. |
| 9,828,165 B2 | 11/2017 | Ranade et al. |
| 9,877,894 B2 | 1/2018 | Wengreen et al. |
| 9,913,777 B2 | 3/2018 | Wengreen et al. |
| 9,938,066 B2 | 4/2018 | Ranade et al. |
| 9,944,449 B2 | 4/2018 | Wood et al. |
| 9,950,851 B2 | 4/2018 | Ranade |
| 9,956,140 B2 | 5/2018 | Wengreen et al. |
| 9,957,099 B2 | 5/2018 | White et al. |
| 9,963,287 B2 | 5/2018 | Vogel et al. |
| 9,975,686 B2 | 5/2018 | Caps |
| 9,976,790 B2 | 5/2018 | Pinto et al. |
| 10,000,329 B2 | 6/2018 | Knight et al. |
| 10,006,581 B2 | 6/2018 | Kuhn et al. |
| 10,065,786 B2 | 9/2018 | Kuhn |
| 10,077,389 B2 | 9/2018 | Formato et al. |
| 10,279,979 B2 | 5/2019 | Ranade |
| 10,287,085 B2 | 5/2019 | Kuhn |
| 10,288,337 B2 | 5/2019 | Blezard et al. |
| 10,309,709 B2 | 6/2019 | Emond et al. |
| 10,329,074 B2 | 6/2019 | Ranade et al. |
| 10,337,784 B2 | 7/2019 | Mills et al. |
| 10,562,694 B2 | 2/2020 | Austerberry et al. |
| 10,568,808 B2 | 2/2020 | Ferracamo, Jr. |
| 10,583,978 B2 | 3/2020 | Longley et al. |
| 10,589,919 B2 | 3/2020 | Losco |

(56) References Cited

U.S. PATENT DOCUMENTS

| | | |
|---|---|---|
| 10,604,326 B2 | 3/2020 | Longley et al. |
| 10,661,969 B2 | 5/2020 | Pranadi et al. |
| 10,752,434 B2 | 8/2020 | Farrar et al. |
| 10,766,685 B2 | 9/2020 | Kuhn et al. |
| 10,816,256 B2 | 10/2020 | Knight et al. |
| 10,829,675 B2 | 11/2020 | Formato et al. |
| 10,919,665 B2 | 2/2021 | Robbins et al. |
| 10,962,270 B2 | 3/2021 | Jain et al. |
| 10,981,714 B2 | 4/2021 | Austerberry et al. |
| 11,137,190 B2 | 10/2021 | Martino |
| 2002/0000443 A1 | 1/2002 | Hunter |
| 2002/0004724 A1 | 1/2002 | Eastman |
| 2002/0114937 A1 | 8/2002 | Albert et al. |
| 2003/0019870 A1 | 1/2003 | Ekerot et al. |
| 2004/0226309 A1 | 11/2004 | Broussard |
| 2005/0224501 A1 | 10/2005 | Folkert et al. |
| 2007/0051734 A1 | 3/2007 | Kuhn |
| 2007/0193297 A1 | 8/2007 | Wilson |
| 2007/0204645 A1 | 9/2007 | Balva et al. |
| 2008/0022696 A1 | 1/2008 | Welle et al. |
| 2008/0202128 A1 | 8/2008 | Flanagan |
| 2009/0078699 A1 | 3/2009 | Mustafa et al. |
| 2009/0230139 A1 | 9/2009 | Li |
| 2010/0314397 A1 | 12/2010 | Williams et al. |
| 2011/0155621 A1 | 6/2011 | Lindquist et al. |
| 2011/0220633 A1 | 9/2011 | Mak et al. |
| 2011/0248038 A1 | 10/2011 | Mayer |
| 2011/0290792 A1 | 12/2011 | Krzak et al. |
| 2012/0279896 A1 | 11/2012 | Lantz |
| 2013/0015191 A1 | 1/2013 | Seagle et al. |
| 2013/0020309 A1 | 1/2013 | Tattam et al. |
| 2013/0228583 A1 | 9/2013 | Mayer |
| 2013/0255306 A1 | 10/2013 | Mayer |
| 2014/0054297 A1 | 2/2014 | Patstone |
| 2014/0091098 A1 | 4/2014 | Casoli |
| 2014/0157797 A1 | 6/2014 | Kovalick et al. |
| 2014/0343493 A1 | 11/2014 | Wengreen |
| 2014/0345316 A1 | 11/2014 | Godbole et al. |
| 2015/0143840 A1 | 5/2015 | Ma |
| 2015/0166244 A1 | 6/2015 | Wood et al. |
| 2015/0191291 A1 | 7/2015 | Wood et al. |
| 2015/0239639 A1 | 8/2015 | Wenner et al. |
| 2015/0274415 A1 | 10/2015 | Farrar et al. |
| 2015/0276297 A1 | 10/2015 | Moore et al. |
| 2016/0236452 A1 | 8/2016 | Caps |
| 2016/0262979 A1 | 9/2016 | Wengreen et al. |
| 2016/0362240 A1 | 12/2016 | Ferracamo, Jr. |
| 2017/0082344 A1 | 3/2017 | Tansley |
| 2017/0115046 A1 | 4/2017 | Blezard et al. |
| 2017/0121097 A1 | 5/2017 | Pranadi et al. |
| 2017/0131014 A1 | 5/2017 | Farrar |
| 2017/0131015 A1 | 5/2017 | Farrar |
| 2017/0203875 A1 | 7/2017 | Tattam et al. |
| 2017/0247169 A1 | 8/2017 | Losco |
| 2017/0297814 A1 | 10/2017 | Goldstein |
| 2017/0305639 A1 | 10/2017 | Kuhn et al. |
| 2018/0016083 A1 | 1/2018 | Knight et al. |
| 2018/0017311 A1 | 1/2018 | Knight et al. |
| 2018/0036202 A1 | 2/2018 | Wengreen et al. |
| 2018/0086534 A1 | 3/2018 | Kilmer et al. |
| 2018/0093816 A1 | 4/2018 | Longley et al. |
| 2018/0100682 A1 | 4/2018 | Nilsen et al. |
| 2018/0208388 A1 | 7/2018 | Austerberry |
| 2018/0251265 A1 | 9/2018 | Egertz et al. |
| 2018/0328644 A1 | 11/2018 | Rizzo et al. |
| 2018/0346122 A1 | 12/2018 | Kzrak et al. |
| 2019/0039811 A1 | 2/2019 | Kuhn et al. |
| 2019/0210790 A1 | 7/2019 | Rizzo et al. |
| 2019/0219320 A1 | 7/2019 | Wood et al. |
| 2019/0226744 A1 | 7/2019 | Wood et al. |
| 2019/0285328 A1 | 9/2019 | Emond et al. |
| 2020/0002075 A1 | 1/2020 | Lee et al. |
| 2020/0039687 A1 | 2/2020 | Kuhn et al. |
| 2020/0047993 A1 | 2/2020 | Brabbs et al. |
| 2020/0158359 A1 | 5/2020 | Ratchford |
| 2020/0231362 A1 | 7/2020 | Kulangara et al. |
| 2020/0307896 A1 | 10/2020 | Pranadi et al. |
| 2020/0324959 A1 | 10/2020 | Longley et al. |
| 2020/0331686 A1 | 10/2020 | Longley et al. |
| 2021/0024270 A1 | 1/2021 | Mirzaee Kakhki |
| 2021/0206565 A1 | 7/2021 | Neeld |
| 2021/0278120 A1 | 9/2021 | Kuhn et al. |
| 2021/0292630 A1 | 9/2021 | Formato et al. |
| 2021/0300665 A1 | 9/2021 | Melchor |
| 2021/0331834 A1 | 10/2021 | Longley et al. |
| 2021/0403224 A1 | 12/2021 | Baske et al. |
| 2022/0002070 A1 | 1/2022 | Moghaddas et al. |

FOREIGN PATENT DOCUMENTS

| | | |
|---|---|---|
| DE | 20301839 U1 | 5/2003 |
| DE | 10301318 B4 | 8/2004 |
| DE | 10346829 A1 | 4/2005 |
| DE | 102004039372 A1 | 4/2005 |
| DE | 102004050549 A1 | 3/2006 |
| DE | 102007028009 A1 | 12/2008 |
| DE | 102014006579 A1 | 9/2015 |
| DE | 202015005010 U1 | 9/2015 |
| DE | 102014015770 A1 | 4/2016 |
| DE | 202018104807 U1 | 10/2018 |
| DE | 202018106306 U1 | 12/2018 |
| DE | 102012006743 B4 | 8/2021 |
| EP | 0781714 A1 | 7/1997 |
| EP | 0893367 A1 | 1/1999 |
| EP | 1006058 A1 | 6/2000 |
| EP | 1177984 A2 | 2/2002 |
| EP | 1248738 B1 | 9/2004 |
| EP | 1544367 A2 | 6/2005 |
| EP | 1428643 B1 | 10/2006 |
| EP | 1944422 A2 | 7/2008 |
| EP | 1477751 B1 | 9/2010 |
| EP | 2374443 A1 | 10/2011 |
| EP | 2256065 B1 | 12/2013 |
| EP | 2876389 A1 | 5/2015 |
| EP | 3381830 A1 | 10/2018 |
| EP | 3686522 A1 | 7/2020 |
| EP | 2014967 B1 | 11/2020 |
| ES | 1265464 U | 4/2021 |
| FR | 2994420 A1 | 2/2014 |
| GB | 2459392 A | 10/2009 |
| JP | 2006011585 A | 1/2006 |
| NO | 2010136771 A1 | 12/2010 |
| WO | 8702122 A1 | 4/1987 |
| WO | 0134501 A1 | 5/2001 |
| WO | 2005061808 A1 | 7/2005 |
| WO | 2007042248 A1 | 4/2007 |
| WO | 2010136769 A1 | 12/2010 |
| WO | 2012094333 A1 | 7/2012 |
| WO | 2014023911 A1 | 2/2014 |
| WO | 2014083320 A1 | 6/2014 |
| WO | 2014125878 A1 | 8/2014 |
| WO | 2015044668 A1 | 4/2015 |
| WO | 2017060695 A1 | 4/2017 |
| WO | 2017207974 A1 | 12/2017 |
| WO | 2018197049 A1 | 4/2018 |
| WO | 2018086752 A1 | 5/2018 |
| WO | 2018157978 A1 | 9/2018 |
| WO | 2019011478 A1 | 1/2019 |
| WO | 2019079186 A1 | 4/2019 |
| WO | 2021119453 A1 | 6/2021 |

OTHER PUBLICATIONS

Bock et al. (DE 102014006579 A1), English Translation, Sep. 10, 2015 (Year: 2015).*

U.S. Appl. No. 17/585,139, inventors James Nilsen et al., filed Jan. 26, 2022.

U.S. Appl. No. 16/246,435, inventors James Robert Chasteen et al., filed Jan. 11, 2019.

U.S. Appl. No. 16/827,086, inventors Dawn E. Smith et al., filed Mar. 23, 2020.

U.S. Appl. No. 17/675,251, inventors Heather M. Conway et al. filed Feb. 18, 2022.

(56) References Cited

OTHER PUBLICATIONS

U.S. Appl. No. 17/687,382, inventors James R. Chasteen et al., filed Mar. 4, 2022.
U.S. Appl. No. 17/726,318, inventors Henry Melchor et al., filed Apr. 21, 2022.
"Phase Change Material PCM based cold storage car" okorder.com Jan. 20, 2018 https://www.okorder.com/p/phase-change-material-pcm-based-cold-storage-car_683766.html#next.
"Pelican BioThermal Cold Storage" payloadasia.com Nov. 23, 2020 https://www.payloadasia.com/2020/11/pelican-biothermal-vaccine-shipping/.
"Pallet Containers Cold Storage Refrigerated Shipping Containers," m.made-in-china.com. Accessed: Mar. 18, 2022. https://m.made-in-china.com/product/Pallet-Containers-Cold-Staorage-Refrigerated-Shipping-Containers-1903014145.html.
Insulated Products Corporation, PopUp Liner; https://ipcpack.com/products/new-innovations/; accessed Mar. 28, 2022.
Elrayies, Ghada Mohammad. "Thermal performance assessment of shippingcontainer architecture in hot and humid climates." Int. J. Adv. Sci. Eng. Inf.Technol 7.4 (2017).
Innovative Energy Inc., InsulTote Insulated Box Liners; https://insul.net/product/insultote-insulated-box-liners/; accessed Mar. 28, 2022.
Grainger Insulated Shipping Kits; https://www.grainger.com/category/packaging-shipping/shipping-boxes-pads-tubes/shipping-boxes/insulated-shipping-kits; accessed Mar. 28, 2022.
AstroAsia Thermal Box | Insulated pallet boxes | Cold Box; https://astro-asia.com/insulated-pallet-box/; accessed Mar. 28, 2022.
Brochure for va-Q-tainer, va-Q-tec AG, Wuerzburg, Germany, https://va-q-tec.com/wp-content/uploads/Extract-va-Q-tainer.pdf; accessed Apr. 12, 2023.
Product Data Sheet for va-Q-tainer Eurox, va-Q-tec AG, Wuerzburg, Germany (2018).
Product Sheet for Peli Biothermal Credo Cargo, Peli BioThermal Ltd., Leighton Buzzard, UK (2022).
Graham, "SkyCell launches the 1500X hybrid container," Air Cargo Week (Apr. 6, 2022); https://www.aircargoweek.com/skycell-launches-the-1500x-hybrid-container/.
Hailey, "SkyCell launches next gen 1500X pharma container," Air Cargo News (Jun. 4, 2022); https://www.aircargonews.net/sectors/pharma-logistics/skycell-launches-next-gen-1500x-pharma-container/.
Paul et al., "A eutectic mixture of galactitol and mannitol as a phase change material for latent heat storage" (sciencedirect.com) Oct. 2015 [online] retrieved from <URL:https://www.sciencedirect.com/science/article/abs/pii/S0196890415005531>.
International Search Report mailed Feb. 10, 2021, in corresponding PCT Application No. PCT/US2020/049597.
Written Opinion mailed Feb. 10, 2021, in corresponding PCT Application No. PCT/US2020/049597.
Ashokan, "A Comparative Study for Cold Chain Packaging Options," Thesis for Master of Science, Rochester Institute of Technology (2011).
"Active CC Boxes Becomes Intelligent Thermal Solutions, Powered by New Leadership Team; Kodiak Cold Chain Containers for Pharmaceuticals and Biologics Re-branded as EcoTherm" prweb.com (Aug. 1, 2011) https://www.prweb.com/releases/2011/8/prweb8681838.htm.
"Climate-controlled LTL containers: an idea whose time has come (again)?" dcvelocity.com (Feb. 28, 2014) https://www.dcvelocity.com/articles/20140228-climate-controlled-ltl-containersan-idea-whose-time-has-come-again/.
"Nordic Cold Chain Pallet Shippers" nordiccoldchain.com (May 17, 2022) https://nordiccoldchain.com/products/shippers/.
Product literature for Topa Thermal GTS-1150L4D-ST pallet shipper, Topa Thermal, Voorhout, The Netherlands (Oct. 21, 2021).
Product literature for Topa Thermal GTS-1150L4D-DI-JAN pallet shipper, Topa Thermal, Voorhout, The Netherlands (Aug. 25, 2020).

\* cited by examiner

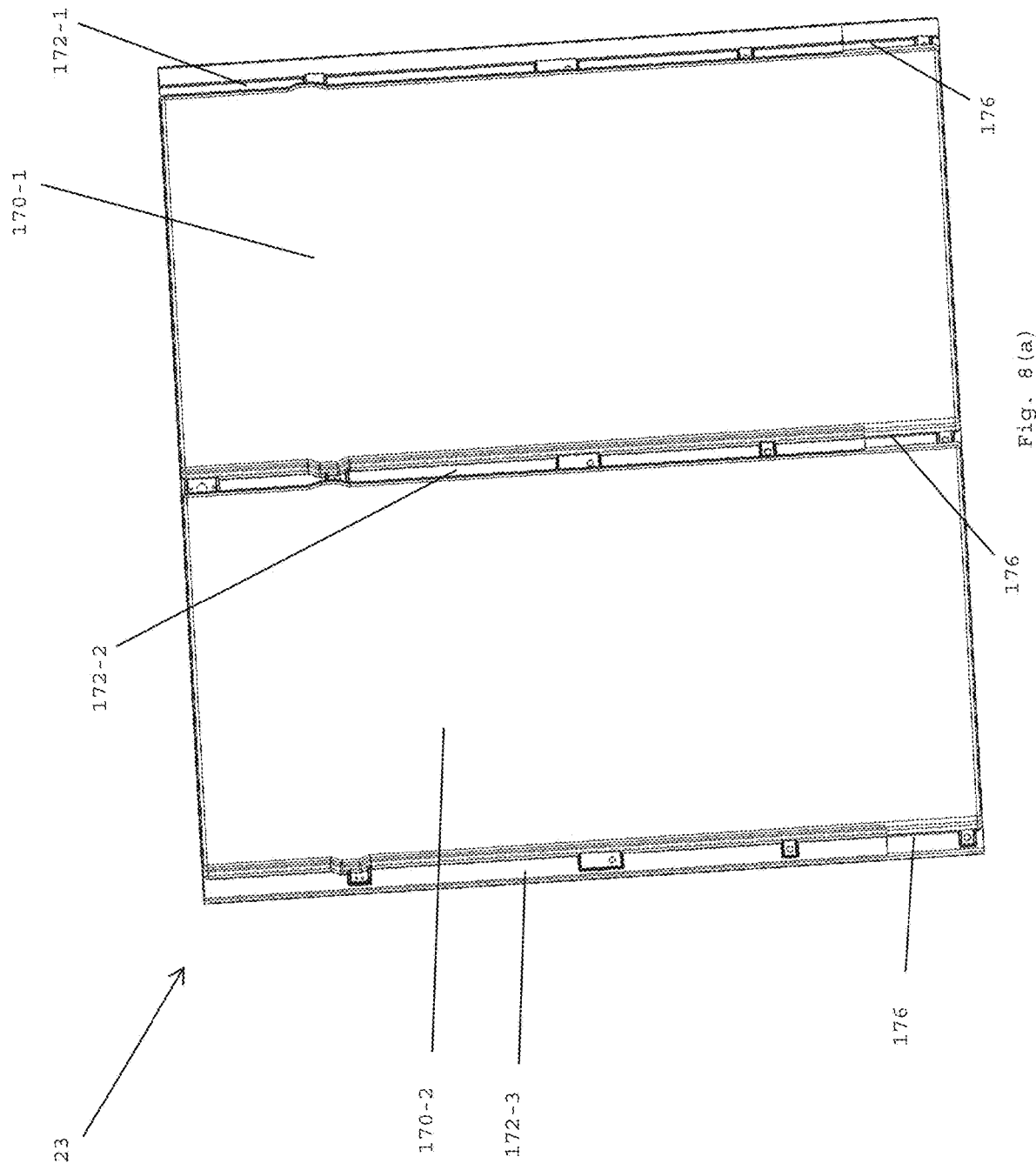

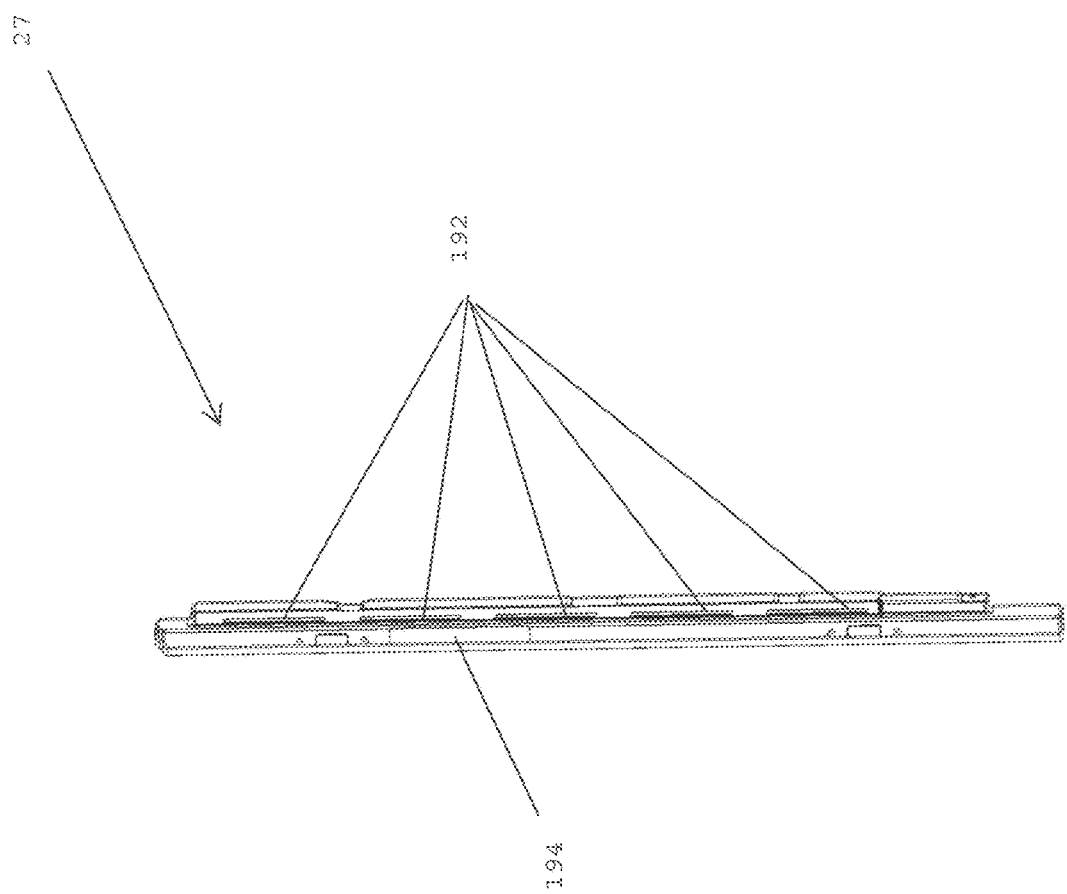

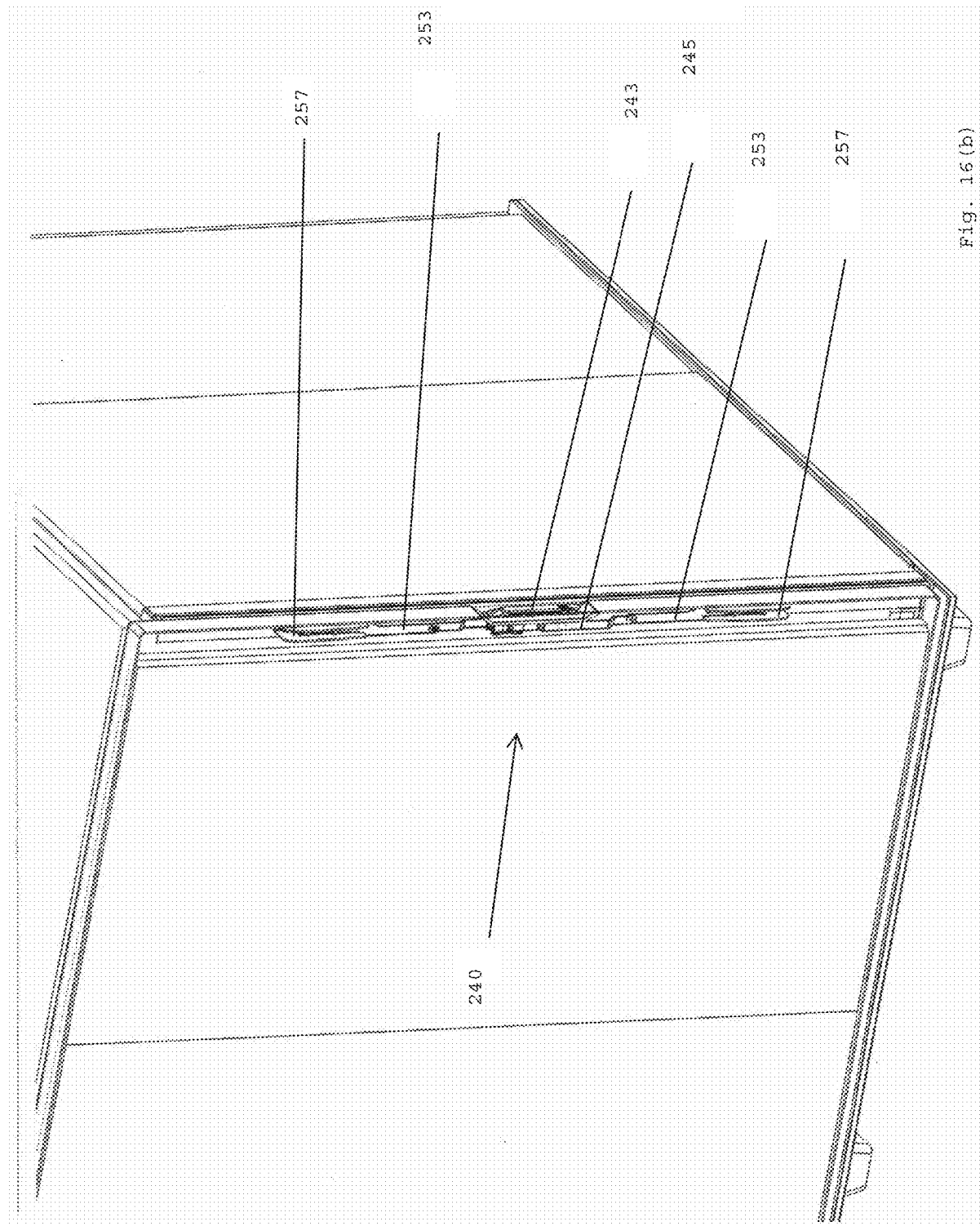

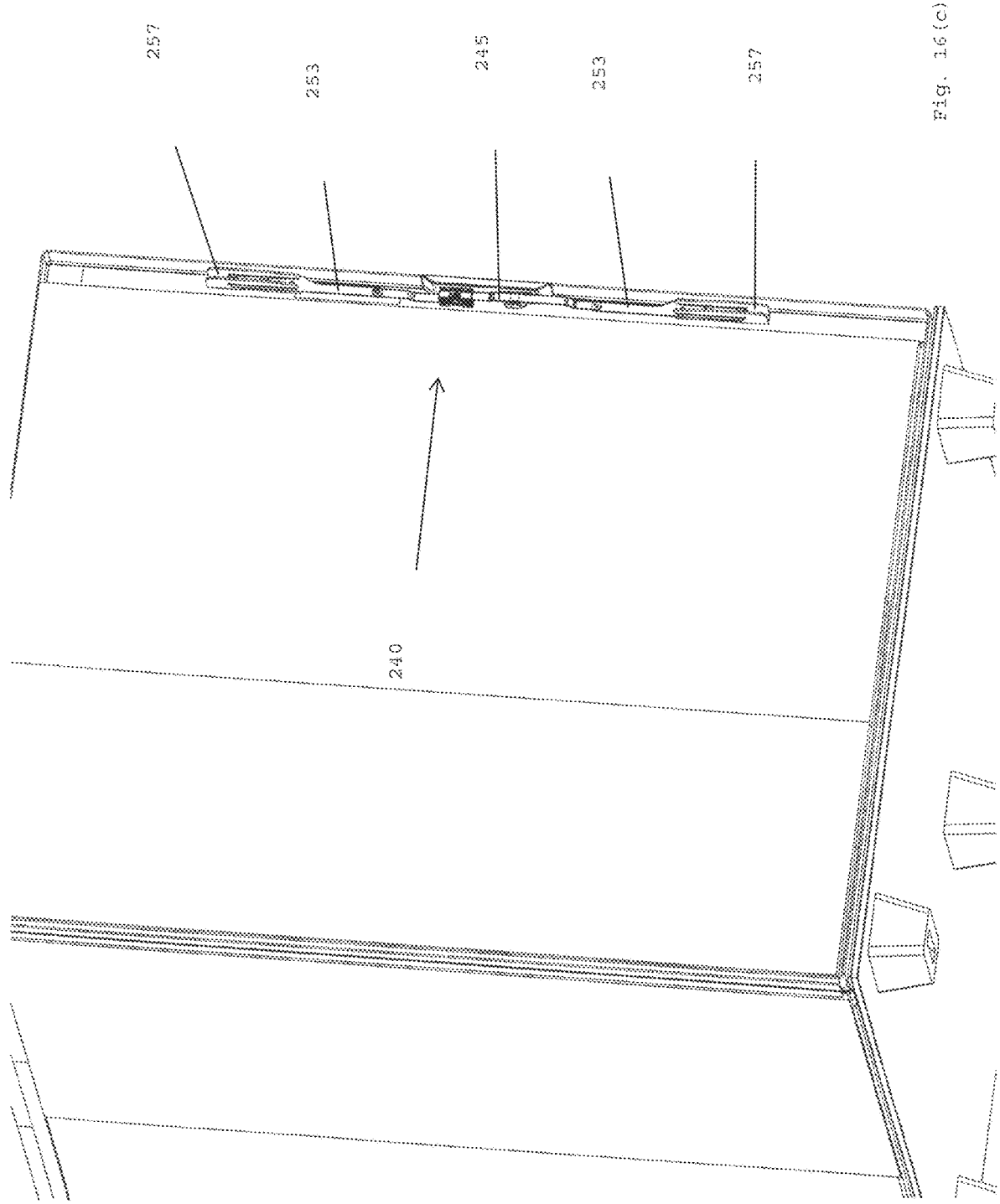

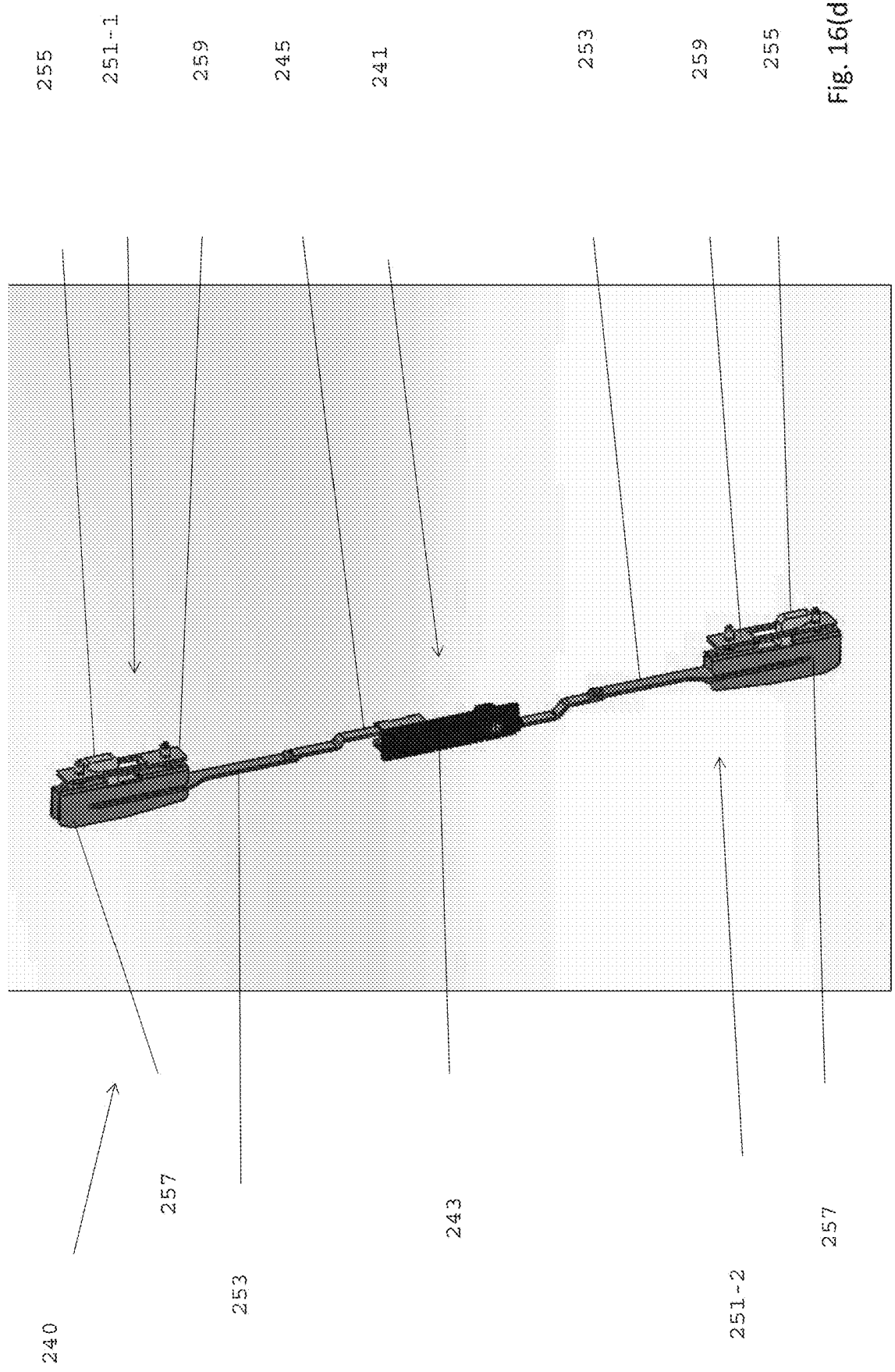

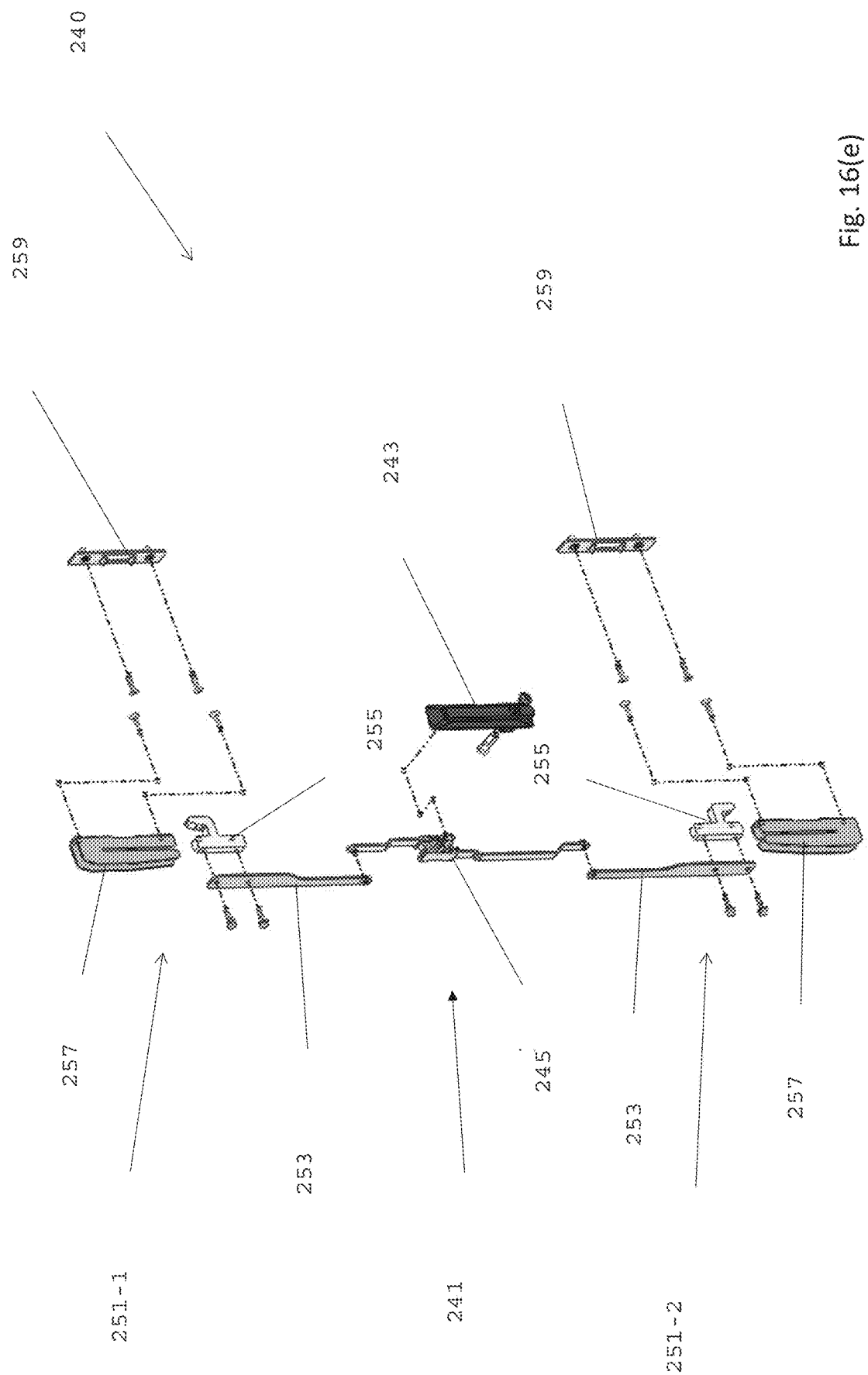

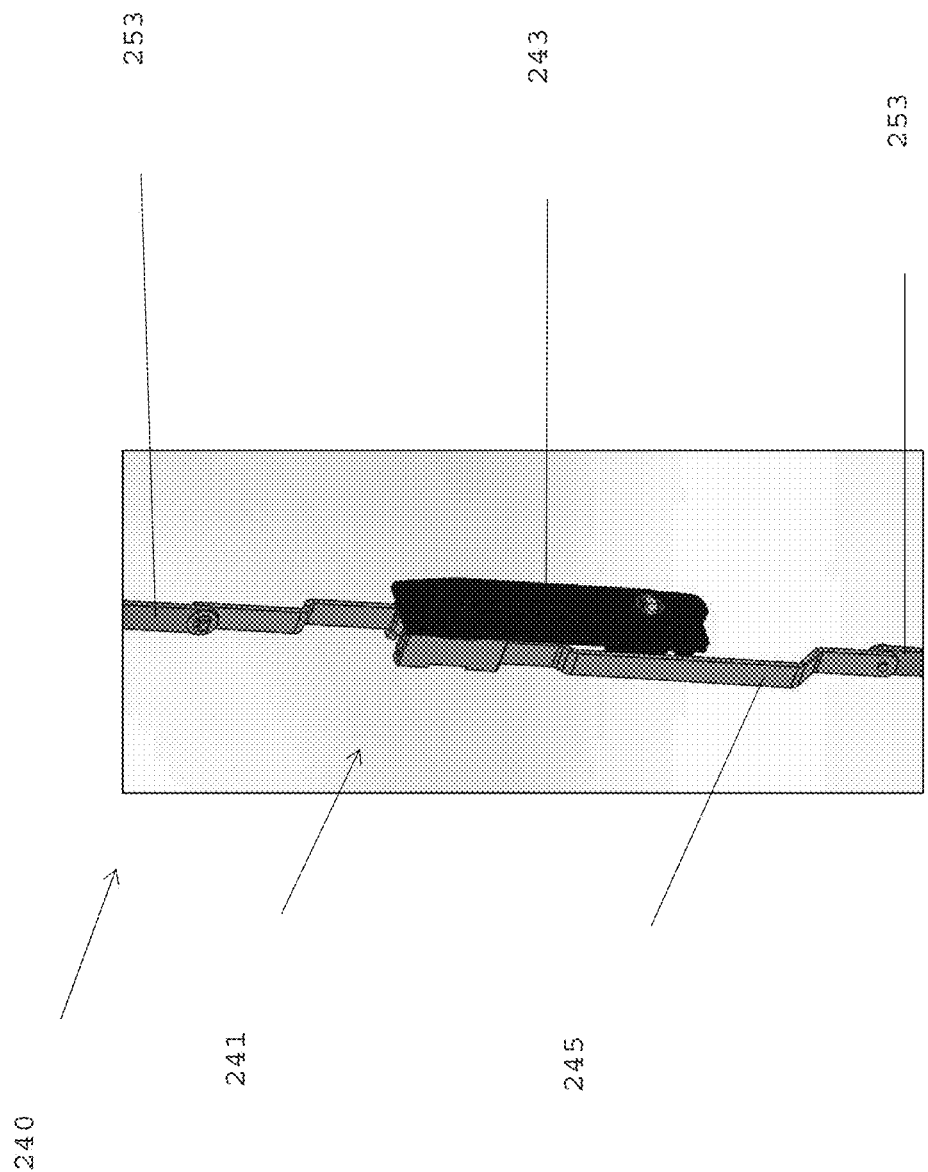

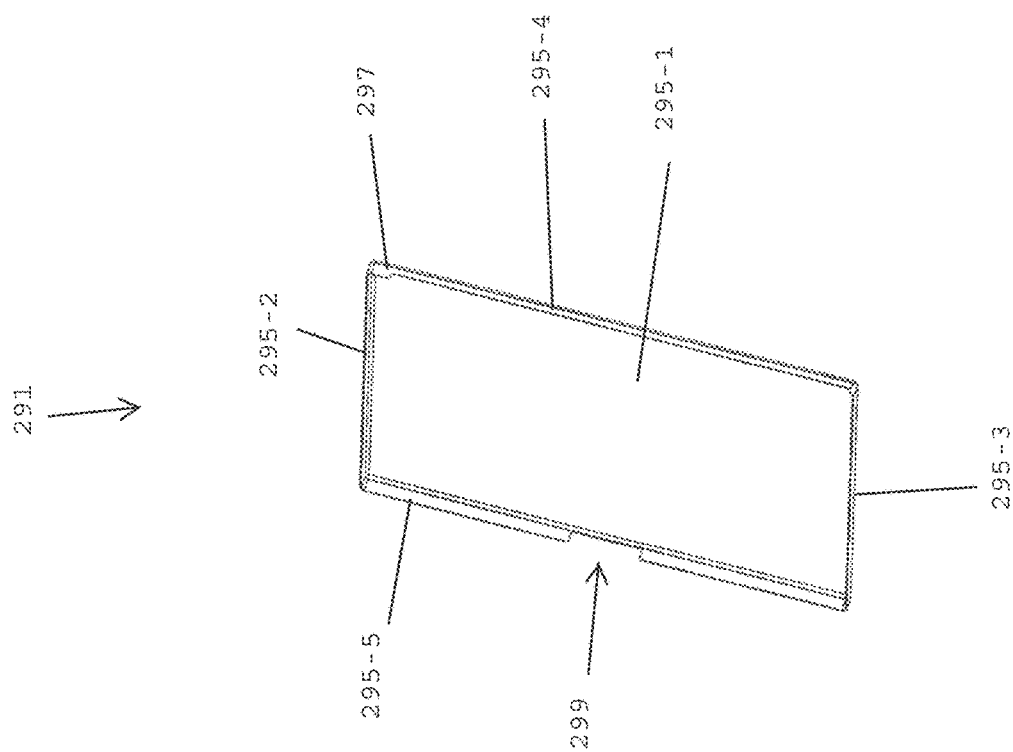

| Location Description | Size (inches) | Weight (oz) | Type of PCM | Notes | Total PCM (lbs) |
|---|---|---|---|---|---|
| Floor | 10.625 x 9.25 x 0.6875 | 31.1 | 5C | 8 per curtain. 4 curtains per shipper | 62.2 |
| Left/Right upper and lower | 7.25 x 12.0 x 0.5 | 20.4 | 5C | 12 per curtain 8 curtains with this much PCM per shipper | 122.4 |
| Front/Back upper and lower | 7.5 x 8.8 x 0.75 | 23.0 | 5C | 12 per curtain 8 curtains with this much PCM per shipper | 138.0 |
| Ceiling | 12.5 x 8.5 x 0.6875 | 33.5 | 5C | 8 per curtain 4 curtains per shipper | 67.0 |
| | | | | | 389.6 |

Fig. 31

| Location Description | Size (inches) | Weight (oz) | Type of PCM | Notes | Total PCM (lbs) |
|---|---|---|---|---|---|
| Floor | 10.625 x 9.25 x 0.6875 | 31.1 | 17C | 8 per curtain, 4 curtains per shipper | 62.2 |
| Left/Right upper | 7.25 x 12.0 x 0.5 | 20.4 | 22C | 12 per curtain, 4 curtains PCM per shipper | 61.2 |
| Left/Right lower | 7.25 x 12.0 x 0.5 | 20.4 | 17C | 12 per curtain, 4 curtains per shipper | 61.2 |
| Front/Back upper | 7.5 x 8.8 x 0.75 | 23.0 | 22C | 12 per curtain, 4 curtains PCM per shipper | 69.0 |
| Front/Back lower | 7.5 x 8.8 x 0.75 | 23.0 | 17C | 12 per curtain, 4 curtains per shipper | 69.0 |
| Ceiling | 12.5 x 8.5 x 0.6875 | 33.5 | 22C | 8 per curtain, 4 curtains per shipper | 67.0 |
| | | | | | 389.6 |

Fig. 32

| Location Description | Size (inches) | Width (in) | Type of Roll | Notes | Total pouches | Total Row (lbs) |
|---|---|---|---|---|---|---|
| Face | 5.5" x 9.375" x 0.875" | 21 | ST | 32 pouches | 672 | 42 |
| Top | 6" x 7.25" x 0.625" | 15 | ST | 48 pouches | 720 | 45 |
| Right | 6" x 7.25" x 0.625" | 15 | ST | 48 pouches | 720 | 45 |
| Bottom | 6" x 8.75" x 0.875" | 21 | ST | 32 pouches | 672 | 42 |
| Front | 6" x 7.25" x 1" | 21 | ST | 36 pouches | 756 | 47.25 |
| Back | 6" x 7.25" x 1" | 21 | ST | 36 pouches | 756 | 47.25 |
| | | | | | 4296 | 268.5 |

Payload size is 48" x 48" x 50".

Fig. 33

| Location Description | Size (inches) | Weight (oz) | Type of PCM | Notes | Total PCM (cc) | Total PCM (lbs) |
|---|---|---|---|---|---|---|
| Floor | 5.5" x 9.375" x 0.875" | 21 | ST | 32 pouches | 672 | 42 |
| Left | 6" x 7.25" x 0.625" | 15 | ST | 96 pouches (additional 48 pouches) | 1440 | 45 |
| Right | 6" x 7.25" x 0.625" | 15 | ST | 96 pouches (additional 48 pouches) | 1440 | 45 |
| Ceiling | 6" x 8.75" x 0.875" | 21 | ST | 64 pouches (additional 32 pouches) | 1344 | 42 |
| Front | 6" x 7.25" x 1" | 21 | ST | 36 pouches | 756 | 47.25 |
| Back | 6" x 7.25" x 1" | 21 | ST | 36 pouches | 756 | 47.25 |
| | | | | | 6408 | 400.5 |

Payload size is reduced to 48" x 38.6" x 49.3" to allow for additional refrigerant on top, left side and right side.

Fig. 34

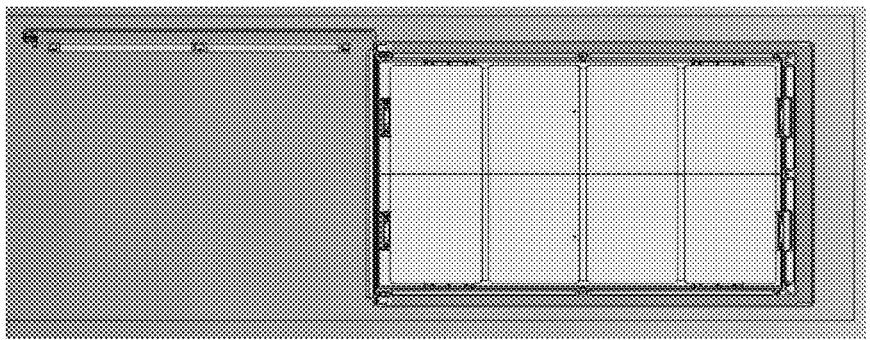
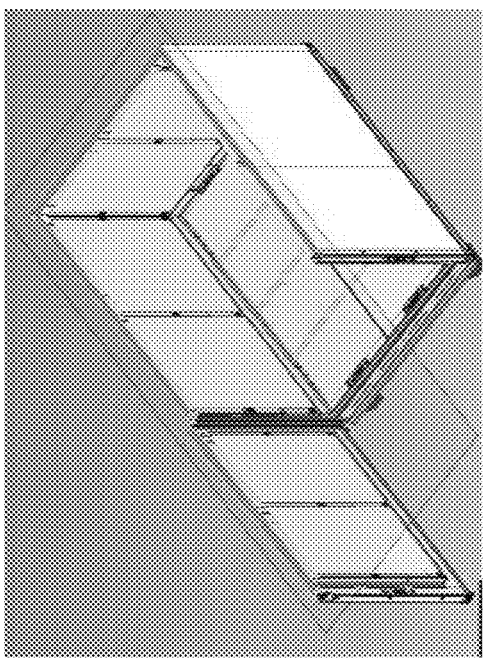
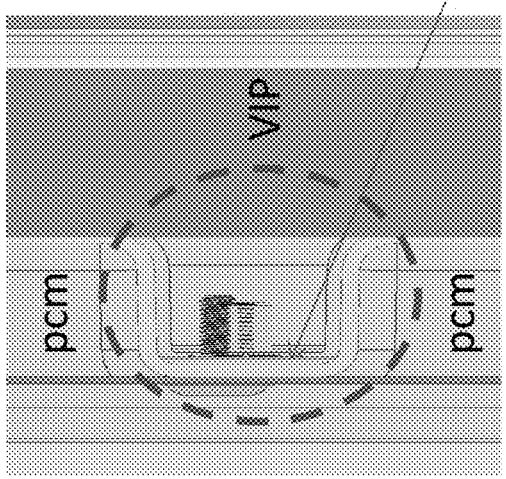
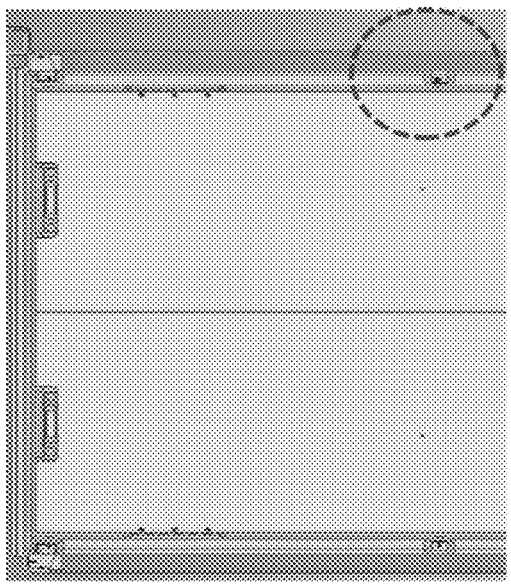
Fig. 36(a)
Fig. 36(b)
Fig. 36(c)
Fig. 36(d)
Fig. 36(e)

SHIPPING SYSTEM FOR TEMPERATURE-SENSITIVE MATERIALS

CROSS-REFERENCE TO RELATED APPLICATIONS

The present application claims the benefit under 35 U.S.C. 119(e) of U.S. Provisional Patent Application No. 62/896,513, inventors James R. Chasteen et al., filed Sep. 5, 2019, U.S. Provisional Patent Application No. 62/896,629, inventors James R. Chasteen et al., filed Sep. 6, 2019, U.S. Provisional Patent Application No. 62/897,847, inventors James R. Chasteen et al., filed Sep. 9, 2019, U.S. Provisional Patent Application No. 62/901,686, inventors James R. Chasteen et al., filed Sep. 17, 2019, U.S. Provisional Patent Application No. 62/915,576, inventors James R. Chasteen, filed Oct. 15, 2019, and U.S. Provisional Patent Application No. 63/010,406, inventors James R. Chasteen, filed Apr. 15, 2020, the disclosures of all of which are incorporated herein by reference.

BACKGROUND OF THE INVENTION

The present invention relates generally to shipping systems for temperature-sensitive materials and relates more particularly to a novel such shipping system.

Shipping systems of the type that may be used to store and/or to transport payloads of temperature-sensitive materials, such as, but not limited to, biological materials, pharmaceutical products, foods, beverages, and/or medical devices, are well-known. Such systems must be capable of maintaining the temperature-sensitive materials within a desired temperature range for an extended period of time (e.g., up to one or more days or longer). As can readily be appreciated, the maintenance of temperature-sensitive materials within a desired temperature range can be challenging and typically cannot be met simply by placing the temperature-sensitive materials in a thermally insulating container. One way in which such temperature maintenance may be achieved is by the use of active temperature-control devices, such as electrically-powered refrigeration units or the like. Systems that include active temperature-control devices are sometimes referred to as actively-controlled systems. A disadvantage with actively-controlled systems is that they tend to add considerable expense to transportation costs. This is, in part, because such systems typically require, amongst other things, a portable source of electricity.

Another way in which temperature maintenance may be achieved is by the use of passive temperature-control devices, such as, but not limited to, ice packs, gel packs, and the like. Such passive temperature-control devices typically comprise a quantity of a phase-change material disposed within a suitable container. Many different types of phase-change materials exist, some types comprising an organic phase-change material and some other types comprising an aqueous phase-change material. As an alternative to packaged phase-change materials, loose ice or loose dry ice may also be used. Shipping systems that rely on passive temperature-control are sometimes referred to as passively-controlled systems.

Some passively-controlled systems for shipping temperature-sensitive materials are designed for shipping a parcel-sized payload. Other passively-controlled systems for shipping temperature-sensitive materials are designed for shipping a pallet-sized payload.

Illustrative examples of passively-controlled shipping systems that may be used to transport pallet-sized payloads are discussed below.

In U.S. Patent Application Publication No. US 2017/0121097 A1, inventors Pranadi et al., published May 4, 2017, which is incorporated herein by reference, there is disclosed a thermally insulated shipping system for use in transporting a pallet-sized payload. In one embodiment, the system includes a plurality of thermally insulating walls arranged to define an interior volume suitable for receiving a pallet-sized payload. The thermally insulating walls include a top wall, a bottom wall, a front wall, a rear wall, a left wall, and a right wall, of which all but the bottom wall include at least two slots facing towards the interior volume. One of the slots is an inner slot that is more proximal to the interior volume, and one of the slots is an outer slot that is more distal to the interior volume. The system also includes a plurality of inner cassettes disposed in at least some of the inner slots and a plurality of outer cassettes disposed in at least some of the outer slots. The inner and outer cassettes include phase-change materials.

In U.S. Pat. No. 9,180,998 B2, inventor Banks et al., which issued Nov. 10, 2015, and which is incorporated herein by reference, there is disclosed an insulated pallet shipper and methods of making and using the same. The insulated pallet shipper of the foregoing published patent application is said to include an insulated container shaped to include a top wall, a bottom wall, a left side wall, a right side wall, a rear wall, and a front wall, the aforementioned walls collectively defining a cavity. A plurality of coolant members are positioned within the cavity, each of the coolant members including a plurality of coolant bricks encased within a cardboard container. At least some of the coolant members are preconditioned at a refrigerating temperature and at least some of the coolant members are preconditioned at a freezing temperature. An inner pallet is seated on the bottom wall.

Shipping systems for pallet-sized payloads are often used in air transport. Typically, in air transport, a pallet-sized shipping system is seated on and secured to a PMC (Prorate Manual Cargo) sheet. A PMC sheet is a standard hardware platform used on aircraft and typically has a defined geometry, such as length and width dimensions of 125 inches×96 inches. For US-sized pallets, which typically have length and width dimensions of 48 inches×40 inches, the size of a conventional passively-controlled shipping system that possesses adequate thermal properties to keep a payload within a desired temperature range for an extended period of time (e.g., up to a few days or longer) is so large that only one or, at most, two shipping systems can fit on a single PMC sheet. As a result, the amount of product that can be shipped on a single PMC sheet using a conventional passively-controlled system is significantly limited.

As noted above, a standard US-sized pallet typically has a footprint of 40 inches×48 inches. By contrast, a standard European-sized pallet typically has a footprint of 31.5 inches×47.2 inches. Another shortcoming with conventional passively-controlled shipping systems is that such systems are typically designed either for only a standard US-sized pallet and payload or for only a standard European-sized pallet and payload. In other words, conventional systems are typically not designed to accommodate, alternatively, a standard US-sized pallet and payload and a standard European-sized pallet and payload. As a result, based on whether a standard US-sized pallet is used or a standard European-sized pallet is used, a different type of conventional passively-controlled shipping system is typically required.

Furthermore, another shortcoming with conventional shipping systems is that such systems are often difficult to store when not in use. This is because such systems typically are not constructed to withstand the weight of one system being stacked upon another system.

Documents that may be of interest may include the following, all of which are incorporated herein by reference: U.S. Pat. No. 10,583,978 B2, inventors Longley et al., issued Mar. 10, 2020; U.S. Pat. No. 9,963,287 B2, inventors Vogel et al., issued May 8, 2018; U.S. Pat. No. 9,944,449 B2, inventors Wood et al., issued Apr. 17, 2018; U.S. Pat. No. 9,718,608 B2, inventors Tattam et al., issued Aug. 1, 2017, U.S. Pat. No. 9,689,602 B2, inventors Emond et al., issued Jun. 27, 2017; U.S. Pat. No. 8,887,515 B2, inventor Patstone, issued Nov. 18, 2014; U.S. Pat. No. 8,763,423 B2, inventor Tattam, issued Jul. 1, 2014; U.S. Pat. No. 8,672,137 B2, inventors Seagle et al., issued Mar. 18, 2014; U.S. Pat. No. 8,607,581 B2, inventors Williams et al., issued Dec. 17, 2013; U.S. Pat. No. 7,950,246 B1, inventors Mayer et al., issued May 31, 2011; U.S. Pat. No. 7,913,511 B2, inventors Meyer et al., issued Mar. 29, 2011; U.S. Pat. No. 7,784,301 B2, inventors Sasaki et al., issued Aug. 31, 2010; U.S. Pat. No. 7,721,566 B1, inventor Wilken, issued May 25, 2010; U.S. Pat. No. 7,328,583 B2, inventors Hillman et al., issued Feb. 12, 2008; U.S. Pat. No. 7,240,513 B1, inventor Conforti, issued Jul. 10, 2007; U.S. Pat. No. 7,257,963 B2, inventor Mayer, issued Aug. 21, 2007; U.S. Pat. No. 7,028,504 B2, inventor Derifield, issued Apr. 18, 2006; U.S. Pat. No. 6,875,486 B2, inventor Miller, issued Apr. 5, 2005; U.S. Pat. No. 6,832,562 B2, inventors Tabor et al., issued Dec. 21, 2004; U.S. Pat. No. 6,718,776 B2, inventors Wessling et al., issued Apr. 13, 2004; U.S. Pat. No. 6,116,042, inventor Purdum, issued Sep. 12, 2000; U.S. Pat. No. 5,669,233, inventors Cook et al., issued Sep. 23, 1997; U.S. Patent Application Publication No. US 2018/0093816 A1, inventors Longley et al., published Apr. 5, 2018, U.S. Patent No. US 2016/0362240 A1, inventor Ferracamo, Jr., published Dec. 15, 2016; U.S. Patent No. US 2015/0285548 A1, inventors Emond et al., published Oct. 8, 2015; U.S. Patent Application Publication No. US 2015/0276297 A1, inventors Moore et al., published Oct. 1, 2015; U.S. Patent Application Publication No. US 2015/0239639 A1, inventors Wenner et al., published Aug. 27, 2015; U.S. Patent Application Publication No. US 2014/0008042 A1, inventors Schryver et al., published Jan. 9, 2014; U.S. Patent Application Publication No. US 2013/0015191 A1, inventors Seagle et al., published Jan. 17, 2013; U.S. Patent Application Publication No. US 2010/0301057 A1, inventors Tattam et al., published Dec. 2, 2010; U.S. Patent Application Publication No. US 2008/0276643 A1, inventors Heroux et al., published Nov. 13, 2008; U.S. Patent Application Publication No. US 2007/0051734 A1, inventor Kuhn, published Mar. 8, 2007; PCT International Publication No. WO 2018/213348 A2, published Nov. 26, 2018; PCT International Publication No. WO 2014/083320 A1, published Jun. 5, 2014; PCT International Publication No. WO 2014/023911 A1, published Feb. 13, 2014; French Patent Application Publication No. FR 2 994 420 A1, published Feb. 14, 2014; and French Patent Application Publication No. FR 2 989 359 A1, published Oct. 18, 2013.

SUMMARY OF THE INVENTION

It is an object of the present invention to provide a novel shipping system for temperature-sensitive materials.

It is another object of the present invention to provide a shipping system as described above that overcomes at least some of the shortcomings associated with existing shipping systems.

Therefore, according to one aspect of the invention, there is provided a passively-controlled shipping system for temperature-sensitive materials, the passively-controlled shipping system comprising (a) an insulated container, the insulated container having a payload space dimensioned to accommodate a pallet and a pallet-sized payload; and (b) a quantity of phase-change material disposed within the insulated container; (c) wherein the passively-controlled shipping system is dimensioned so that four such shipping systems may be seated within the footprint of a PMC sheet having dimensions of 125 inches×96 inches.

In a more detailed feature of the invention, the passively-controlled shipping system may have maximum outer length and width dimensions of about 61¼ inches and about 47¼ inches, respectively.

In a more detailed feature of the invention, the passively-controlled shipping system may have a maximum outer height of less than 64 inches.

In a more detailed feature of the invention, the passively-controlled shipping system may have a maximum outer height of about 62½ inches.

In a more detailed feature of the invention, the payload space may be dimensioned to accommodate alternatively a standard US-sized pallet and corresponding payload and a standard European-sized pallet and corresponding payload.

In a more detailed feature of the invention, the passively-controlled shipping system may be configured to maintain a payload disposed within the insulated container within a desired temperature range for at least 4 days.

In a more detailed feature of the invention, the passively-controlled shipping system may be configured to maintain a payload disposed within the insulated container within a desired temperature range for at least 5 days.

In a more detailed feature of the invention, the desired temperature range may be 2° C. to 8° C.

In a more detailed feature of the invention, the desired temperature range may be 15° C. to 25° C.

In a more detailed feature of the invention, the passively-controlled shipping system may be configured to withstand being stacked two-high when not in use without undergoing structural damage.

In a more detailed feature of the invention, the passively-controlled shipping system may have a tare weight of about 500-525 kg.

In a more detailed feature of the invention, the passively-controlled shipping system may have a maximum payload weight of about 700 kg.

In a more detailed feature of the invention, the insulated container may comprise a frame, the frame may define a closed space, and the closed space may comprise the payload space.

In a more detailed feature of the invention, the frame may be made of a composite material.

In a more detailed feature of the invention, the composite material may comprise a fiberglass composite.

In a more detailed feature of the invention, the frame may have a wall thickness not exceeding about 6 mm.

In a more detailed feature of the invention, the insulated container may further comprise at least one vacuum insulated panel, and the at least one vacuum insulated panel may be disposed outside the frame.

In a more detailed feature of the invention, the frame may comprise a bottom, a top, a front, a rear, a left side, and a right side, the at least one vacuum insulated panel disposed outside the frame may comprise a plurality of vacuum insulated panels disposed outside the frame, and at least one of the plurality of vacuum insulated panels may be aligned with each of the bottom, the top, the front, the rear, the left side, and the right side of the frame.

In a more detailed feature of the invention, the frame may comprise at least one thermal break to minimize heat conduction between the closed space within the frame and a space external to the frame.

In a more detailed feature of the invention, the at least one thermal break may comprise at least one through opening formed in the frame.

In a more detailed feature of the invention, the frame may comprise a bottom, a top, a front, a rear, a left side, and a right side, the at least one thermal break may comprise a plurality of through openings in the front and a plurality of through openings in the bottom, and none of the through openings may be in fluid communication with the enclosed space of the frame.

In a more detailed feature of the invention, the quantity of phase-change material may be disposed within the frame.

In a more detailed feature of the invention, the quantity of phase-change material may be distributed amongst a plurality of phase-change material assemblies, and the phase-change material assemblies may be coupled to the interior of the frame.

In a more detailed feature of the invention, the phase-change material may consist of a single type of phase-change material.

In a more detailed feature of the invention, the phase-change material may comprise a plurality of different types of phase-change material.

In a more detailed feature of the invention, the plurality of different types of phase-change material may comprise a first phase-change material and a second phase-change material, the first phase-change material may be positioned exclusively in a top portion of the enclosed space of the frame, and the second phase-change material may be positioned exclusively in a bottom portion of the enclosed space of the frame.

In a more detailed feature of the invention, the passively-controlled shipping system may further comprise a plurality of heat-spreaders, and the heat-spreaders may be disposed between the payload space and the phase-change material assemblies.

In a more detailed feature of the invention, the insulated container may comprise a frame, an outer shell, and a plurality of vacuum insulated panels, the frame may encompass the payload space, the outer shell may be positioned outside of the frame, the vacuum insulated panels may be positioned outside of the frame, and at least some of the vacuum insulated panels may be positioned between the frame and the outer shell.

In a more detailed feature of the invention, the quantity of phase-change material may be distributed amongst a plurality of phase-change material assemblies, and the phase-change material assemblies may be coupled to the interior of the frame.

In a more detailed feature of the invention, the passively-controlled shipping system may further comprise a plurality of heat-spreaders, and the heat-spreaders may be disposed interior to the phase-change material assemblies.

According to another aspect of the invention, there is provided a passively-controlled shipping system for temperature-sensitive materials, the passively-controlled shipping system comprising (a) a frame, the frame defining a closed space; (b) an outer shell, the outer shell being disposed exterior to the frame; (c) a plurality of vacuum insulated panels, the plurality of vacuum insulated panels being disposed exterior to the frame, with at least some of the vacuum insulated panels positioned between the frame and the outer shell; (d) a plurality of phase-change material assemblies, the plurality of phase-change material assemblies being disposed interior to the frame; and (e) a plurality of heat-spreaders, the plurality of heat-spreaders being disposed interior to the phase-change material assemblies.

In a more detailed feature of the invention, the frame may comprise at least one thermal break to minimize heat conduction between the closed space and a space external to the frame.

In a more detailed feature of the invention, the frame may comprise at least one vertical wall, and the vertical wall may comprise at least one vertical rib.

In a more detailed feature of the invention, the frame may comprise at least one inwardly-facing cavity and at least one outwardly-facing cavity, at least one of the phase-change material assemblies may be disposed within one of the at least one inwardly-facing cavity, and at least one vacuum insulated panel may be disposed within one of the at least one outwardly-facing cavity.

In a more detailed feature of the invention, at least one of the plurality of heat-spreaders may comprise a first portion and a second portion, the first portion and the second portion may be hingedly interconnected, the first portion may be permanently attached to the frame, and the second portion may be removably attachable to the frame.

In a more detailed feature of the invention, the frame may comprise a door, and the door may be hingedly connected to a remainder of the frame.

In a more detailed feature of the invention, the door hinge may comprise a pair of wings interconnected by a flexible bridge, and the wings may not be mounted parallel to one another.

According to still another aspect of the invention, there is provided a phase-change material assembly comprising (a) a curtain, the curtain comprising a plurality of pockets, wherein each of the pockets has a pair of ends, each of the pair of ends being permanently closed, wherein at least one of the permanently closed ends is closed only at one or more spots, thereby permitting visual inspection of the contents of the pocket; and (b) at least one phase-change material pack disposed within at least some of the pockets, the contents of the at least one phase-change material pack being visible through the end of the pocket closed only at one or more spots.

For purposes of the present specification and claims, various relational terms like "top," "bottom," "proximal," "distal," "upper," "lower," "front," and "rear" may be used to describe the present invention when said invention is positioned in or viewed from a given orientation. It is to be understood that, by altering the orientation of the invention, certain relational terms may need to be adjusted accordingly.

Additional objects, as well as aspects, features and advantages, of the present invention will be set forth in part in the description which follows, and in part will be obvious from the description or may be learned by practice of the invention. In the description, reference is made to the accompanying drawings which form a part thereof and in which is shown by way of illustration various embodiments for practicing the invention. The embodiments will be described in sufficient detail to enable those skilled in the art to practice the invention, and it is to be understood that other embodiments may be utilized and that structural or other changes may be made without departing from the scope of the invention. The following detailed description is, therefore, not to be taken in a limiting sense.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. These drawings are not necessarily drawn to scale, and certain components may have undersized and/or oversized dimensions or may be missing for purposes of explication. In the drawings wherein like reference numerals represent like parts:

FIGS. 8(a) and 8(b) are right and left perspective views, respectively, of the frame right side shown in FIG. 2(b);

FIGS. 10(a) and 10(b) are front and rear perspective views, respectively, of the right corner gusset of the shipping system shown in FIG. 2(a);

FIGS. 16(b) and 16(c) are enlarged fragmentary front right and enlarged fragmentary front left perspective views, respectively, of the shipping system of FIG. 1(a), with the outer shell removed to reveal additional details of the door-latching mechanism;

FIGS. 16(d) and 16(e) are enlarged perspective and partly exploded enlarged perspective views, respectively, of the door-latching mechanism shown in FIG. 16(a);

FIGS. 16(f) and 16(g) are enlarged fragmentary perspective views of the door-latching mechanism shown in FIG. 16(a), showing one of the plate assemblies and the rack-and-pinion/handle assembly, respectively;

FIGS. 17(a) and 17(b) are front perspective and rear perspective views, respectively, of the first shell portion shown in FIG. 1(a);

FIG. 31 is a table showing some particulars relating to the phase-change material of a version of the system of FIG. 1(a) intended for maintaining a payload within a temperature range of +2° C. to +8° C. for an extended period of time;

FIG. 32 is a table showing some particulars relating to the phase-change material of a version of the system of FIG. 1(a) intended for maintaining a payload within a temperature range of +15° C. to +25° C. for an extended period of time;

FIG. 33 is a table showing some particulars relating to the phase-change material of a computer-simulated version of the system of FIG. 1(a) intended for maintaining a payload within a temperature range of less than approximately −15° C. or less than approximately −20° C. for an extended period of time;

FIG. 34 is a table showing some particulars relating to the phase-change material of a computer-simulated version of the system of FIG. 1(a) intended for maintaining a payload within a temperature range of less than approximately −15° C. or less than approximately −20° C. for an extended period of time;

FIG. 36(a) is a perspective view of the shipper of FIG. 1(a) with a portion of the outer shell removed;

FIG. 36(b) is a section view of the shipper shown in FIG. 36(a);

FIG. 36(c) is a top view of the sectioned shipper shown in FIG. 36(b);

FIG. 36(d) is an enlarged fragmentary view of the sectioned shipper shown in FIG. 36(c);

FIG. 36(e) is an enlarged view of the circled portion of FIG. 36(d);

DETAILED DESCRIPTION OF THE INVENTION

Figure 1A:
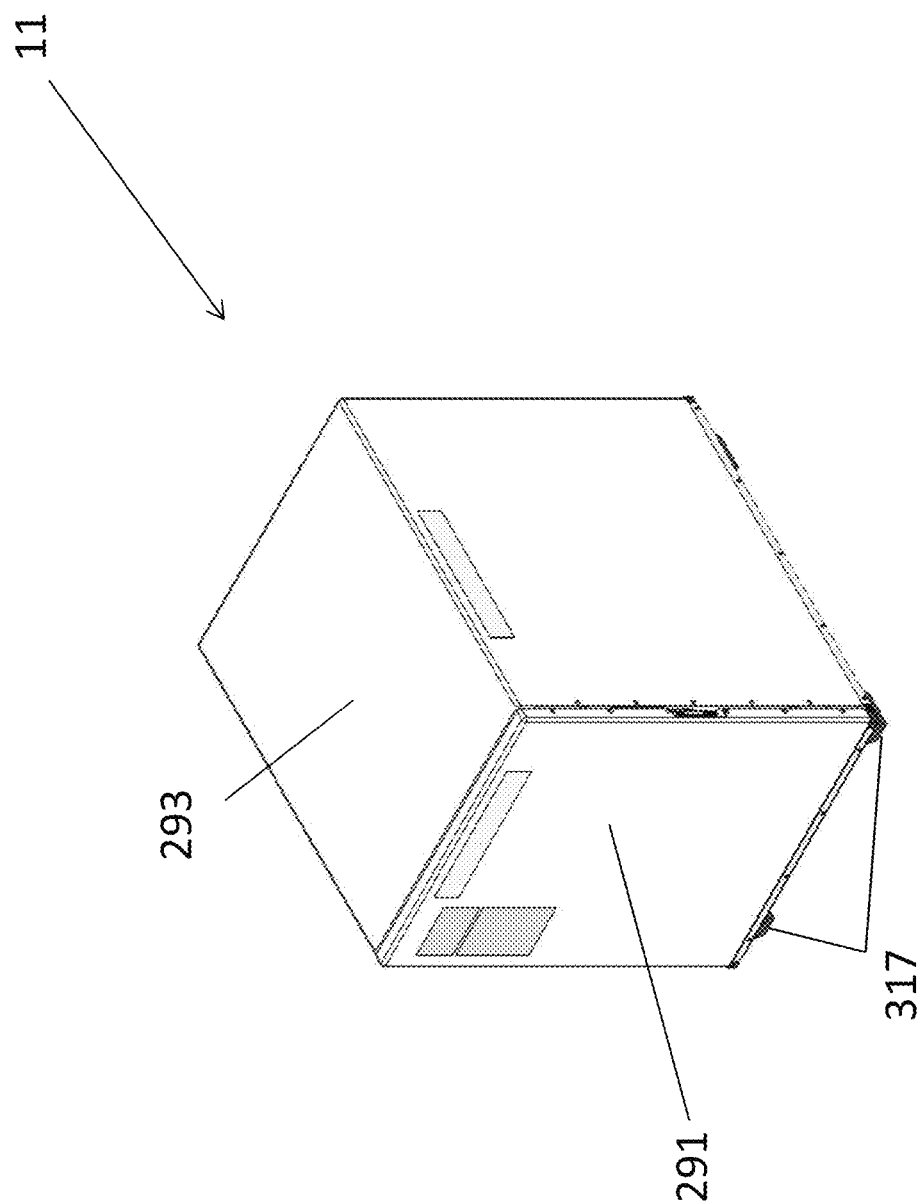
FIG. 1(a) is a front perspective view of a first embodiment of a shipping system for temperature-sensitive materials constructed according to the teachings of the present invention.
Figure 1B:
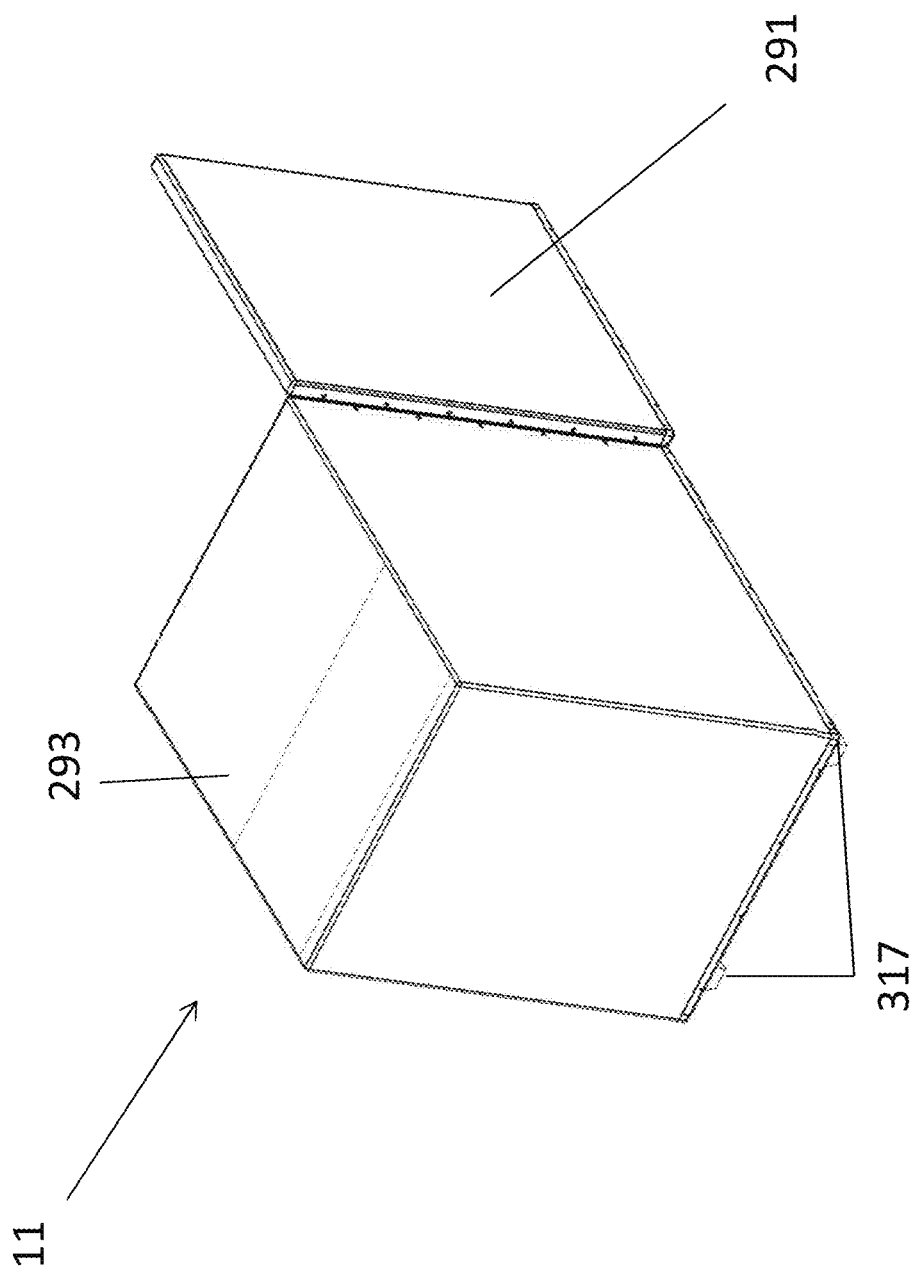
FIG. 1(b) is a rear perspective view of the shipping system shown in FIG. 1(a), with the door of the shipping system being shown in an open position.

Referring now to FIGS. 1(a)-1(e) and 2(a)-2(f), there are shown various views of a first embodiment of a shipping system for temperature-sensitive materials, the shipping system being constructed according to the teachings of the present invention and being represented generally by reference numeral 11. Details of shipping system 11 that are discussed elsewhere in this application or that are not critical to an understanding of the invention may be omitted from one or more of FIGS. 1(a)-1(e) and 2(a)-2(f) and/or from the accompanying description herein or may be shown in one or more of FIGS. 1(a)-1(e) and 2(a)-2(f) and/or described herein in a simplified manner.

Shipping system 11 may be well-suited for, but not limited to, freight aircraft shipments (including, but not limited to, international freight aircraft shipments) of temperature-sensitive materials, such as, but not limited to, biological materials, pharmaceutical products, foods, beverages, and/or medical devices. In particular, shipping system 11 may be designed to maintain temperature-sensitive materials within a desired temperature range (for example, but not limited to, a temperature range of +2° C. to +8° C. or a temperature range of +15° C. to +25° C.) for an extended period of time (for example, but not limited to, several hours or days including 96 hours or longer). In one embodiment, shipping system 11 may be qualified with ISTA (International Safe Transit Association) 7D standard temperature test profiles for a 96-hour duration.

In addition, shipping system 11 may be dimensioned to alternatively accommodate either a standard US-sized pallet and payload or a standard European-sized pallet and payload. A standard US-sized pallet typically has a footprint of 40 inches×48 inches and a height of 5 inches. A standard European-sized pallet typically has a footprint of 31.5 inches×47.2 inches and a height of 5 inches. In a preferred embodiment, shipping system 11 may be dimensioned to accommodate either a standard US-sized pallet or a standard European-sized pallet, together with a payload having a height of 45 inches (in other words, a combined pallet and payload height of 50 inches). In addition, in a preferred embodiment, shipping system 11 may have overall outer dimensions of about 61¼ inches×about 47¼ inches×about 62½ inches. In this manner, four such shipping systems 11 may simultaneously sit, in one layer, on a single PMC sheet having a footprint of 125 inches×96 inches. In addition, by having overall outer dimensions of about 61¼ inches×about 47¼ inches×about 62½ inches, shipping system 11 may fit through a cargo hold door opening that is 64 inches in height.

Shipping system 11 may comprise a frame 12. Frame 12 may define a substantially enclosed space 10 that may be designed to alternatively receive either a standard US-sized pallet and payload or a standard European-sized pallet and payload. In other words, space 10 may have "one size fits all" dimensions (i.e., may be universally suitable for) (1) a standard US-sized pallet and payload and (2) a standard European-sized pallet and payload. Frame 12 may comprise a bottom 13, a top 15, a door (or front) 17, a back 19, a left side 21, a right side 23, a left corner gusset 25, and a right corner gusset 27.

Back 19 may be fixedly secured, for example, by an appropriate adhesive, mechanical fasteners, or other suitable means, to each of left side 21 and right side 23. Each of back 19, left side 21, and right side 23 may be fixedly secured, for example, by an appropriate adhesive, mechanical fasteners or other suitable means, to each of bottom 13 and top 15. Left corner gusset 25 may be fixedly secured, for example, by an appropriate adhesive, mechanical fasteners, or other suitable means, to each of left side 21, bottom 13, and top 15. Right corner gusset 27 may be fixedly secured, for example, by an appropriate adhesive, mechanical fasteners, or other suitable means, to each of right side 23, bottom 13, and top 15. In a preferred embodiment, the various components of frame 12 discussed above may be fixedly secured to one another using a bonding adhesive, such as PLEXUS MA2015, a two-part methacrylate adhesive (ITW Performance Polymers, Danvers, MA).

Preferably, each of bottom 13, top 15, door 17, back 19, left side 21, right side 23, left corner gusset 25, and right corner gusset 27 is made of one or more materials possessing one or more of the following properties: low thermal conductivity and good mechanical strength. Examples of materials possessing at least one of these properties include, but are not limited to, metals (such as, for example, aluminum), metal alloys (such as, for example, steel), and composite materials. Composite materials are a class of materials that include a fiber material bonded together with a resin binder. The fiber material, which is typically e-glass, carbon, or aramid, may be arranged in a single layer or in a multi-layer with unidirectional or oriented layups depending on the desired properties. Examples of composite materials include fiberglass composite, carbon fiber composite, and Kevlar composite. Composite materials not only possess good mechanical strength but also exhibit low thermal conductivity. For example, fiberglass composite has a thermal conductivity of about 0.187 W/mK and carbon fiber composite has a thermal conductivity of about 0.275 W/mK. By contrast, aluminum has a thermal conductivity of about 167 W/mK, and steel has a thermal conductivity of about 52 W/mK. Consequently, composite materials, such as fiberglass composite and carbon fiber composite, may be preferred over metals and metal alloys, such as aluminum and steel, for forming bottom 13, top 15, door 17, back 19, left side 21, right side 23, left corner gusset 25, and right corner gusset 27.

In a preferred embodiment, the composite material used to make the foregoing components of frame 12 may be a multilayer material comprising 6 oz. e-glass layers (e.g., HEXFORCE 3733 fiber glass fabric, Hexcel Corporation, Stamford, CT) and 36 oz. e-glass layers (e.g., VECTORPLY E-TLY 3600, Vectorply Corporation, Phenix City, AL), as well as a matting (e.g., ROVICORE C2/300, Chromarat North America, Anderson, SC) and a resin (e.g, a vinyl ester/dicyclopentadiene blend infusion resin). Each of the components of frame 12 has a wall thickness of about 3 mm to 6 mm.

Figure 3A:
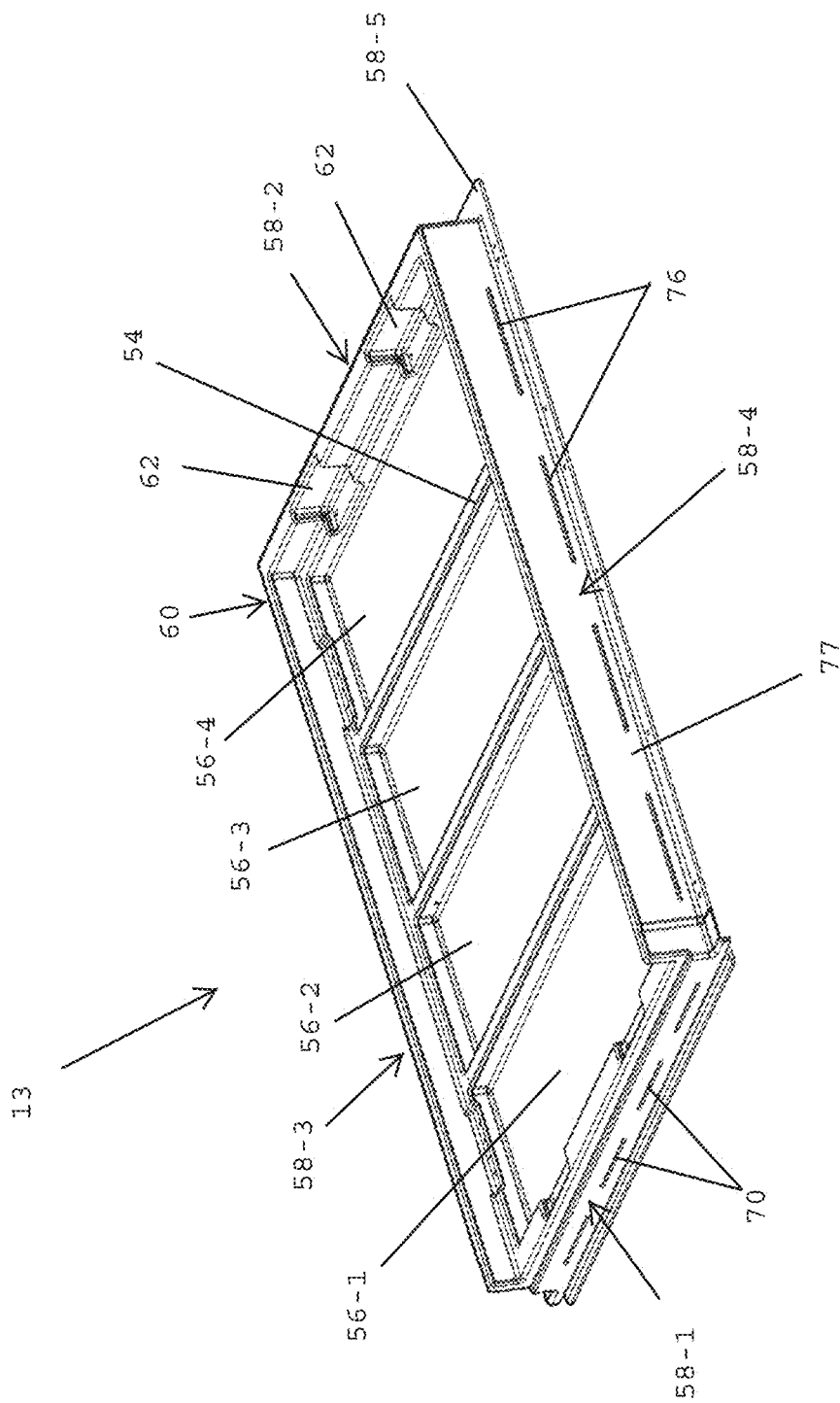
FIGS. 3(a) and 3(b) are top and bottom perspective views, respectively, of the frame bottom shown in FIG. 2(b)
Figure 3B:
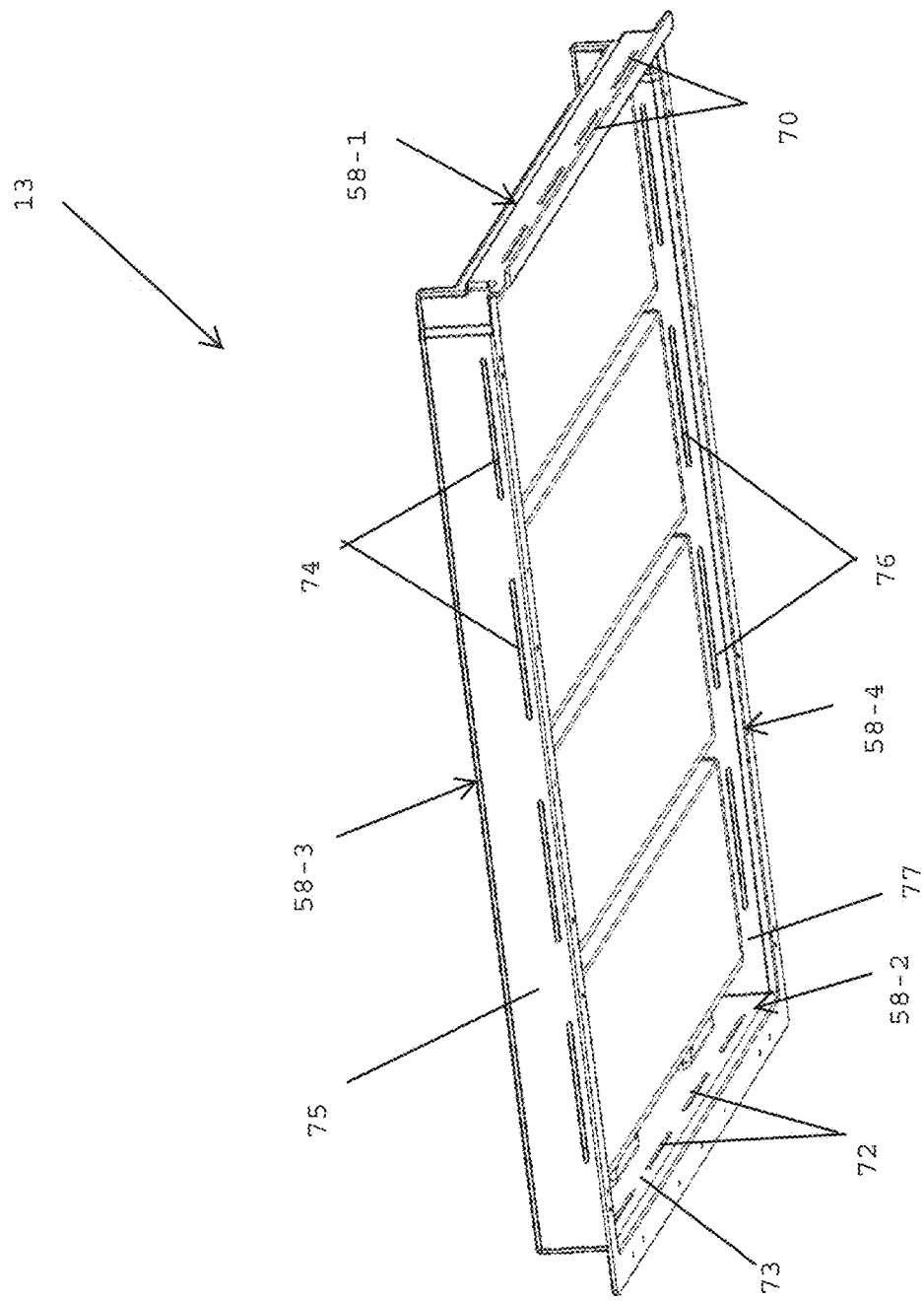

Bottom 13, which is also shown separately in FIGS. 3(a) and 3(b), may be a unitary (i.e., one-piece), solid structure and may be made of a molded composite material, such as a molded fiberglass composite or a molded carbon fiber composite. Bottom 13, which may be generally rectangular in overall shape, may be shaped to include a platform 54, which is preferably dimensioned for a pallet to be seated thereon (either with or without an accompanying payload on said pallet). Platform 54 may be shaped to include a plurality of open-topped depressions or troughs 56-1 through 56-4, each of which may be used to receive phase-change material in the manner to be discussed below. Although four troughs 56 are shown in the present embodiment, the number of troughs is not critical to the present invention; consequently, there may be greater than four troughs 56 or as few as one trough 56. Also, although troughs 56-1 through 56-4 are shown in the present embodiment having a particular size, shape, and orientation, it is to be understood that one or more of the size, shape, and orientation of troughs 56-1 through 56-4 may vary from what is shown in the present embodiment.

Bottom 13 may also be shaped to include a front border portion 58-1, a rear border portion 58-2, a left side border portion 58-3, a right side border portion 58-4, and a peripheral flange 58-5. Each of rear border portion 58-2, left side border portion 58-3, and right side border portion 58-4 may be a double-walled structure including an inner surface extending upwardly relative to platform 54 and an outer surface extending both upwardly and downwardly relative to platform 54 (the inner surface extending upwardly relative to platform 54, the portion of the outer surface extending upwardly relative to platform 54, and the connecting surface between the foregoing inner and outer surfaces collectively forming a structural lip 60). By contrast, front border portion 58-1 may include one or more surfaces extending downwardly or outwardly, but not upwardly, relative to platform 54 so as to enable a pallet and payload to be loaded onto or removed from platform 54 through the front (e.g., door 17) of shipping system 11. Rear border portion 58-2 of bottom 13 may include recesses 62 to accommodate the tines of a forklift.

Rear border portion 58-2 may be appropriately dimensioned so that back 19 may be seated thereon and mounted thereto, for example, using an adhesive, mechanical fasteners, or other suitable means. In a similar fashion, left side border portion 58-3 may be appropriately dimensioned so that left side 21 and left corner gusset 25 may be seated thereon and mounted thereto, for example, using an adhesive, mechanical fasteners, or other suitable means, and right side portion 58-4 may be appropriately dimensioned so that right side 23 and right corner gusset 27 may be seated thereon and mounted thereto, for example, using an adhesive, mechanical fasteners, or other suitable means.

The underside of platform 54, front border portion 58-1, rear border portion 58-2, left side border portion 58-3, and right side border portion 58-4 may be appropriately dimensioned to collectively form an open-bottomed space within which a plurality of vacuum insulated panels may be positioned.

Peripheral flange 58-5, which may extend outwardly from front border portion 58-1, rear border portion 58-2, left side border portion 58-3, and right side border portion 58-4, may be appropriately dimensioned so that other components of shipping system 11, such as, for example, vacuum insulated panels along the front, rear, left side and right side of shipping system 11, may be seated thereon.

Figure 1C:
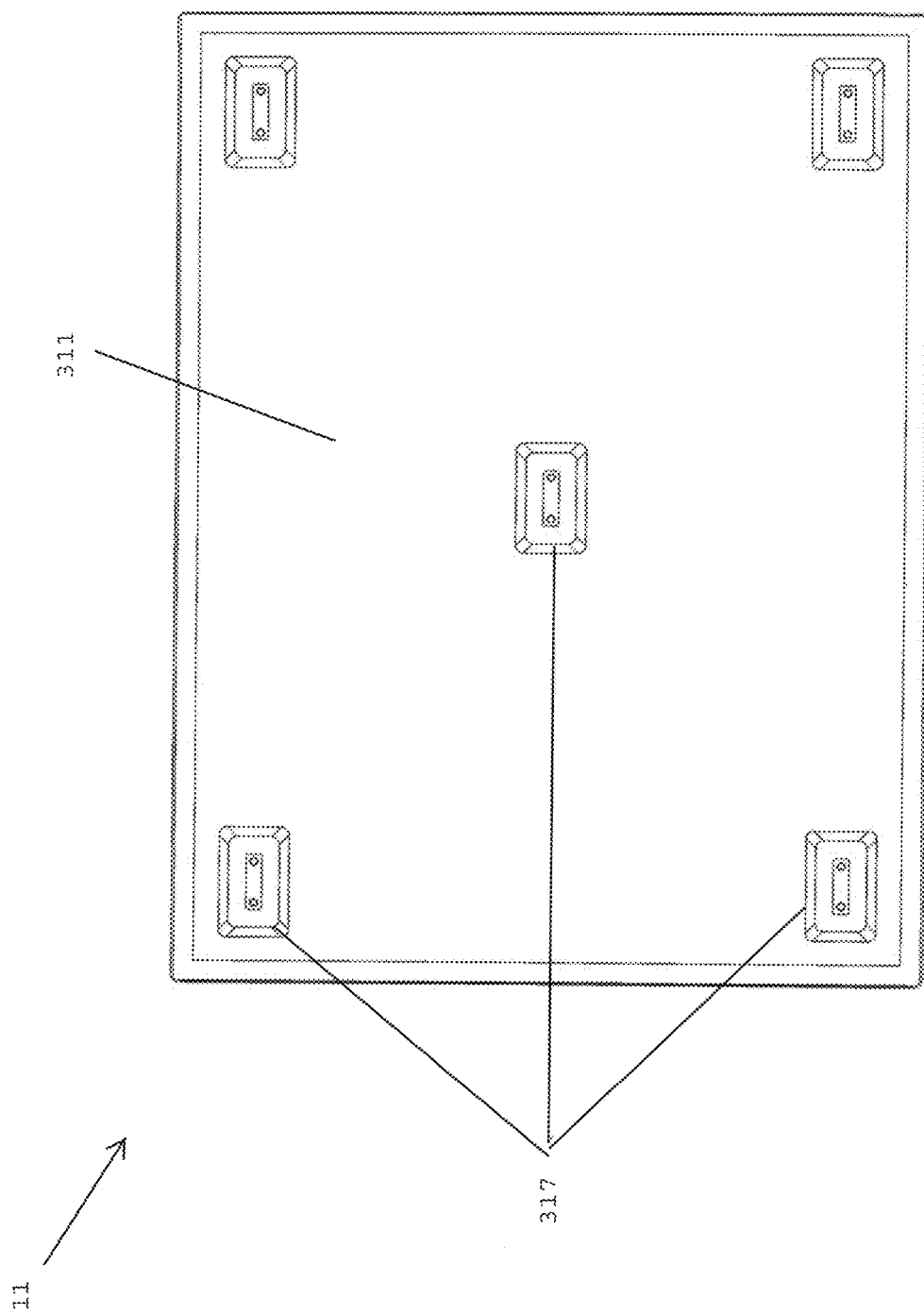
FIG. 1(c) is an enlarged bottom view of the shipping system shown in FIG. 1(a)
Figure 1D:
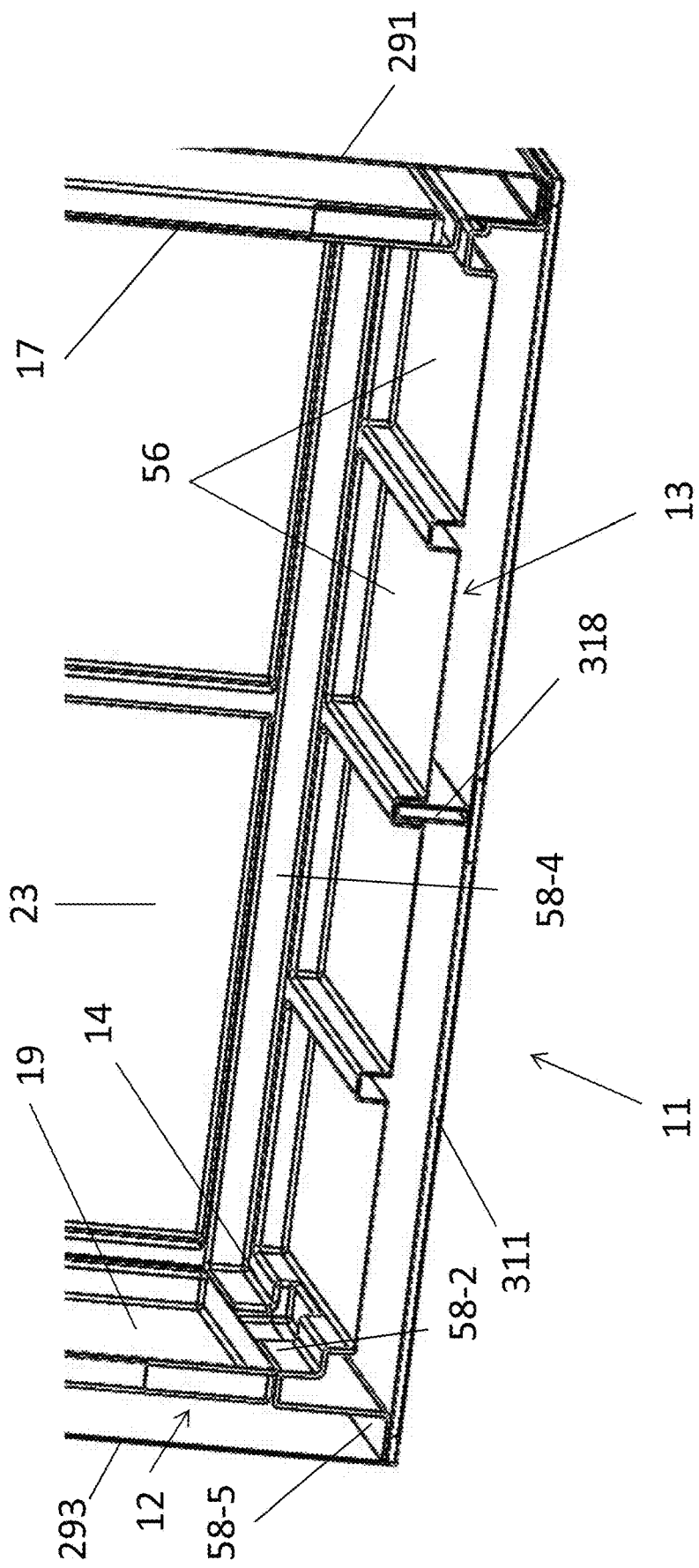
FIGS. 1(d) and 1(e) are fragmentary left perspective section and enlarged fragmentary section views, respectively, of the shipping system shown in FIG. 1(a), with certain components, such as, but not limited to, the vacuum insulated panels, the phase-change material assemblies, and the support feet, not being shown for simplicity and/or clarity.
Figure 1E:
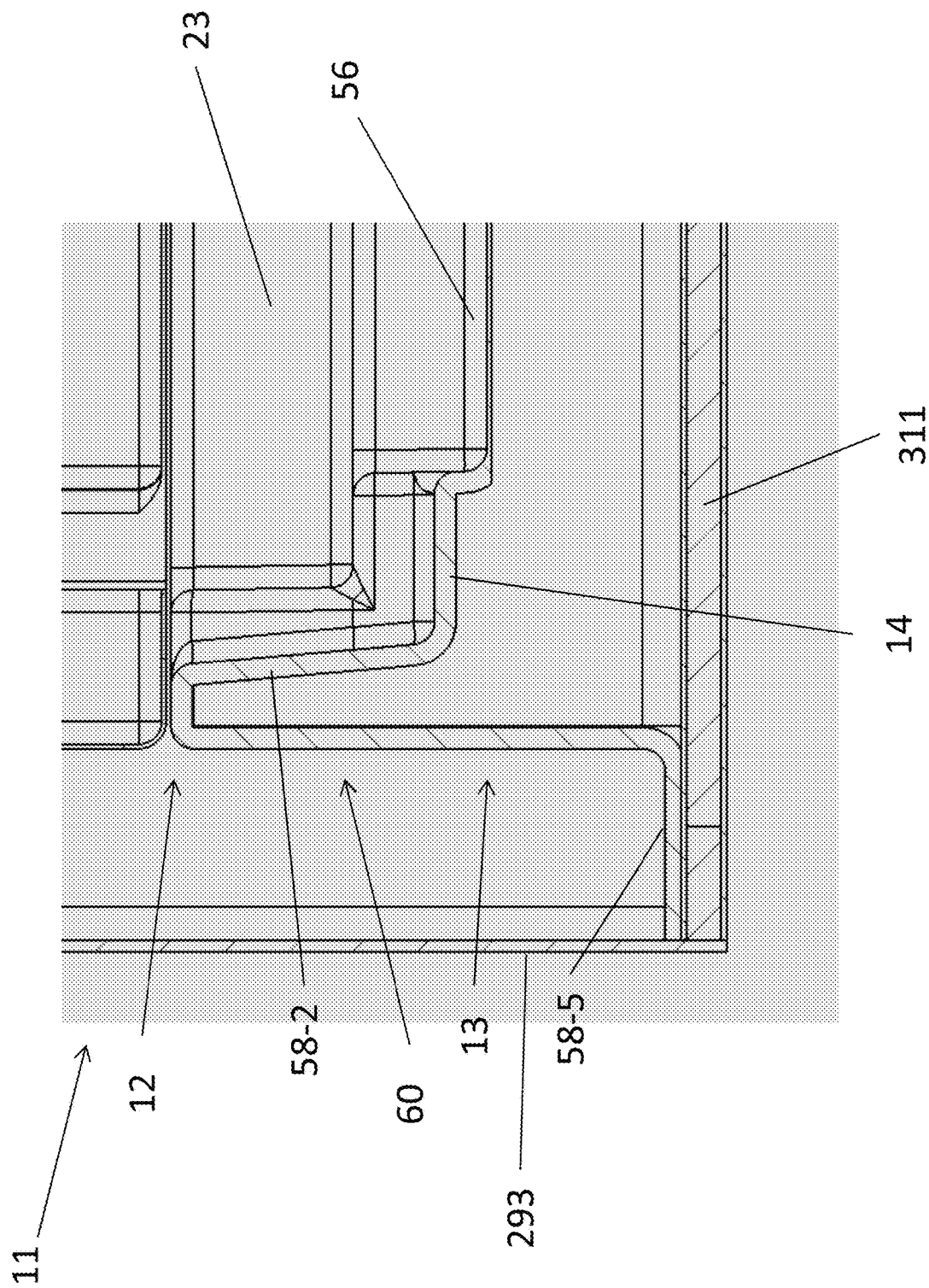
Figure 2A:
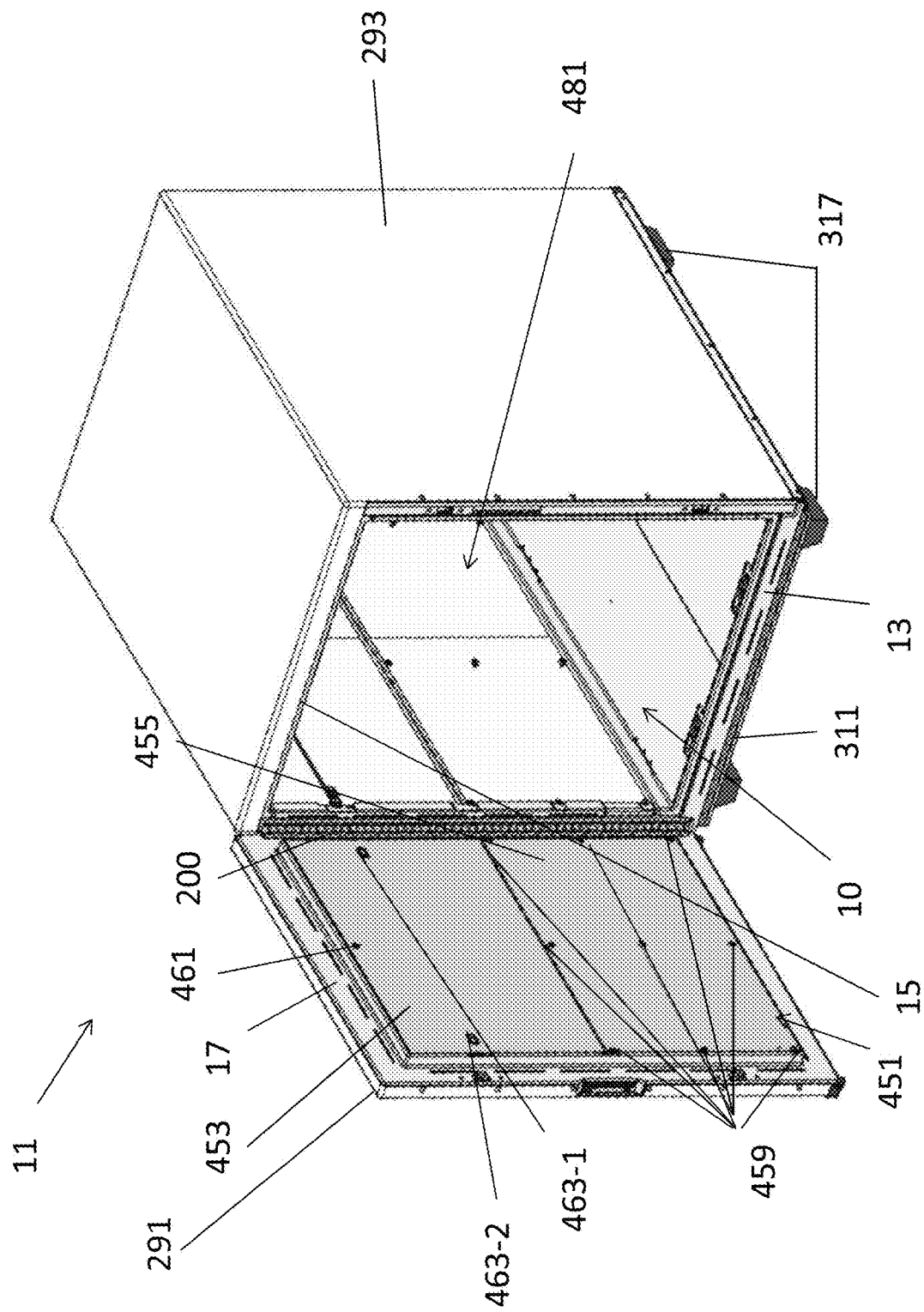
FIGS. 2(a) and 2(b) are perspective and partly exploded perspective views, respectively, of the shipping system shown in FIG. 1(a), with the door of the shipping system shown in an open position.
Figure 2B:
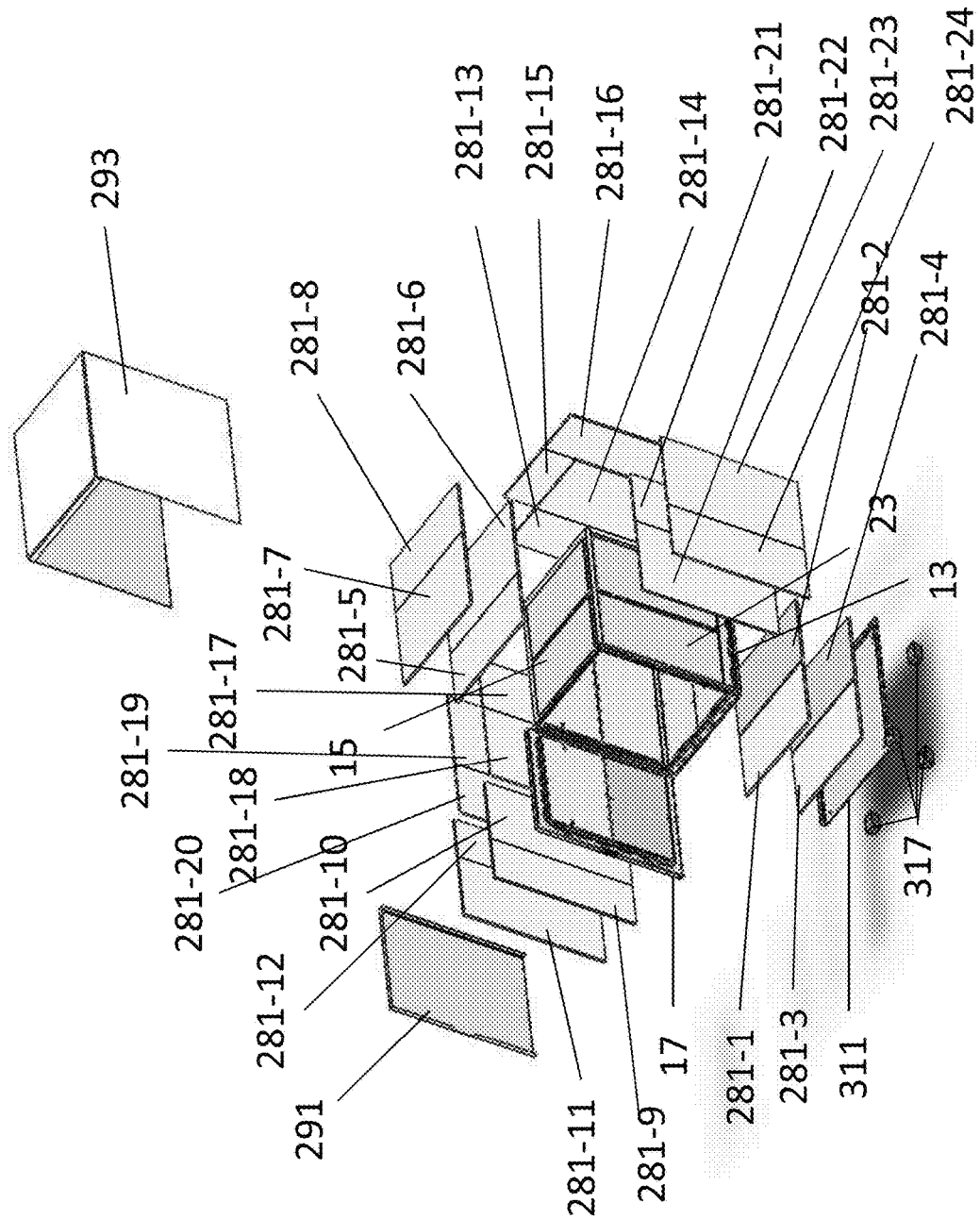
Figure 2C:
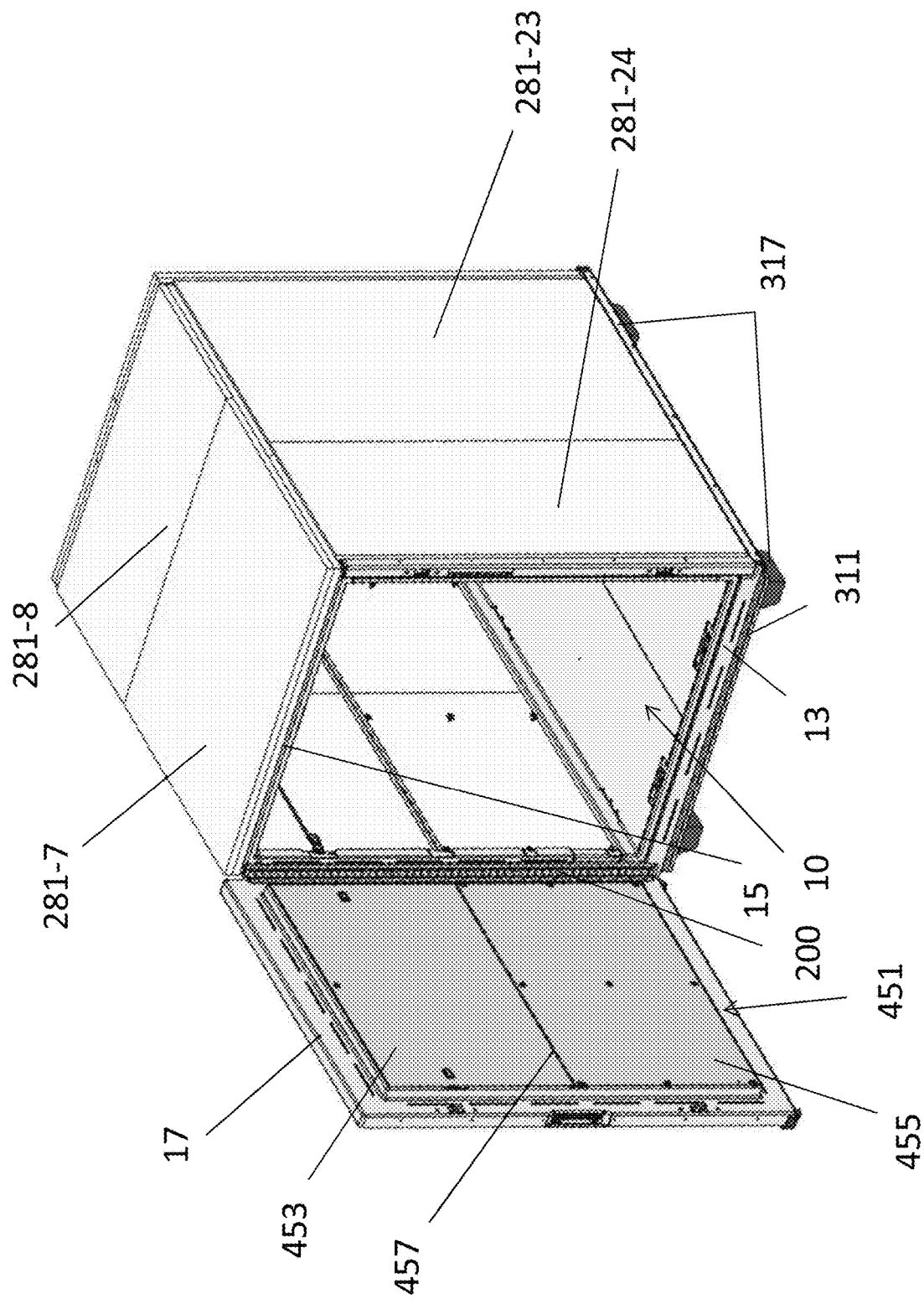
FIG. 2(c) is a perspective view of the shipping system of FIG. 1(a), with the outer shell removed.
Figure 2D:
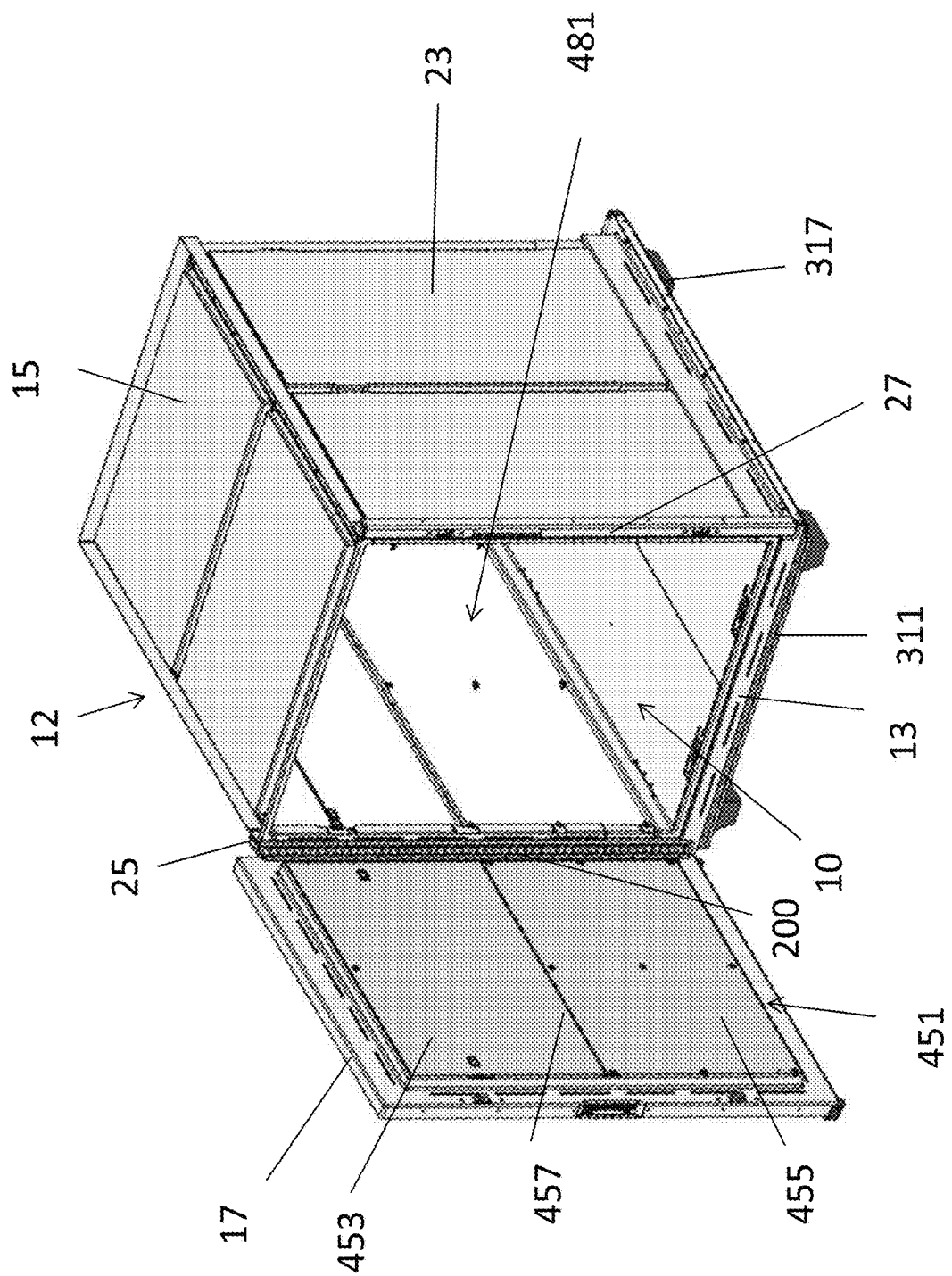
FIGS. 2(d) and 2(e) are front and rear perspective views, respectively, of the shipping system of FIG. 1(a), with the outer shell and VIPs removed.
Figure 2E:
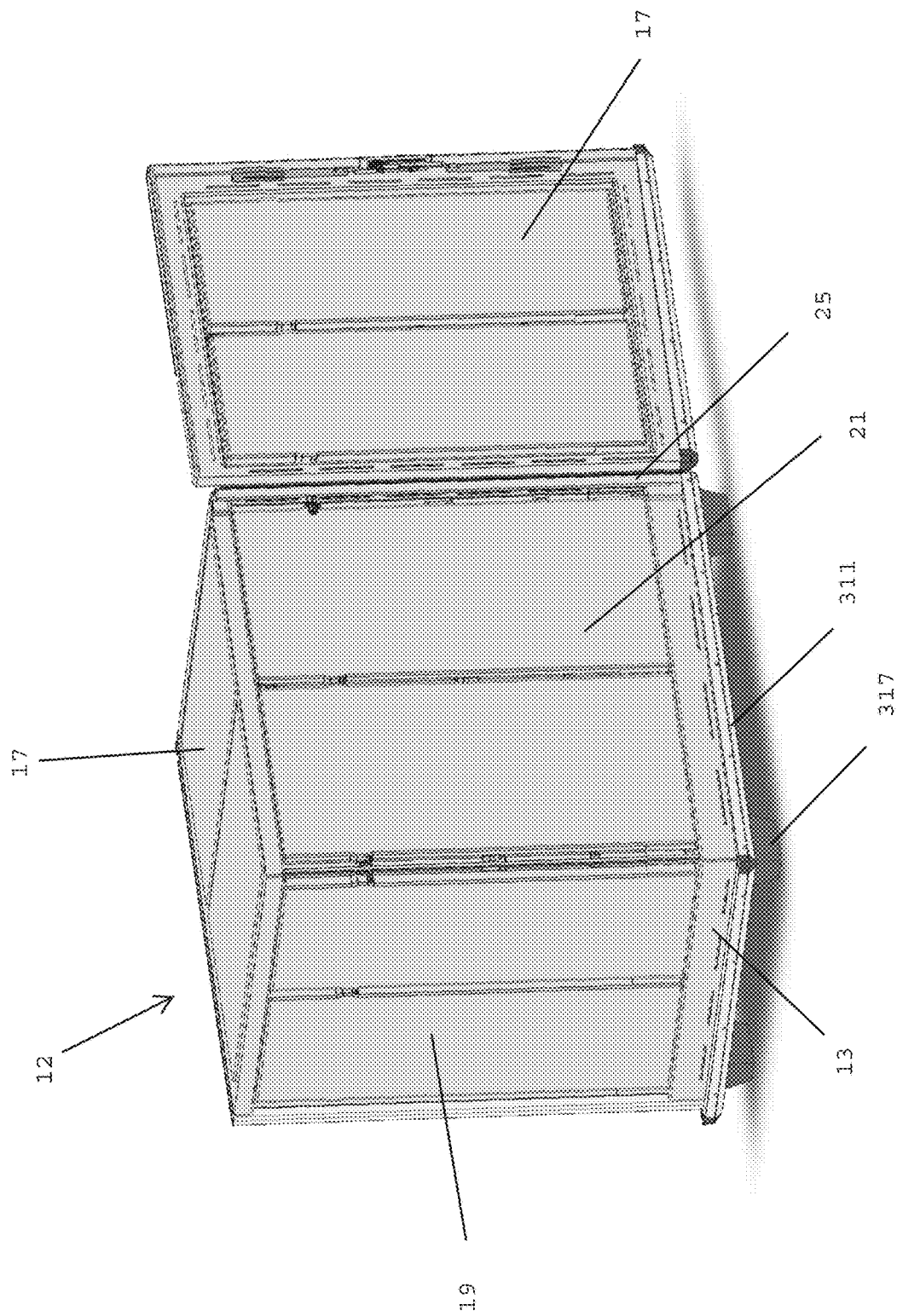
Figure 2F:
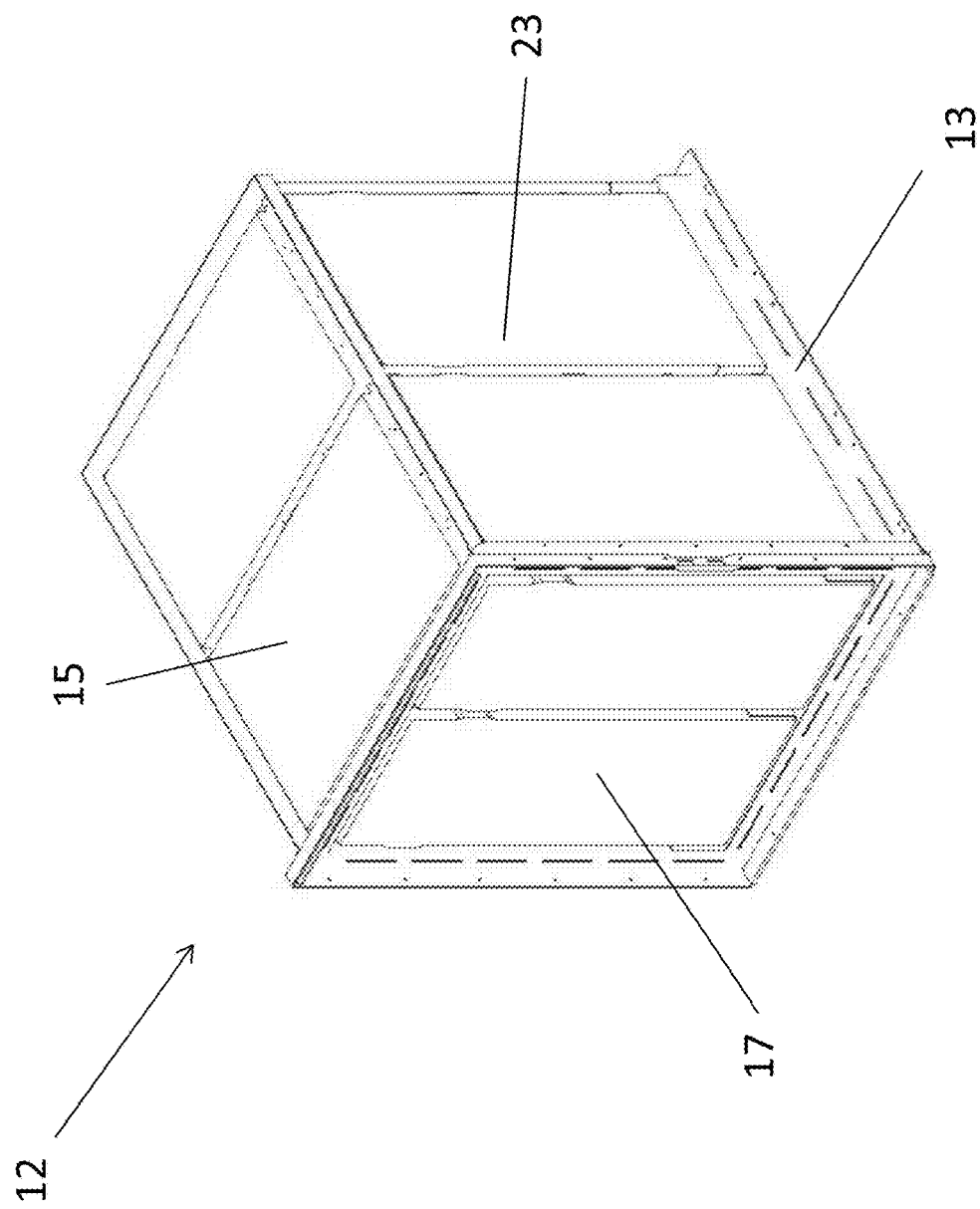
FIG. 2(f) is a front perspective view of the shipping system of FIG. 1(a), with the outer shell and VIPs removed and with the door in a closed position.

As can be appreciated best from FIGS. 1(d) and 1(e), one benefit to having rear border portion 58-2, left side border portion 58-3, and right side border portion 58-4 shaped so as to include structural lip 60 is that the lower edges of back 19, left side 21, and right side 23, which may be seated on rear border portion 58-2, left side border portion 58-3, and right side border portion 58-4, respectively, may be elevated relative to platform 54. As a result, if a pallet that is seated on platform 54 slides rearward or laterally during transit, the pallet may make contact with structural lip 60 of rear border portion 58-2, left side border portion 58-3, and/or right side border portion 58-4, instead of making contact with back 19, left side 21, or right side 23, respectively. This is advantageous because the structural lip 60 of rear border portion 58-2, left side border portion 58-3 and right side border portion 58-4 has greater strength than the lower portions of back 19, left side 21, and right side 23. This greater strength is due, in part, to the double-walled construction of structural lip 60. As a result of this increased strength, shipping system 11 is less likely to become damaged during use by the sliding of a pallet disposed therewithin.

As will be discussed further below, frame 12 of shipping system 11 may be constructed to include one or more thermal conduction breaks to reduce the thermal conductivity of frame 12. Such a reduction in the thermal conductivity of frame 12 may reduce the amount of heat that may be exchanged between space 10 and the environment outside of shipping system 11.

To this end, bottom 13 may include one or more thermal conduction breaks. More specifically, each of rear border portion 58-2, left side border portion 58-3, and/or right side border portion 58-4 may be shaped to include one or more through openings in their respective outer walls. In addition, front border portion 58-1 may be shaped to include one or more openings in its wall extending downwardly from platform 54. Such openings may serve as thermal conduction breaks to reduce the thermal conductivity of bottom 13 (since air has less thermal conductivity than the material used to make bottom 13) and may reduce the flow of heat into or out of space 10. In the present embodiment, such openings are formed only in the respective outer walls of border portions 58-2 through 58-4 and are not present in the respective inner walls of border portion 58-2 through 58-4 (border portion 58-1 not being double-walled); however, such openings could additionally or alternatively be present in such inner walls.

More specifically, in the present embodiment, front border portion 58-1 of bottom 13 may be shaped to include one or more through openings 70, rear border portion 58-2 of bottom 13 may be shaped to include one or more through openings 72 in its outer wall 73, left side border portion 58-3 of bottom 13 may be shaped to include one or more through openings 74 in its outer wall 75, and right side border portion 58-4 may be shaped to include one or more through openings 76 in its outer wall 77.

As can be appreciated, the number and arrangement (e.g., size and/or spacing) of such openings in bottom 13 may impact both the thermal conductivity of bottom 13 and the structural strength of bottom 13. In other words, the greater the size and/or number of such openings, the greater the reduction in thermal conductivity of bottom 13; on the other hand, the greater the size and/or number of such openings, the greater the reduction in strength of bottom 13. Consequently, the number and arrangement of openings in bottom 13 may be selected to balance these competing interests. Without wishing to be limited to any particular number or arrangement of thermal conduction breaks in bottom 13, in the present embodiment, front border portion 58-1 may have four openings 70, each of openings 70 having a length of about 6 inches and a width of about ⅛-¼ inch, with adjacent openings 70 being spaced apart by about 4 inches. In addition, rear border portion 58-2 may have four openings 72, each of openings 72 having a length of about 6 inches and a width of about ⅛-¼ inch, with adjacent openings 72 being spaced apart by about 4 inches. Moreover, left side border portion 58-3 may have four openings 74, each of openings 74 having a length of 8 inches and a width of about ⅛-¼ inch, with adjacent openings 74 being spaced apart by about 4 inches, and right side portion 58-4 may have four openings 76, each of openings 76 having a length of 8 inches and a width of about ⅛-¼ inch, with adjacent openings 76 being spaced apart by about 4 inches. Notwithstanding the above, the number and/or arrangement of openings serving as thermal conduction breaks in bottom 13 may be varied as desired.

Figure 4A:
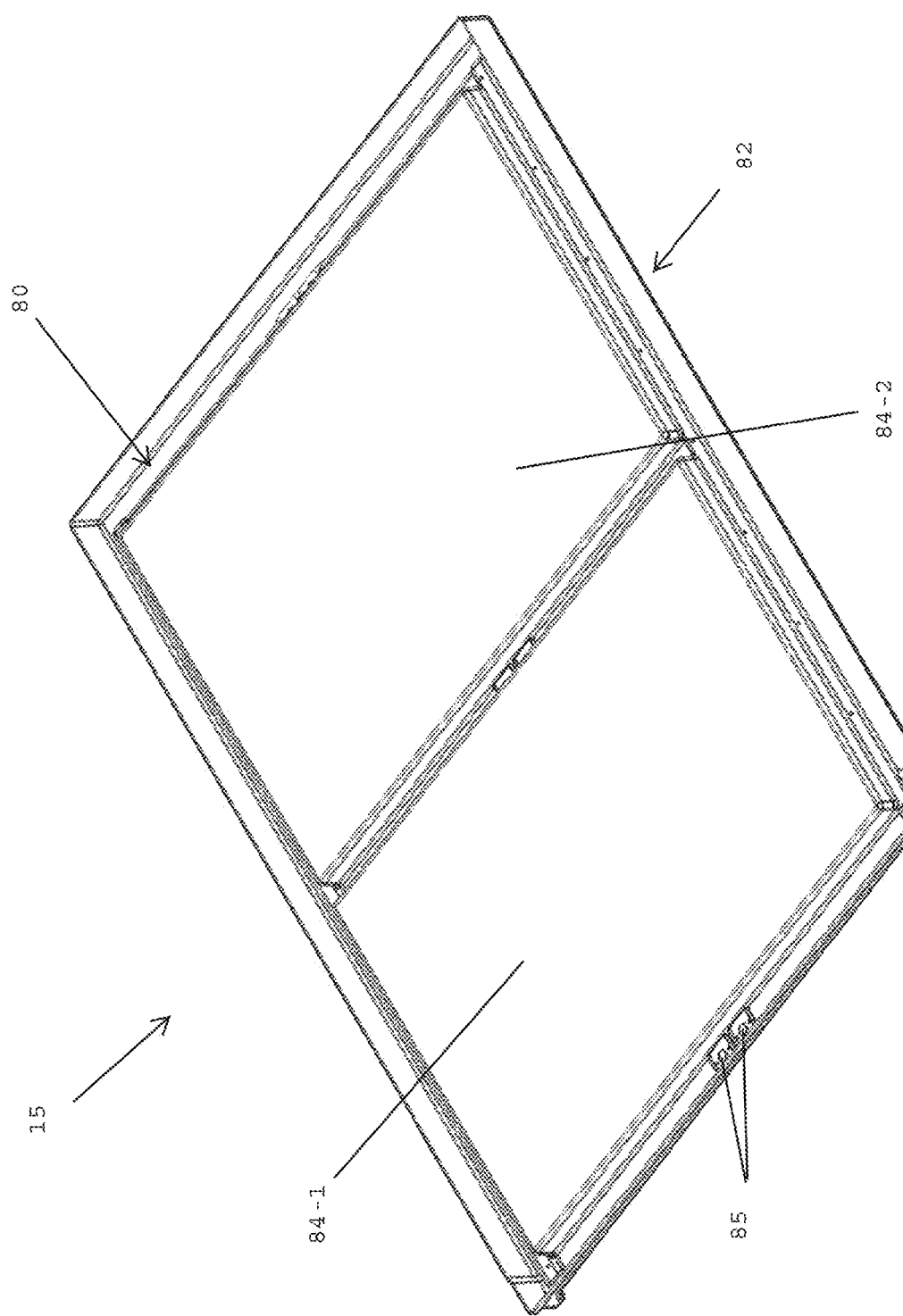
FIGS. 4(a) and 4(b) are top and bottom perspective views, respectively, of the frame top shown in FIG. 2(b)
Figure 4B:
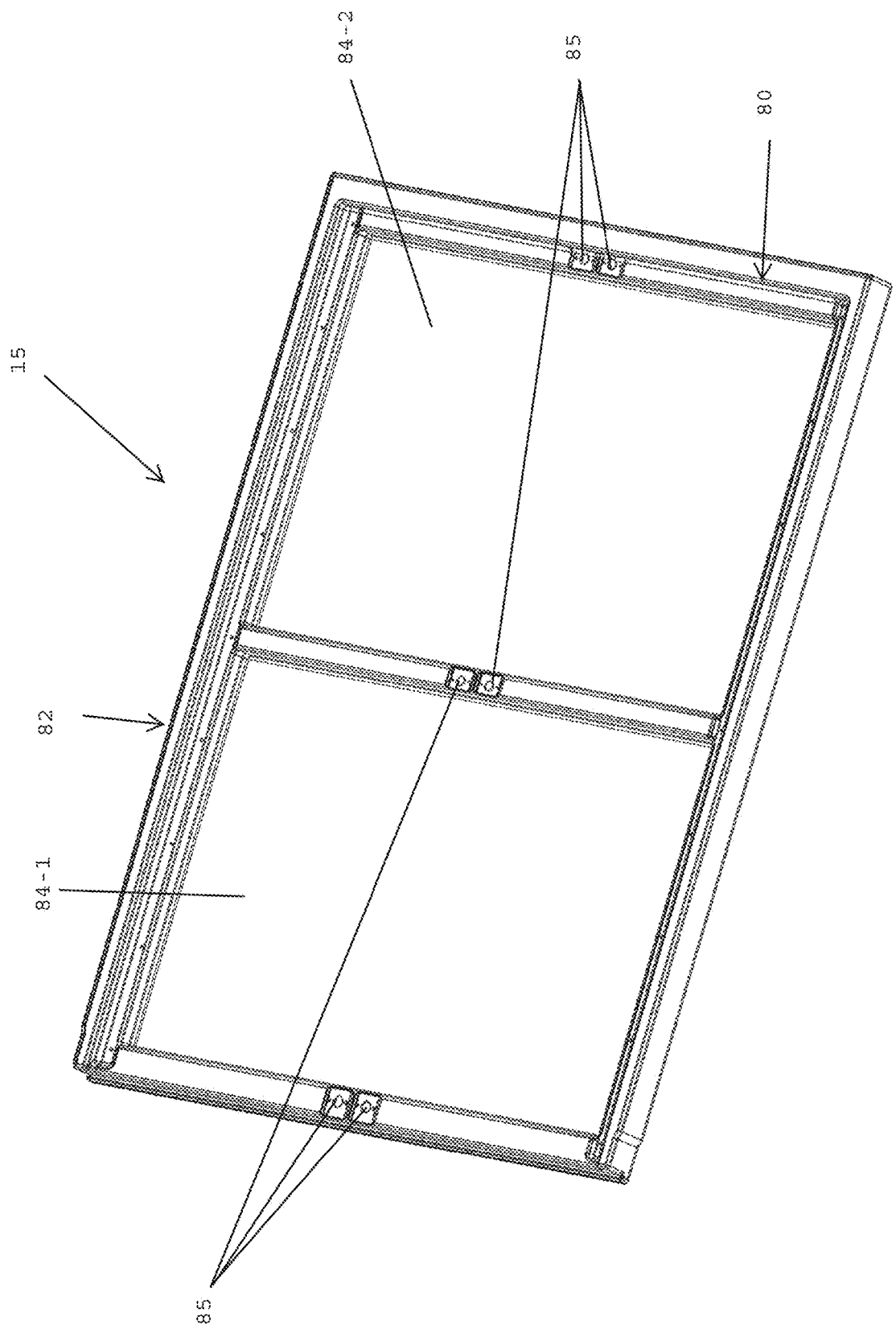

Top 15, which is also shown separately in FIGS. 4(*a*) and 4(*b*), may be a unitary, solid structure and may be made of a molded composite material, such as a molded fiberglass composite or a molded carbon fiber composite. Top 15, which may be generally rectangular in overall shape, may be shaped to include an inner portion 80 and an outer portion 82. Inner portion 80 may be shaped to include a plurality of open-bottomed depressions or troughs 84-1 and 84-2, which may be used to receive phase-change material in the manner to be discussed below. Troughs 84-1 and 84-2 may be accessible from the underside of top 15 and may be shaped to protrude upwardly from the remainder of inner portion 80. Although two troughs 84 are shown in the present embodiment, the number of troughs is not critical to the present invention; consequently, there may be greater than two troughs 84 or as few as one trough 84. Also, although troughs 84-1 and 84-2 are shown in the present embodiment having a particular size, shape, and orientation, it is to be understood that one or more of the size, shape, and orientation of troughs 84 may vary from what is shown in the present embodiment.

A plurality of receptacles 85 may be provided in areas of inner portion 80 outside of troughs 84. As will be discussed further below, receptacles 85 may be used to receive screws or other fasteners for securing one or more heat-spreaders to the bottom surface of top 15.

Outer portion 82 may extend peripherally along the rear, left side, and right side edges of inner portion 80. A rear section 86 of outer portion 82 may be fixedly secured, for example, by an adhesive, mechanical fasteners, or other suitable means, to rear 19, a left section 88 of outer portion 82 may be fixedly secured, for example, by an adhesive, mechanical fasteners, or other suitable means, to left side 21 and to left corner gusset 25, and a right section 90 of outer portion 82 may be fixedly secured, for example, by an adhesive, mechanical fasteners, or other suitable means, to right side 23 and to right corner gusset 27.

Figure 5A:
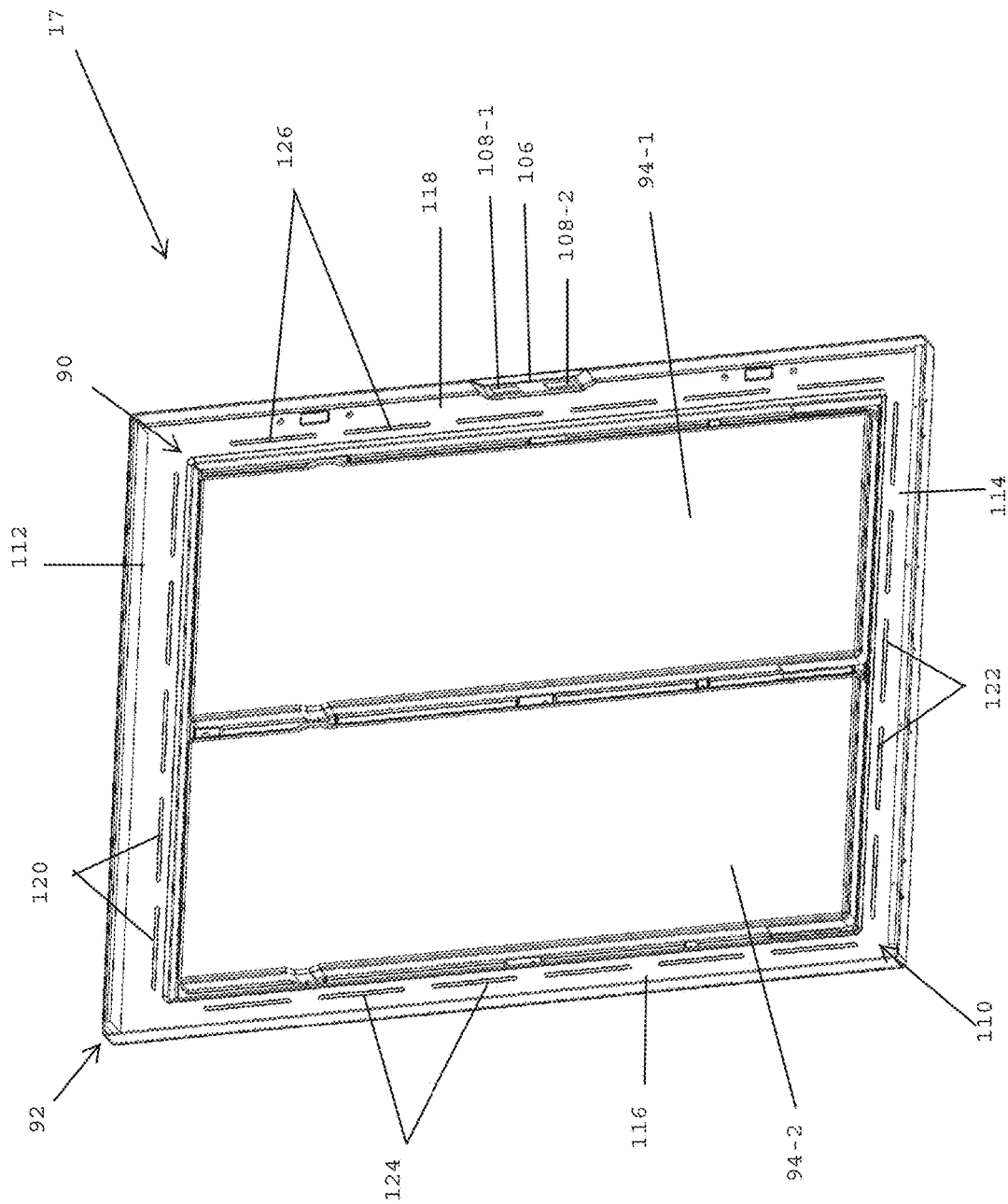
FIGS. 5(a) through 5(c) are front, rear perspective, and rear views, respectively, of the frame door shown in FIG. 2(b)
Figure 5B:
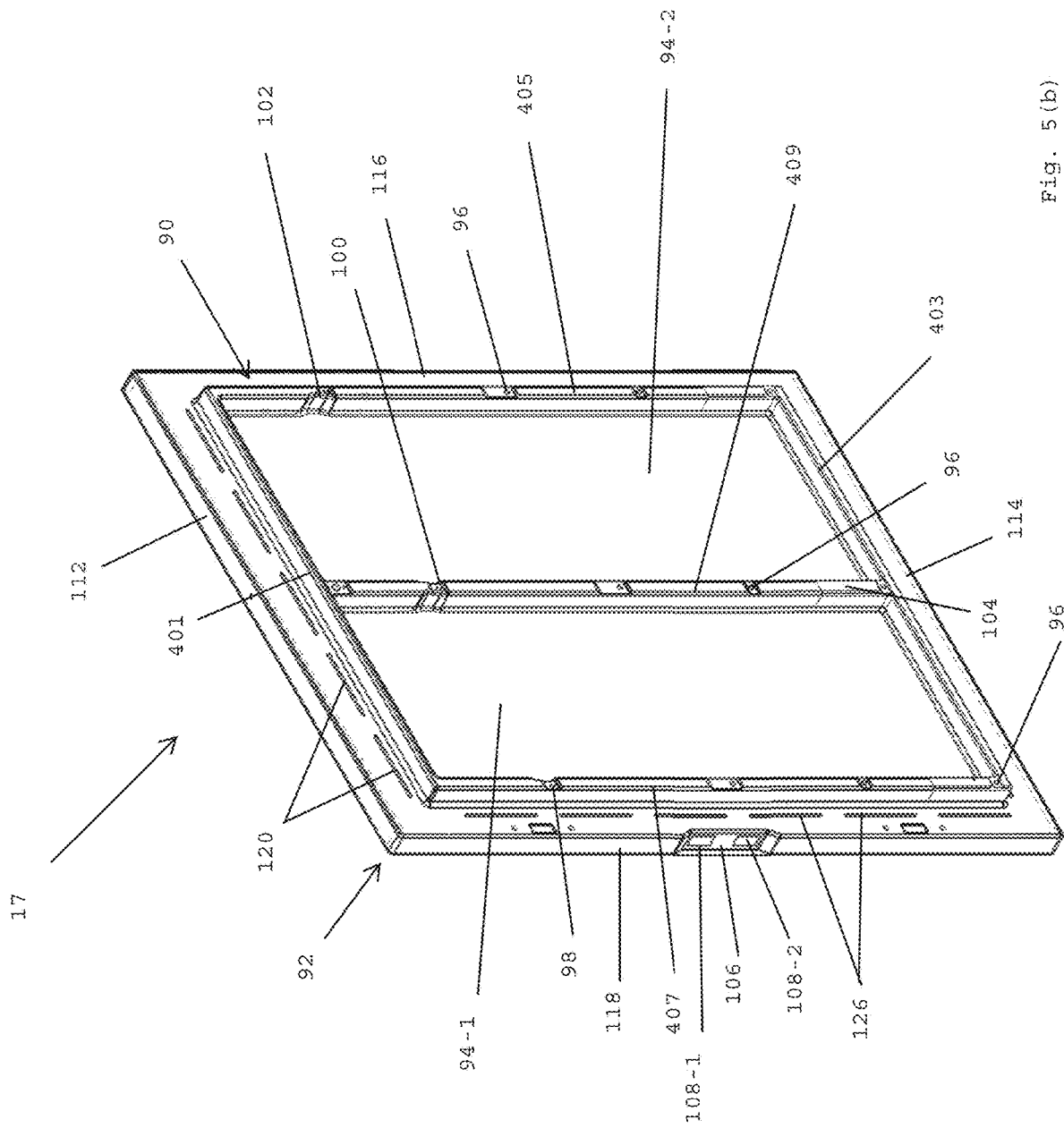
Figure 5C:
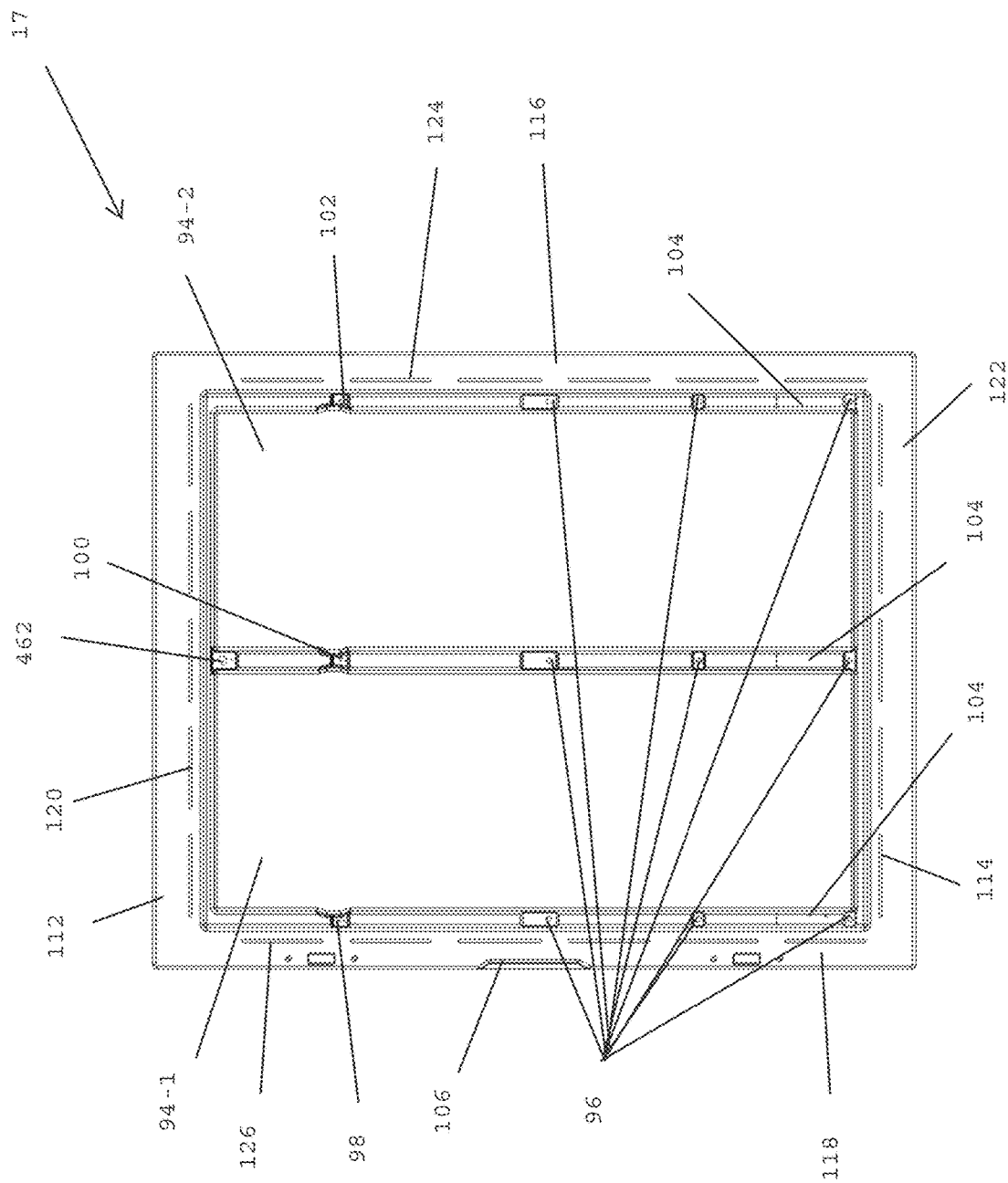

Door 17, which is also shown separately in FIGS. 5(*a*) through 5(*c*), may be a unitary, solid structure made of a molded composite material, such as a molded fiberglass composite or a molded carbon fiber composite. Door 17, which may be generally rectangular in overall shape, may be shaped to include an inner portion 90 and an outer portion 92. Inner portion 90 may be shaped to include a plurality of troughs 94-1 and 94-2, which may be used to receive phase-change material in the manner to be discussed below. Troughs 94-1 and 94-2 may be accessible from the rear of door 17. Although two troughs 94 are shown in the present embodiment, the number of troughs is not critical to the present invention; consequently, there may be greater than two troughs 94 or as few as one trough 94. Also, although troughs 94-1 and 94-2 are shown in the present embodiment having a particular size, shape, and orientation, it is to be understood that one or more of the size, shape, and orientation of troughs 94-1 and 94-2 may vary from what is shown in the present embodiment.

A plurality of receptacles 96 may be provided in areas of inner portion 90 outside of troughs 94. As will be discussed further below, receptacles 96 may be used to receive screws or other fasteners for securing one or more heat-spreaders to the rear surface of door 17. In addition, inner portion 90 may be shaped to include a plurality of recesses 98, 100 and 102, which may be used to receive brackets or other hardware for use in mounting phase-change material assemblies to the rear surface of door 17.

Door 17 may also be shaped to have one or more areas 104 of increased wall thickness proximate to troughs 94-1 and 94-2. For example, door 17 may transition from a wall thickness of 3 mm to a thickness of 6 mm in areas 104. Areas 104, which may be positioned proximate to the bottom of troughs 94 when system 11 is assembled and upright, may provide structural reinforcement to frame 12 against damage from an inclined shock, such as may occur when system 11, loaded with a pallet and payload, slides off the forks of a lift truck.

Outer portion 92, which may extend around the periphery of inner portion 90, may extend forwardly relative to inner portion 90 so as to define a cavity 110, which opens forwardly. Cavity may be used to receive a plurality of vacuum insulation panels. Outer portion 92 may also be shaped to include a recess 106 having a pair of openings 108-1 and 108-2. Recess 106 and openings 108-1 and 108-2 may be used to receive part of a door-latching mechanism.

Door 17 may comprise one or more thermal conduction breaks. For example, in the present embodiment, outer portion 92 of door 17 may be shaped to include one or more through openings, such openings serving as thermal conduction breaks to reduce the thermal conductivity of door 17 (since air has less thermal conductivity than the material used to make door 17). In contrast with many of the through openings of bottom 13, which may be formed only in the outer walls of border portions 58-2 through 58-4 (and which may not also be formed in the inner walls of border portions 58-2 through 58-4), the through openings of door 17 may pass entirely through outer portion 92 of door 17.

In the present embodiment, outer portion 92 of door 17 may comprise a top section 112, a bottom section 114, a left section 116 and a right section 118, one or more of which may include one or more such through openings serving as thermal conduction breaks. In the present embodiment, top section 112 may be shaped to include one or more through openings 120, bottom section 114 may be shaped to include one or more through openings 122, left section 116 may be shaped to include one or more through openings 124, and right section 118 may be shaped to include one or more through openings 126.

More specifically, in the present embodiment, top section 112 may include five through openings 120, and bottom section 114 may include five through openings 122, wherein openings 120 and 122 may each be about ⅛-¼ inch wide and approximately 6 inches long, wherein adjacent openings 120 may be spaced apart by about 2.25 inches, and wherein adjacent openings 122 may be spaced apart by about 2.25 inches. Also in the present embodiment, left section 116 may include six through openings 124, and right section 118 may include six through openings 126, wherein openings 124 and 126 may each be about ⅛-¼ inch wide and approximately 6 inches long and wherein adjacent openings 124 may be spaced apart by about 2.25 inches, and wherein adjacent openings 126 may be spaced apart by 2.25 inches. Notwithstanding the above, the number and/or arrangement of openings in door 17 serving as thermal conduction breaks may be varied as desired.

Figure 6A:
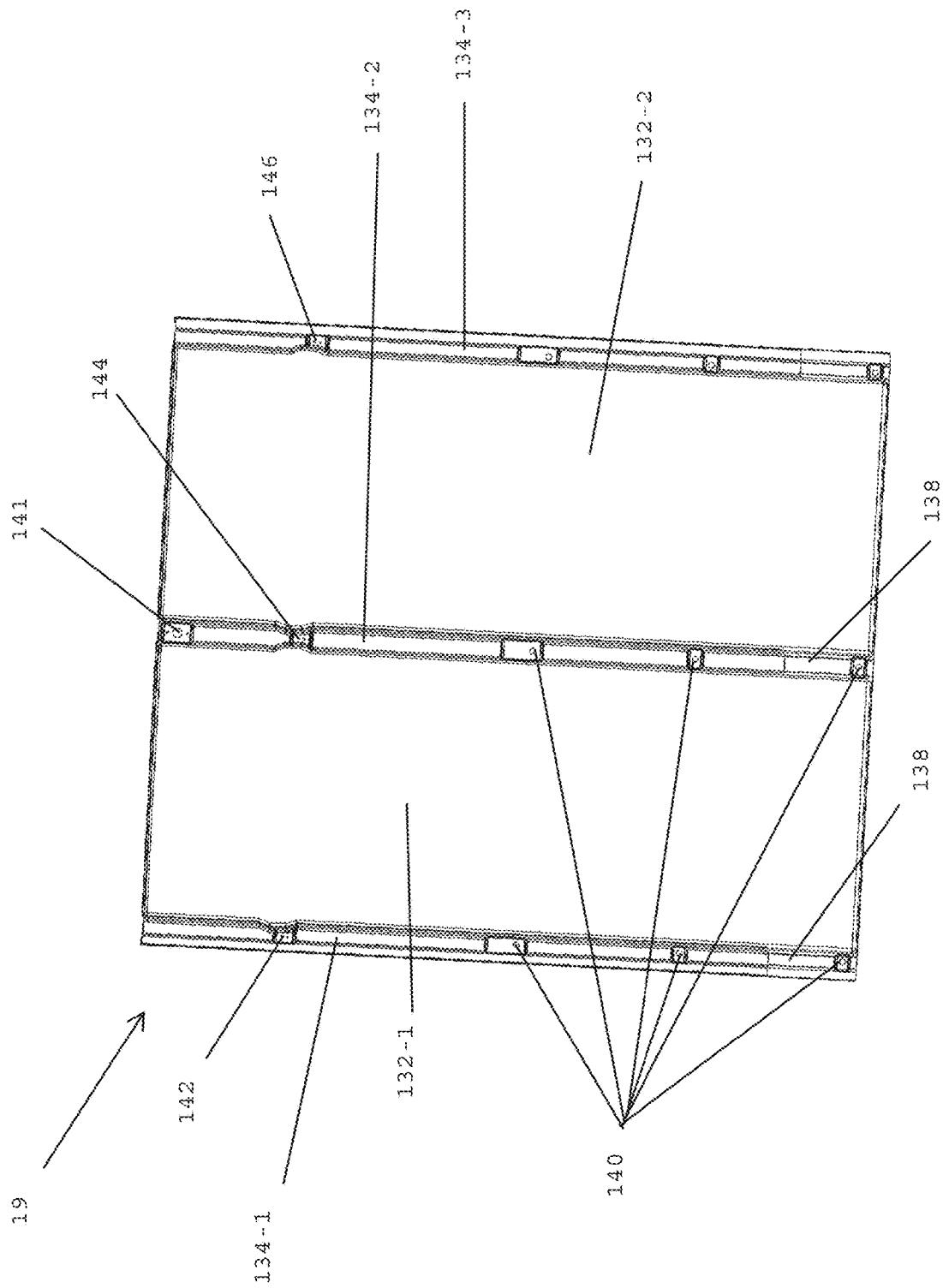
FIGS. 6(a) and 6(b) are front and rear perspective views, respectively, of the frame back shown in FIG. 2(e)
Figure 6B:
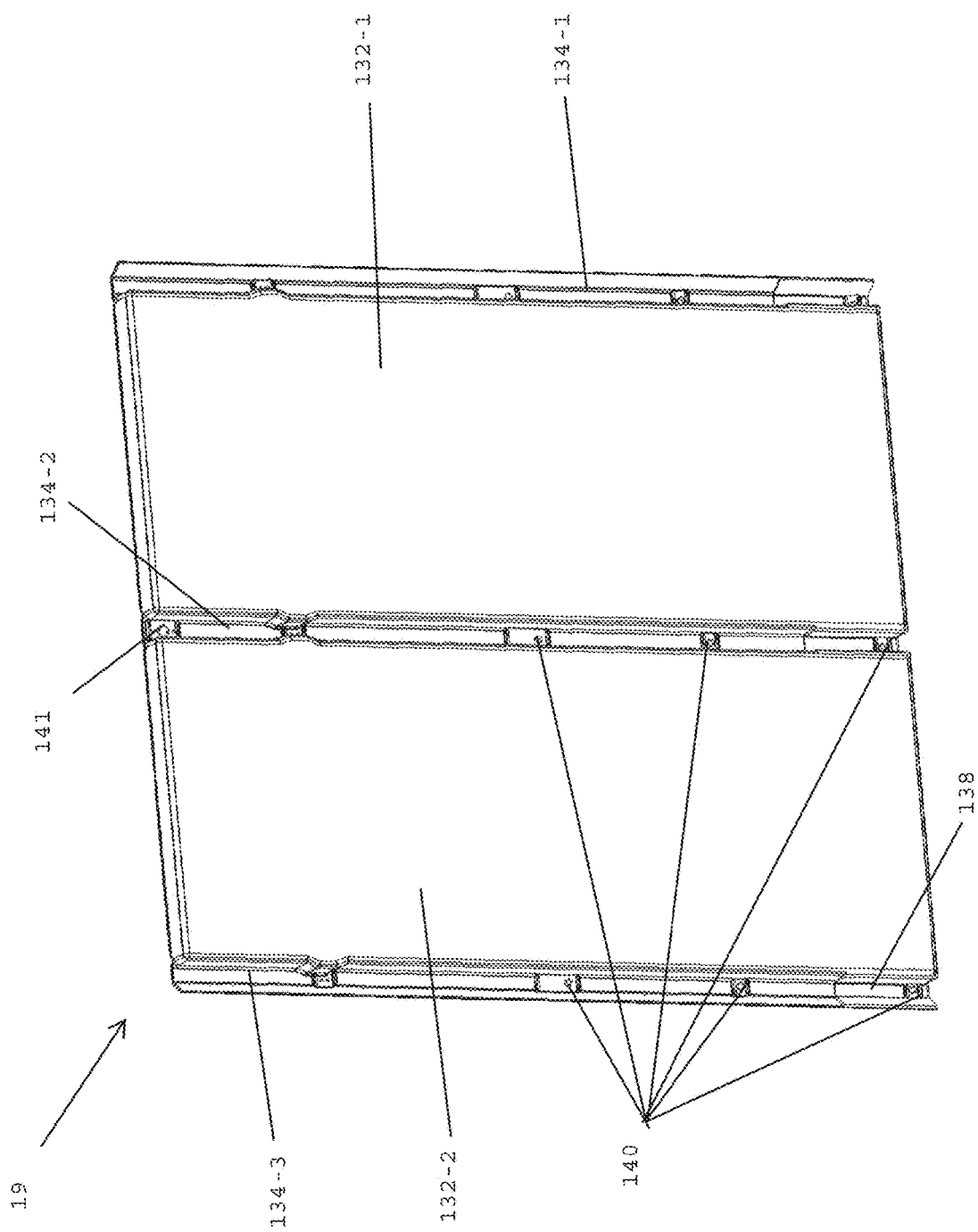

Back 19, which is also shown separately in FIGS. 6(*a*) and 6(*b*), may be a unitary, solid structure and may be made of a molded composite material, such as a molded fiberglass composite or a molded carbon fiber composite. Back 19, which may be generally rectangular in overall shape, may be shaped to include a pair of troughs 132-1 and 132-2 and a plurality of channels 134-1 through 134-3, with troughs 132 and channels 134 opening in opposite directions relative to one another. Each of troughs 132-1 and 132-2 may be used to receive phase-change material in the manner to be discussed below. Troughs 132-1 and 132-2 may be accessible from the front of back 19 and may be shaped to protrude rearward from a front surface of back 19. Although two troughs 132-1 and 132-2 are shown in the present embodiment, the number of troughs is not critical to the present invention; consequently, there may be greater than two troughs 132 or as few as one trough 132. Also, although troughs 132-1 and 132-2 are shown in the present embodiment having a particular size, shape, and orientation, it is to be understood that one or more of the size, shape, and orientation of troughs 132-1 and 132-2 may vary from what is shown in the present embodiment.

Channels 134-1 through 134-3, which may open rearwardly, may be shaped to extend vertically, with channels 134-1 and 134-2 extending along opposite sides of trough 132-1 and with channels 134-2 and 134-3 extending along opposite sides of trough 132-2. Channels 134-1 through 134-3 may be shaped to have one or more areas 138 of increased wall thickness. For example, channels 134-1 through 134-3 may transition from a wall thickness of 3 mm to a thickness of 6 mm in areas 138. Areas 138, which may be positioned proximate to the bottom of channels 134 when system 11 is assembled and upright, may provide structural reinforcement to frame 12 against damage from an inclined shock, such as may occur when system 11, loaded with a pallet and payload, slides off the forks of a lift truck.

A plurality of receptacles 140 and 141 may be provided in back 19 outside of troughs 132. As will be discussed further below, receptacles 140 and 141 may be used to receive screws or other fasteners for securing one or more heat-spreaders to the front surface of back 19. In addition, a plurality of recesses 142, 144 and 146 may also be provided in back 19. Recesses 142, 144, and 146 may be used to receive brackets or other hardware for use in mounting phase-change material assemblies to back 19.

Back 19 may be appropriately dimensioned to support a plurality of vacuum insulated panels positioned against its rearward surface.

Figure 7A:
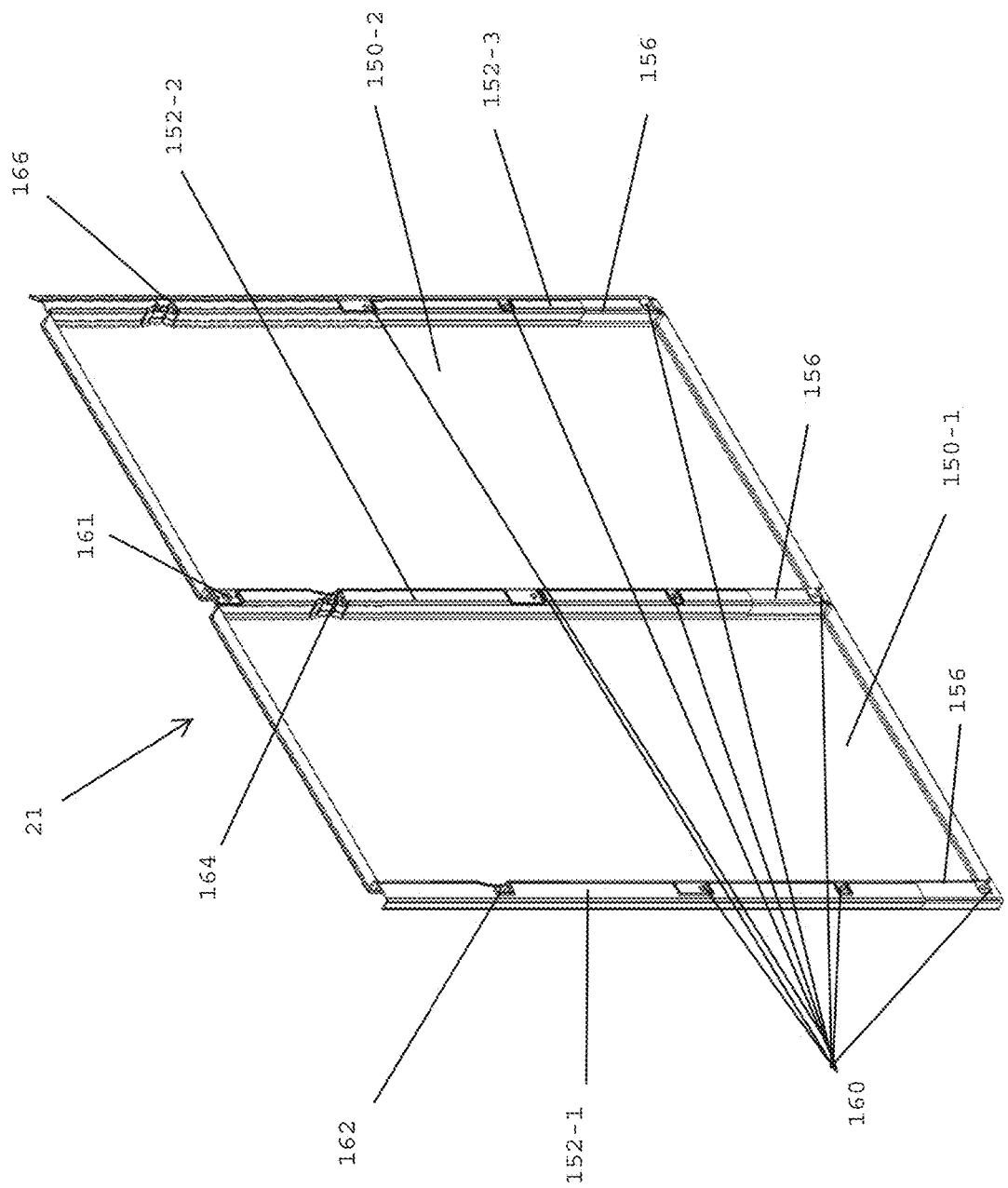
FIGS. 7(a) and 7(b) are right and left perspective views, respectively, of the frame left side shown in FIG. 2(e)
Figure 7B:
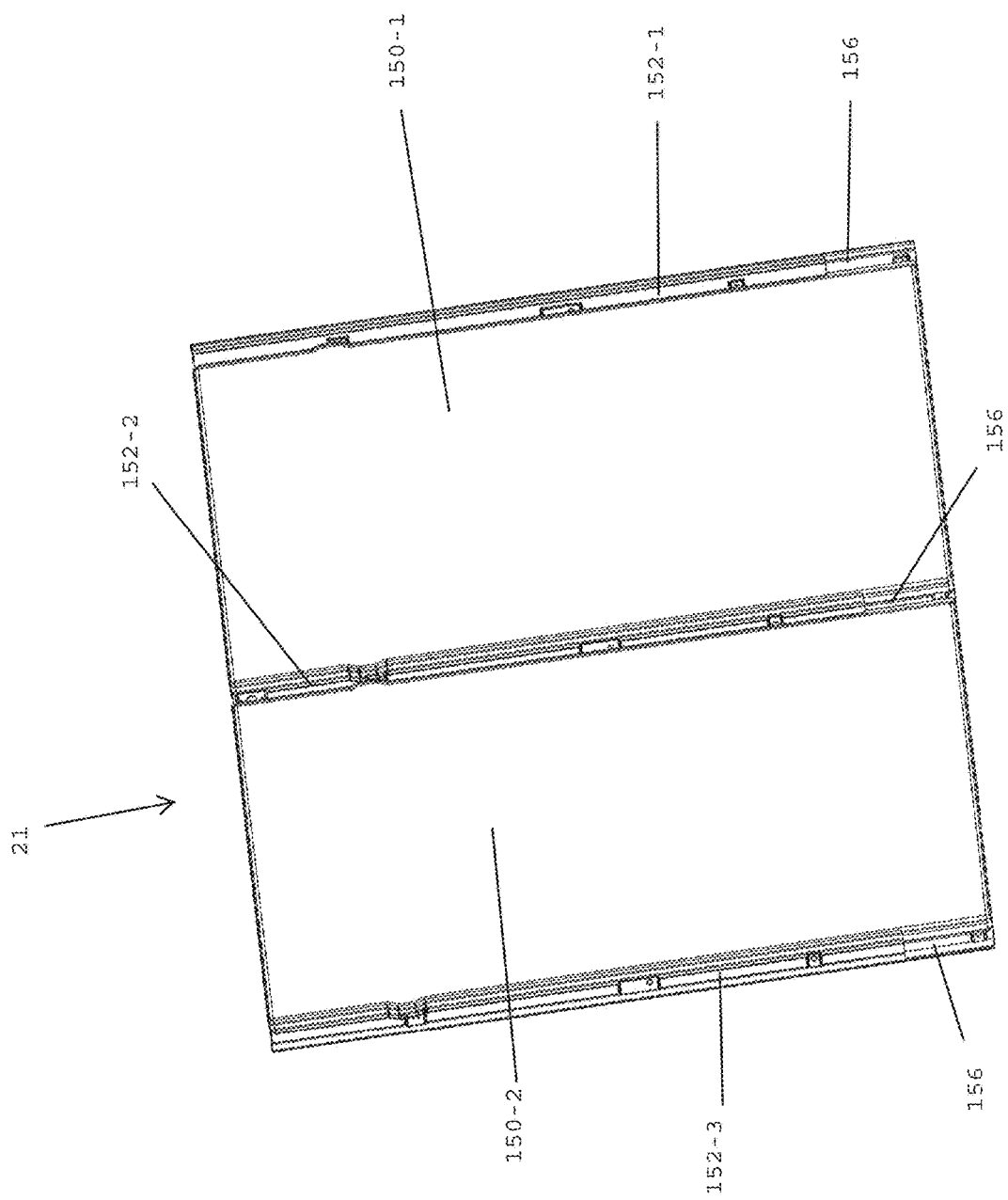

Left side 21, which is also shown separately in FIGS. 7(*a*) and 7(*b*), may be a unitary, solid structure and may be made of a molded composite material, such as a molded fiberglass composite or a molded carbon fiber composite. Left side 21, which may be generally rectangular in overall shape, may have a shape that is similar in some respects to back 19. Left side 21 may be shaped to include a pair of troughs 150-1 and 150-2 and a plurality of channels 152-1 through 152-3, with troughs 150 and channels 152 opening in opposite directions relative to one another. Each of troughs 150-1 and 150-2 may be used to receive phase-change material in the manner to be discussed below. Troughs 150-1 and 150-2 may be accessible from the inner side (i.e., right side) of left side 21 and may be shaped to protrude outwardly from the right surface of left side 21. Although two troughs 150 are shown in the present embodiment, the number of troughs is not critical to the present invention; consequently, there may be greater than two troughs 150 or as few as one trough 150. Also, although troughs 150-1 and 150-2 are shown in the present embodiment having a particular size, shape, and orientation, it is to be understood that one or more of the size, shape, and orientation of troughs 150-1 and 150-2 may vary from what is shown in the present embodiment.

Channels 152-1 through 152-3, which may open outwardly (i.e., leftward), may be shaped to extend vertically, with channels 152-1 and 152-2 extending along opposite sides of trough 150-1 and with channels 152-2 and 152-3 extending along opposite sides of trough 150-2. Channels 152-1 through 152-3 may be shaped to have one or more areas 156 of increased wall thickness. For example, channels 152-1 through 152-3 may transition from a wall thickness of 3 mm to a thickness of 6 mm in areas 156. Areas 156, which may be positioned proximate to the bottom of channels 152-1 through 152-3 when system 11 is assembled and upright, may provide structural reinforcement to frame 12 against damage from an inclined shock, such as may occur when system 11, loaded with a pallet and payload, slides off the forks of a lift truck.

Left side 21 may be appropriately dimensioned to support a plurality of vacuum insulated panels positioned against its outer surface.

A plurality of receptacles 160 and 161 may be provided in left side 21 outside of troughs 150-1 and 150-2. As will be discussed further below, receptacles 160 and 161 may be used to receive screws or other fasteners for securing one or more heat-spreaders to the right surface of left side 21. In addition, a plurality of recesses 162, 164 and 166 may also be provided in left side 21. Recesses 162, 164, and 166 may be used to receive brackets or other hardware for use in mounting phase-change material assemblies to left side 21.

Figure 8B:
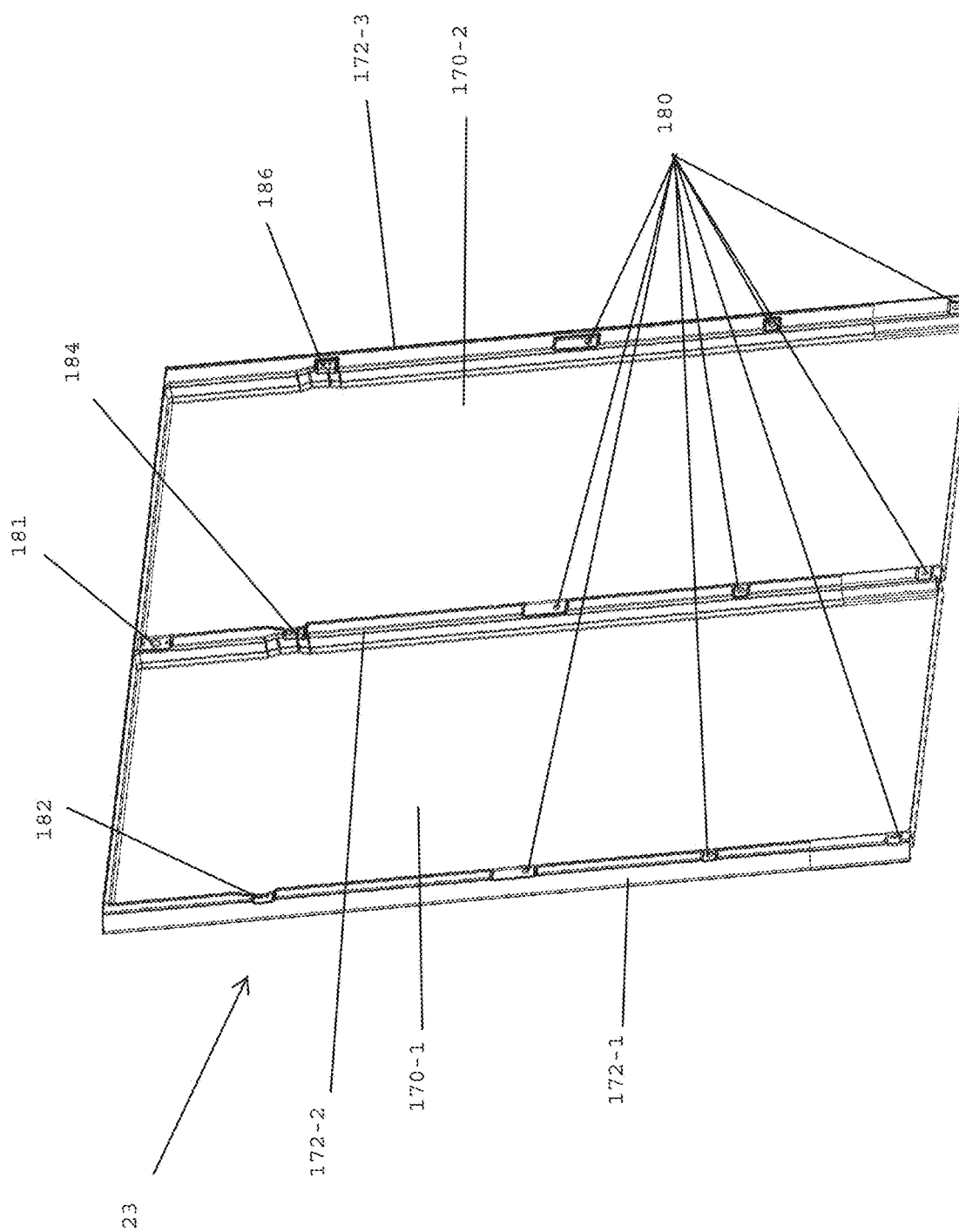

Right side 23, which is also shown separately in FIGS. 8(a) and 8(b), may be a unitary, solid structure and may be made of a molded composite material, such as a molded fiberglass composite or a molded carbon fiber composite. Right side 23, which may be generally rectangular in overall shape, may have a shape that is similar to left side 21. Right side 23 may be shaped to include a pair of troughs 170-1 and 170-2 and a plurality of channels 172-1 through 172-3, with troughs 170 and channels 172 opening in opposite directions relative to one another. Each of troughs 170-1 and 170-2 may be used to receive one or more trays containing one or more pouches of phase-change material. Troughs 170-1 and 170-2 may be accessible from the inner side (i.e., left side) of right side 23 and may be shaped to protrude outwardly from the left surface of right side 23. Although two troughs 170-1 and 170-2 are shown in the present embodiment, the number of troughs is not critical to the present invention; consequently, there may be greater than two troughs 170 or as few as one trough 170. Also, although troughs 170-1 and 170-2 are shown in the present embodiment having a particular size, shape, and orientation, it is to be understood that one or more of the size, shape, and orientation of troughs 170-1 and 170-2 may vary from what is shown in the present embodiment.

Channels 172-1 through 172-3, which may open outwardly (i.e., rightward), may be shaped to extend vertically, with channels 172-1 and 172-2 extending along opposite sides of trough 170-1 and with channels 172-2 and 172-3 extending along opposite sides of trough 170-2. Channels 172-1 through 172-3 may be shaped to have one or more areas 176 of increased wall thickness. For example, channels 172-1 through 172-3 may transition from a wall thickness of 3 mm to a thickness of 6 mm in areas 176. Areas 176, which may be positioned proximate to the bottom of channels 172-1 through 172-3 when system 11 is assembled and upright, may provide structural reinforcement to frame 12 against damage from an inclined shock, such as may occur when system 11, loaded with a pallet and payload, slides off the forks of a lift truck.

Right side 23 may be appropriately dimensioned to support a plurality of vacuum insulated panels positioned against its outer surface.

A plurality of receptacles 180 and 181 may be provided in right side 23 outside of troughs 170-1 and 170-2. As will be discussed further below, receptacles 180 and 181 may be used to receive screws or other fasteners for securing one or more heat-spreaders to the right surface of right side 23. In addition, a plurality of recesses 182, 184 and 186 may also be provided in right side 23. Recesses 182, 184, and 186 may be used to receive brackets or other hardware for use in mounting phase-change material assemblies to right side 23.

Figure 9A:
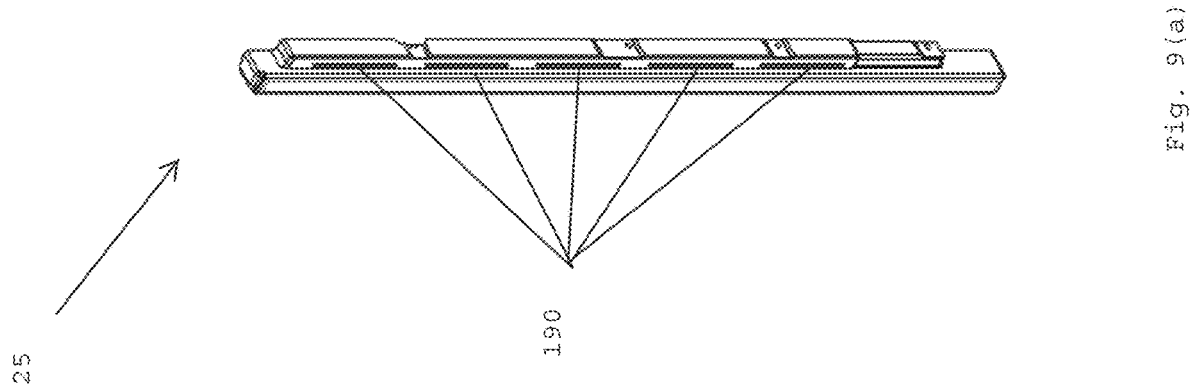
FIGS. 9(a) and 9(b) are front and rear perspective views, respectively, of the left corner gusset shown in FIG. 2(e)
Figure 9B:
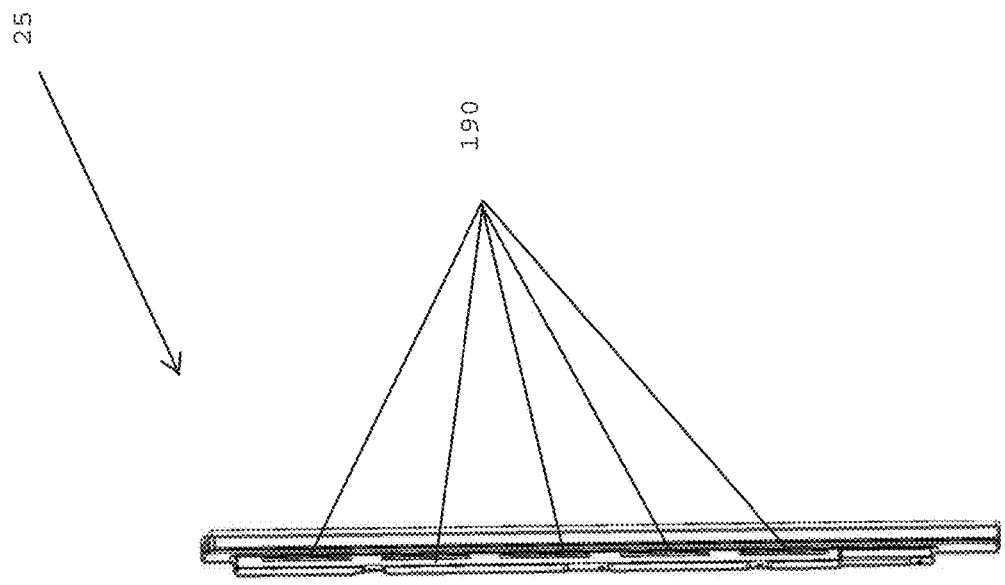

Left corner gusset 25, which is also shown separately in FIGS. 9(a) and 9(b), may be a unitary, solid structure and may be made of a molded composite material, such as a molded fiberglass composite or a molded carbon fiber composite. Left corner gusset 25 may be shaped to include one or more through openings 190, openings 190 serving as thermal conduction breaks to reduce the thermal conductivity of left corner gusset 25. In the present embodiment, left corner gusset 25 may include five openings 190, wherein openings 190 may each be about ⅛-¼ inch wide and approximately 6 inches long and may be spaced apart by 2.25 inches. Notwithstanding the above, the number and/or arrangement of openings serving as thermal conduction breaks in left corner gusset 25 may be varied as desired.

Figure 10A:
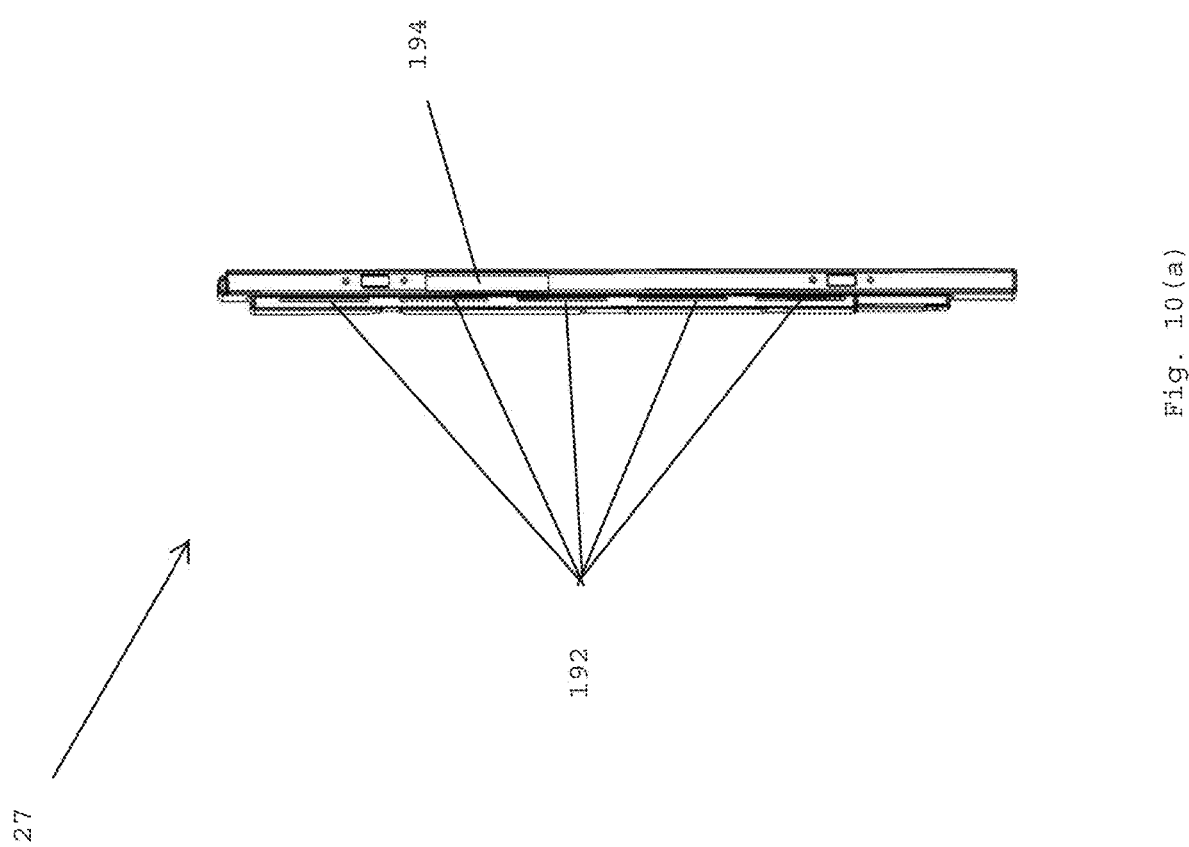

Right corner gusset 27 (also shown separately in FIGS. 10(a) and 10(b)) may be a unitary, solid structure and may be made of a molded composite material, such as a molded fiberglass composite or a molded carbon fiber composite. Right corner gusset 27 may be shaped to include one or more through openings 192, openings 192 serving as thermal conduction breaks to reduce the thermal conductivity of right corner gusset 27. In the present embodiment, right corner gusset 27 may include five openings 192, wherein openings 192 may each be about ⅛-¼ inch wide and approximately 6 inches long and may be spaced apart by 2.25 inches. Notwithstanding the above, the number and/or arrangement of openings serving as thermal conduction breaks in right corner gusset 27 may be varied as desired.

Right corner gusset 27 may also include an opening 194, which may receive a portion of a door-latching mechanism.

In the present embodiment, top 15, back 19, left side 21, and right side 23 preferably do not include any thermal conduction breaks. Nevertheless, one or more of top 15, back 19, left side 21, and right side 23 could be modified to include one or more thermal conduction breaks.

Figure 11:
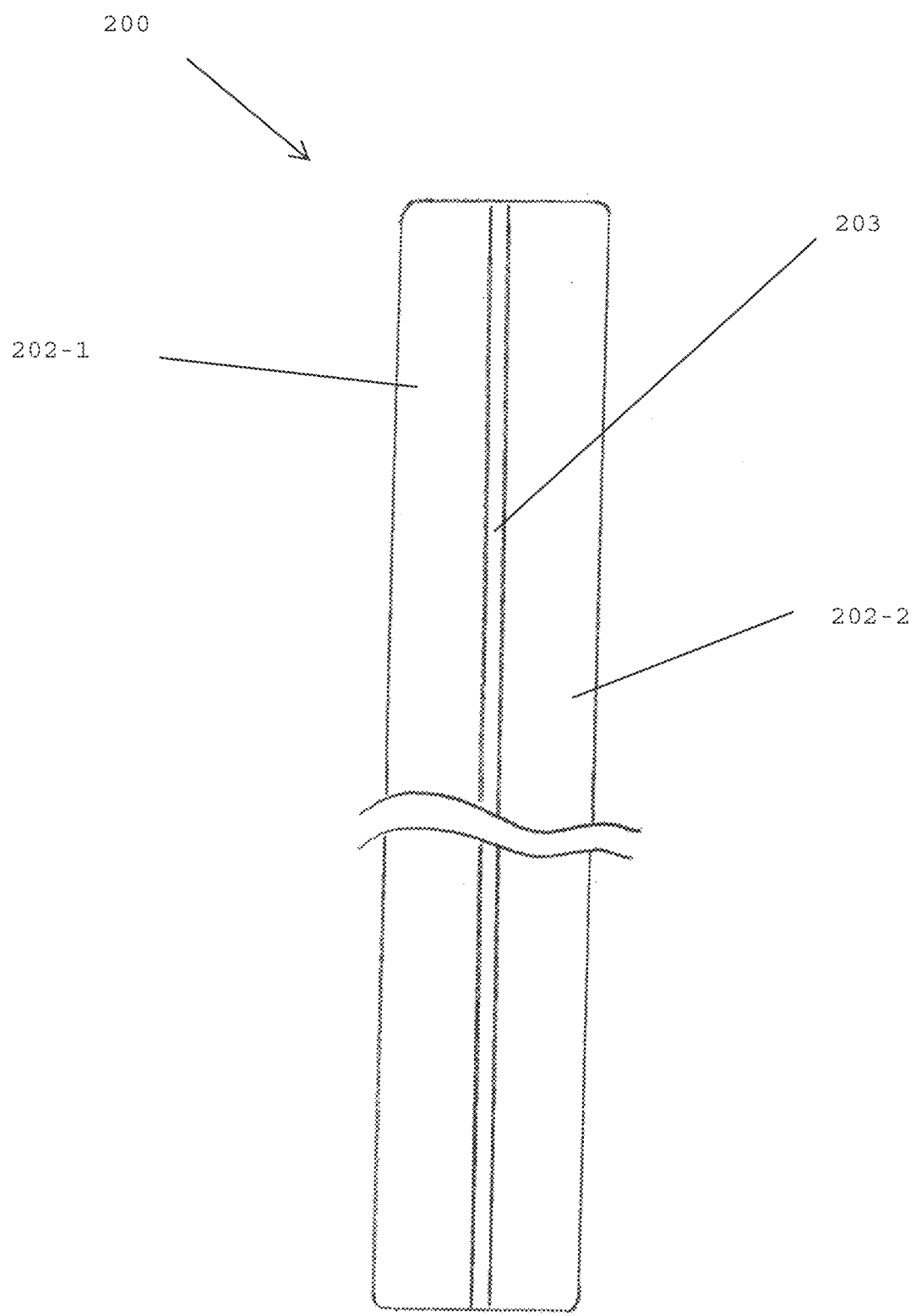
FIG. 11 is a front view of the low-profile, high-strength door hinge shown in FIG. 2(d)

Shipping system 11 may further comprise a door hinge 200. Door hinge 200, which is also shown separately in FIG. 11, may be a low-profile, high-strength hinge, such as a carbon-KEVLAR aramid hinge (Talon Technology, Brookvale, Australia) and may comprise a pair of carbon fiber composite wings 202-1 and 202-2 that are interconnected by a flexible Kevlar aramid bridge 203. Wing 202-1 may be fixedly secured by adhesive, mechanical fasteners or other suitable means to left corner gusset 25, and wing 202-2 may be fixedly secured by adhesive, mechanical fasteners, or other suitable means to door 17, thereby enabling door 17 to be moved between an open position and a closed position.

Figure 12:
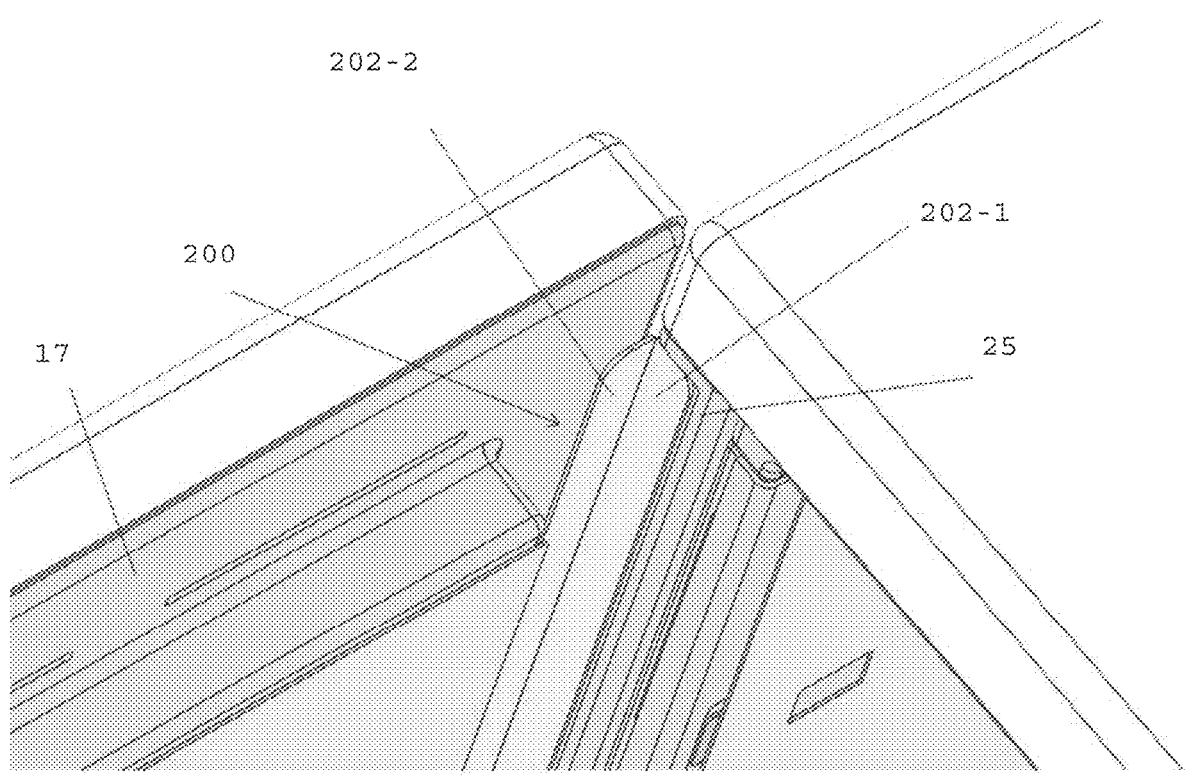
FIG. 12 is a fragmentary perspective view, showing the use of the low-profile, high-strength door hinge to couple together the door frame to the left corner gusset of the shipping system of FIG. 1(a)
Figure 13:
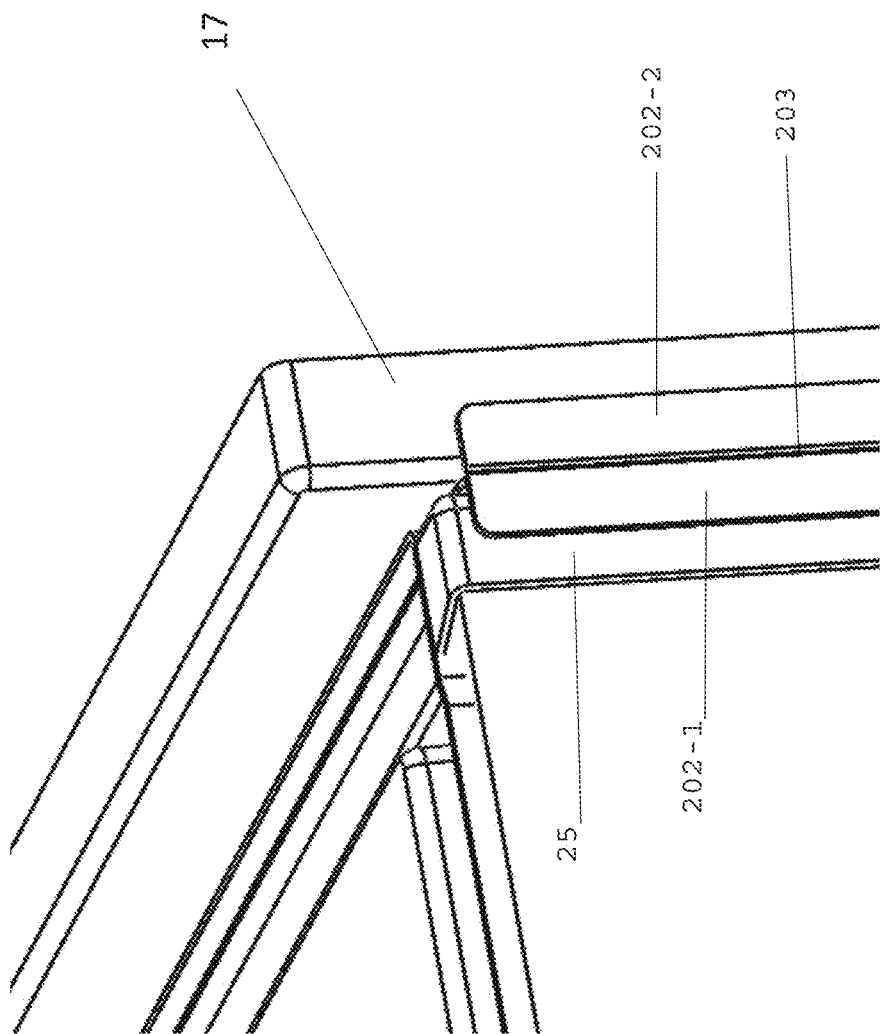
FIG. 13 is an enlarged fragmentary perspective view showing an alternative positioning of the door hinge on the left corner gusset and the door of the shipping system of FIG. 1(a)
Figure 14:
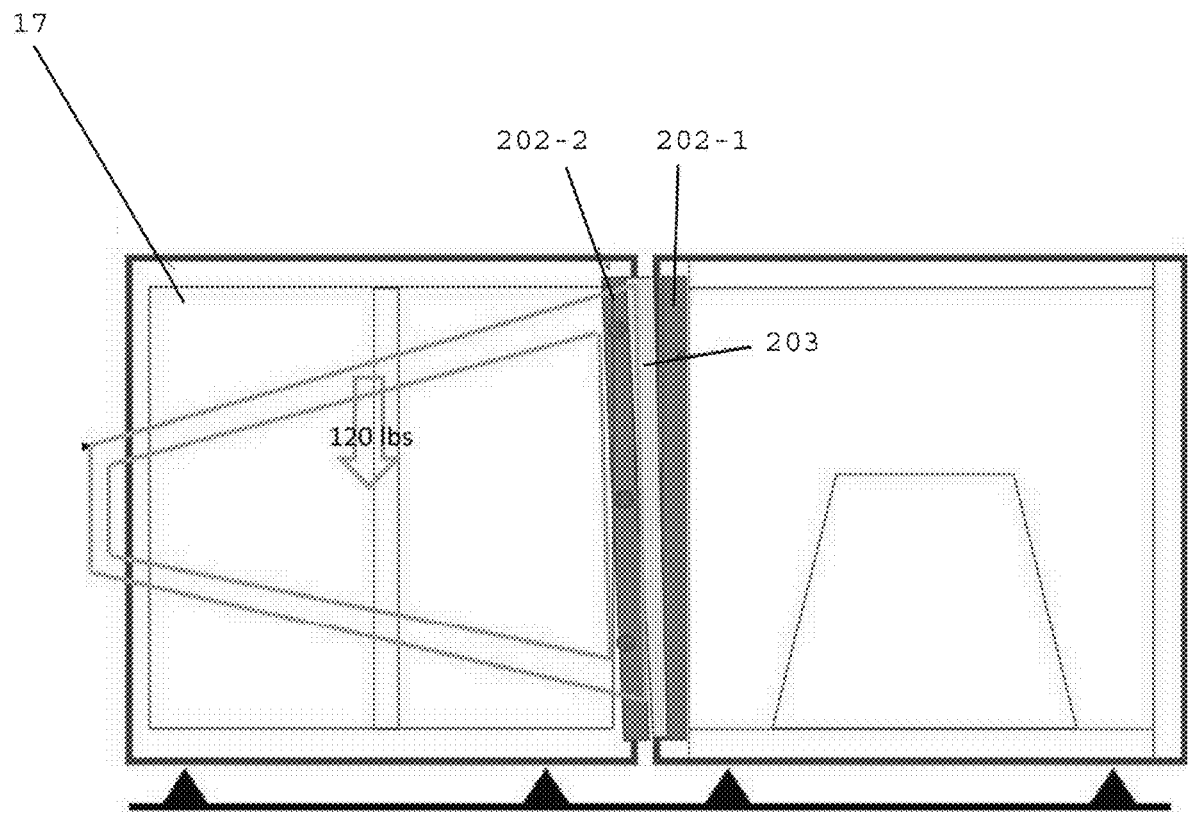
FIG. 14 is a simplified schematic drawing showing how the door hinge of FIG. 11 may be mounted on the door and on the left corner gusset as shown in FIG. 12.

In the present embodiment, wing 202-1 of door hinge 200 may be mounted on a front surface of left corner gusset 25 and wing 202-2 may be mounted on a rear surface of door 17 as shown in FIG. 12. (Bridge 203 is hidden from view in FIG. 12.) Alternatively, in another embodiment shown in FIG. 13, wing 202-1 of door hinge 200 may be mounted on a left surface of left corner gusset 25 and wing 202-2 may be mounted on a front surface of door 17. In the alternative embodiment of FIG. 13, wings 202-1 and 202-2 may be parallel to one another (i.e., with wing 202-1 positioned vertically on left corner gusset 25 and wing 202-2 positioned vertically on door 17). Such a mounting may not be optimal in practice. This is because, when weight is thereafter added to door 17, such as when phase-change material is installed on door 17, such weight can cause door hinge 200 to deflect in such a way that wings 202-1 and 202-2 may no longer be parallel to one another. As a result, door 17 may no longer close properly. Accordingly, hinge 200 may be mounted in such a way as to compensate for the expected hinge deflection when weight is later added to the door. This hinge-mounting technique may be seen in FIG. 14 and may comprise mounting wing 202-1 at an angle to compensate for the expected hinge deflection. The angle at which wing 202-1 may be mounted may be determined by preloading the door hinge with a weight (e.g., 120-140 lb) before it is mounted. This ensures that the angle is correct and compensates for any part-to-part variation. (Each hinge may deflect a different amount and, therefore, may require a unique mounting angle.) As a result, the edge of 202-1 may mate with a slightly positive angle to the edge of left corner gusset 25 (i.e., at shipper bottom, the edge of 202-1 may be farther from the edge of left corner gusset 25), considering the pivot is about the top edges of left corner gusset 25 and wing 202-1. More specifically, this mounting technique may comprise the following steps: (1) Position frame and door. (2) Bond hinge to remainder of frame in nominal position. (3) Put some kind of hold-down weight in frame. (4) Bolt door-side of hinge to preload fixture. (5) Apply 120 lbs to fixture. This preloads the door side of the hinge. (6) Bond door-side of the hinge to the door. (7) Remove the fixture. (Note: The door will now be out of alignment with the body frame since there is no loading on it.)

Figure 15:
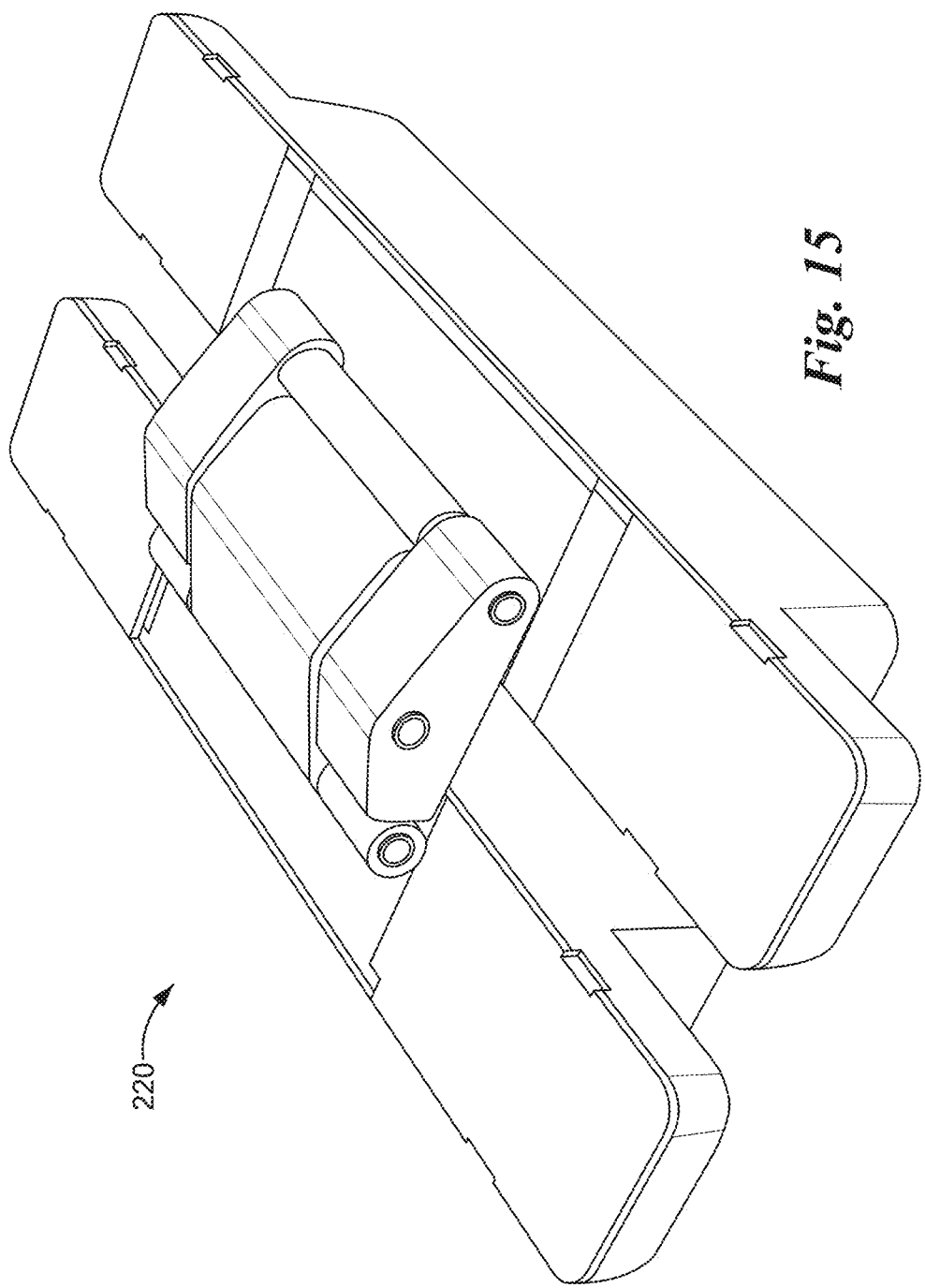
FIG. 15 is an alternative door hinge that may be used, instead of the door hinge of FIG. 11, in the shipping system of FIG. 1(a)

One of the reasons for using door hinge 200 is that it has a low profile, thereby minimizing the space that it occupies. This feature is particularly advantageous when door hinge 200 is exteriorly mounted as it does not significantly increase the overall dimensions of shipping system 11. That being said, the present invention is not limited to using door hinge 200. For example, referring now to FIG. 15, there is shown an alternative door hinge 220 that may be suitable for use with shipping system 11, particularly when door hinge 220 is interiorly mounted so as to couple door 17 and left corner gusset 25. Door hinge 220, which may be a 3-way adjustable door hinge of the type commercially available as SUGATSUNE HES3D-120BL door hinge (Sugatsune America, Inc., Carson, CA) is constructed so that, when folded, the center portion folds into the recess between the two end portions. Preferably, a plurality of door hinges 220 may be used to couple door 17 to left corner gusset 25, the door hinges 220 preferably being spaced apart (evenly or unevenly) along the height of door 17, with one end of each hinge 220 preferably attached to the front surface of left corner gusset 25 and with the other end of each hinge 220 preferably attached to the rear surface of door 17.

Figure 16A:
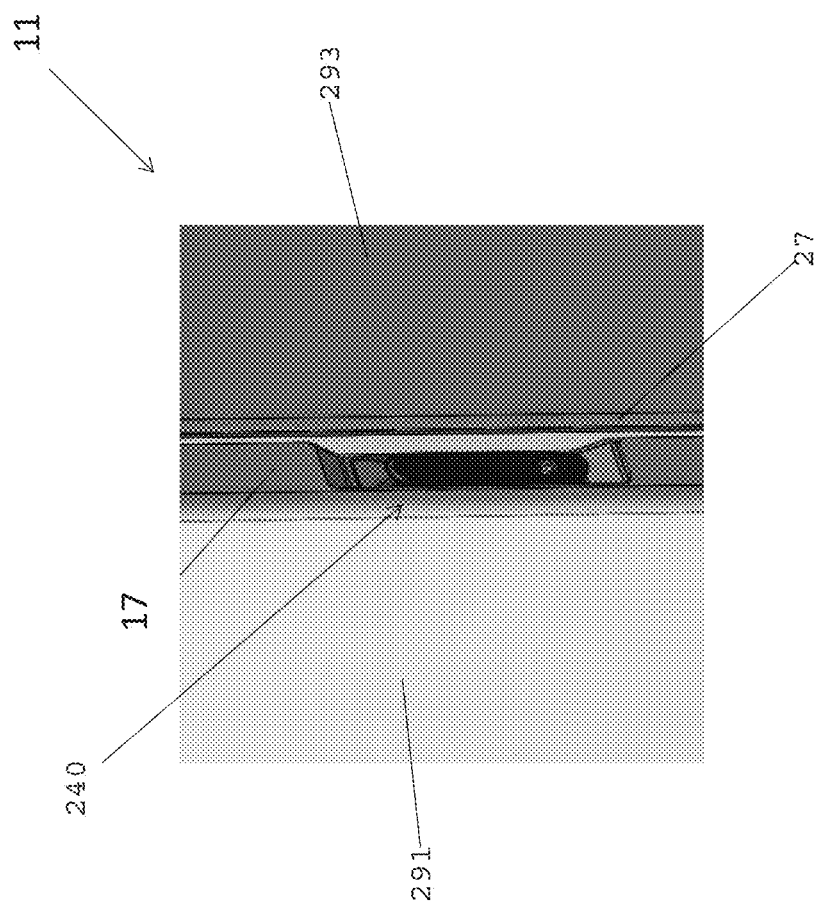
FIG. 16(a) is an enlarged fragmentary front right perspective view of the shipping system of FIG. 1(a), showing the door-latching mechanism.
Figure 16F:
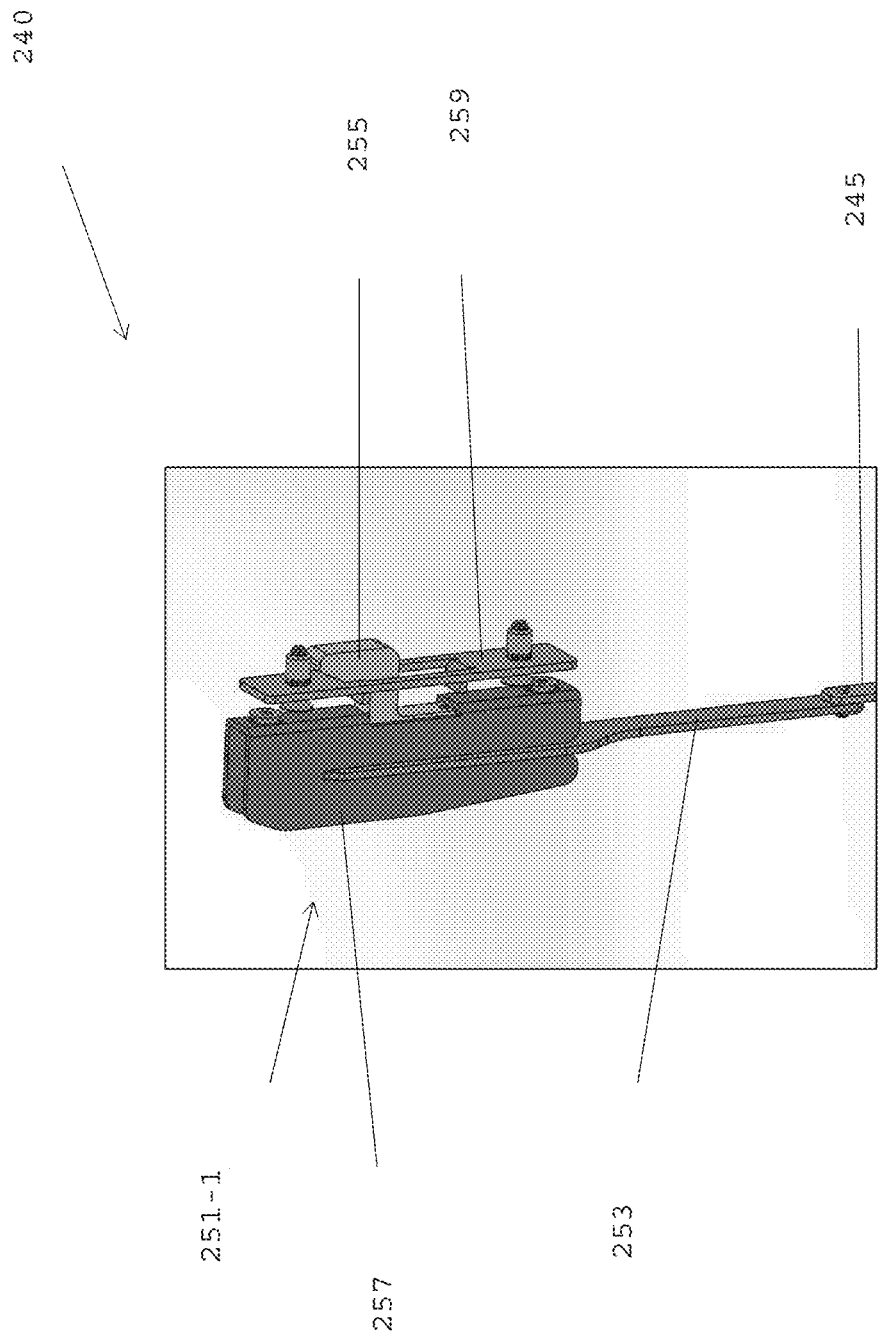

Referring now to FIGS. 16(a) through 16(c), shipping system 11 may further comprise a door-latching mechanism 240. Door-latching mechanism 240 may be used to keep door 17 in a closed position and may be a conventional door-latching mechanism.

In the present embodiment, door-latching mechanism 240, which is also shown separately in FIGS. 16(d) through 16(g), may comprise a rack-and-pinion/handle assembly 241. Assembly 241, in turn, may comprise a handle 243 and a rack-and-pinion mechanism 245.

Door-latching mechanism 240 may also comprise a pair of identical plate assemblies 251-1 and 251-2 that are coupled to opposite ends of rack-and-pinion mechanism 245. Each of plate assemblies 251-1 and 251-2 may comprise an extension arm 253, a locking finger 255, a guide plate 257, and a frame plate 259. Frame plates 259 may be fixed to right corner gusset 27 whereas the rest of door-latching mechanism 240 may be coupled to door 17.

In use, handle 243 may be pulled out and rotated. The rotation of handle 243, in turn, may cause rack-and-pinion mechanism 245 to turn. As a result of the turning of rack-and-pinion mechanism 245, extension arms 253 and locking fingers 255 may translate. The translation of locking fingers 255, in turn, may cause locking fingers 255 to engage frame plates 259, thus latching the door.

Referring back to FIGS. 2(b) and 2(c), shipping system 11 may further comprise a plurality of insulating panels 281-1 through 281-24. Preferably, each of insulating panels 281-1 through 281-24 is a vacuum insulated panel (VIP), which VIP may be conventional in its construction and/or composition. Preferably, the VIP is a VIP of the type with the following attributes: face center thermal conductivity ≤5 mW/mK and 5 yr shelf life. The VIP may include a thin metallic coating along at least one of its major surfaces, examples of such VIPs being disclosed in one or more of the following patents: U.S. Pat. No. 6,863,949 B2, inventor Ehrmanntraut, issued Mar. 8, 2005, U.S. Pat. No. 8,281,558 B2, inventors Hiemeyer et al., which issued Oct. 9, 2012, U.S. Pat. No. 8,822,005, inventors Hiemeyer et al., which issued Sep. 2, 2014, U.S. Pat. No. 5,082,335, inventors Cur et al., which issued Jan. 21, 1992, U.S. Pat. No. 7,449,227, inventors Echigoya et al., which issued Nov. 11, 2008, U.S. Pat. No. 6,037,033, inventor Hunter, which issued Mar. 14, 2000, U.S. Pat. No. 6,106,449, inventor Wynne, which issued Aug. 22, 2000, U.S. Pat. No. 5,252,408, inventors Bridges et al., which issued Oct. 12, 1993, U.S. Pat. No. 4,745,015, inventors Cheng et al., which issued May 17, 1998, and U.S. Pat. No. 3,993,811, inventor Walles, which issued Nov. 23, 1976, all of which are incorporated herein by reference. Panels 281-1 through 281-4 may be positioned in two layers of 2 VIPs per layer directly under and in contact with bottom 13. Panels 281-5 through 281-8 may be positioned in two layers of 2 VIPs per layer directly on top of and in contact with top 15. Panels 281-9 through 281-12 may be positioned in two layers of 2 VIPs per layer directly in front of and in contact with door 17. Panels 281-13 through 281-16 may be positioned in two layers of 2 VIPs per layer directly behind and in contact with back 19. Panels 281-17 through 281-20 may be positioned in two layers of 2 VIPs per layer directly exterior to and in contact with left side 21. Panels 281-21 through 281-24 may be positioned in two layers of 2 VIPs per layer directly exterior to and in contact with right side 23. If desired, some or all of panels 281-1 through 281-24 may be held in place on frame 12 using plastic wrap or the like (not shown).

In the present embodiment, the four VIPs on each of the six sides of frame 12 may come in two different sizes, a first size having a comparatively larger footprint and a second size having a comparatively smaller footprint. (The thicknesses of all four VIPs may be the same, and the thickness of an individual VIP may be, for example, 0.75-1.0 inch.) Each layer of the two layers of VIPs may comprise a VIP having a comparatively larger footprint and a VIP having a comparatively smaller footprint; however, the arrangement of the two VIPs in the two layers may be the opposite of one another. In other words, if one of the layers includes a VIP having a comparatively smaller footprint to the left of a VIP having a comparatively larger footprint, the other layer may include a VIP having a comparatively larger footprint to the left of a VIP having a comparatively smaller footprint. One reason for such an arrangement is to ensure that the seams between the VIPs of the two layers are not aligned with one another. By not aligning the seams with one another, a longer path is needed for heat to flow through the two layers of VIPs. A longer path typically results in improved thermal performance.

In addition, although not shown, a protective layer may be interposed between each foursome of panels 281 and the portion of frame 12 that is associated with said foursome of panels 281. The protective layer, which may comprise, for example, a TYVEK® flashspun nonwoven sheet of high density polyethylene fibers (DuPont de Nemours, Inc., Wilmington, DE), may completely cover the surfaces of the foursome of panels 281 that would otherwise be in contact with frame 12. Also, if desired, some or all of panels 281-1 through 281-24 may be held in place on frame 12 using plastic wrap or the like (not shown).

Figure 17A:
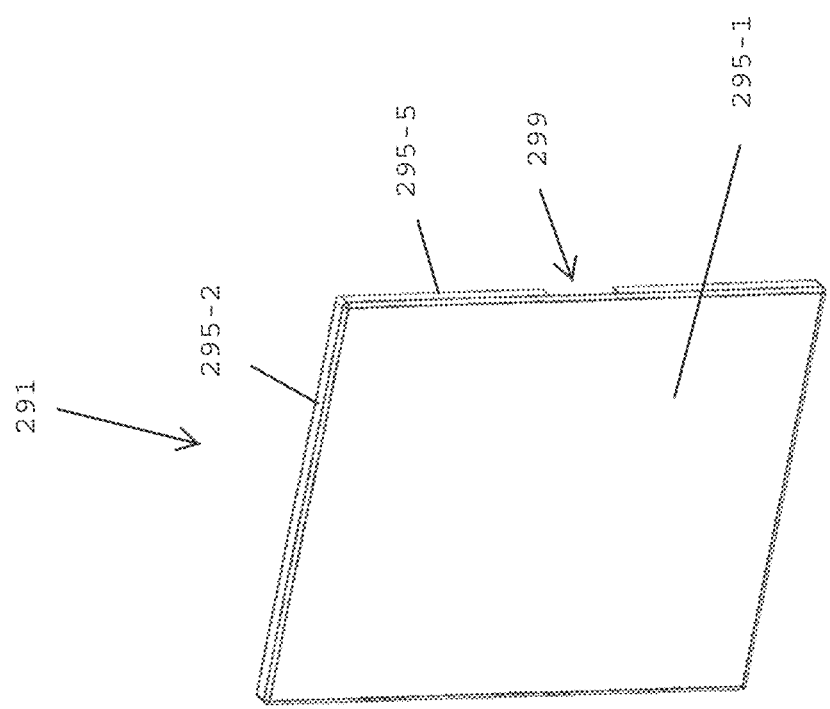

Referring back now to FIGS. 1(a)-1(b) and 2(a)-2(b), shipping system 11 may further comprise an outer shell. The outer shell, in turn, may comprise a first shell portion 291 and a second shell portion 293. First shell portion 291, which is also shown separately in FIGS. 17(a) and 17(b), may be shaped to include a front 295-1 dimensioned to cover the exterior of door 17 (as well as to cover panels 281-9 through 281-12), a top 295-2 dimensioned to cover the top of door 17, a bottom 295-3 dimensioned to cover the bottom of door 17, a left side 295-4 dimensioned to cover at least a portion of the left side of door 17, a right side 295-5 dimensioned to cover at least a portion of the right side of door 17, and an open rear. A cutout 297 may be provided in left side 295-4 to accommodate wing 202-2 of door hinge 200, and a cutout 299 may be provided in right side 295-5 to accommodate a portion of door-latching mechanism 240. First shell portion 291 may be fixedly secured to door 17 by mechanical fasteners (e.g., screws), adhesive or other suitable means. Openings (not shown) may be provided in first shell portion 291 through which such mechanical fasteners may be inserted.

Figure 18A:
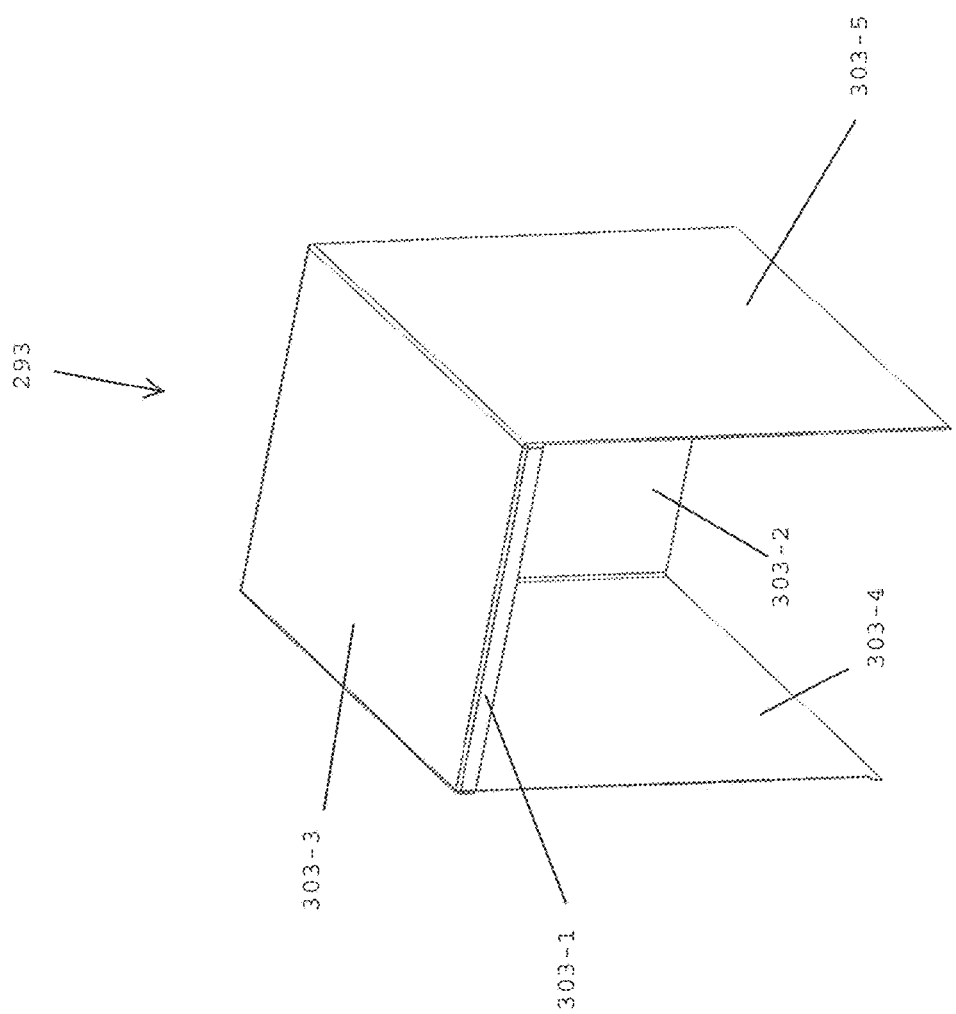
FIGS. 18(a) and 18(b) are front perspective and rear perspective views, respectively, of the second shell portion shown in FIG. 1(a)
Figure 18B:
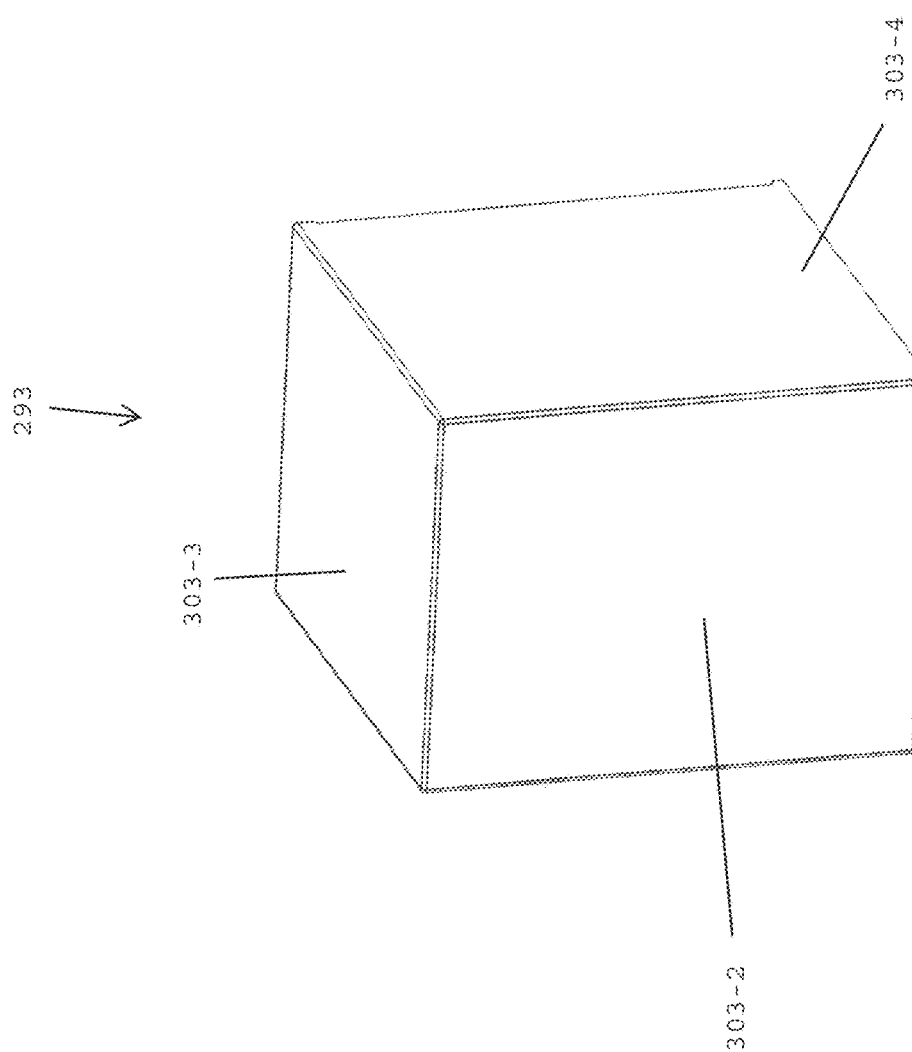
Figure 19A:
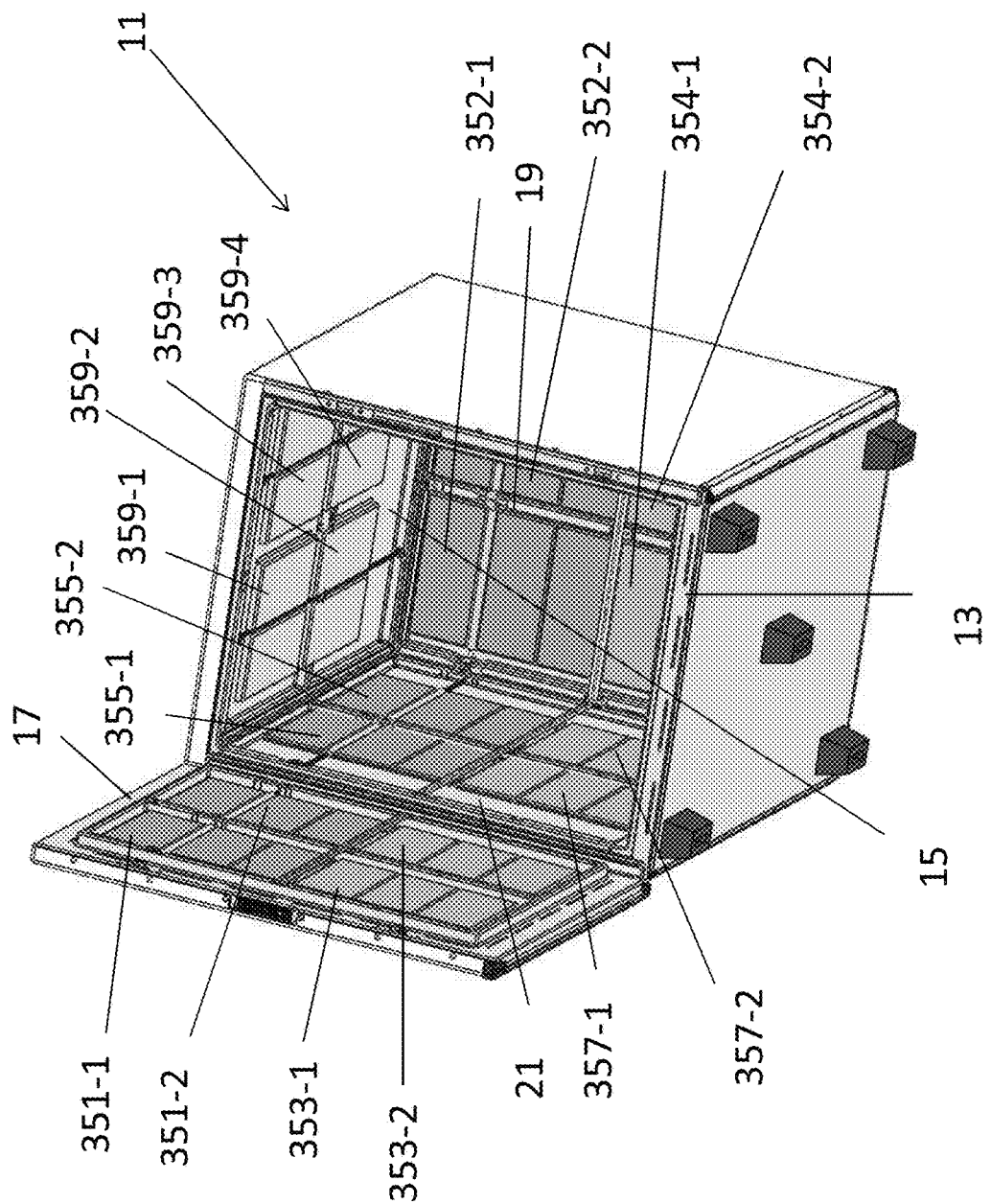
FIGS. 19(a) and 19(b) are bottom and top perspective views, respectively, of the shipping system shown in FIG. 2(a), with many of the heat-spreader assemblies not being shown to reveal components that would otherwise be obscured thereby.
Figure 19B:
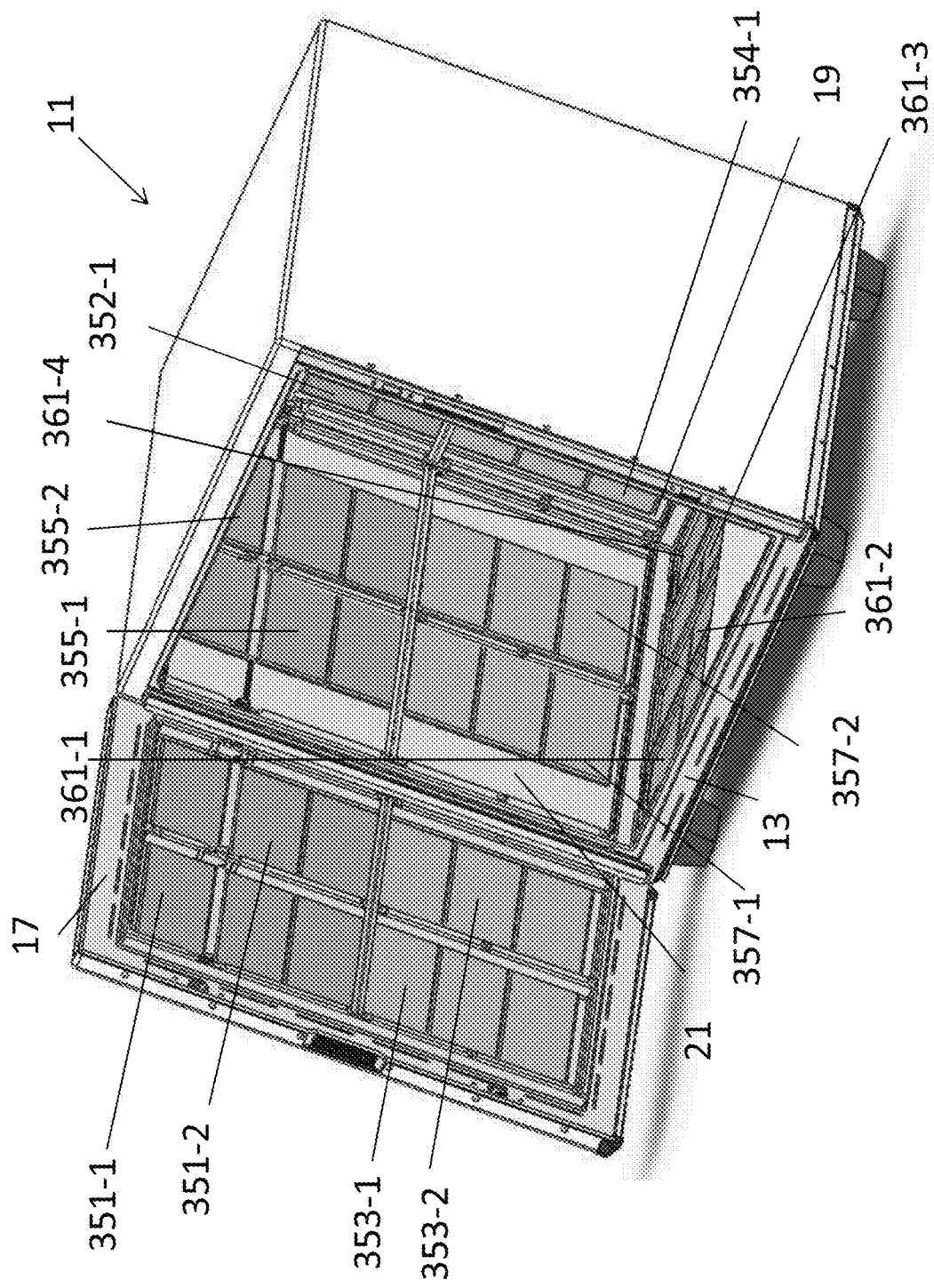
Figure 19C:
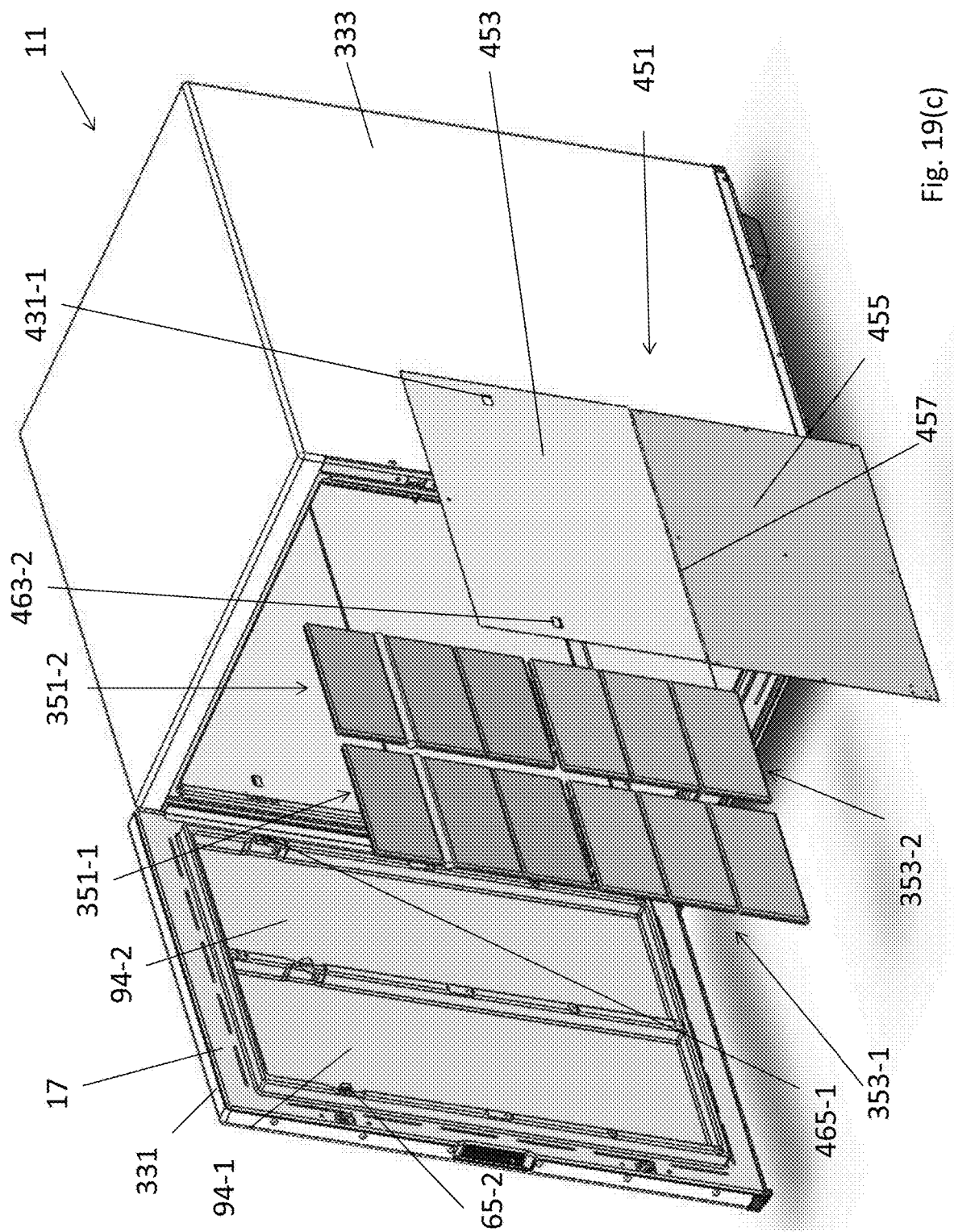
FIG. 19(c) is a partly exploded perspective view of the shipping system shown in FIG. 2(a), with certain components not being shown for simplicity.
Figure 19D:
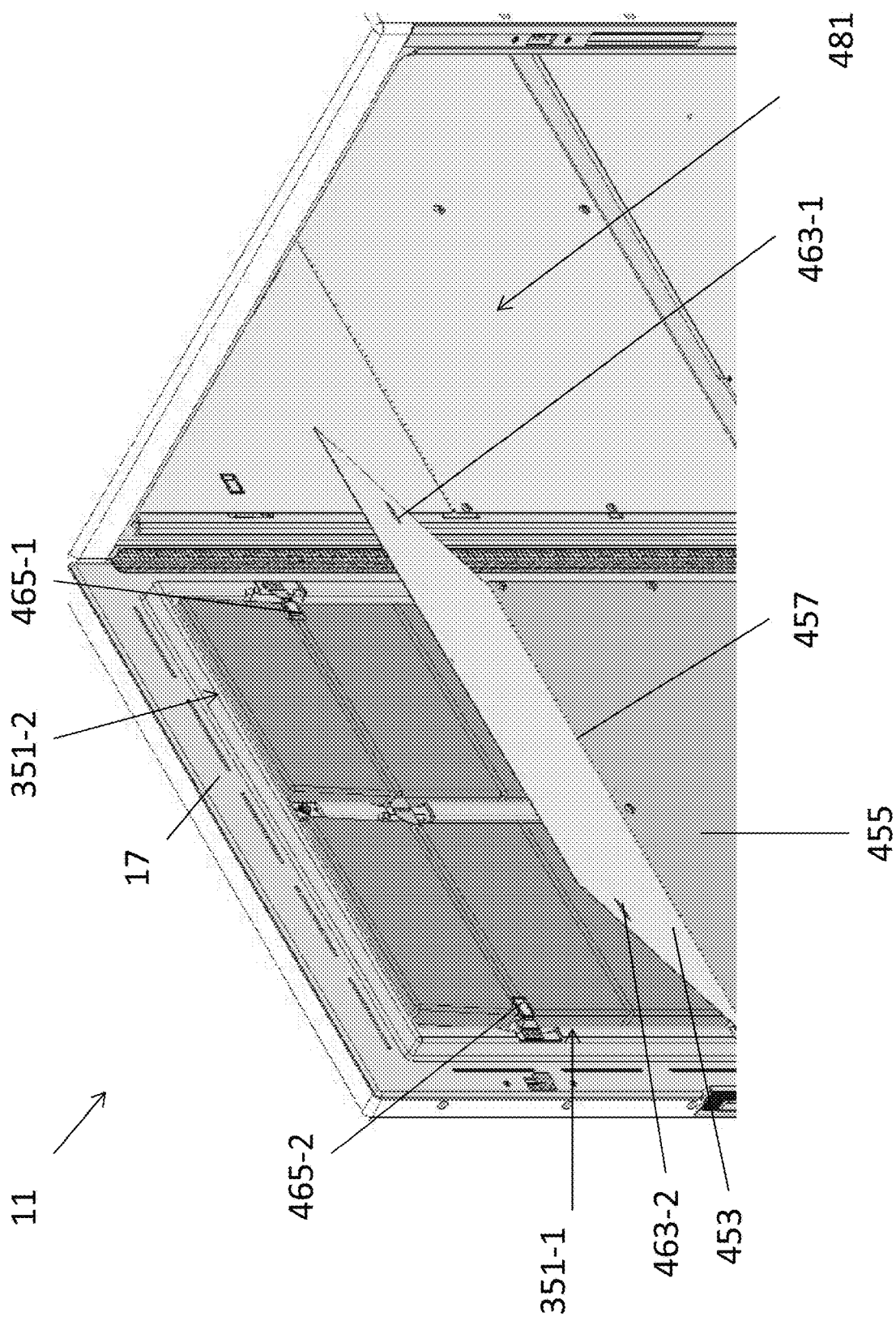
FIG. 19(d) is an enlarged fragmentary perspective view of the shipping system shown in FIG. 2(a), with the top panel of the heat-spreader assembly shown pivoted away from the door to reveal components that would otherwise be obscured thereby.
Figure 19E:
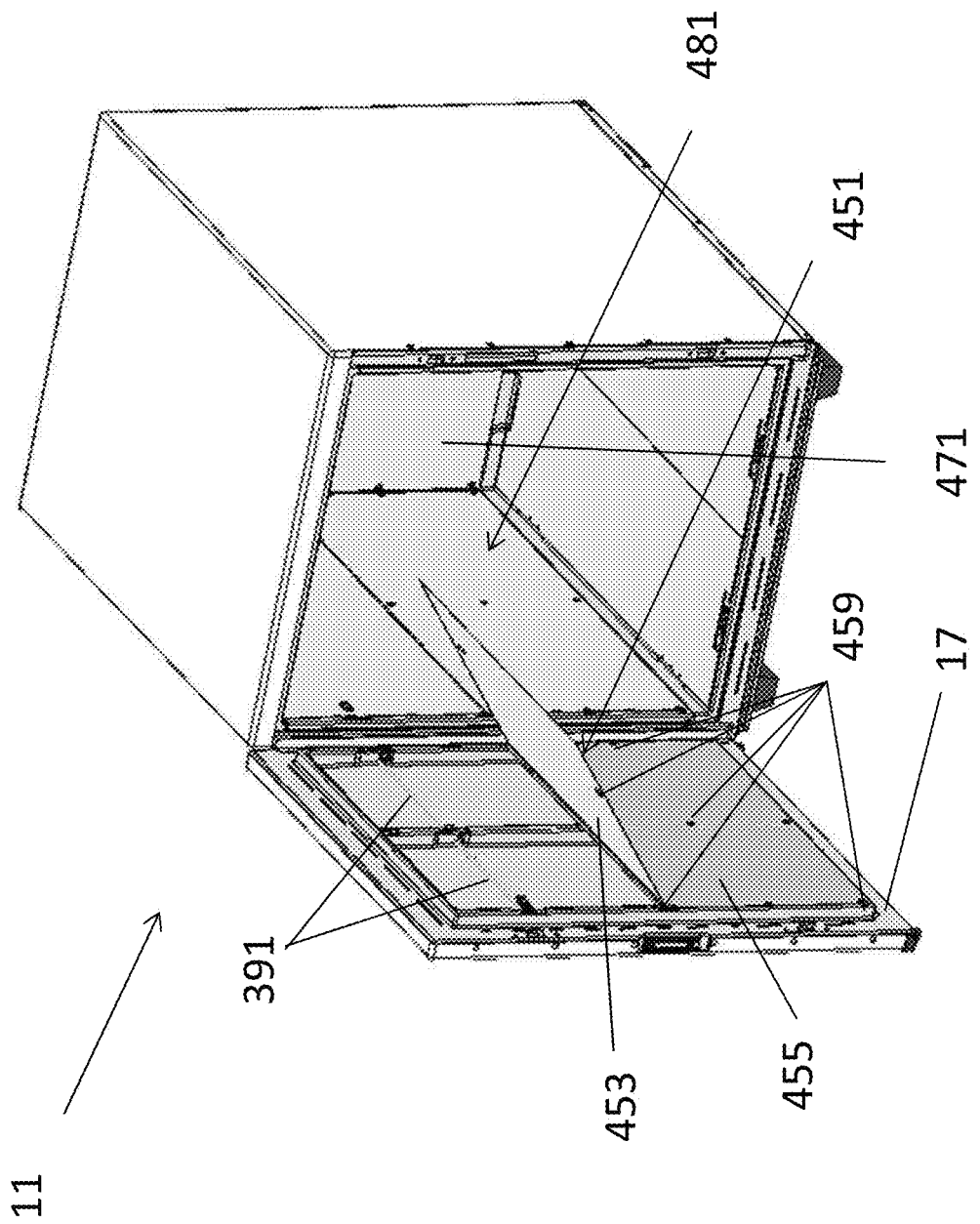
FIG. 19(e) is a perspective view of the shipping system shown in FIG. 2(a), with the top panel of the heat-spreader assembly shown pivoted away from the door and with certain components not being shown for simplicity.

Second shell portion 293, which is also shown separately in FIGS. 18(a) and 18(b), may be shaped to include a front 303-1, a back 303-2, a top 303-3, a left side 303-4, a right side 303-5, and an open bottom. Second shell portion 293 may be appropriately dimensioned to cover nearly all of the exterior surfaces of top 15, back 19, left side 21, right side 23, left corner gusset 25, and right corner gusset 27. Second shell portion 293 may be fixedly secured to one or more of the exterior surfaces of bottom 13, top 15, back 19, left side 21 and right side 23 by mechanical fasteners (e.g., screws), adhesive or the like. Openings (not shown) may be provided in second shell portion 293 through which such mechanical fasteners may be inserted.

Each of first shell portion 291 and second shell portion 293 may be a unitary, solid structure made of one or more materials possessing low thermal conductivity and good mechanical strength. Examples of particularly suitable materials may comprise composite materials, such as fiberglass composite and carbon fiber composite. Such materials may be molded to form each of first shell portion 291 and second shell portion 293. In one embodiment, the composite material used to make first shell portion 291 and second shell portion 293 may be a multilayer material comprising a gel coat (e.g., POLYCOR 944W005 white isophthalic gel coat, Polynt Composites USA, Inc., Carpentersville, IL) of about 0.508-0.558 mm in thickness, a 0.75 oz. chop strand mat (e.g., JUSHI P04 powder chopped strand mat, Jushi USA, Irwindale, CA) of about 0.483 mm in thickness, a 1708 biaxial glass layer (e.g., VECTORPLY E-BXM 1708, Vectorply Corporation, Phenix City, AL) of about 1.2 mm in thickness, and a carbon fiber 1.5 oz. mat (e.g., TORAY T700S standard modulus carbon fiber, Toray Composite Materials America, Inc., Tacoma, WA) of about 0.965 mm in thickness.

Shipping system 11 may further comprise a lower panel 311. Lower panel 311, which may be made of wood or another suitable material, may be fixedly secured to the bottom surface of bottom 13 by mechanical fasteners, adhesive or other suitable means.

Shipping system 11 may further comprise a plurality of support feet 317 (which are also shown in FIG. 1(c)). Support feet 317, which may be fixedly secured by mechanical fasteners (e.g., screws), adhesive or other suitable means to the bottom of lower panel 311, may serve to elevate panel 311 so that shipping system 11 may be moved with a forklift or the like. In addition, support feet 317 may be made of a suitable material to provide some shock absorbance. In the present embodiment, five support feet 317 are shown in a specific pattern; however, a greater or lesser number of support feet 317 may be used, and support feet 317 may be arranged in a pattern that differs from that shown.

Shipping system 11 may further comprise a bottom reinforcement beam 318. Bottom reinforcement beam 318, which may be made of a composite material, such as, for example, fiberglass composite, may be positioned between bottom 13 and lower panel 311 to provide structural reinforcement to bottom 13.

Shipping system 11 may further comprise one or more insulating strips (not shown). These insulating strips, which may be made of expanded polystyrene or the like, may be appropriately dimensioned so that they may be positioned around one or more of front border portion 58-1, rear border portion 58-2, left side border portion 58-3, and right side border portion 58-4 of bottom 13.

System 11 may further comprise a plurality of PCM assemblies and a plurality of heat-spreader assemblies. In the present embodiment, there may be a number of different types of PCM assemblies, and there may be a number of different types of heat-spreader assemblies. For instance, door 17 may be equipped with two different types of PCM assemblies, namely, a first type of PCM assembly and a second type of PCM assembly, and door 17 may also be equipped with a first type of heat-spreader assembly. Back 19 may be equipped with the same two types of PCM assemblies associated with door 17, and back 19 may also be equipped with the same type of heat-spreader assembly associated with door 17. Accordingly, unless specified otherwise, any discussion or depiction in the present application of PCM assemblies and a heat-spreader assembly in the context of door 17 is equally applicable to back 19. In addition, left side 21 may be equipped with two additional types of PCM assemblies, namely, a third type of PCM assembly and a fourth type of PCM assembly, and left side 21 may also be equipped with an additional type of heat-spreader assembly, namely, a second type of heat-spreader assembly. Right side 23 may be equipped with the same two types of PCM assemblies associated with left side 21, and right side 23 may also be equipped with the same type of heat-spreader assembly associated with left side 21. Accordingly, unless specified otherwise, any discussion or depiction in the present application of PCM assemblies and a heat-spreader assembly provided in the context of left side 21 is equally applicable to right side 23. Additionally, top 15 may be equipped with an additional type of PCM assembly, namely, a fifth type of PCM assembly, and top 15 may also be equipped with an additional two types of heat-spreader assembly, namely, a third type of heat-spreader assembly and a fourth type of heat-spreader assembly. In addition, bottom 13 may be equipped with an additional type of PCM assembly, namely, a sixth type of PCM assembly, and bottom 13 may also be equipped with an additional two types of heat-spreader assembly, namely, a fifth type of heat-spreader assembly and a sixth type of heat-spreader assembly.

More specifically, various views of system 11 are shown in FIGS. 19(*a*) through 19(*e*), with certain components not being shown to reveal details of the PCM assemblies and/or heat-spreader assemblies of system 11. As can be seen, door 17 may be equipped with two different types of PCM assemblies, which may be an upper PCM assembly and a lower PCM assembly. More specifically, in the present embodiment, door 17 may be equipped with two identical upper PCM assemblies 351-1 and 351-2 and with two identical lower PCM assemblies 353-1 and 353-2. Back 19 may be equipped with two identical upper PCM assemblies 352-1 and 352-2 and with two identical lower PCM assemblies 354-1 and 354-2. Upper PCM assemblies 352-1 and 352-2 for back 19 may be identical to upper PCM assemblies 351-1 and 351-2 for door 17, and lower PCM assemblies 354-1 and 354-2 for back 19 may be identical to lower PCM assemblies 353-1 and 353-2 for door 17.

Left side 21 may be equipped with an additional two different types of PCM assemblies, which may be an upper PCM assembly and a lower PCM assembly. More specifically, in the present embodiment, left side 21 may be equipped with two identical upper PCM assemblies 355-1 and 355-2 and with two identical lower PCM assemblies 357-1 and 357-2. Although not shown, right side 23 may be equipped with the same array of PCM assemblies as left side 21.

Top 15 may be equipped with an additional type of PCM assembly. More specifically, in the present embodiment, top 15 may be equipped with four identical PCM assemblies 359-1 through 359-4. In addition, bottom 13 may be equipped with an additional type of PCM assembly. More specifically, in the present embodiment, bottom 13 may be equipped with four identical PCM assemblies 361-1 through 361-4.

Figure 20A:
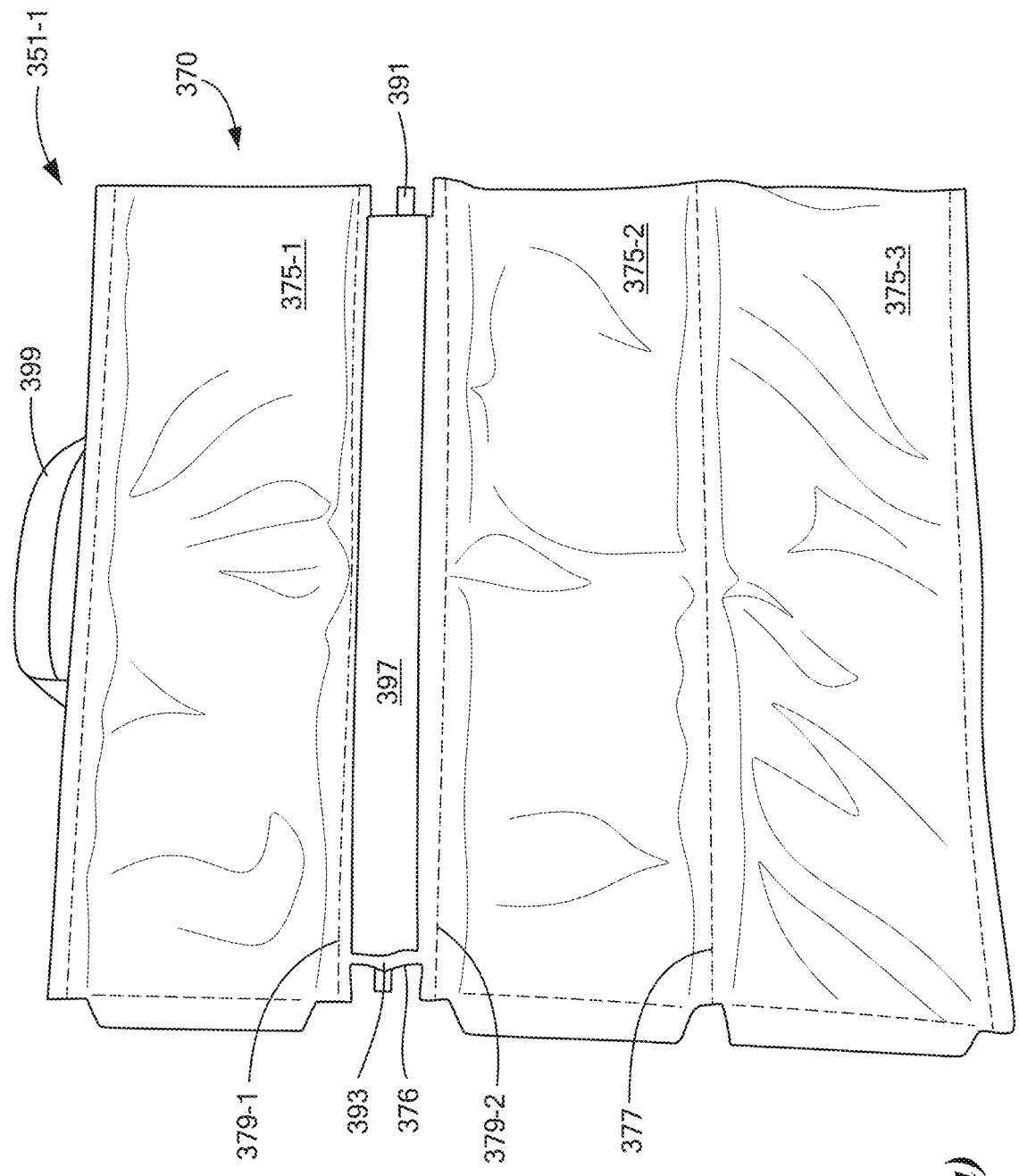
FIGS. 20(a) through 20(c) are front, enlarged fragmentary end, and enlarged fragmentary perspective views, respectively, of one of the door upper PCM assemblies shown in FIG. 19(a)
Figure 20B:
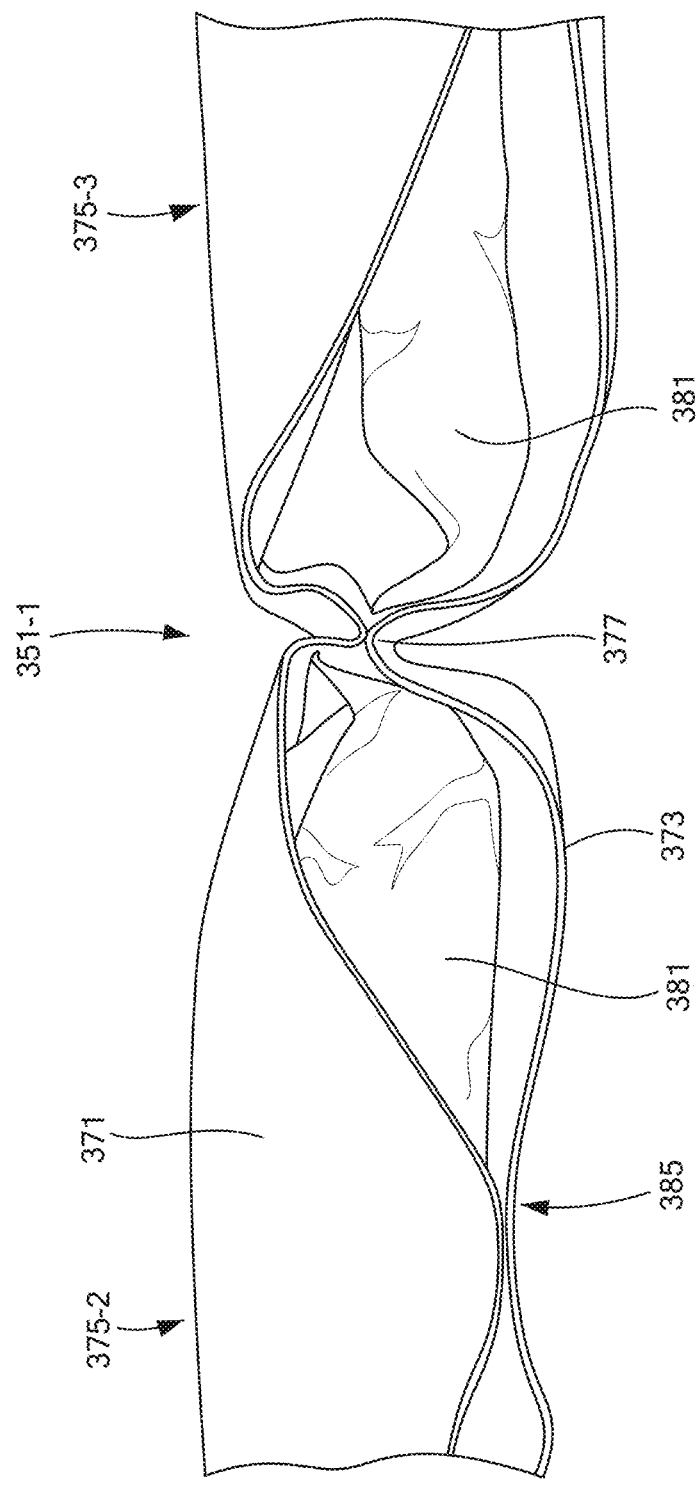
Figure 20C:
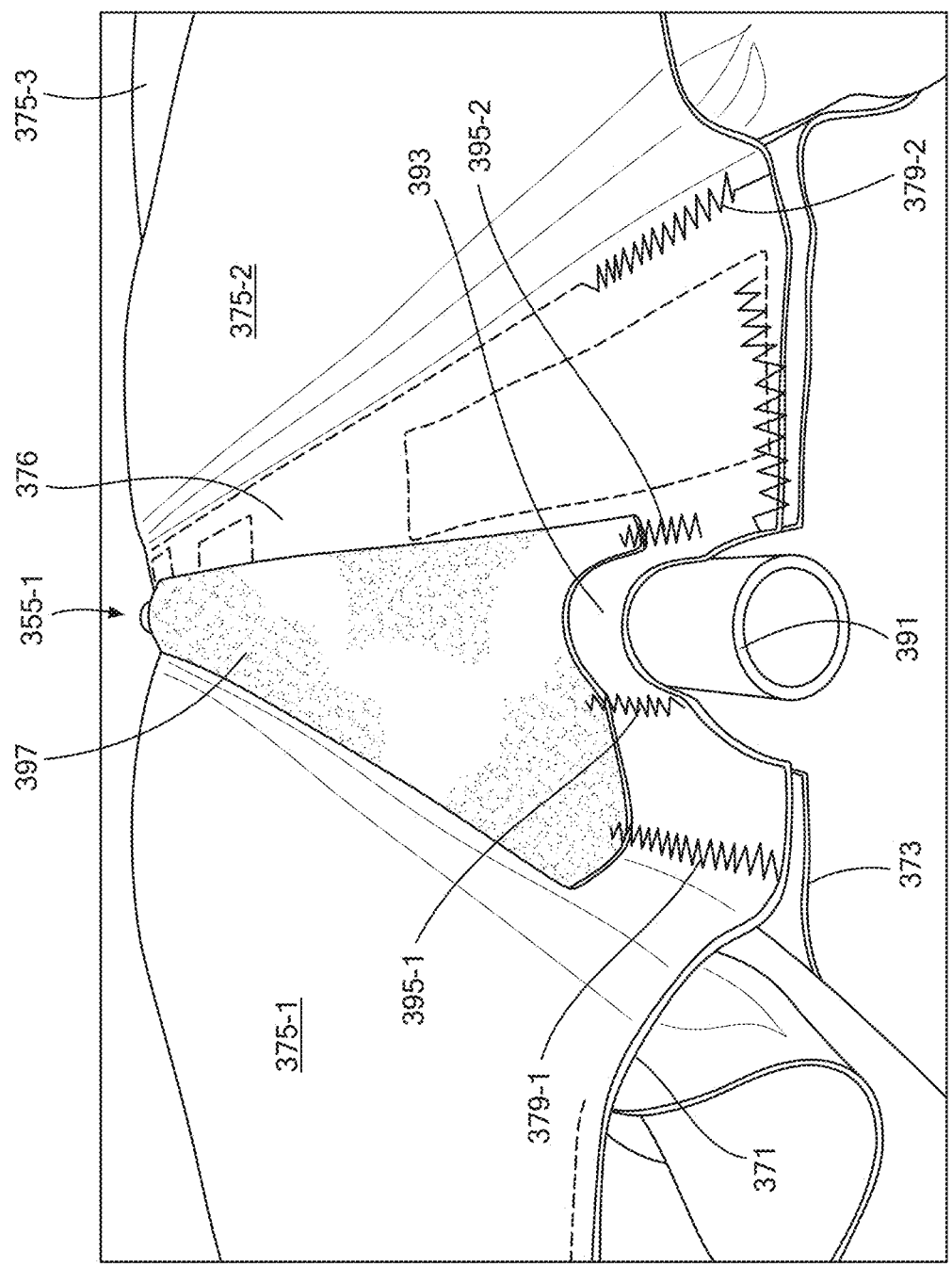

Referring now to FIGS. 20(*a*) through 20(*c*), there are shown various views of upper PCM assembly 351-1. Upper PCM assembly 351-1 may comprise a curtain 370. Curtain 370 may comprise an upper sheet 371 and a lower sheet 373. Upper sheet 371 and lower sheet 373 may comprise two separate sheets of material or may comprise a single sheet of material that has been folded over. Upper sheet 371 and lower sheet 373 may be made of any of a variety of materials. For example, according to one embodiment, upper sheet 371 and lower sheet 373 may consist of or comprise a fire-retardant polyvinyl chloride (PVC)-laminated polyester. Additionally or alternatively, upper sheet 371 and lower sheet 373 may consist of or comprise NYLON polyamide stretch fabric or other types of durable material, and upper sheet 371 and lower sheet 373 may be assembled in a manner similar to that disclosed in U.S. Pat. No. 10,583,978 B2 for use in forming pallet cover pockets.

Upper sheet 371 and lower sheet 373 may be joined together, for example, by sewing, to define a plurality of pockets 375-1, 375-2, and 375-3 and also to define a connecting portion 376. Pockets 375-1 through 375-3 may be parallel, hollow structures that extend generally horizontally, and each of pockets 375-1 through 375-3 may have exemplary dimensions of approximately 19.0 inches×approximately 8.75 inches. Pockets 375-2 and 375-3 may be substantially sealed off and separated from one another, but hingedly interconnected to one another, for example, by a laterally extending seam 377. Connecting portion 376, which may be of comparatively smaller length and width than pockets 375-1 through 375-3, may be oriented parallel to and interposed between pockets 375-1 and 375-2. Pocket 375-1 and connecting portion 376 may be hingedly interconnected to one another and substantially sealed off from one another by a laterally extending seam 379-1, and pocket 375-2 and connecting portion 376 may be hingedly interconnected to one another and substantially sealed off from one another by a laterally extending seam 379-2.

Although, in the present embodiment, curtain 370 is shown as having three pockets 375-1 through 375-3 and one connecting portion 376, it is to be understood that the number of pockets 375-1 through 375-3 and connecting portions 376 in curtain 370 is merely illustrative; consequently, there could be a greater number of pockets and/or connecting portions and/or a lesser number of pockets and/or connecting portions in curtain 370.

A quantity of phase-change material may be disposed within each of pockets 375-1 through 375-3, and curtain 370 is preferably constructed to support up to about 20 lbs assembled weight. In the present embodiment, one or more phase-change material (PCM) packs 381 may be disposed within each of pockets 375-1 through 375-3. Each PCM pack 381 may comprise a container and a quantity of one or more phase-change materials disposed within the container. For example and without limitation, PCM pack 381 may be a passive temperature-control member of the type comprising a flexible polymeric pouch or mat and a quantity of a phase-change material disposed within the pouch or mat. The phase-change material may comprise any of a number of different types of phase-change materials, such as, but not limited to, any water-based or organic phase-change material. For example, if the phase-change material is water-based, the phase-change material may be water, a mixture of water and a thickener (e.g., a polysaccharide thickener) to produce a gelled water mixture, or a water/salt solution with an optional thickener.

Alternatively, if the phase-change material is an organic phase-change material, the phase-change material may be a gelled organic phase-change material. The gelled organic phase-change material may comprise, for example, one or more n-alkanes, such as n-tetradecane, n-pentadecane, n-hexadecane, n-heptadecane, and n-octadecane, and one or more gelling agents, such as a styrene-ethylene-butylene-styrene (SEBS) triblock copolymer, and may be made by the technique disclosed in U.S. Pat. No. 10,077,389 B2, which is incorporated herein by reference. Illustrative examples of PCM pack 881 may be disclosed in one or more of U.S. Pat. No. 10,583,978 B2, U.S. Pat. No. 10,077,389 B2, U.S. Patent Application Publication No. 2018/0093816 A1, and PCT International Publication No. WO 2018/213348 A2, all of which are incorporated herein by reference.

Each PCM pack 381 may be sized to occupy substantially the entirety of a pocket 375; alternatively, a single PCM pack 381 may be smaller than a pocket 375, and a plurality of PCM packs 381 may be disposed side-by-side and/or front-to-back within a single pocket 375. For example, according to one embodiment, four PCM packs 381 may be disposed side-by-side within a single pocket 375.

Each PCM pack 381 may be removably retained within a pocket 375 (e.g., by having pocket 375 sewn shut at one end and closed with a flap at the opposite end) or may be permanently retained within a pocket 375. In the present embodiment, each PCM pack 381 is permanently retained within a pocket 375 so as to preclude the removal of a PCM pack 381 from a pocket 375 and the subsequent reinsertion of the same or a different PCM pack 381 into the same pocket 375 without causing permanent damage to the pocket 375.

Accordingly, in the present embodiment, both lateral ends of each pocket 375 may be permanently closed. The permanent closure of the ends of each pocket 375 may be effected by one or more different techniques, such as, but not limited to, sewing, the use of mechanical fasteners, the use of one or more permanent adhesives and/or the bonding or fusing together of upper sheet 371 and lower sheet 373, for example, by heat-sealing and/or ultrasonic welding. The closure of one or both ends of a pocket 375 may be along the entire end of the pocket 375 or may be along only portions of the end of the pocket 375. For example, in the present embodiment, the closure of at least one end may only be at one or more spots 385 at the end of a pocket 375. In this manner, by closing the end of a pocket 375 only at one or more spots 385, as opposed to closing the entire end of the pocket 375, it may be possible for a person to visually inspect a PCM pack 381 without removing the PCM pack 381 from its pocket 375 (i.e., by viewing the PCM pack 381 through the spaces between spots 385). This feature may be desirable as it may enable a person to confirm whether or not the phase-change material of a PCM pack 381 is in a desired frozen or liquid state without having to remove the PCM pack 381 from its pocket 375. For example, prior to installation of upper PCM assembly 351-1 on door 17, upper PCM assembly 351-1 may be preconditioned in a temperature regulated environment (e.g., a freezer or refrigerator) so that the phase-change material of the PCM packs 381 included in PCM assembly 351-1 may be appropriately frozen or refrigerated prior to use. Where pockets 375 are closed only at spots 385, one may confirm whether or not the phase-change material of a PCM pack 381 is in its desired phase before installation of upper PCM assembly 351-1 on door 17. In this manner, in the event that the phase-change material of a PCM pack 381 is observed not to be properly preconditioned, upper PCM assembly 351-1 may be returned to a temperature regulated environment (e.g., a freezer or refrigerator) so that it may become properly preconditioned. Additionally or alternatively, in another embodiment (not shown), some or all of pockets 375 may be provided with one or more viewing areas along their sides and/or ends to permit the visual inspection of a PCM pack 381 while the PCM pack 381 is in its pocket 375. For example, this may be accomplished by constructing a portion or the entirety of a pocket out of a mesh material having openings suitable for visual inspection of a PCM pack 381 disposed therewithin or by constructing a portion or the entirety of a pocket with a transparent or translucent material. Additionally or alternatively, this may be accomplished by providing a permanent or closable window in a pocket 375.

Upper PCM assembly 351-1 may further comprise a mounting rod 391, which may be useful in mounting curtain 370 to door 17. Mounting rod 391 preferably comprises an elongated structure that is made of a material that is lightweight but rigid. In the present embodiment, mounting rod 391 may be hollow; however, mounting rod 391 need not be hollow and may be solid. Mounting rod 391 may be disposed within a pocket 393 formed in connecting portion 376 by a pair of seams 395-1 and 395-2. Mounting rod 391 may be appropriately dimensioned to extend beyond the ends of pocket 393.

Upper PCM assembly 351-1 may further comprise a fastener strip 397. Fastener strip 397, which may be a strip of loop fasteners of the complementary hook-and-loop variety (e.g., VELCRO® hook-and-loop fasteners) may be fixed to sheet 371 over at least a portion of connecting portion 376. As will be discussed below, fastener strip 397 may be used to mate with a strip of complementary hook fasteners coupled to door 17 to help keep pocket 375-1 from pivoting away from door 17.

Upper PCM assembly 351-1 may further comprise a handle 399. Handle 399, which may comprise a strip of fabric or other suitable material, may be secured, for example, by sewing, at opposite ends to the top of curtain 370. Handle 399 may be useful in the carrying of upper PCM assembly 351-1 prior to its installation on door 17 or after its removal from door 17.

Figure 21A:
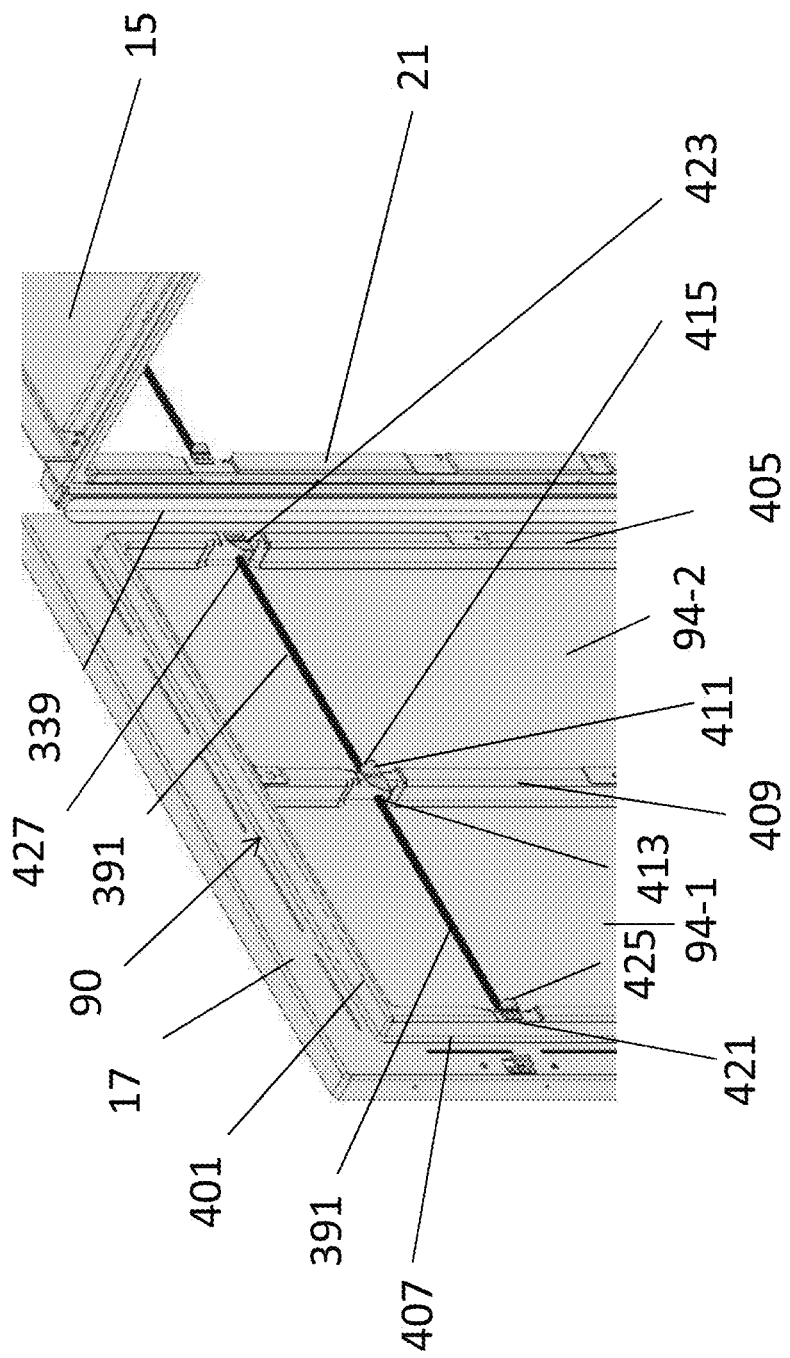
FIGS. 21(a) through 21(c) are fragmentary perspective, enlarged fragmentary perspective, and enlarged fragmentary perspective views, respectively, showing how the upper PCM assemblies shown in FIG. 19(a) are mounted on the door.
Figure 21B:
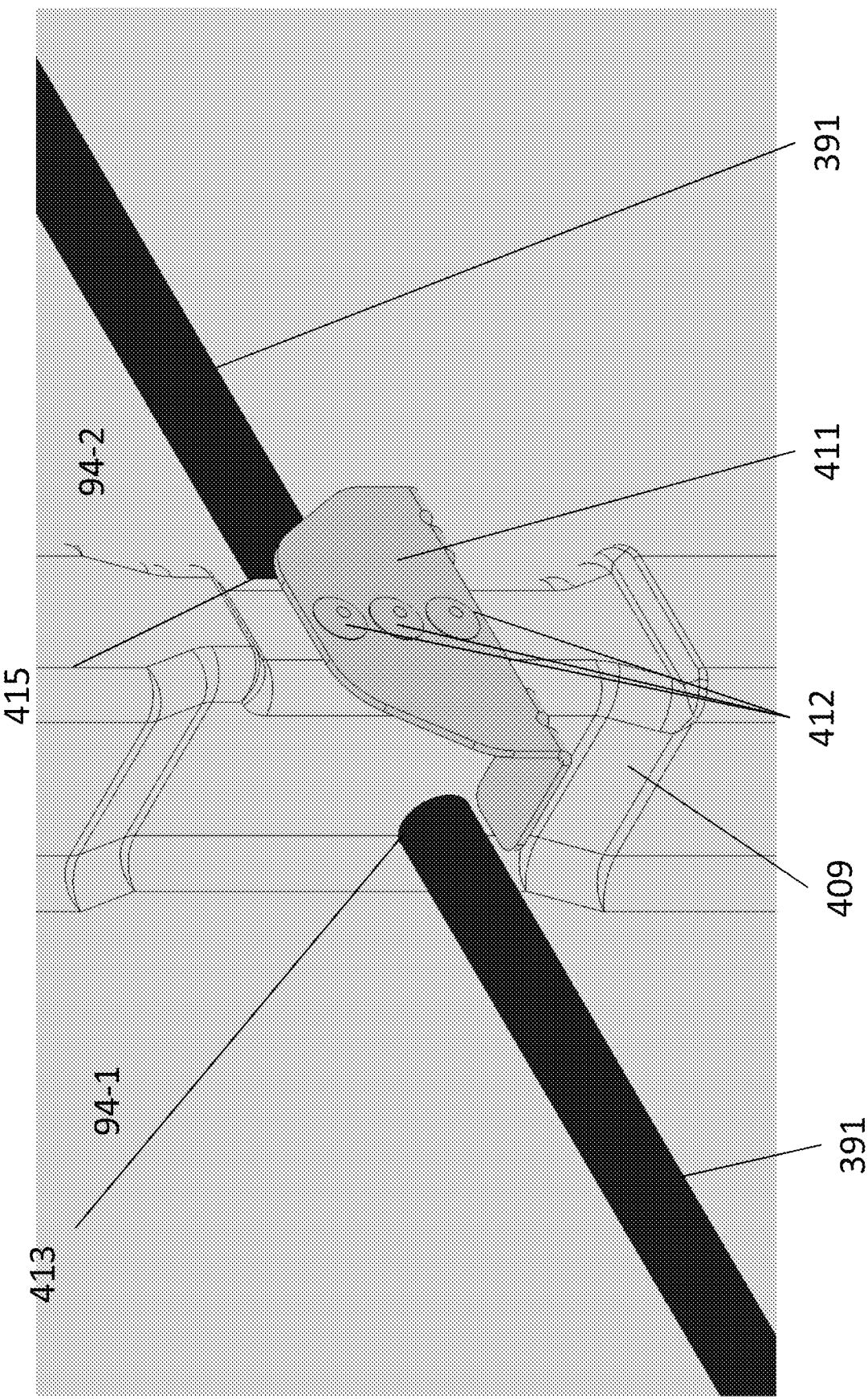
Figure 21C:
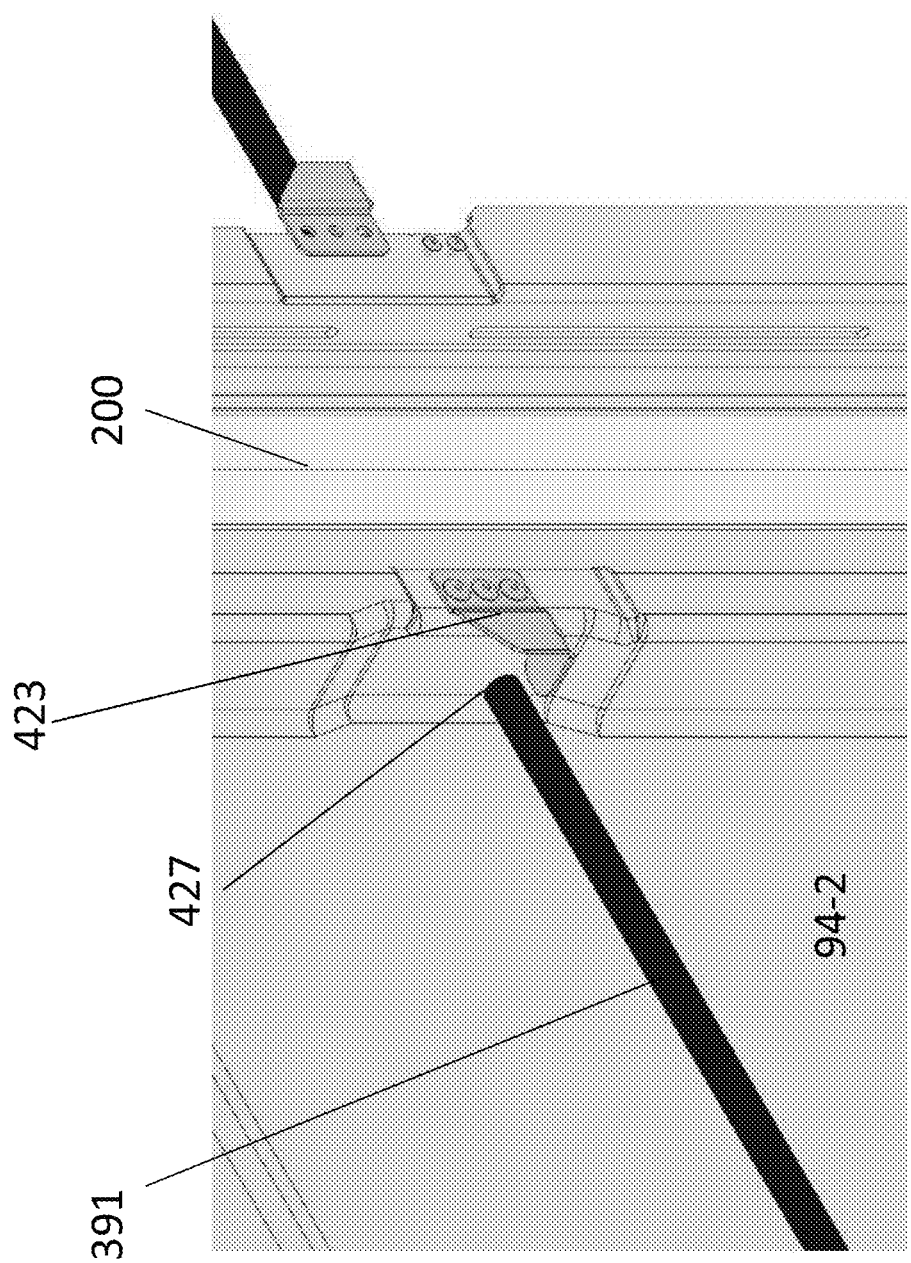

Referring now to FIGS. 5(a), 5(b), 21(a), 21(b), and 21(c), the manner in which upper PCM assemblies 351-1 and 351-2 may be mounted on door 17 may be explained. For clarity, the only portion of upper PCM assemblies 351-1 and 351-2 that is shown in FIGS. 21(a) through 21(c) is mounting rod 391. As seen best in FIGS. 5(b), and 21(a), inner portion 90 of door 17 may comprise a plurality of structures that project rearwardly relative to outer portion 92. More specifically, such structures may comprise a top rib 401, a bottom rib 403, a left rib 405, a right rib 407, and a central rib 409. Top rib 401, bottom rib 403, right rib 407 and central rib 409 may collectively define trough 94-1, and top rib 401, bottom rib 403, left rib 405, and central rib 409 may collectively define trough 94-2. Troughs 94-1 and 94-2, which may be of similar size and shape, may be separated by central rib 409, with trough 94-1 being dimensioned to receive upper PCM assembly 351-1 and with trough 94-2 being dimensioned to receive upper PCM assembly 351-2.

A first mounting bracket 411 may be mounted on central rib 409 using screws 412 or other suitable fasteners. (The neck in central rib 409, where mounting bracket 411 is secured, may allow mounting rods 391 to stick out of the curtain 370 and to fully engage mounting bracket 411, while still enabling the curtain 370 to cover the wall area fully.) An end 413 of mounting rod 391 of upper PCM assembly 351-1 may be seated directly on top of one side of mounting bracket 411, and an end 415 of mounting rod 391 of upper PCM assembly 351-2 may be seated directly on top of an opposite side of mounting bracket 411. (Although, in FIGS. 21(a) through 21(c), ends 413 and 415 of mounting rods 391 appear to be spaced above mounting bracket 411, they are, in fact, seated directly on top of mounting bracket 411.)

A second mounting bracket 421 may be mounted on right rib 407, and a third mounting bracket 423 may be mounted on left rib 405. An end 425 of mounting rod 391 of upper PCM assembly 351-1 may be seated directly on top of mounting bracket 421, and an end 427 of mounting rod 391 of upper PCM assembly 351-2 may be seated directly on top of mounting bracket 423. (Despite the fact that, in FIGS. 21(a) through 21(c), ends 425 and 427 appear to be spaced above mounting brackets 421 and 423, respectively, they are, in fact, seated directly on top of mounting bracket 421 and 423, respectively.)

Figure 22:
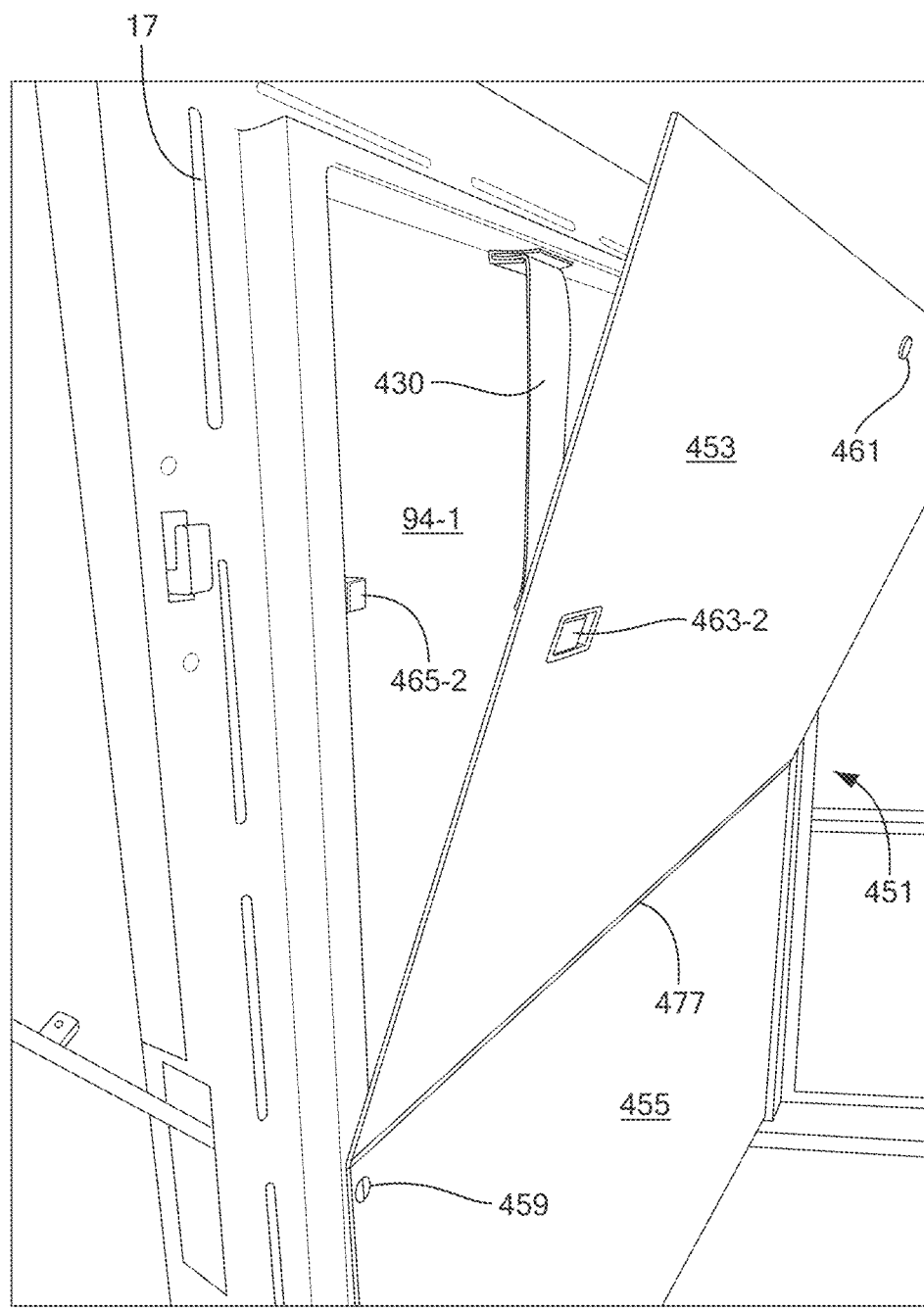
FIG. 22 is a fragmentary perspective view, showing how the door heat-spreader assembly shown in FIG. 19(c) is mounted on the door.

Accordingly, in view of the above, to couple upper PCM assembly 351-1 to door 17, upper PCM assembly 351-1 may be positioned within trough 94-1 such that end 413 of mounting rod 391 may be seated on mounting bracket 411 and such that end 425 of mounting rod 391 may be seated on mounting bracket 421. In a similar fashion, to couple upper PCM assembly 351-2 to door 17, upper PCM assembly 351-2 may be positioned within trough 94-2 such that end 415 of mounting rod 391 may be seated on mounting bracket 411 and such that end 427 of mounting rod 391 may be seated on mounting bracket 423. With upper PCM assemblies 351-1 and 351-2 thus mounted, each pocket 375-1 may be held in place against door 17 with one or more straps each having one end fixed to door 17 and another end with a strip of hook fasteners of the complementary hook-and-loop variety (e.g., VELCRO® hook-and-loop fasteners) that may mate with fastener strip 397. FIG. 22 shows a strap 430 that may be used to secure a top pocket of an upper PCM assembly (not shown) to door 17. If desired, strap 430 may be omitted.

Figure 23:
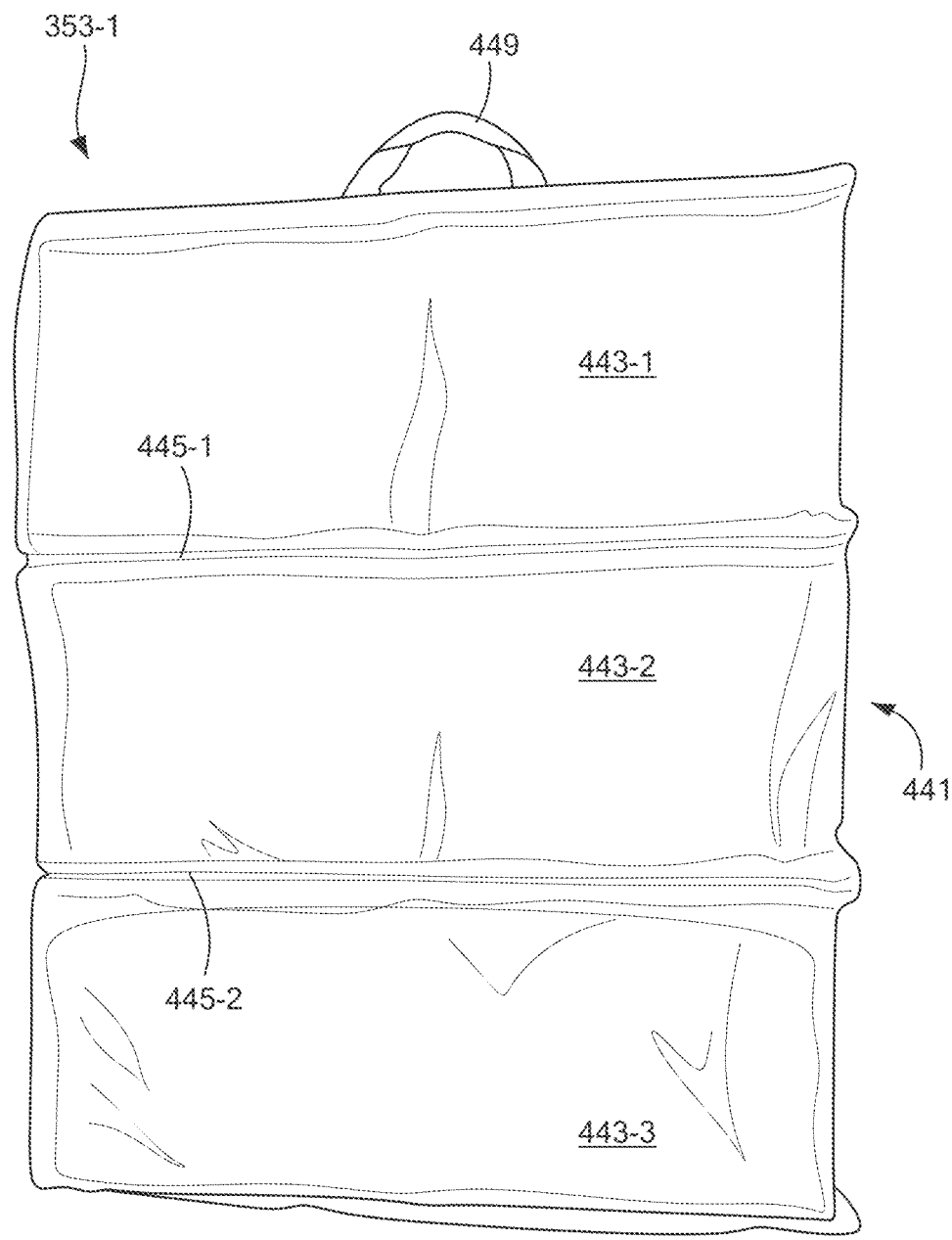
FIG. 23 is a front view of one of the door lower PCM assemblies shown in FIG. 19(a)

Referring now to FIG. 23, lower PCM assembly 353-1 is shown in greater detail. Lower PCM assembly 353-1 may be similar in many respects to upper PCM assembly 351-1 and may comprise a curtain 441, which may be similar in many respects to curtain 370 of upper PCM assembly 351-1. Accordingly, curtain 441 may comprise an upper sheet and a lower sheet that may be similar in composition to upper sheet 371 and lower sheet 373 of curtain 370 and that may be joined together in the same manner as described above for curtain 370. One difference between curtain 441 and curtain 370 may be that, whereas curtain 370 may comprise pockets 375-1 through 375-3 and a connecting portion 376, curtain 441 may omit a structure corresponding to connecting portion 376 and, instead, may comprise pockets 443-1 through 443-3, wherein pockets 443-1 and 443-2 may be hingedly interconnected to one another and substantially sealed off from one another by a laterally extending seam 445-1, and pockets 443-2 and 443-3 may be hingedly interconnected to one another and substantially sealed off from one another by a laterally extending seam 445-2. Like pockets 375-1 through 375-3 of curtain 370, each of pockets 443-1 through 443-3 of curtain 441 may have exemplary dimensions of approximately 19.0 inches×approximately 8.75 inches. It should be understood that, although, in the present embodiment, lower PCM assembly 353-1 is shown as having three pockets 443-1 through 443-3, lower PCM assembly 353-1 is not limited to having three pockets and may have a greater or lesser number of pockets.

In the present embodiment, lower PCM assembly 353-1 may omit structure corresponding to mounting rod 391. Accordingly, as will be discussed further below and/or as seen in the accompanying drawings, lower PCM assembly 353-1 may sit within trough 94-1 below upper PCM assembly 351-1 but need not be mounted on door 17. Instead, lower PCM assembly 351-1 may be kept in place by a heat-spreader assembly mounted on door 17.

Although not shown in FIG. 23, each of pockets 443-1 through 443-3 may contain a quantity of phase-change material and, more specifically, may contain one or more PCM packs, like PCM packs 381. In addition, one or more of the ends of pockets 443-1 through 443-3 may be sealed in such a way as to permit the visual inspection of the PCM packs contained within pockets 443-1 through 443-3.

Lower PCM assembly 353-1 may further comprise a handle 449. Handle 449, which may comprise a strip of fabric or other suitable material, may be secured, for example, by sewing, at opposite ends to the top of curtain 441. Handle 449 may be useful in the carrying of lower PCM assembly 353-1 prior to its coupling to door 17 or after its removal from door 17.

Referring now to FIGS. 2(*a*), 2(*c*), 2(*d*), 19(*c*), 19(*d*), 19(*e*) and 22, there is shown, amongst other things, one embodiment of a heat-spreader assembly that is associated with door 17, the heat-spreader assembly being represented generally by reference numeral 451. Heat-spreader assembly 451 may comprise a pair of heat-conductive panels 453 and 455, each of which may be an aluminum sheet or other suitable material. In the present embodiment, each of heat-conductive panels 453 and 455 may be an aluminum sheet having a thickness of approximately ¹⁄₁₆ inch, with heat-conductive panel 453 being dimensioned to cover approximately the upper halves of trough 94-1 and 94-2 and with heat-conductive panel 455 being dimensioned to cover approximately the lower halves of troughs 94-1 and 94-2. Heat-conductive panels 453 and 455 may be coupled together with a piano hinge 457 or other suitable hinge.

Figure 24A:
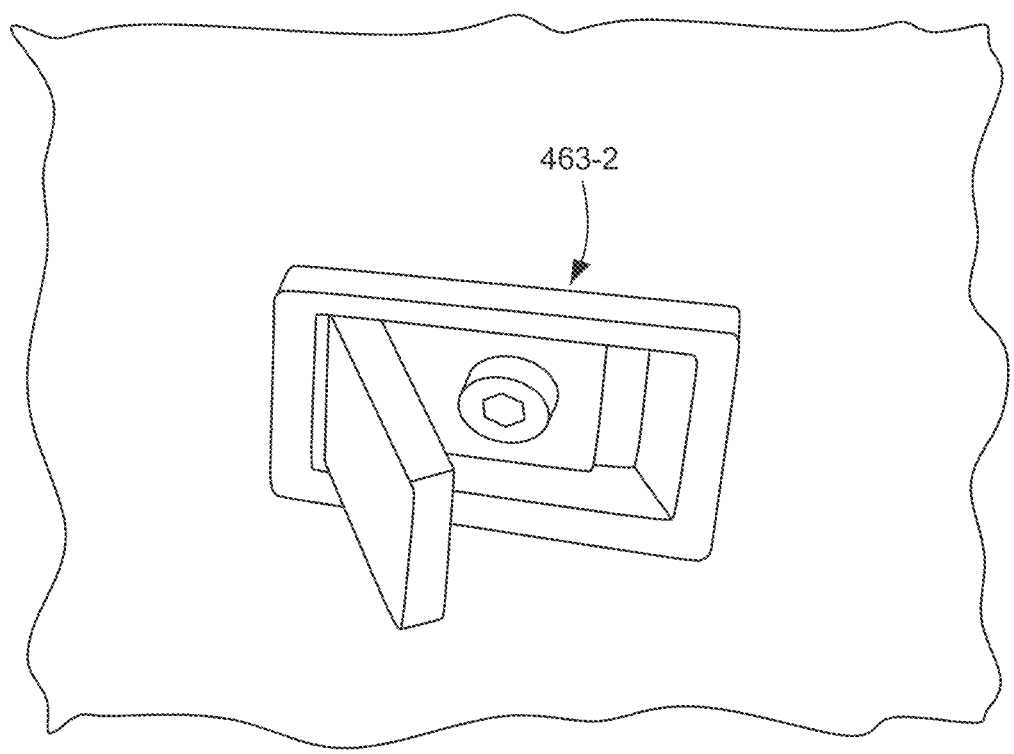
FIGS. 24(a) and 24(b) are enlarged fragmentary front and rear perspective views, respectively, of the door heat-spreader assembly shown in FIG. 19(a), showing one of the finger pull slam latches.
Figure 24B:
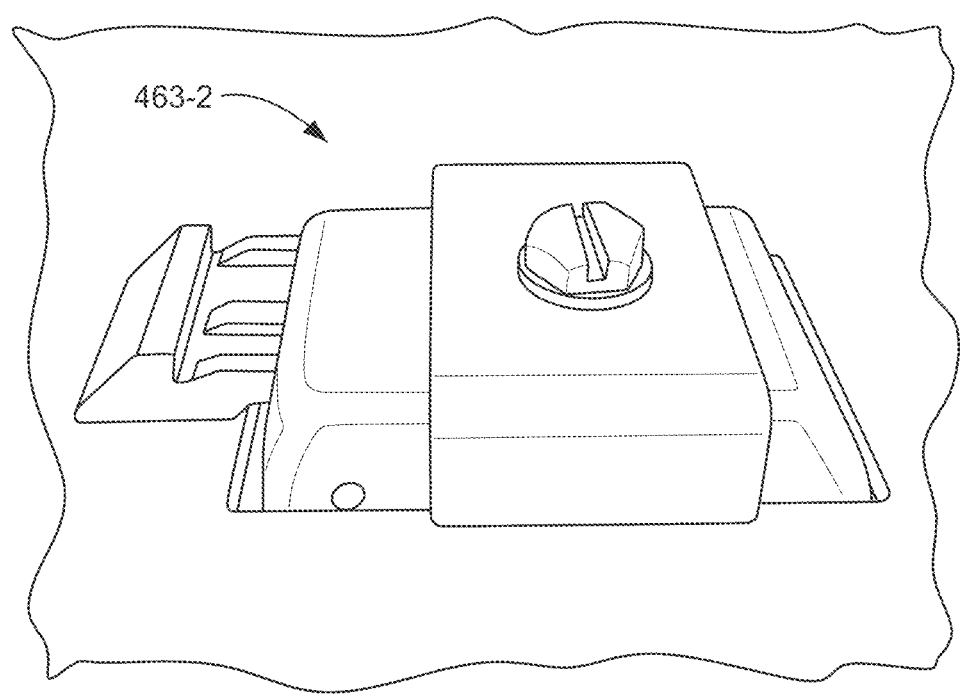

A plurality of fasteners 459, which may be, for example, nine permanent screws (for example, three screws secured to the lower half of rib 405, three screws secured to the lower half of rib 407, and three screws secured to the lower half of rib 409), may be used to permanently secure panel 455 to door 17. Panel 453 may be removably secured to door 17 with a fastener 461, which may be, for example, a quarter-turn screw secured in a receptacle 462 provided at the top of rib 409, and a pair of finger pull slam latches 463-1 and 463-2 used to releasably engage a pair of keepers 465-1 and 465-2, respectively, on the upper portions of ribs 405 and 407, respectively. Finger pull slam latch 463-2 is shown in greater detail in FIGS. 24(*a*) and 24(*b*).

PCM assemblies 351-1, 351-2, 353-1 and 353-2 may be securely retained between door 17 and heat-spreader assembly 451. To remove one or more of PCM assemblies 351-1, 351-2, 353-1 and 353-2 (for example, to thermally recondition the PCM assembly independently of the remainder of the shipper, to replace a worn or damaged PCM assembly, to reconfigure the shipper to include a PCM assembly having a different type of phase change material (e.g., for maintaining the payload within a different target temperature range), etc.), one may first loosen or remove fastener 461, using a screwdriver or similar tool, and then may manually detach latches 463-1 and 463-2 from keepers 465-1 and 465-2, respectively. Then, one may pivot panel 453 away from door 17 (while keeping panel 455 secured to door 17), thereby exposing upper PCM assemblies 351-1 and 351-2. One or both of upper PCM assemblies 351-1 and/or 351-2 may be removed by detaching its respective strap 430 from its respective strip 397 and then by lifting the PCM assembly out of its trough 94, for example, using handle 399. Once an upper PCM assembly 351 has been removed, the lower PCM assembly 353 situated therebeneath may be exposed and may be removed, for example, using its handle 449.

To install PCM assemblies 351-1, 351-2, 353-1 and 353-2 on door 17, panel 453 may be pivoted away from door 17 in the manner described above, and lower PCM assemblies 353-1 and 353-2 may then be lowered into the spaces between the bottom portions of troughs 94-1 and 94-2 and panel 455. Then, upper PCM assemblies 351-1 and 351-2 may be inserted into the upper portions of troughs 94-1 and 94-2, mounting rod 391 of PCM assembly 351-1 may be mounted on brackets 411 and 421, and mounting rod 391 of PCM assembly 351-2 may be mounted on brackets 411 and 423. Panel 453 may then be reattached to door 17, for example, by pivoting panel 453 towards door 17 and by manually operating finger pull slam latches 463-1 and 463-2 so that they engage keepers 465-1 and 465-2, respectively, and then by screwing fastener 461 to door 17.

Upper PCM assemblies 352-1 and 352-2 and lower PCM assemblies 354-1 and 354-2, all of which are associated with back 19, may be identical to upper PCM assemblies 351-1 and 351-2 and lower PCM assemblies 353-1 and 353-2, respectively, and may be mounted or otherwise coupled to back 19 in the same manner described above for door 17. Similarly, heat-spreader assembly 471, which is associated with back 19, may be identical to heat-spreader assembly 451 and may be secured to back 19 in the same manner that heat-spreader assembly 451 may be secured to door 17.

Figure 25:
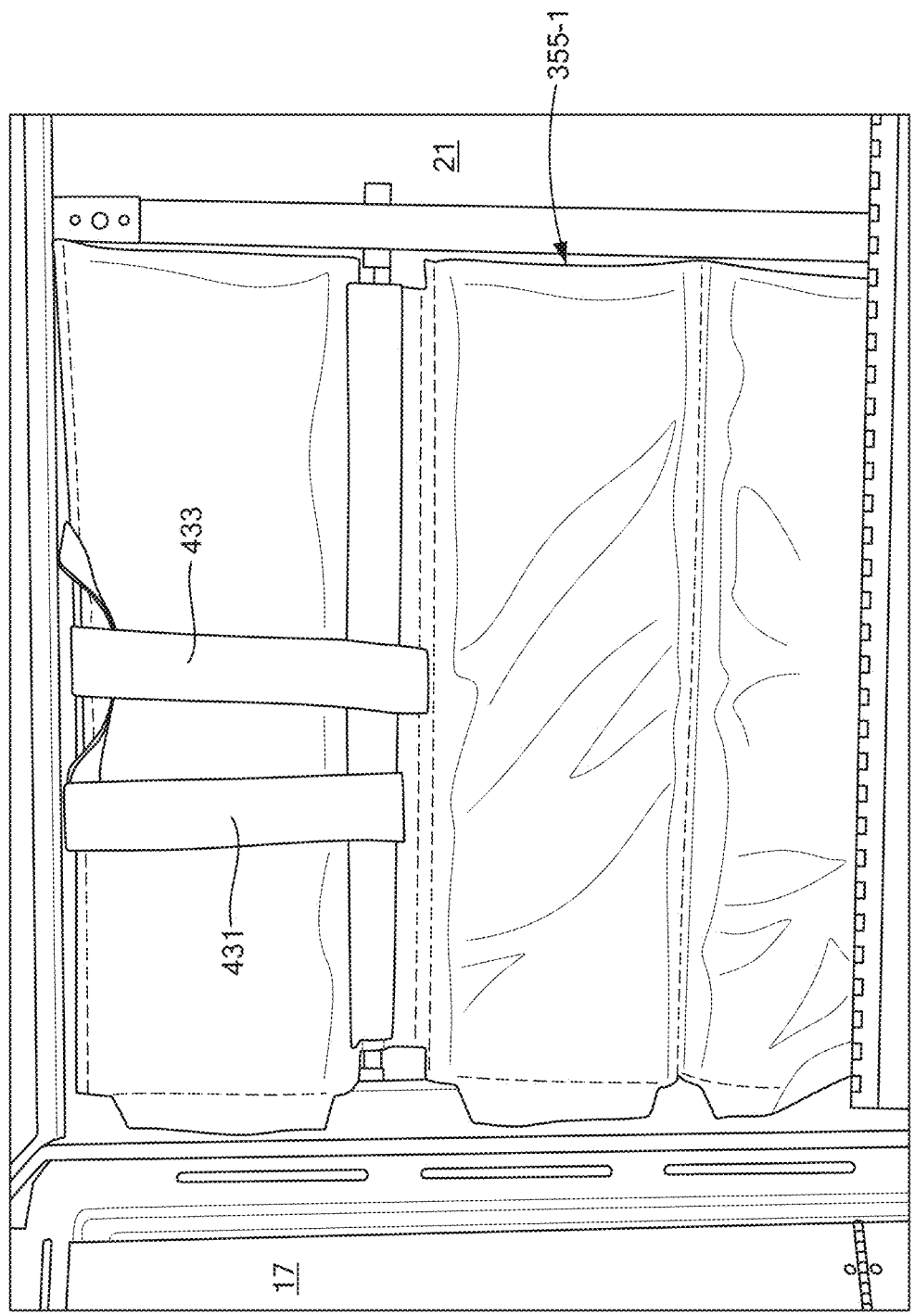
FIG. 25 is a fragmentary right side view, showing one of the left side upper PCM assemblies shown in FIG. 19(a) mounted on the left side.

Upper PCM assemblies 355-1 (also shown in FIG. 25) and 355-2 and lower PCM assemblies 357-1 and 357-2, all of which are associated with left side 21, may be similar to upper PCM assemblies 351-1 and 351-2 and lower PCM assemblies 353-1 and 353-2, respectively, the respective PCM assemblies differing in the present embodiment only with regard to their relative dimensions. For example, upper PCM assemblies 355-1 and 355-2 and lower PCM assemblies 357-1 and 357-2 may have pockets having exemplary dimensions of approximately 25.25 inches×approximately 8.25 inches. Upper PCM assemblies 355-1 and 355-2 and lower PCM assemblies 357-1 and 357-2 may be mounted or otherwise coupled to left side 21 in the same manner described above for door 17. (Although two straps 431 and 433 are shown in FIG. 25 for use in keeping the top pocket from pivoting away from left side 21, one could omit one of straps 431 and 433.) Similarly, heat-spreader assembly 481, which is associated with left side 21, may be similar to heat-spreader assembly 451, the respective heat-spreader assemblies differing only with regard to their relative widths (the thicknesses of the respective heat-spreader assemblies being the same). Heat-spreader assembly 481 may be secured to left side 21 in the same manner that heat-spreader assembly 451 may be secured to door 17.

Figure 26A:
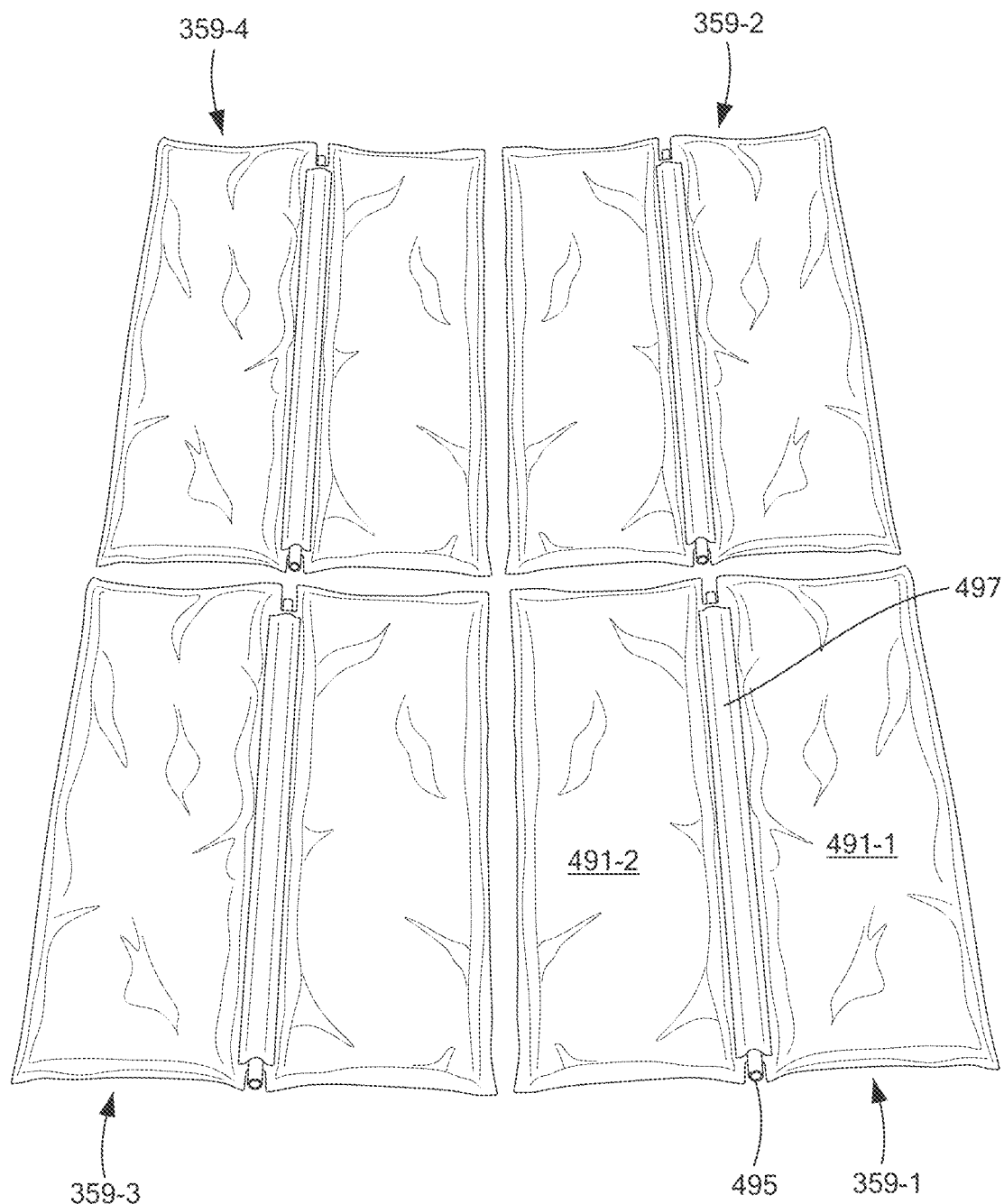
FIGS. 26(a) and 26(b) are bottom perspective and top perspective views, respectively, of the top PCM assemblies shown in FIG. 19(a)
Figure 26B:
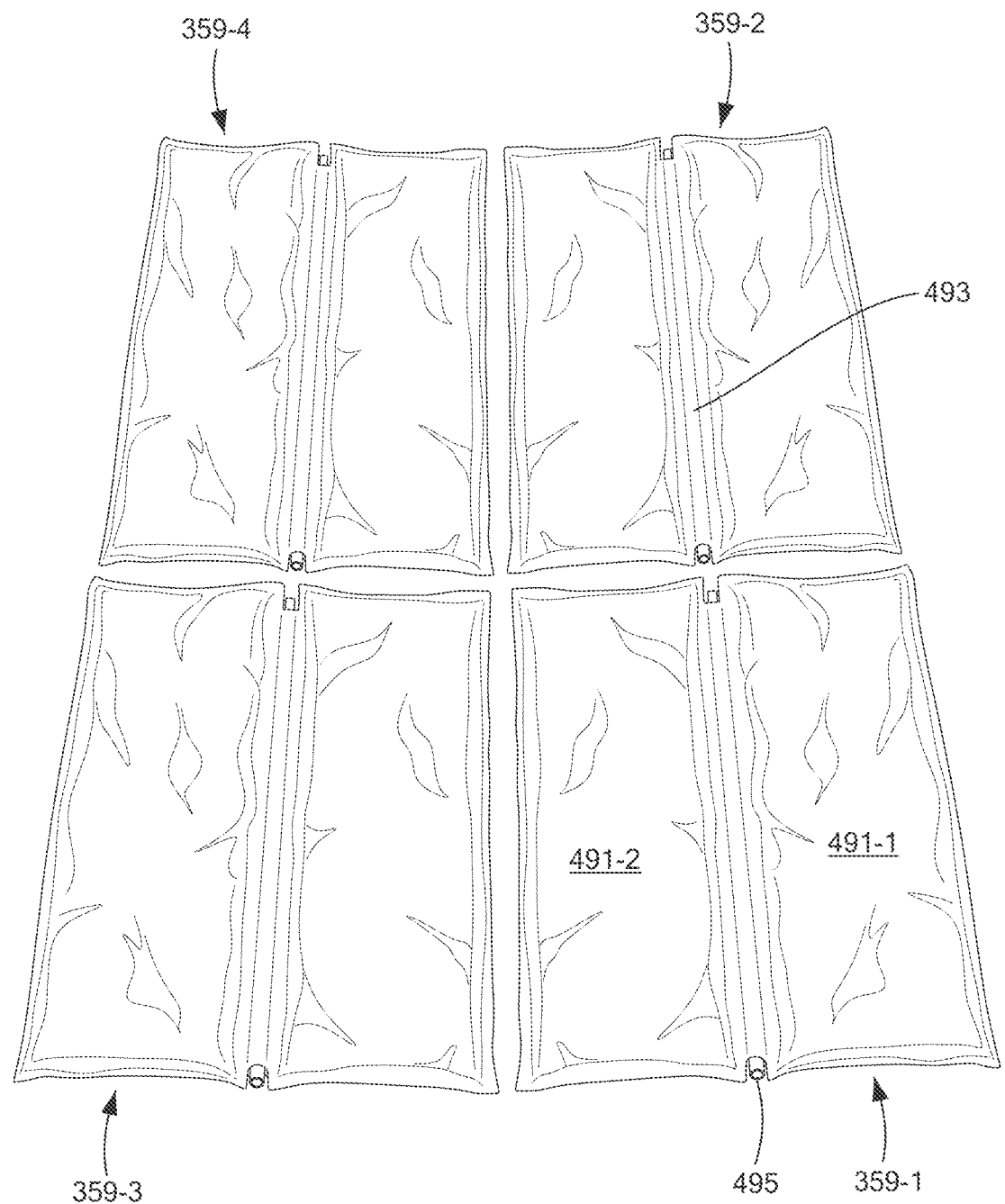
Figure 27A:
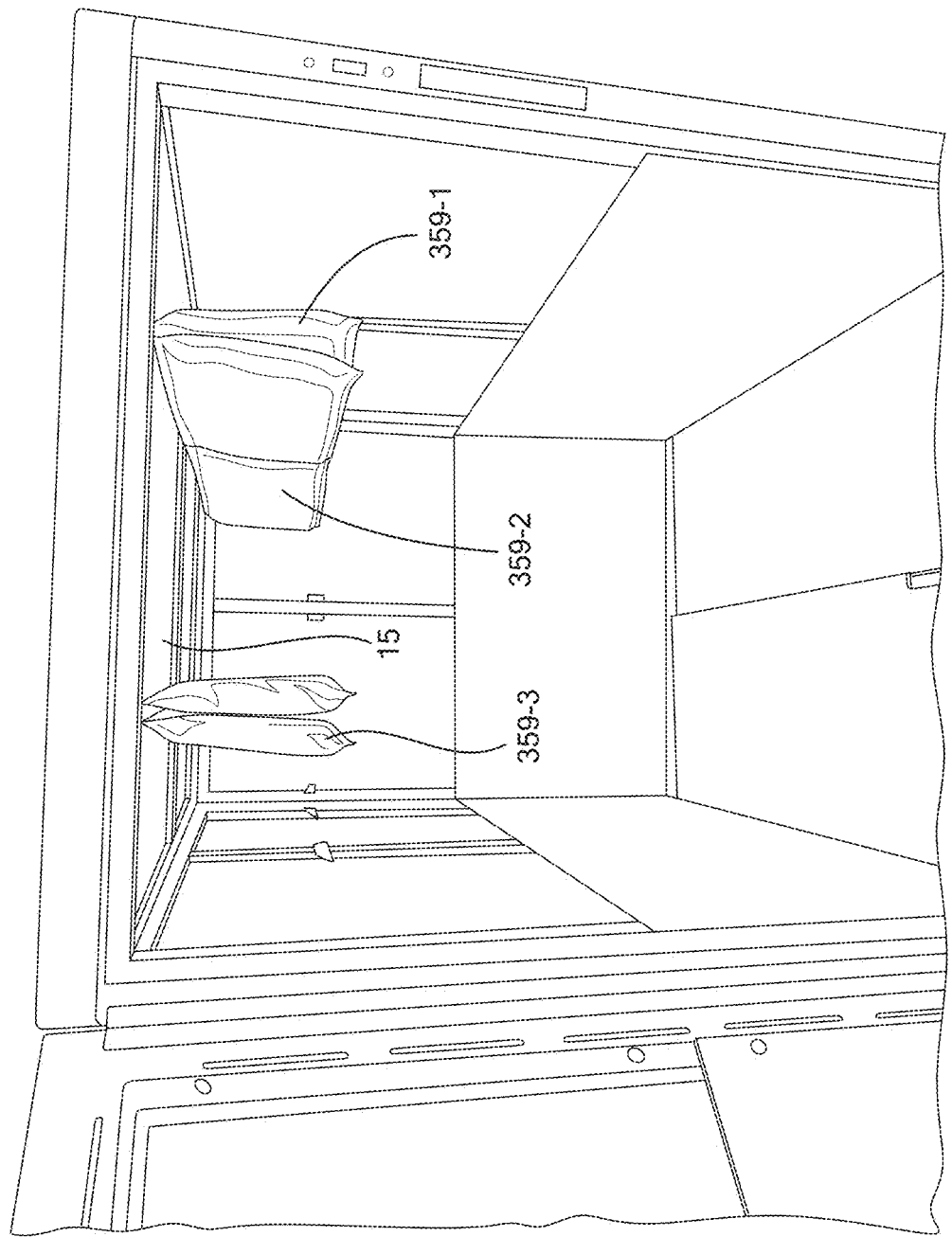
FIGS. 27(a) through 27(e) are perspective views showing how the top PCM assemblies and top heat-spreader assemblies are mounted on the top.
Figure 27B:
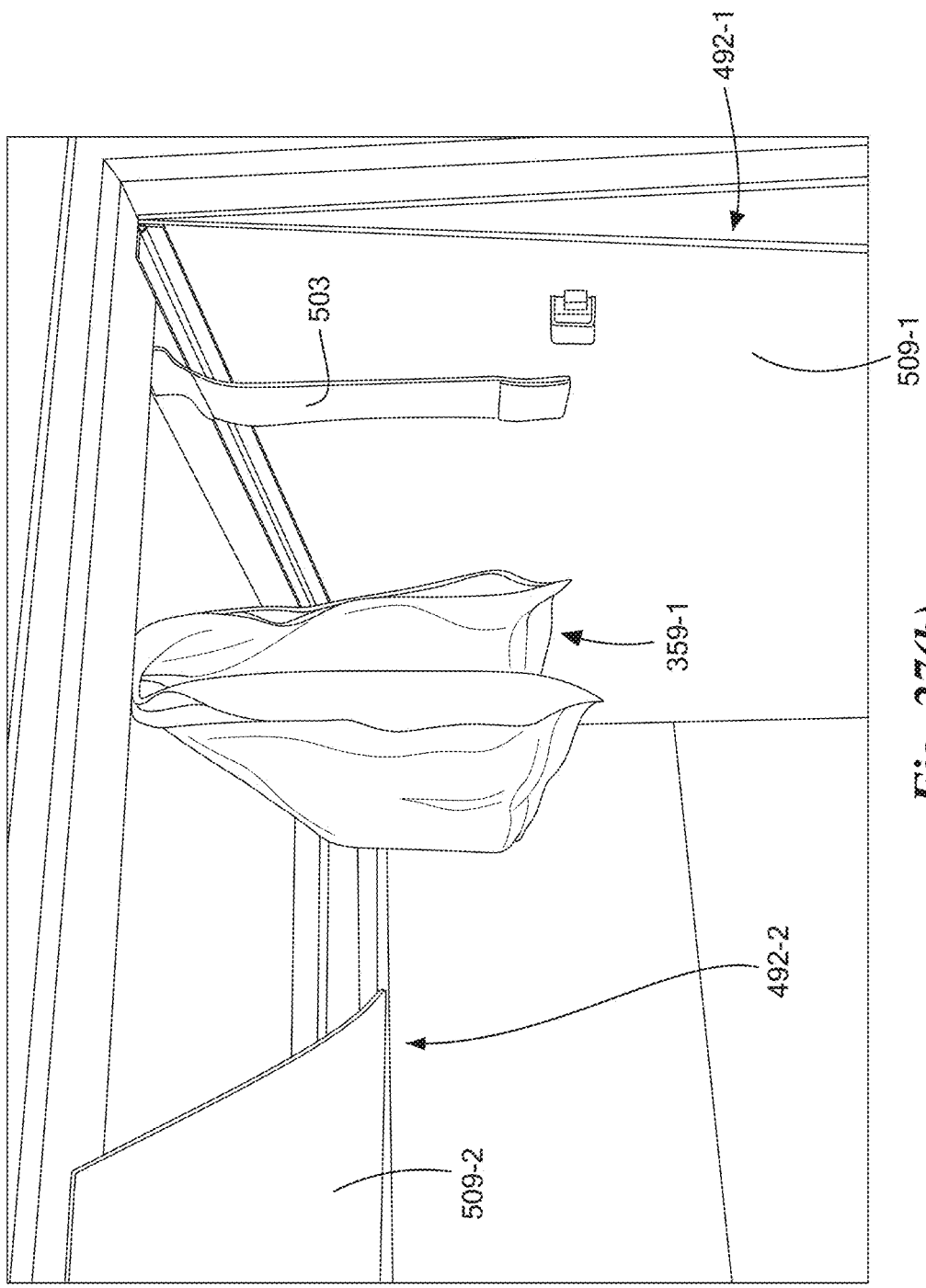
Figure 27C:
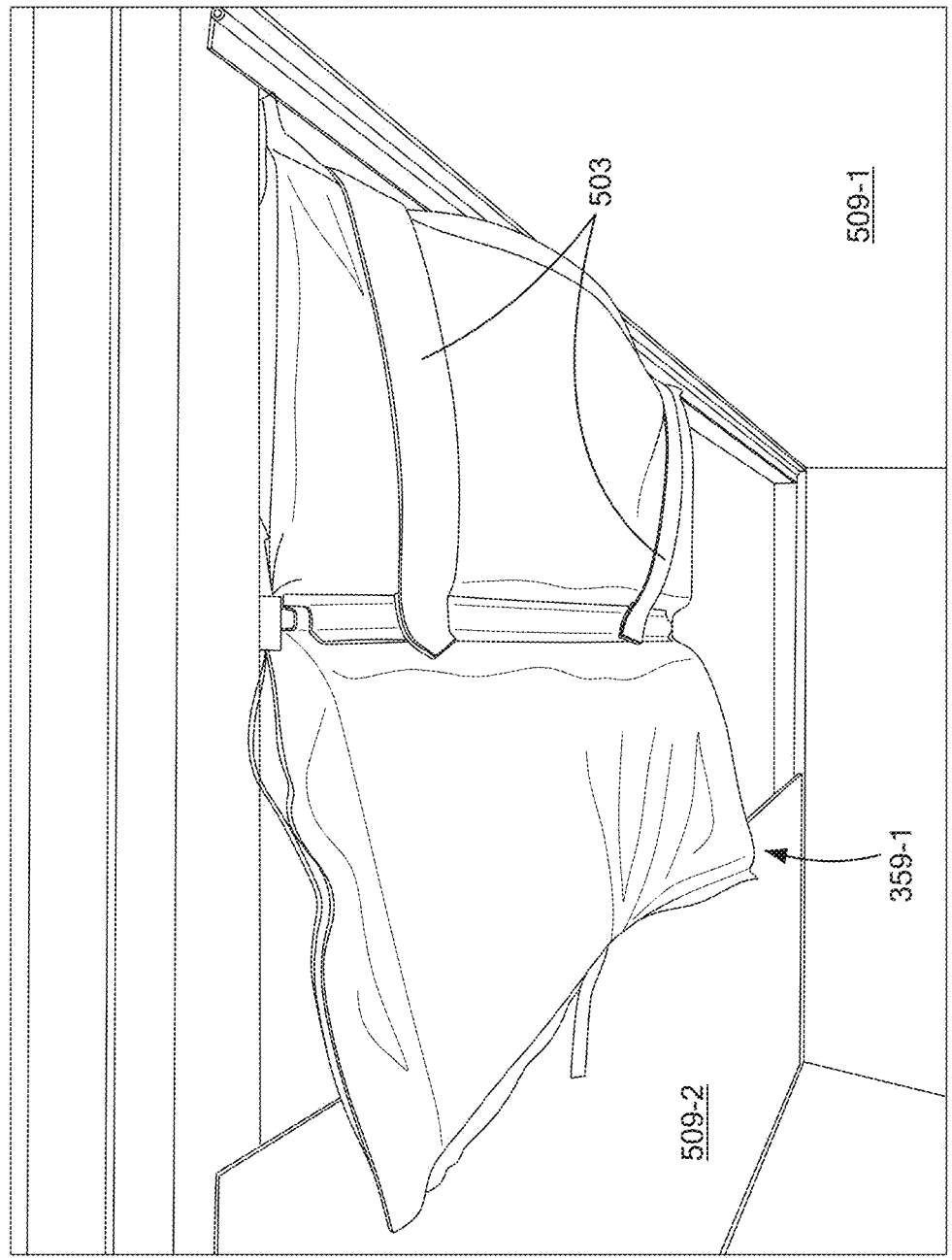
Figure 27D:
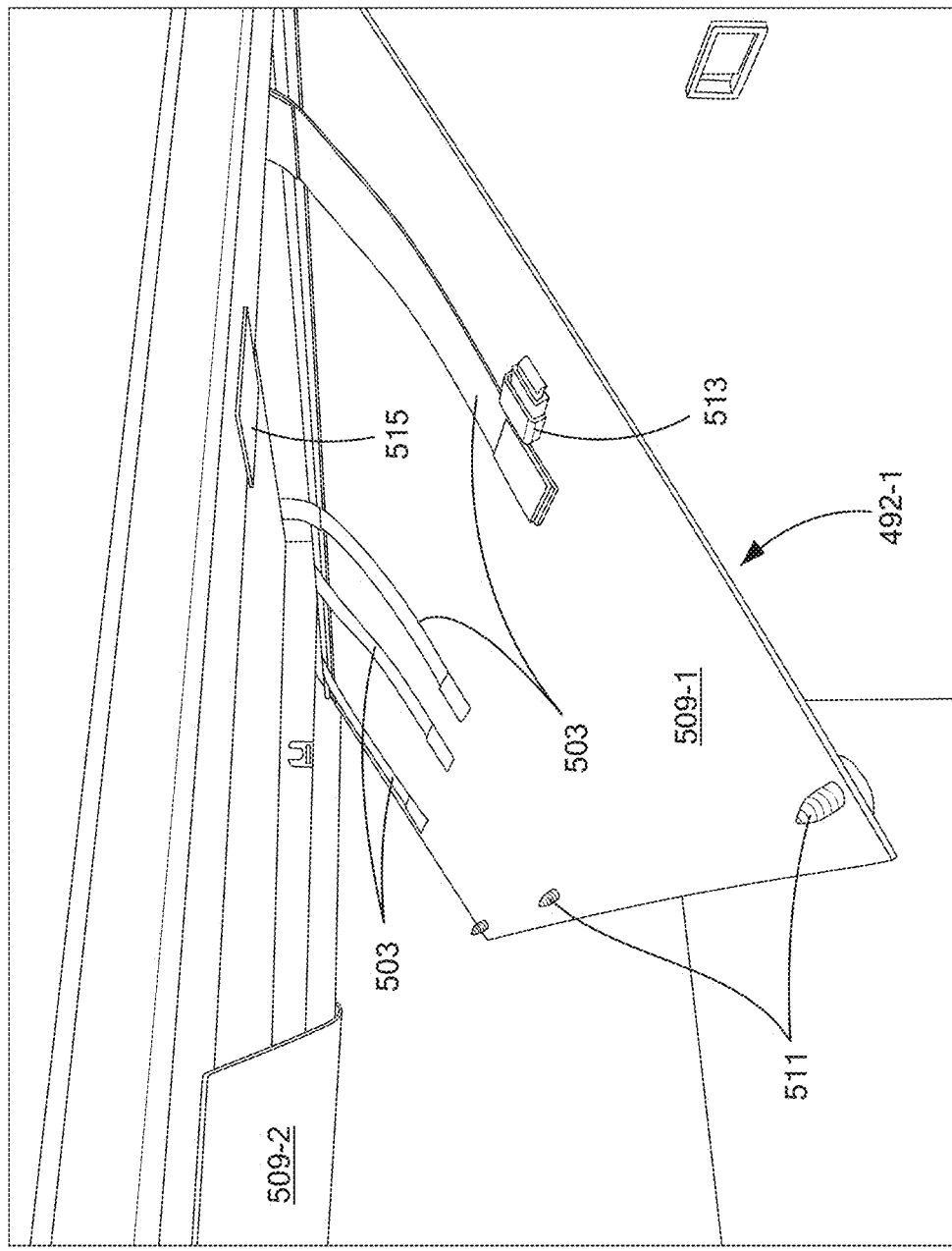
Figure 27E:
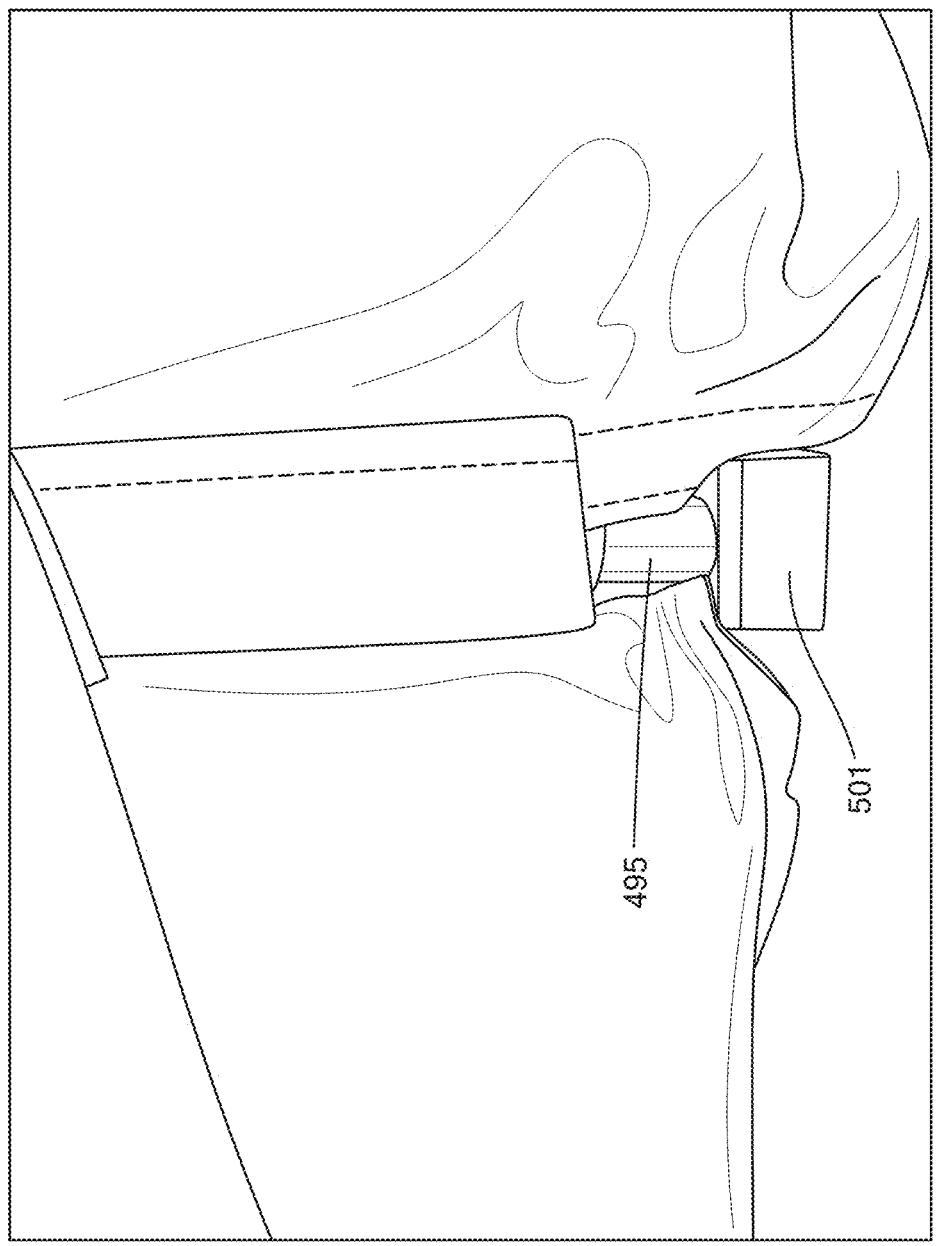

Referring now to FIGS. 26(*a*) and 26(*b*), PCM assemblies 359-1 through 359-4 are shown in greater detail. PCM assemblies 359-1 through 359-4 may be identical to one another and may be similar in many respects to PCM assembly 351-1. The principal differences between PCM assemblies 359-1 through 359-4, on the one hand, and PCM assembly 351-1, on the other hand, may be (i) that PCM assemblies 359-1 through 359-4 may include only two PCM-containing pockets whereas PCM assembly 351-1 may include three PCM-containing pockets; (ii) that PCM assemblies 359-1 through 359-4 may lack a handle like handle 399; and (iii) that PCM assemblies 359-1 through 359-4 may differ dimensionally from PCM assembly 351-1. In view of the above, each of PCM assemblies 359-1 through 359-4 may comprise a pair of pockets 491-1 and 491-2 separated by a connecting portion 493. (Although not visible, each of pockets 491-1 and 491-2 may contain a quantity of phase-change material and more specifically may contain one or more PCM packs like packs 381.) A mounting rod 495 may be disposed within connecting portion 493, and a strip of loop fasteners 497 may be secured to an outer surface of connecting portion 493. PCM assemblies 359-1 through 359-4 may have pockets having exemplary dimensions of approximately 25.0 inches×approximately 10.25 inches.

It is to be understood that, although, in the present embodiment, each of PCM assemblies 359-1 through 359-4 has two pockets 491-1 and 491-2 and one connecting portion 493, PCM assemblies 359-1 through 359-4 need not have two pockets and one connecting portion and, instead, may have a greater or lesser number of pockets and/or connecting portions. It is also to be understood that, although PCM assemblies 359-1 through 359-4 lack a looped handle, PCM assemblies 359-1 through 359-4 may comprise one or more looped handles (not shown).

Referring now to FIGS. 27(*a*) through 27(*e*), there are shown various views illustrating the way in which PCM assemblies 359-1 through 359-4 may be mounted on top 15 and may be covered by a pair of heat-spreader assemblies 492-1 and 492-2. More specifically, each PCM assembly 459 may be coupled to top 15 by inserting an end of each mounting rod 495 into a holder 501 (FIG. 27(*e*) showing one end of a mounting rod 495 inserted into one holder 501). Two sets of holders 501 may be positioned at opposite ends of trough 84-1 of top 15 so that PCM assemblies 359-1 and 359-3 may be mounted thereon, and two sets of holders 501 may be positioned at opposite ends of trough 84-2 of top 15 so that PCM assemblies 359-2 and 359-4 may be mounted thereon.

Pocket 491-1 of PCM assembly 359-1 may be held against top 15 by one or more straps 503 each having one end fixed to top 15 near right side 23 and another end with a strip of hook fasteners of the complementary hook-and-loop variety (e.g., VELCRO® hook-and-loop fasteners) that may mate with fastener strip 497. In an analogous fashion, pocket 491-2 of PCM assembly 359-1 may be held against top 15 by one or more straps (not shown) each having one end fixed to top 15 about midway between left side 21 and right side 23 and another end with a strip of hook fasteners of the complementary hook-and-loop variety (e.g., VELCRO® hook-and-loop fasteners) that may mate with fastener strip 497. The pockets of PCM assembly 359-2 may be secured in a similar fashion, and the pockets of PCM assemblies 359-3 and 359-4 may be secured in a mirror-image fashion.

Heat-spreader assemblies 492-1 and 492-2 may be similar to heat-spreader assembly 451, except that heat-spreader assemblies 492-1 and 492-2 do not have a structure corresponding to panel 455. Instead, heat-spreader assembly 492-1 may comprise a panel 509-1 that may be hingedly connected to top 15 proximate to right side 23, and heat-spreader assembly 492-2 may comprise a panel 509-2 that may be hingedly connected to top 15 proximate to left side 21. Each of heat-spreader assemblies 492-1 and 492-2 may be secured to top 15 approximately midway between left side 21 and right side 23 with a combination of quarter-turn screws 511 and a pair of finger pull slam latches 513 used to releasably engage keepers 515.

Figure 28:
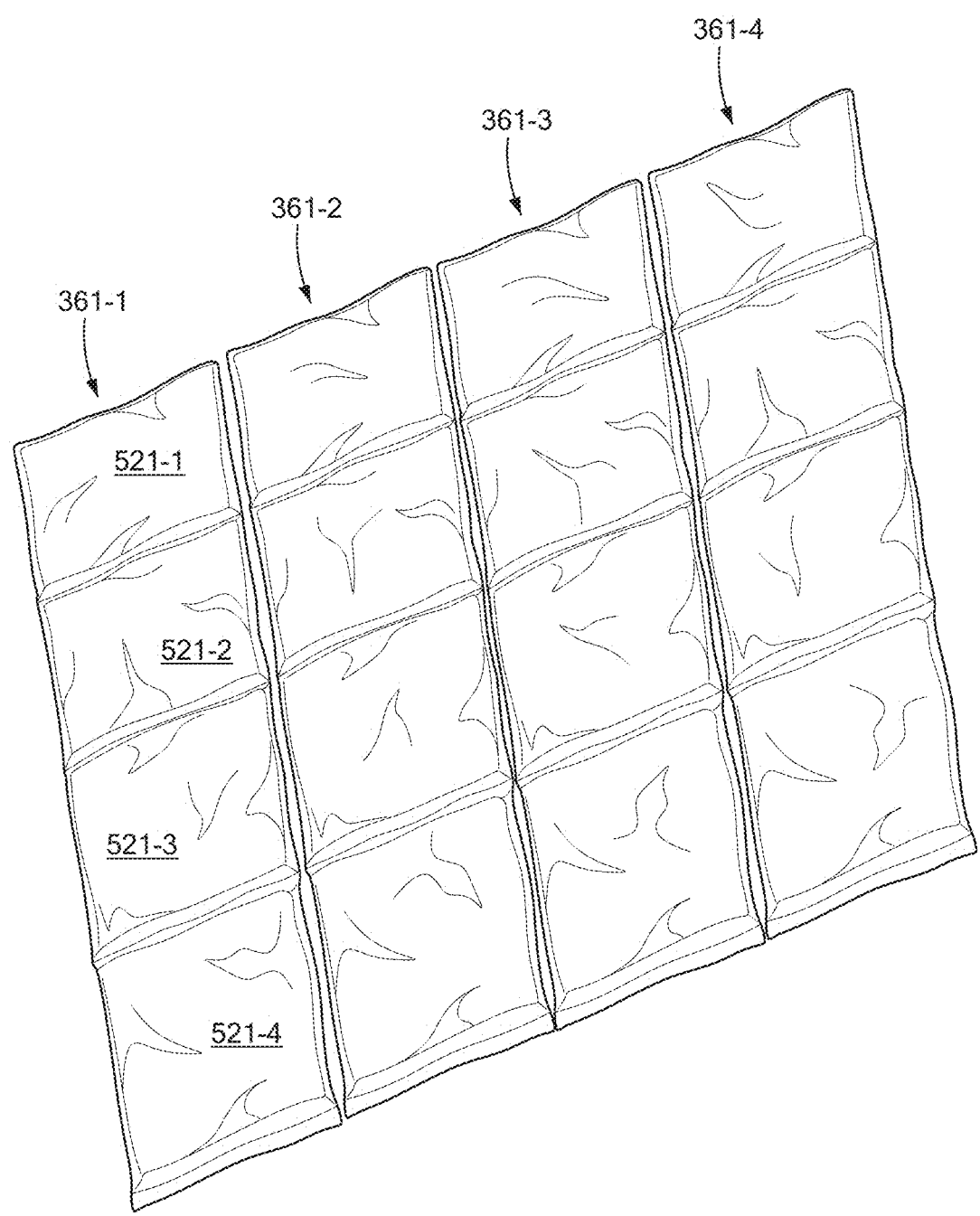
FIG. 28 is a perspective view of the bottom PCM assemblies shown in FIG. 19(b)
Figure 29A:
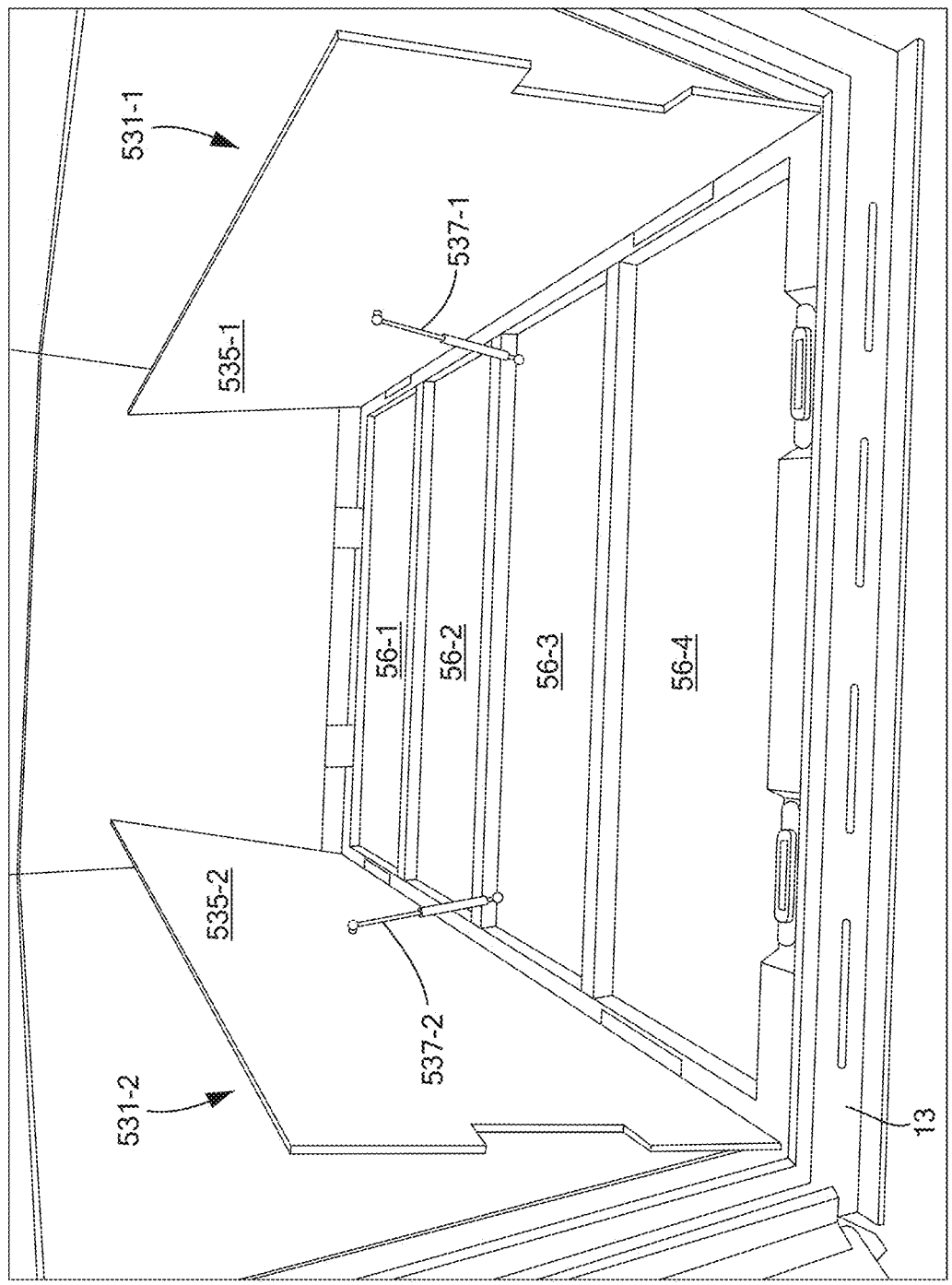
FIGS. 29(a) through 29(d) are perspective views showing how the bottom PCM assemblies and bottom heat-spreader assemblies are mounted on the bottom.
Figure 29B:
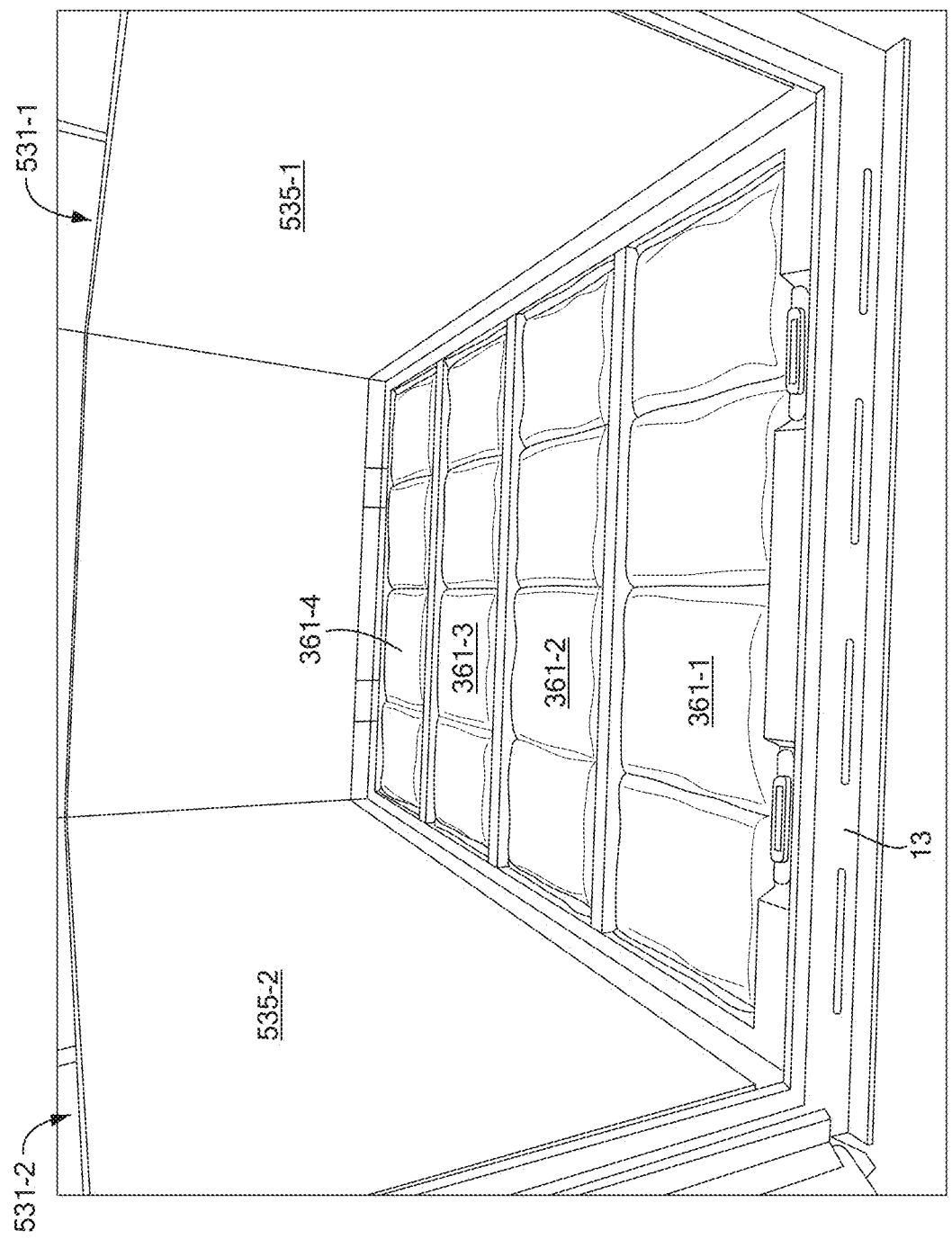
Figure 29C:
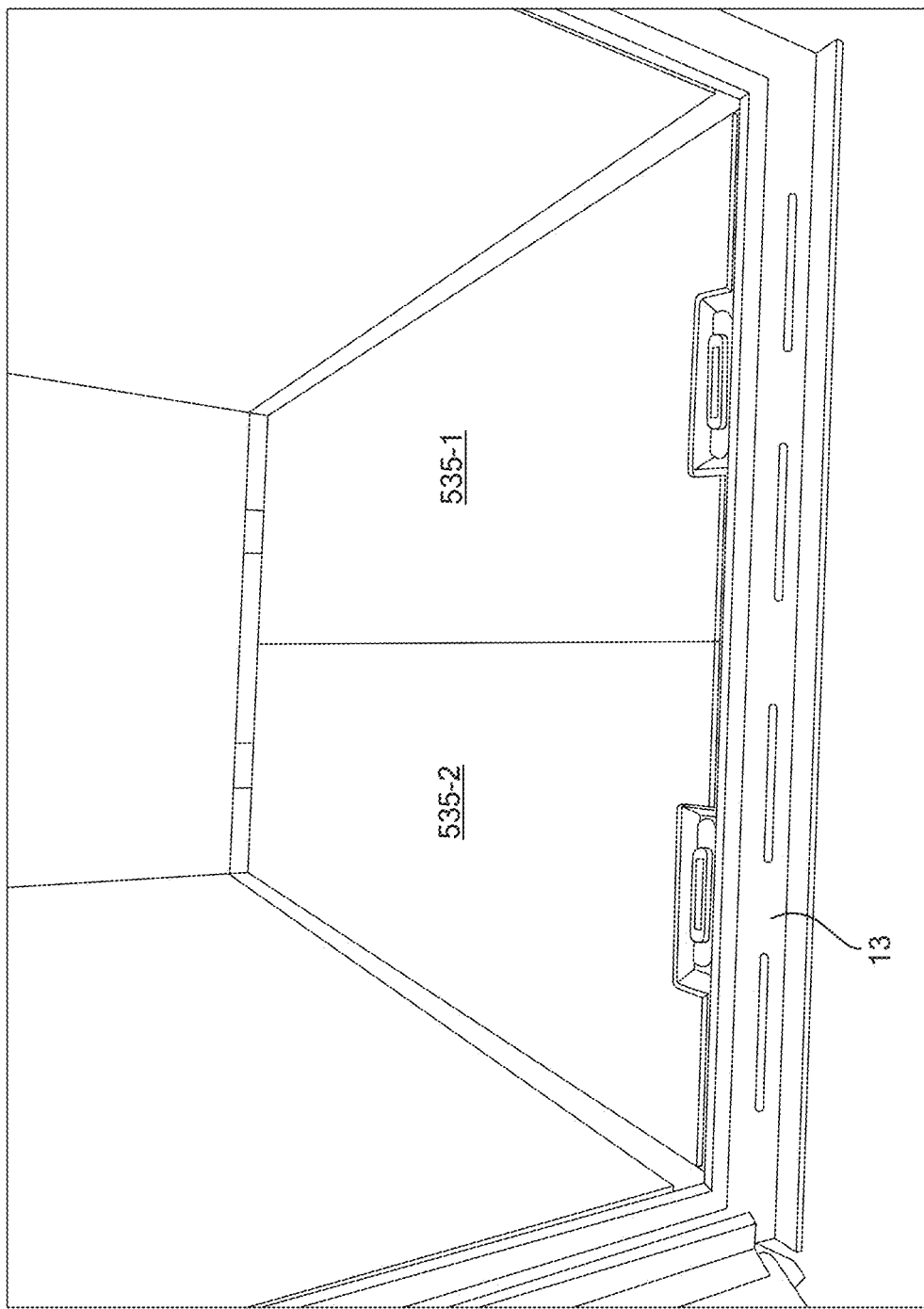
Figure 29D:
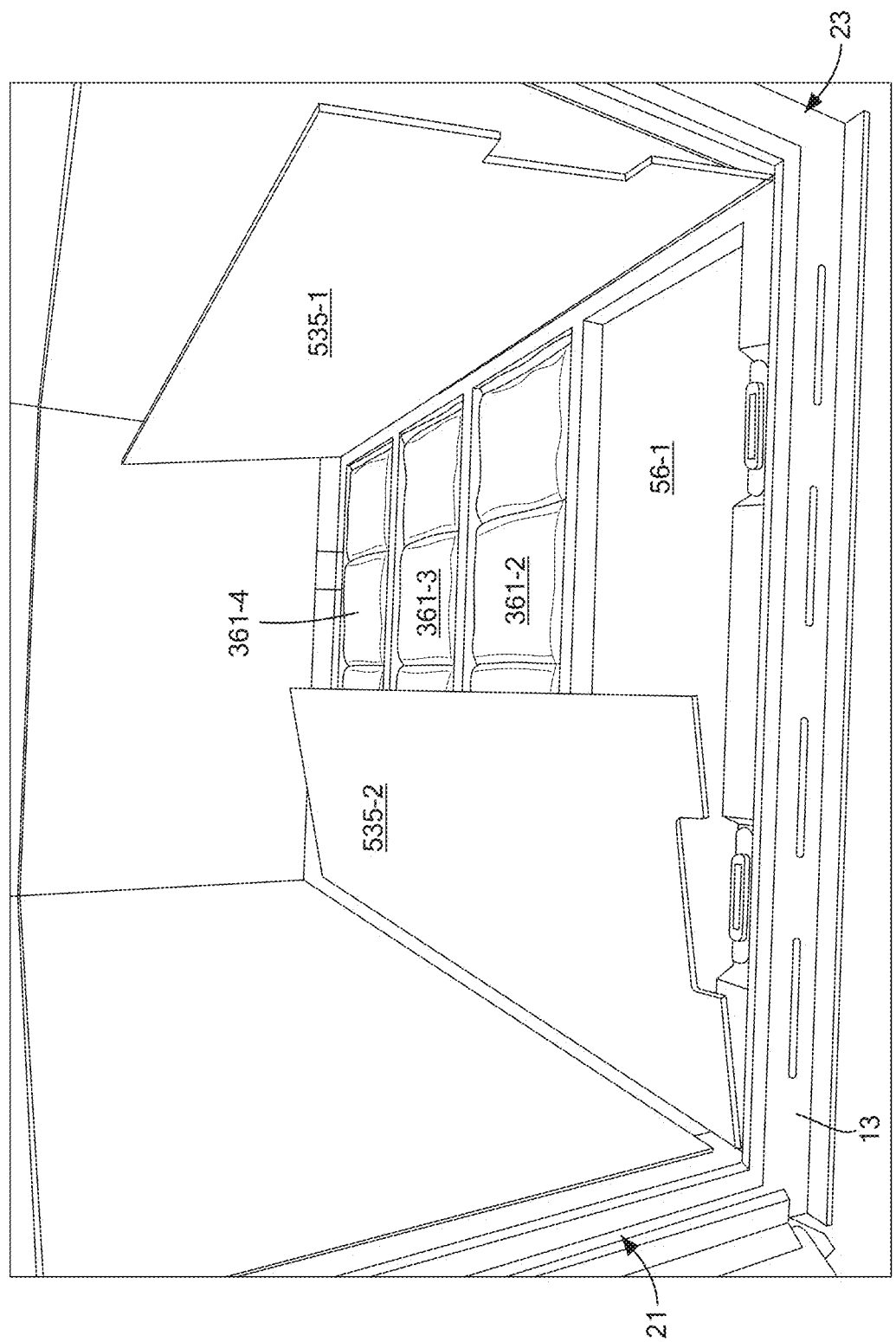
Figure 30A:
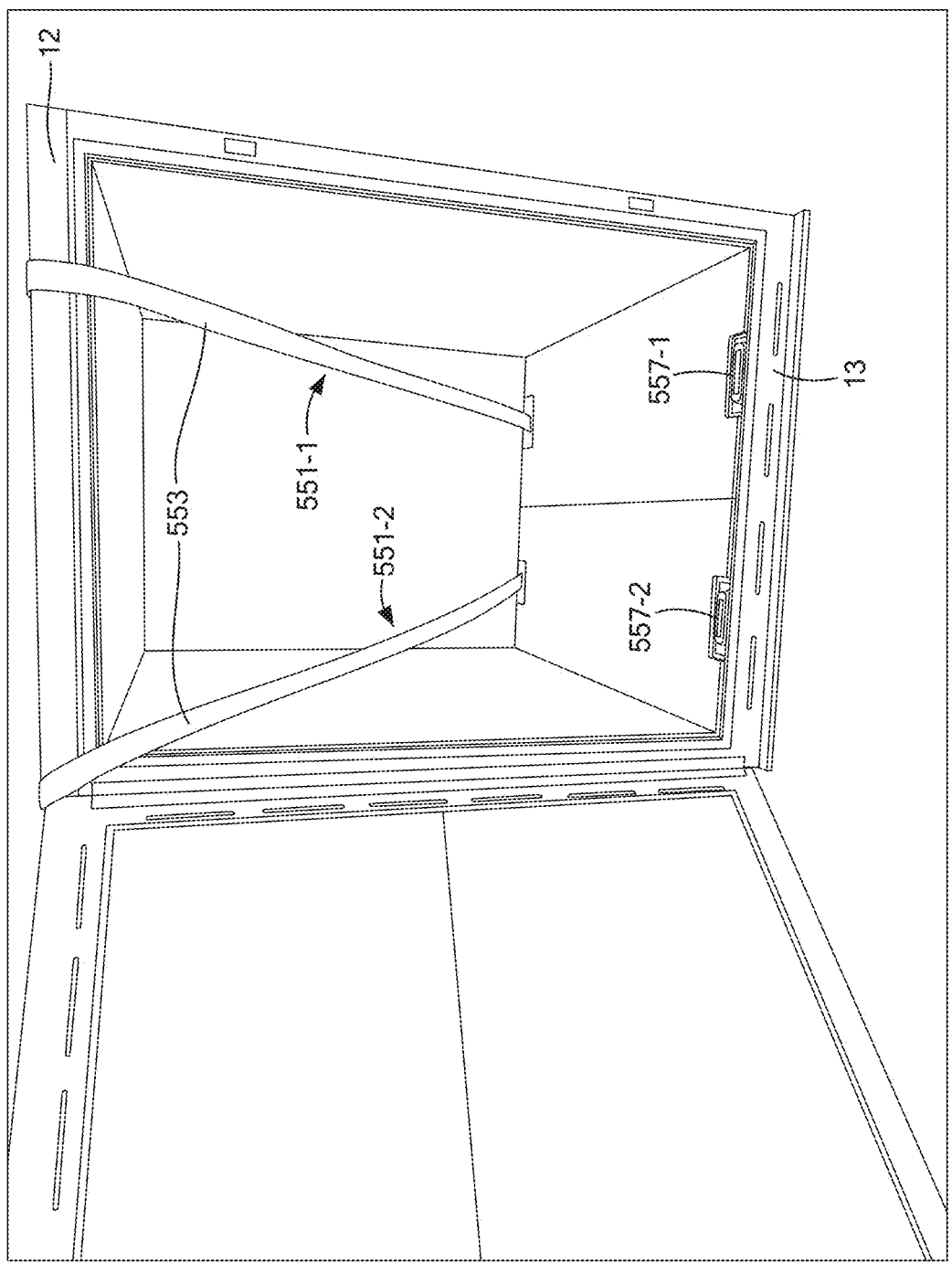
FIG. 30(a) is a fragmentary perspective view of the shipper of FIG. 2(a), showing the pair of payload retaining members, the free ends of the payload retaining members positioned on top of the shipper.
Figure 30B:
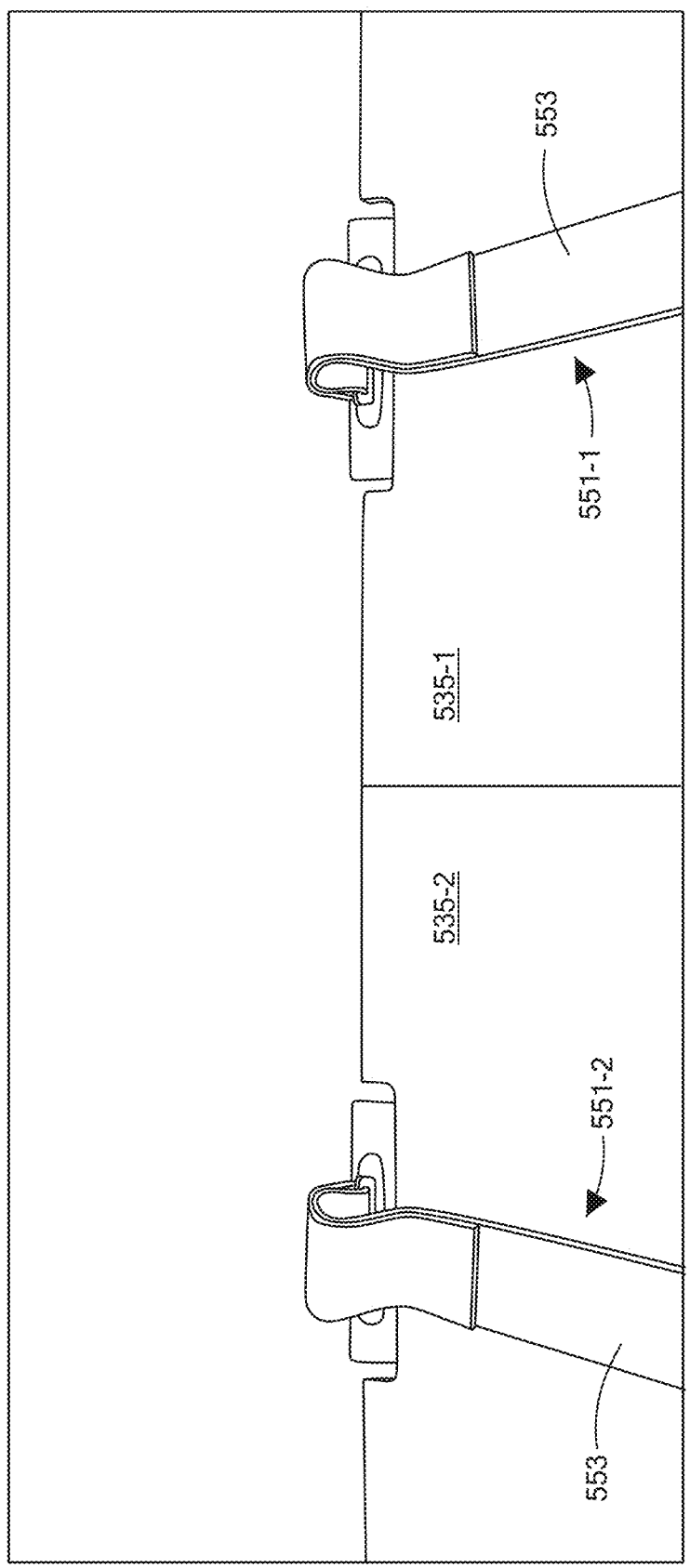
FIG. 30(b) is an enlarged fragmentary perspective view, showing the attachment of the fixed ends of the payload retaining members to the frame along its back bottom edge.
Figure 30C:
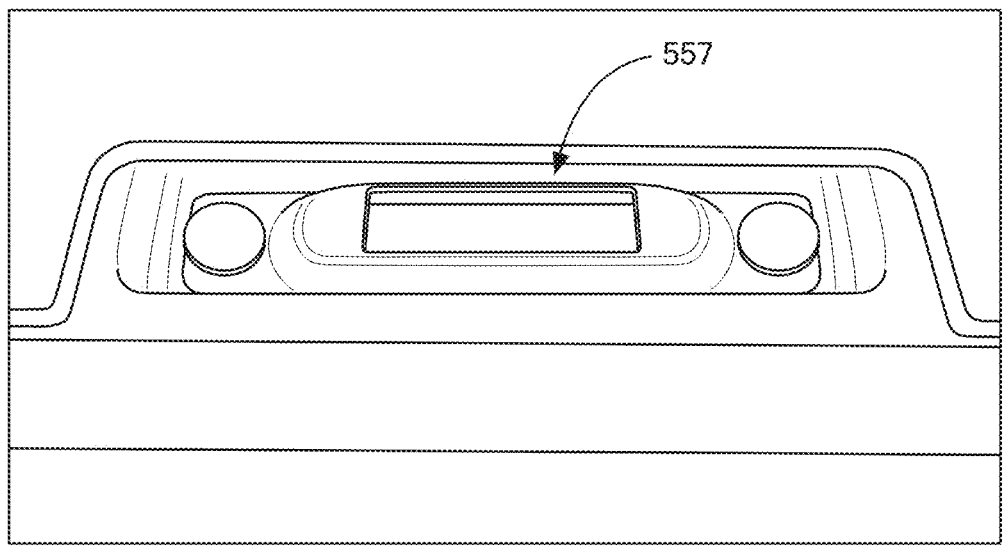
FIG. 30(c) is an enlarged fragmentary perspective view, showing a receptacle in the bottom of the frame for receiving the free end of a payload retaining member.
Figure 30D:
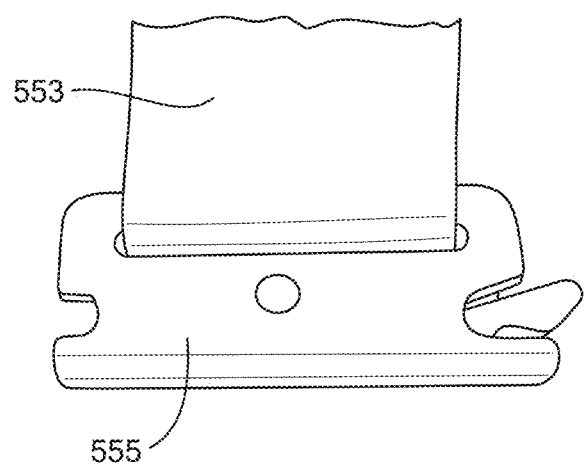
FIG. 30(d) is an enlarged fragmentary perspective view, showing the buckle at the free end of a payload retaining member.
Figure 30E:
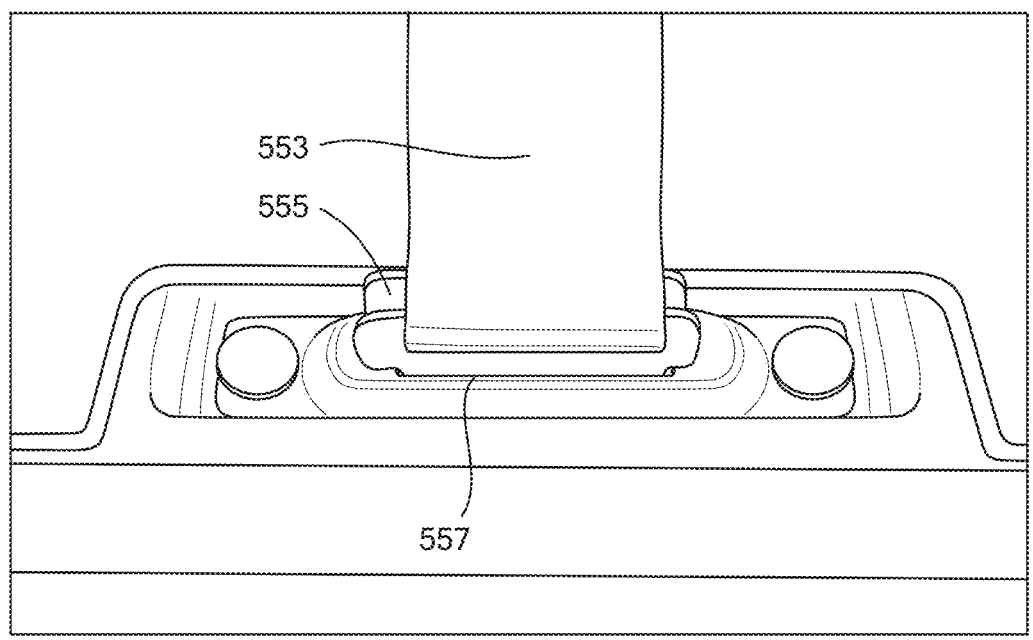
FIG. 30(e) is an enlarged fragmentary perspective view, showing the buckle at the free end of a payload retaining member secured to a receptacle.
Figure 30T:
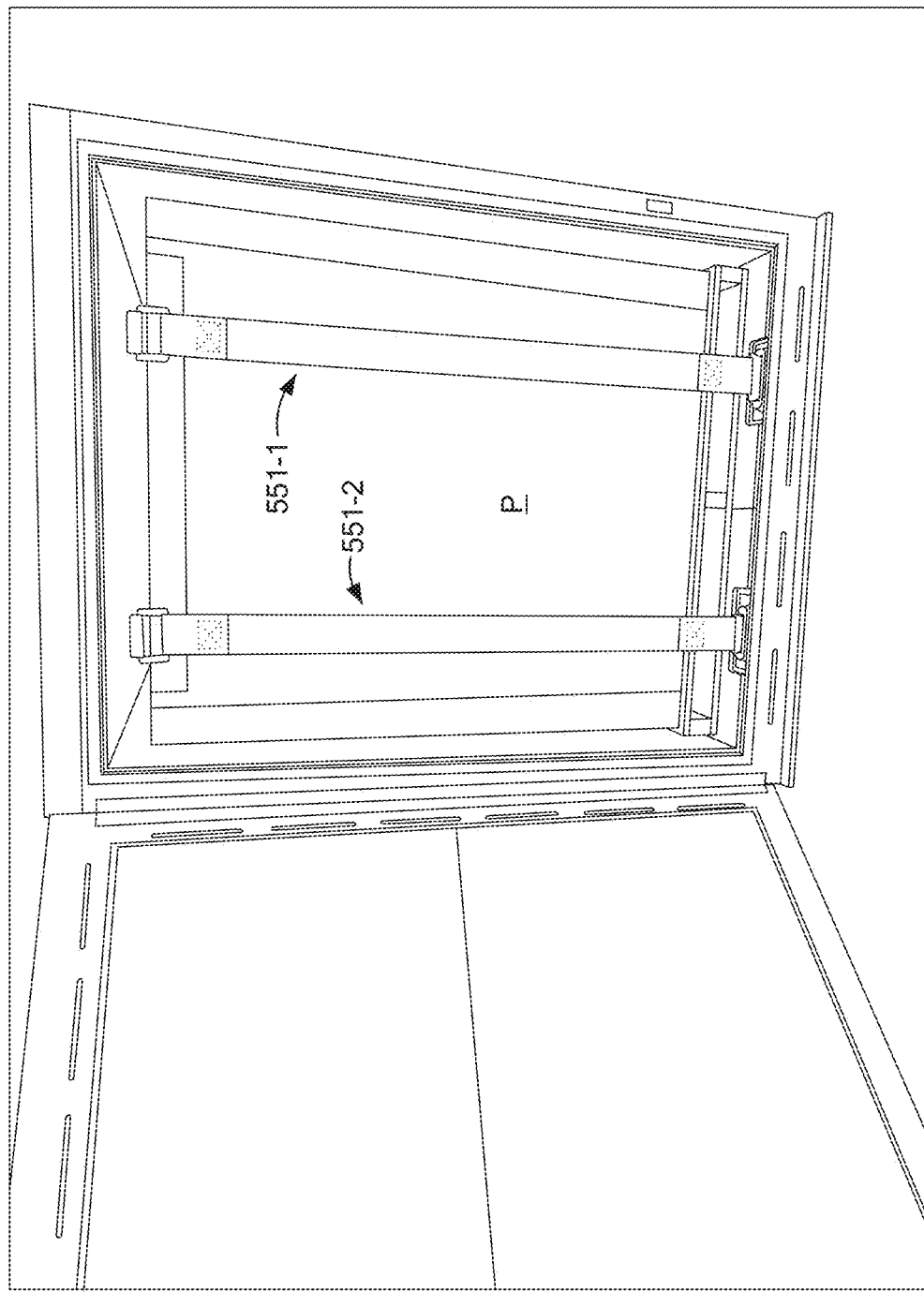
FIG. 30(f) is an enlarged fragmentary perspective view, showing a payload secured with the payload retaining members.

Referring now to FIG. 28, PCM assemblies 361-1 through 361-4 are shown in greater detail. PCM assemblies 361-1 through 361-4 may be identical to one another and may be similar in many respects to PCM assembly 353-1. The principal differences between PCM assemblies 361-1 through 361-4, on the one hand, and PCM assembly 353-1, on the other hand, may be (i) that PCM assemblies 361-1 through 361-4 may include four PCM-containing pockets whereas PCM assembly 353-1 may include three PCM-containing pockets; (ii) that PCM assemblies 361-1 through 361-4 may lack a handle like handle 449; and (iii) that PCM assemblies 361-1 through 361-4 may differ dimensionally from PCM assembly 353-1. In view of the above, each of PCM assemblies 361-1 through 361-4 may comprise four pockets 521-1 through 521-4. (Although not visible, each of pockets 521-1 through 521-4 may contain a quantity of phase-change material and may contain one or more PCM packs like pack 381.) Each of PCM assemblies 361-1 through 361-4 may comprise one or more looped handles (not shown). PCM assemblies 361-1 through 361-4 may have pockets having exemplary dimensions of approximately 12.125 inches×approximately 10.75 inches.

It is to be understood that, although, in the present embodiment, each of PCM assemblies 361-1 through 361-4 has four pockets 521-1 through 521-4, PCM assemblies 361-1 through 361-4 need not have four pockets and may have a greater or lesser number of pockets.

Referring now to FIGS. 19(b) and 29(a)-29(d), there are shown various views illustrating the way in which PCM assemblies 361-1 through 361-4 may be mounted on bottom 13 and may be covered by a pair of heat-spreader assemblies 531-1 and 531-2. More specifically, as seen best in FIGS. 19(b) and 29(b), PCM assemblies 361-1 through 361-4 may be inserted into trough 56-1 through 56-4, respectively, of bottom 13. (Because PCM assemblies 361 sit within troughs 56 of bottom 13, there is no need to strap, or otherwise to secure, PCM assemblies 361 in place.) Heat-spreader assemblies 531-1 and 531-2 may be similar to heat-spreader assemblies 492-1 and 492-2, respectively, except that (i) heat-spreader assemblies 531-1 and 531-2 may comprise panels 535-1 and 535-2 having an increased thickness compared to panels 509-1 and 509-2 (e.g., ¼ inch thickness for panels 535-1 and 535-2 vs. 1/16 inch thickness for panels 509-1 and 509-2); (ii) heat-spreader assemblies 531-1 and 531-2 may not include structures like quarter-turn screws 511 and finger pull slam latches 513 for securing panels 535-1 and 535-2 to bottom 13, heat-spreader assemblies 531-1 and 535-2 instead relying on gravity, as well as on the weight of any payload thereon; and (iii) heat-spreader assemblies 531-1 and 531-2 may include air cylinders 537-1 and 537-2 (not shown in FIG. 29(b)) to facilitate the lifting of panels 535-1 and 535-2.

Heat-spreader panel 535-1 may be hingedly connected to bottom 13 proximate to right side 23, and heat-spreader panel 535-2 may be hingedly connected to bottom 13 proximate to left side 21.

Referring now to FIGS. 30(a) through 30(f), system 11 may further comprise a pair of identical payload retaining members 551-1 and 551-2, which may be used to help keep a payload P stationary within system 11. Each of payload retaining members 551-1 and 551-2 may comprise a strap 553 that may be fixed at one end to frame 12 along its back edge. A buckle 555 may be attached to the free end of each strap 553. A pair of identical receivers 557-1 and 557-2 may be provided at the front end of bottom 13, receivers 557 being adapted to mate with buckles 555. (Cutouts may be provided in panels 535-1 and 535-2 to provide access to receivers 557-1 and 557-2.) Straps 553 may be appropriately dimensioned to be drawn over a payload, with buckles 555 mating with receivers 557.

According to one embodiment of the invention, each of the PCM assemblies of system 11 may contain only one type of phase-change material, and all of the PCM assemblies of system 11 may contain the same type of phase-change material. According to another embodiment of the invention, some of the PCM assemblies of system 11 may contain only a first type of phase-change material, and some of the PCM assemblies of system 11 may contain only a second type of phase-change material, wherein the first and second phase-change materials may be different in composition. In some cases, the PCM assemblies containing only the first type of phase-change material and the PCM assemblies containing only the second type of phase-change material may be associated with the same wall of frame 12 or may only be associated with different walls of frame 12. For example, in one case, the PCM assemblies associated with top 15, and the upper PCM assemblies associated with door 17, back 19, left wall 21, and right wall 23 may contain only a first phase-change material, and the PCM assemblies associated with bottom 13, and the lower PCM assemblies associated with door 17, back 19, left wall 21, and right wall 23 may contain only a second phase-change material, the first and second phase-change materials being different. According to yet another embodiment of the invention, at least some of the PCM assemblies of system 11 may contain two or more phase-change materials differing in composition. In some cases, said two or more phase-change materials may be present within a single PCM pack or may be present within different PCM packs of the same pocket or may be present within different pockets of the same PCM assembly.

System 11 may be configured for different applications by using different types of phase-change materials. For example, one or more types of phase-change materials may be selected so that system 11 may be used to maintain a payload within a refrigerated temperature range (e.g., approximately +2° C. to approximately +8° C.), within a room temperature range (e.g., approximately +15° C. to approximately +25° C.), or within a frozen temperature range (e.g., below a temperature of approximately −15° C. or below a temperature of approximately −20° C.).

More specifically, where system 11 is used to maintain a payload within a refrigerated temperature range, the phase-change material may be a phase-change material having a phase-change temperature of +5° C., an example of which may be a gelled n-tetradecane of the type disclosed in U.S. Pat. No. 10,583,978. Alternatively, where system 11 is used to maintain a payload within a room temperature range, two different phase-change materials may be used, such as a first phase-change material having a phase-change temperature of +17° C. and a second phase-change material having a phase-change temperature of +22° C. An example of a phase-change material having a phase-change temperature of +17° C. may be a gelled n-hexadecane of the type disclosed in U.S. Pat. No. 10,583,978, and an example of a phase-change material having a phase-change temperature of +22° C. may be Cold Chain Technologies' KOOLIT® Advanced PCM 22C Gel, product code 730G12+22C (a blend of n-hexadecane and n-octadecane phase change materials gelled with an SEBS gelling agent in the same manner as described in U.S. Pat. No. 10,583,978). In one embodiment, the +17° C. phase-change material may be located in the bottom half of system 11 (i.e., in the PCM assemblies on bottom 13 and in the lower PCM assemblies on door 17, back 19, left wall 21, and right wall 23), and the +22° C. phase-change material may be located in the top half of system 11 (i.e., in the PCM assemblies on top 15 and in the upper PCM assemblies on door 17, back 19, left wall 21, and right wall 23). In another embodiment, the +17° C. phase-change material and the +22° C. phase-change material may be located in different PCM assemblies but arranged in a manner other than in a top half/bottom half split arrangement of the type disclosed above. Alternatively, the +17° C. phase-change material and the +22° C. phase-change material may be located different pockets of the same PCM assembly or in the same pocket of the same PCM assembly or otherwise.

Alternatively, where system 11 is used to maintain a payload within a frozen temperature range, the phase-change material may be a salt/water solution having a phase-change temperature of −23° C., such as the phase-change material of present in the 500-ST series KOOLIT® gel pack or saddlebag from Cold Chain Technologies, LLC (Franklin, MA).

Referring now to FIG. 31, there is shown a table providing information about the type and quantity of phase-change material that may be used in a version of system 11 configured to hold a payload within a refrigerated temperature range of +2° C. to +8° C. (RFG) for an extended period of time, such as 96 hours.

Referring now to FIG. 32, there is shown a table providing information about the type and quantity of phase-change material that may be used in a version of system 11 configured to hold a payload within a temperature range of +15° C. to +25° C. (CRT) for an extended period of time, such as 96 hours.

Referring now to FIGS. 33 and 34, there are shown tables providing information about the type and quantity of phase-change material that may be used in other versions of system 11 that are configured to hold a payload under frozen conditions, for example, below a temperature of −15° C. for an extended period of time, or below a temperature of −20° C. for an extended period of time. The system of FIG. 33 may be similar to the RFG and CRT systems described above, except for the use of −23° C. phase-change material of the type described above. Such −23° C. phase-change material may, for example, be disposed in packs having dimensions of 6 inches×7.25 inches×0.625 inch. Based on thermal modeling, such a system 11 is expected to be capable of keeping a payload below −15° C. for an extended period of time, which may be approximately 52 hours, or below −20° C. for an extended period of time, which may be approximately 33 hours. The system of FIG. 34 may be similar to that of FIG. 33, except that the system of FIG. 34 may comprise additional phase-change material positioned in the payload space. As a result, the size of the payload may be reduced, for example, from 48 inches×48 inches×50 inches to 48 inches×38.6 inches×49.3 inches, and there may be, in addition to the phase-change material disposed between the frame and the heat-spreaders, an additional 48 PCM packs positioned in the payload space to the left of the payload, an additional 48 PCM packs positioned in the payload space to the right of the payload, and an additional 32 PCM packs positioned in the payload space on top of the payload. These additional PCM packs may be loose in the payload space or may be packaged with a plurality of PCM packs in a common container and/or on a common backing. For example, the PCM packs could be grouped together in sets of 4 PCM packs coupled to a corrugated backer or placed in a corrugate sleeve. Based on thermal modeling, the system of FIG. 34 is expected to be capable of keeping a payload of the aforementioned reduced size below −15° C. for an extended period of time, which is expected to be approximately 76 hours, or below −20° C. for an extended period of time, which is expected to be approximately 52 hours.

One of the objectives of the present invention is to provide a shipper that simultaneously possesses all of the following attributes: (1) the shipper is dimensioned internally to accommodate either a standard US-sized pallet and payload or a standard European-sized pallet and payload, (2) the shipper is dimensioned externally so that four such shippers can be seated simultaneously on the same PMC sheet, (3) the shipper is capable of meeting certain thermal requirements, such as maintaining a payload within a desired temperature range for an extended period of time, preferably 96 hours, (4) the shipper has sufficient mechanical strength (a) to carry a payload of significant weight (e.g., 1388 lbs), (b) to withstand a significant shock force (e.g., 6 g), and (c) to permit the stacking of one shipper upon another when the shippers are not in use. In this regard, shipping system 11 may have a tare weight of approximately 500-525 kg and may carry a payload of up to approximately 600-700 kg.

Figure 35:
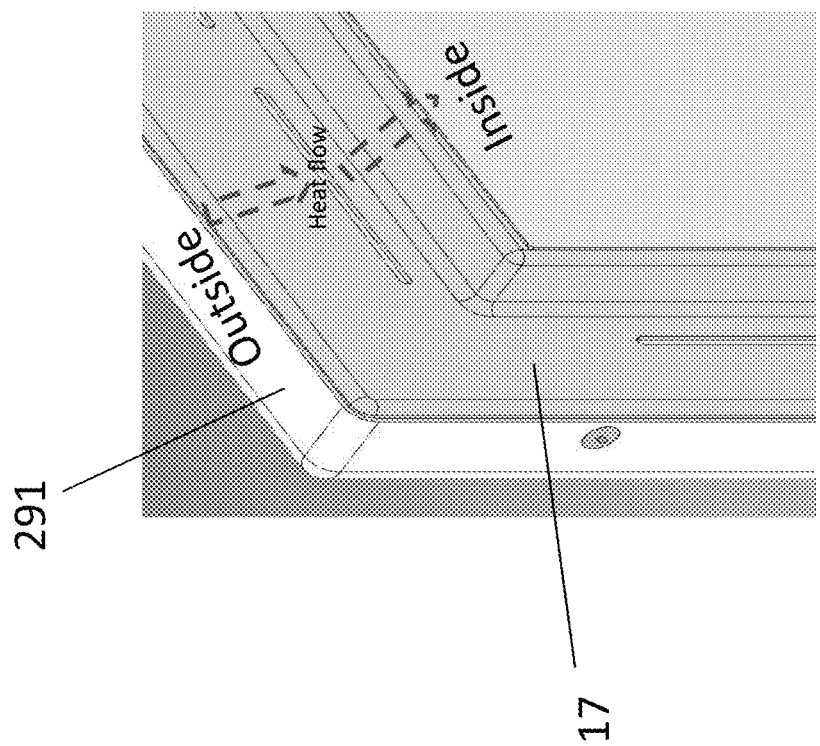
FIG. 35 is a fragmentary perspective view illustrating the function of the thermal breaks in the door of the shipper of FIG. 1(a)

As can be appreciated, many of the above attributes present design considerations that may be at odds with one another. For example, the attribute of comparatively small external size and the attribute of mechanical strength may be at odds with one another. As another example, thermal requirements and mechanical strength may be at odds with one another. Due to these various competing interests, the present shipper must be constructed with only about 3.6 inches per side within which all shipper components (i.e., insulation, phase-change materials, and structural elements) must fit. This is made more difficult by the fact that, in some cases, one must allocate about 2 inches per side to insulation, typically in the form of VIP insulation, and the entire system needs a large quantity of phase-change material distributed around the payload space (in some cases, up to about 400 lbs of phase-change material, which may correspond to a thickness of about 1.375 inch per side of gelled phase-change material packs), One of the design features that contributes to the present shipper being able to overcome the above obstacles is the presence of thermal breaks in various components of frame 12, such as, but not limited to, bottom 13, door 17, left corner gusset 25, and right corner gusset 27. For example, as can be seen in FIG. 35, the presence of thermal breaks in the door lessens the conduction of heat between the payload space of the shipper and the external environment.

Another design feature that contributes to the present shipper being able to overcome the above obstacles is the provision of one or more ribs in the various walls of the shipper frame. For example, as can be seen in FIGS. 36(a)-36(e), the left wall of the shipper includes a rib that extends vertically between the two PCM-containing cavities. This rib provides mechanical strength to the left side, particularly against compressive forces of the type that may be encountered when stacking one shipper on top of another shipper. Similar ribs are present on the other sides of each PCM-containing cavity, and analogous sets of ribs are present in the other walls of the frame.

Still another design feature that contributes to the present shipper being able to overcome the above obstacles is the placement of the frame to the interior to the vacuum insulated panels, as opposed to placement of the frame to the exterior of the vacuum insulated panels.

Still yet another design feature that contributes to the present shipper being able to overcome the above obstacles is the use of a PCM pack of the variety comprising a phase-change material contained within a thin flexible pouch. Such a pouch may be formed from a first film having a thickness of about 4 mils and a second film having a thickness of about 6-7 mils. As a result, the thickness of the PCM pack attributable to packaging is only about 10 mils.

Still a further design feature that contributes to the present shipper being able to overcome the above obstacles is that the shipper comprises a frame made of a lightweight yet strong material having relatively low thermal conductivity, the frame comprising walls having cavities on one side to accommodate phase-change material and having cavities on the opposite side to accommodate insulation panels, particularly VIPs. The foregoing is enhanced by the inclusion in the present shipper of one or more heat-spreaders and an outer shell. The heat-spreaders may be secured to the inner-facing surfaces of the frame, the heat-spreaders separating the phase-change material from the payload space and also being used, in combination with the frame, to encapsulate the phase-change material. The outer shell, which is also made of a lightweight yet strong material having a relatively low thermal conductivity, may be secured to outer-facing surfaces of the frame and may also be used, in combination with the frame, to encapsulate the insulation panels.

Figure 41:
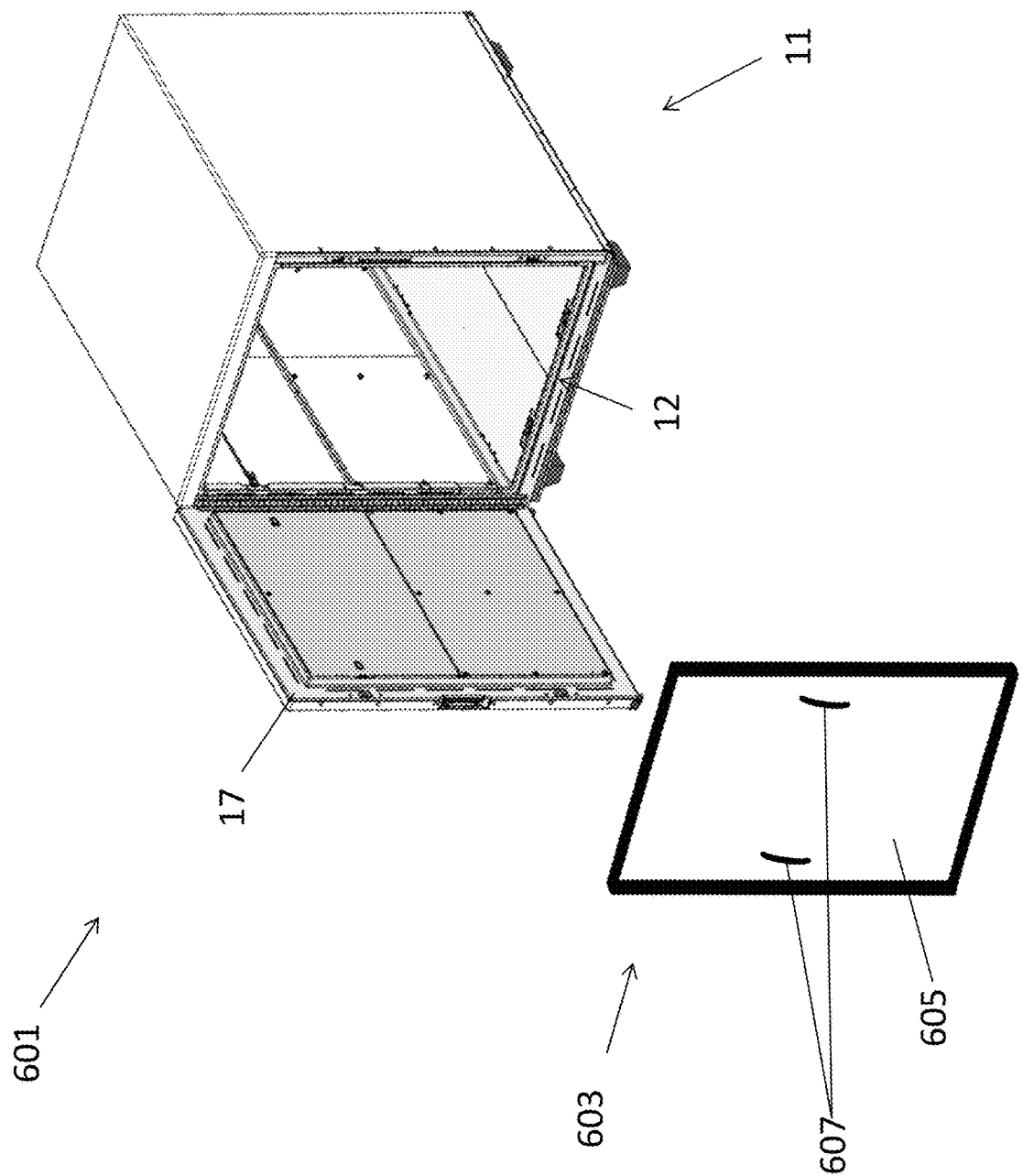
FIG. 41 is a partly exploded perspective view of an alternative embodiment of a shipping system to that shown in FIG. 1(a).

It is to be understood that, although the shipping systems of the present application are described as having a door as the front of the frame, such a door need not constitute the entirety of the front of the frame. Instead, the door could be limited to only a portion of the front of the frame, or the door could be made up of contiguous portions of two different walls of the frame (e.g., a portion of the front and a portion of the top). In addition, it is to be understood that, although the shipping systems of the present application are described as having a door at the front of the frame, the door need not be located at the front of the frame, but rather, could be located at other portions of the frame, such as at the back of the frame, the left side of the frame, the right side of the frame, the top of the frame, or the bottom of the frame. Moreover, it is to be understood that, although the shipping systems of the present application are described as having a single door, the shipping systems could have a plurality of doors, such as a plurality of doors at one wall of the frame (e.g., double doors at the front wall) and/or a single door at each of multiple walls of the frame (e.g., a first door at the front and a second door at the back). For example, as seen in FIG. 41, there is shown a shipping system 601 that includes, in addition to the components of shipping system 11, an interior door 603 such that access to the space within frame 12 requires not only that door 17 be opened but that said interior door 603 also be opened. The interior door 603 may be a hingedly mounted door that may be opened after door 17 has been opened, or the interior door 603 may simply be an insulation panel 605 or similar structure press-fit into the opening. For example, the interior door 603 may comprise one or more pieces of a foam material (e.g., expanded polystyrene foam, polyurethane foam, or expanded polypropylene foam) that have been press-fit into the opening, optionally with another more compressible foam around the edges of the foam panel to aid in the press-fit. Handles 607 may be applied to the insulation panel 605 to aid in its insertion or removal.

As alluded to above, the various shipping systems discussed herein may employ only a single type of phase-change material or may employ two or more different types of phase-change materials. Where only a single type of phase-change material is used, the phase-change material may have a phase-change temperature that is within a range of temperatures at which one desires to maintain the payload. In other words, for example, if it is desired to maintain a payload within a temperature range of +2° C. to +8° C. for an extended period of time, the phase-change material may have a phase-change temperature of, for example, +3° C. or +5° C. or +7° C. or some other suitable temperature within the target temperature range of +2° C. to +8° C.

On the other hand, where two or more different types of phase-change materials are used, a first phase-change material may have a first phase-change temperature, and a second phase-change material may have a second phase-change temperature, wherein the first and second phase-change temperatures are different. (Alternatively, one could also use different types of phase-change materials having the same phase-change temperature.) Where first and second phase-change materials having different phase-change temperatures are used, such first and second phase-change materials may be selected such that the one of the two phase-change materials has a phase-change temperature that is at or near a lower end of a range of temperatures at which one desires to maintain the payload and such that the other one of the two phase-change materials has a phase-change temperature that is at or near an upper end of the range of temperatures at which one desires to maintain the payload. Consequently, for example, if it is desired to maintain a payload within a temperature range of +15° C. to +25° C., one of the two phase-change materials may have a phase-change temperature of +17° C. and the other of the two phase-change materials may have a phase-change temperature of +22° C.

Where two or more different types of phase-change materials are used, such phase-change materials may be contained within a common volume or may be contained within distinct volumes. For example, where a multi-compartmented mat is used, some of the compartments of the mat may contain only one of the phase-change materials, and some of the compartments of the same mat may contain only the other phase-change material. Alternatively, where a curtain having a plurality of pockets for receiving pouches (or other containers) of phase-change material is used, some of the pockets of the curtain may be used to receive pouches (or other types of containers) containing only one of the phase-change material types, and some of the pockets of the same curtain may be used to receive pouches (or other types of containers) containing only the other of the phase-change material types. Alternatively, where the shipping system comprises a plurality of curtains, some of the curtains may hold only one type of phase-change material, and some of the curtains may hold only another type of phase-change material.

According to one embodiment, the shipping system may use two different types of phase-change materials, such as a +17° C. PCM and a +22° C. PCM. One of the two phase-change materials (e.g. +22° C. PCM) may be positioned in the upper half of the shipping system (i.e., mounted on the frame top and mounted on the upper halves of each of the frame door, the frame back, the frame left side, and the frame right side), and the other of the two phase-change materials (e.g., +17° C. PCM) may be positioned in the lower half of the shipping system (i.e., mounted in the frame bottom and mounted on the lower halves of each of the frame door, the frame back, the frame left side, and the frame right side.)

Each of the shipping systems discussed herein preferably has a sufficiently small footprint to enable four US-sized pallets to be seated on a single PMC and, at the same, time meet thermal requirements of maintaining a payload within a desired temperature range for an extended period of time, such as 96 hours. Some of the features of these systems that enable such a small footprint, while meeting such thermal requirements, include, but are not limited to, one or more of the following: (1) the use of composite materials to make the frame and shell components; (2) the use of VIP panels; (3) the use of particular PCMs; (4) the use of heat-spreaders; and (5) the use of a low-profile hinge.

In addition, the shipping systems discussed herein may incorporate onboard telematics, including temperature data logging which may provide both ambient (external) and internal air temps. These telematics may be capable of communicating in real time via multiple communications methods including Wi-Fi, cellular, GPS, and/or Bluetooth.

In addition, the shipping system may have a unique serial number and may be scannable via barcode and/or QR code on the exterior surface.

The shipping system may allow for real time analysis of system performance and remaining life. For example, a user may scan the QR code which will take user to a secure web portal. The onboard telematics system may already be transmitting ambient and payload temperature information to the website. The planned shipment route, along with weather along that entire route, may also be captured within the web. During transit, this can include both the route already taken as well as the remaining route. In combination with pre-calculated tables of performance, created ahead of time via advanced modeling software, the user may be provided with information such as, but not limited to, the following: Is it best to place the system into 5C or leave it at room temp prior to the next leg of the journey? How much "life" is left in the unit and how does that compare to the journey ahead? Given the upcoming journey and weather patterns, combined with the exposure to this point in the journey, should any other action of any type be taken to ensure system performance to end user?

Some additional features, aspects and/or advantages that may apply to at least some embodiments of the present invention are identified below.

1. Quarter PMC sizing
   Length×height×width and feet design allow 4 units to fit on PMC pallet. PMC Pallet dimensions of 96 inches×125 inches and maximum height of 62.5 inches. The usable pallet area within tie down channel is 91 inches×120 inches and channel is expected to be about 1.375 inches taller than center of pallet where shipper will be loaded. Feet to be sized and located in such a way to allow placement of 4 units within the 91 inches×120 inches area and yet allow unit dimensions which extend beyond that area but no greater than 96 inches×125 inches.
2. Payload height of 45 inches+5 inches product pallet
3. System accepts both US and EU sized pallet load, of same height.
4. System thermal characteristics allow 'hibernation' i.e. thermal protection duration is not reduced if unit is stored under recommended storage temperatures for a specified period
5. Stacking—Unit may be stacked two-units high (i.e., one unit stacked upon another unit), under storage conditions (i.e. not in transit) loaded with refrigerants but without product payload
6. Reusable components/design
7. Asset tracking device integral to unit, to report on: global position, shock/drop/vibration, orientation, GPS jamming detection, temperature, relative humidity, barometric pressure and battery life
8. Phase change material (PCM) is removable from unit for conditioning of refrigerants
9. Integral Document holder
10. Outer surface of shipper to allow for adhesive labels to be placed anywhere on any side.
11. Outer surface of shipper to allow for efficient cleaning and deployment.
12. Shock absorbing feet
13. External surface reflects solar radiation exterior surface
14. Max loading capacity: 700 kg
15. Qualified with ISTA 7D standard temperature test profiles for 96 hour duration.
    The shipper may achieve 96 hours of thermal protection duration, within a temperature range of 2° C. to 8° C., in an embodiment where PCM units are used, with phase change temperatures approximately in the 5° C. to 7° C. range (alone or in some combination), and in a thickness of 1.0 to 1.5 inches around the perimeter of the shipper.
    The shipper may achieve 96 hours of thermal protection duration, within a temperature range of 15° C. to 25° C., in an embodiment where PCM units are used, with phase change temperatures approximately in the 17° C. to 24° C. range (alone or in some combination), and in a thickness of 1.0 to 1.5 inches around the perimeter of the shipper.
    In either temperature range, weight of PCM may be in the range of 100-600 lbs, for example, 350-550 lbs.
    In either temperature range, thickness for individual VIP panels may be 0.75 to 1.0 inch thickness.

The following examples are given for illustrative purposes only and are not meant to be a limitation on the invention described herein or on the claims appended hereto.

Example 1

Figure 37:
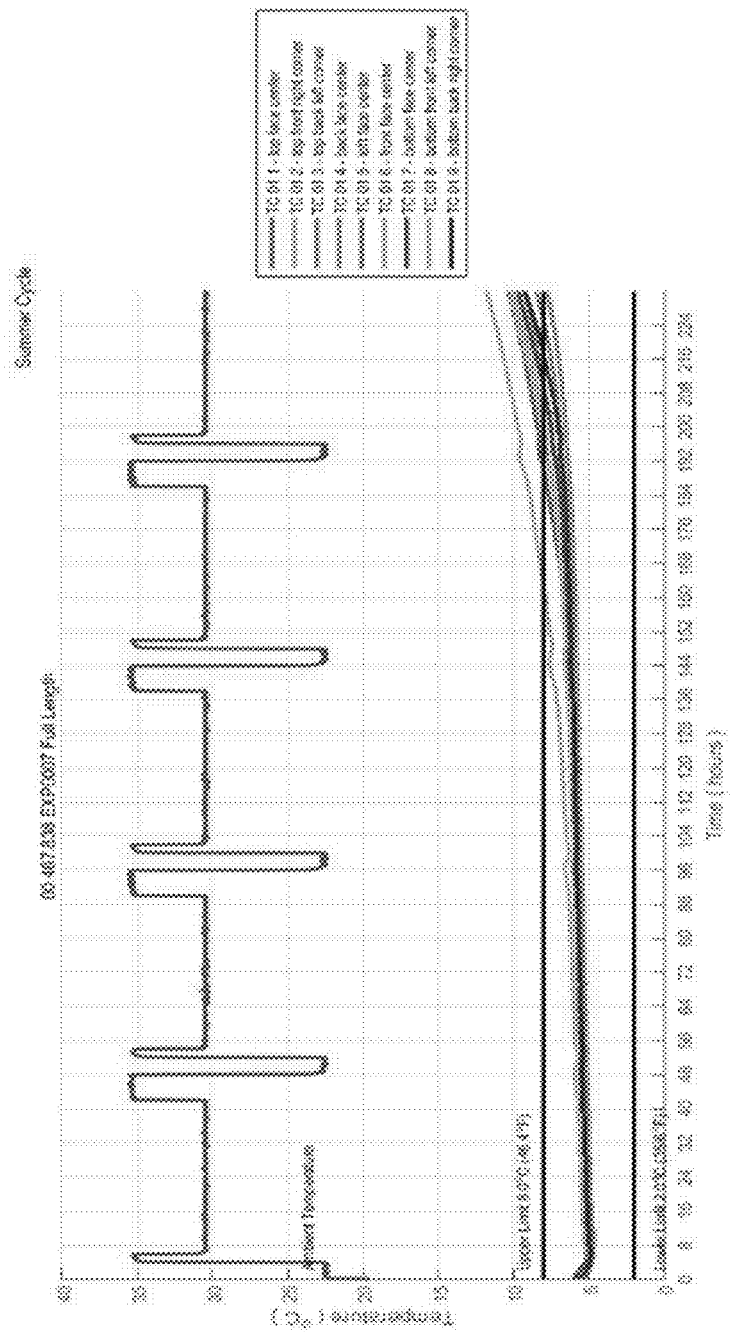
FIG. 37 is a graph showing the test results from Example 1.

A shipping system similar to shipping system 11 and designed to keep a payload within a range of 2° C. to 8° C. was packed-out (i.e., assembled and loaded). All PCM assemblies in the shipping system contained phase-change material having a phase-change temperature of about 5° C. to 7° C. and were preconditioned at 3° C.±2° C. The remaining components of the shipping system were preconditioned at 20° C.±5° C. Prior to packout, the payload was kept at a temperature of 3° C.±2° C. The shipping system was subjected to simulated summer-type temperatures, which included cycling between about 22° C. and 35° C. Representative test results are shown in FIG. 37. As can be seen, the payload was maintained in the 2° C. to 8° C. range for well over 4 days.

Example 2

Figure 38:
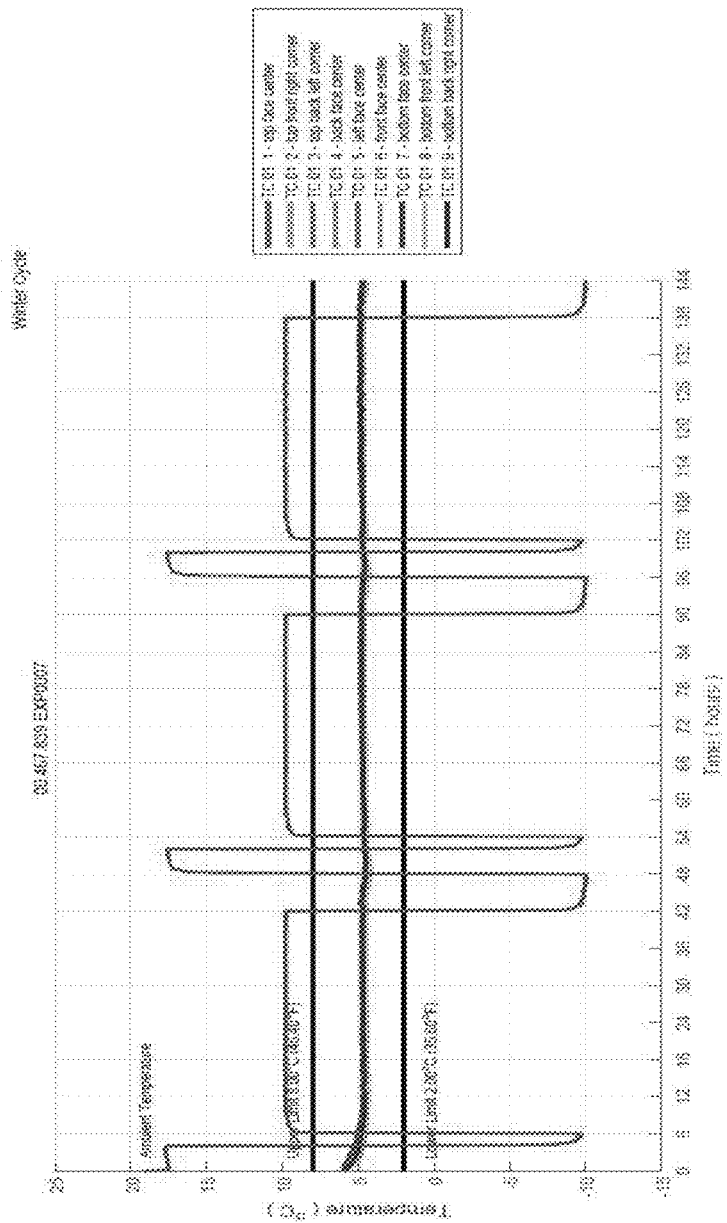
FIG. 38 is a graph showing the test results from Example 2.

A shipping system similar to shipping system 11 and designed to keep a payload within a range of 2° C. to 8° C. was packed-out (i.e., assembled and loaded). All PCM assemblies in the shipping system contained phase-change material having a phase-change temperature of about 5° C. to 7° C. and were preconditioned at 3° C.±2° C. The remaining components of the shipping system were preconditioned at 20° C.±5° C. Prior to packout, the payload was kept at a temperature of 3° C.±2° C. The shipping system was subjected to simulated winter-type temperatures, which included cycling between about −10° C. and 18° C. Representative test results are shown in FIG. 38. As can be seen, the payload was maintained in the 2° C. to 8° C. range for well over 4 days.

Example 3

Figure 39:
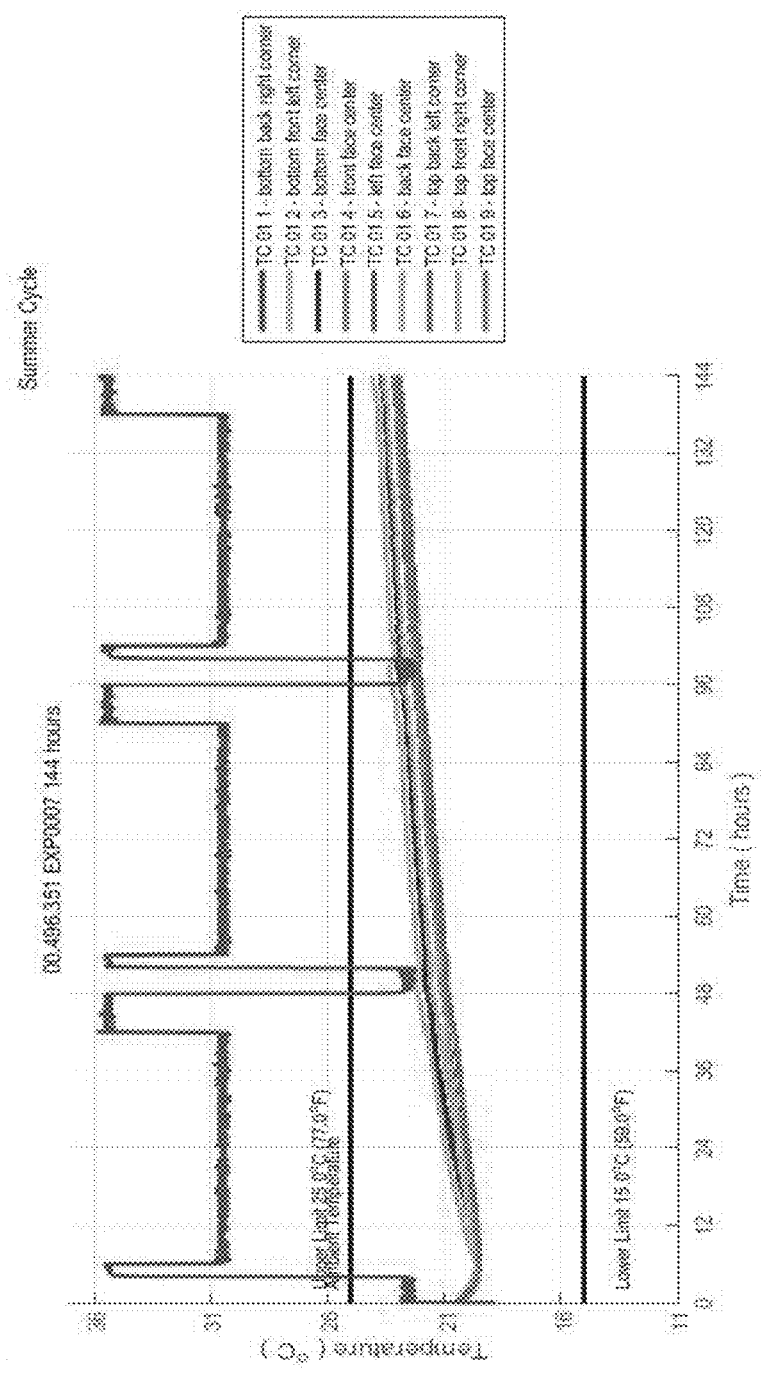
FIG. 39 is a graph showing the test results from Example 3.

A shipping system similar to shipping system 11 and designed to keep a payload within a range of 15° C. to 25° C. was packed-out (i.e., assembled and loaded). The lower PCM assemblies contained phase-change material having a phase-change temperature of 17° C., and the upper PCM assemblies contained phase-change material having a phase-change temperature of 22° C. Some of the 22° C. PCM assemblies were preconditioned at 5° C. The 17° C. PCM assemblies were preconditioned at 19° C., and the remaining 22° C. PCM assemblies were also preconditioned at 19° C. The remaining components of the shipping system were preconditioned at 20° C.±5° C. Prior to packout, the payload was kept at a temperature of 20° C.±5° C. The shipping system was subjected to simulated summer-type temperatures, which included cycling between about 22° C. and 35° C. Representative test results are shown in FIG. 39. As can be seen, the payload was maintained in the 15° C. to 25° C. range for well over 4 days.

Example 4

Figure 40:
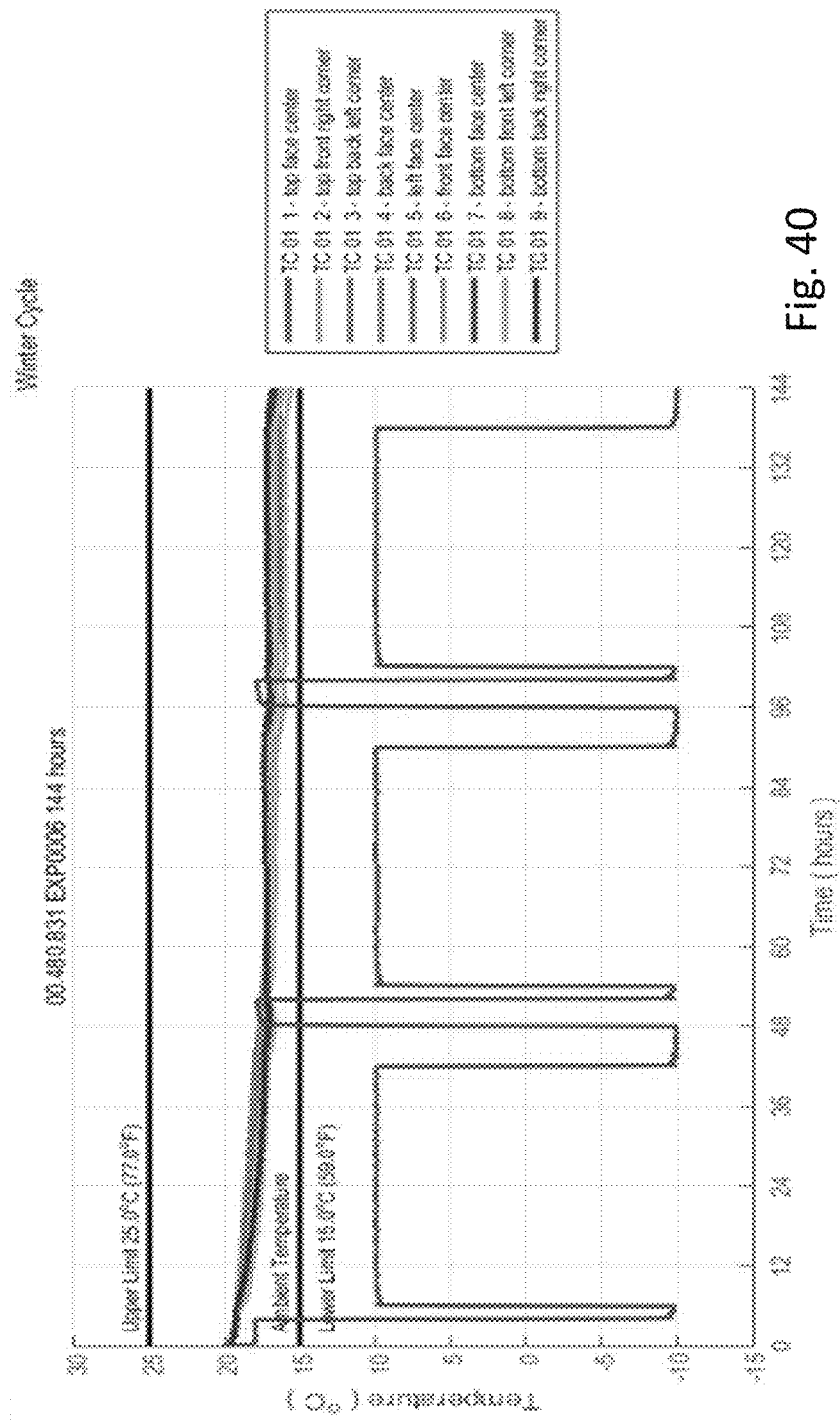
FIG. 40 is a graph showing the test results from Example 4.

A shipping system similar to shipping system 11 and designed to keep a payload within a range of 15° C. to 25° C. was packed-out (i.e., assembled and loaded). The lower PCM assemblies contained phase-change material having a phase-change temperature of 17° C., and the upper PCM assemblies contained phase-change material having a phase-change temperature of 22° C. Some of the 22° C. PCM assemblies were preconditioned at 5° C. The 17° C. PCM assemblies were preconditioned at 19° C., and the remaining 22° C. PCM assemblies were also preconditioned at 19° C. The remaining components of the shipping system were preconditioned at 20° C.±5° C. Prior to packout, the payload was kept at a temperature of 20° C.±5° C. The shipping system was subjected to simulated winter-type temperatures, which included cycling between about −10° C. and 18° C. Representative test results are shown in FIG. 40. As can be seen, the payload was maintained in the 15° C. to 25° C. range for well over 4 days.

The embodiments of the present invention described above are intended to be merely exemplary and those skilled in the art shall be able to make numerous variations and modifications to it without departing from the spirit of the present invention. All such variations and modifications are intended to be within the scope of the present invention.

What is claimed is:

1. A passively-controlled shipping system for temperature-sensitive materials, the passively-controlled shipping system comprising:
   (a) an insulated container, the insulated container comprising a frame, the frame comprising a bottom, a top, a front including a door, a rear, a left side, and a right side, the frame defining a closed space, the closed space comprising a payload space, the payload space being dimensioned to accommodate a pallet and a pallet-sized payload, wherein the payload space is dimensioned to accommodate alternatively a standard US-sized pallet and corresponding payload and a standard European-sized pallet and corresponding payload; and
   (b) a quantity of phase-change material disposed within the closed space defined by the frame of the insulated container;
   (c) wherein the passively-controlled shipping system is dimensioned so that four such shipping systems may be seated within the footprint of a PMC sheet having dimensions of 125 inches×96 inches and wherein the passively-controlled shipping system is configured to maintain a payload disposed within the insulated container within a desired temperature range for at least 4 days.

2. The passively-controlled shipping system as claimed in claim 1 wherein the passively-controlled shipping system has maximum outer length and width dimensions of 61¼ inches and 47¼ inches, respectively.

3. The passively-controlled shipping system as claimed in claim 2 wherein the passively-controlled shipping system has a maximum outer height of less than 64 inches.

4. The passively-controlled shipping system as claimed in claim 3 wherein the passively-controlled shipping system has a maximum outer height of 62½ inches.

5. The passively-controlled shipping system as claimed in claim 1 wherein the passively-controlled shipping system is configured to maintain a payload disposed within the insulated container within a desired temperature range for at least 5 days.

6. The passively-controlled shipping system as claimed in claim 1 wherein the desired temperature range is 2° C. to 8° C.

7. The passively-controlled shipping system as claimed in claim 1 wherein the desired temperature range is 15° C. to 25° C.

8. The passively-controlled shipping system as claimed in claim 1 wherein the passively-controlled shipping system is configured to withstand being stacked two-high when not in use without undergoing structural damage.

9. The passively-controlled shipping system as claimed in claim 8 wherein the passively-controlled shipping system has a tare weight of 500-525 kg.

10. The passively-controlled shipping system as claimed in claim 9 wherein the passively-controlled shipping system has a maximum payload weight of 700 kg.

11. The passively-controlled shipping system as claimed in claim 1 wherein the frame is made of a composite material.

12. The passively-controlled shipping system as claimed in claim 11 wherein the composite material comprises a fiberglass composite.

13. The passively-controlled shipping system as claimed in claim 12 wherein the frame has a wall thickness not exceeding 6 mm.

14. The passively-controlled shipping system as claimed in claim 1 wherein the insulated container further comprises at least one vacuum insulated panel, the at least one vacuum insulated panel being disposed outside the frame.

15. The passively-controlled shipping system as claimed in claim 14 wherein the at least one vacuum insulated panel disposed outside the frame comprises a plurality of vacuum insulated panels disposed outside the frame, and wherein at least one of the plurality of vacuum insulated panels is aligned with each of the bottom, the top, the front, the rear, the left side, and the right side of the frame.

16. The passively-controlled shipping system as claimed in claim 1 wherein the frame comprises at least one thermal break to minimize heat conduction between the closed space within the frame and a space external to the frame.

17. The passively-controlled shipping system as claimed in claim 16 wherein the at least one thermal break comprises at least one through opening formed in the frame.

18. The passively-controlled shipping system as claimed in claim 17 wherein the at least one thermal break comprises a plurality of through openings in the front and a plurality of through openings in the bottom, none of the through openings being in fluid communication with the closed space of the frame.

19. The passively-controlled shipping system as claimed in claim 1 wherein the quantity of phase-change material is distributed amongst a plurality of phase-change material assemblies, the phase-change material assemblies being coupled to the interior of the frame.

20. The passively-controlled shipping system as claimed in claim 19 wherein the phase-change material consists of a single type of phase-change material.

21. The passively-controlled shipping system as claimed in claim 19 wherein the phase-change material comprises a plurality of different types of phase-change material.

22. The passively-controlled shipping system as claimed in claim 21 wherein the plurality of different types of phase-change material comprises a first phase-change material and a second phase-change material, the first phase-change material being positioned exclusively in a top portion of the closed space of the frame and the second phase-change material being positioned exclusively in a bottom portion of the closed space of the frame.

23. The passively-controlled shipping system as claimed in claim 19 wherein each of the plurality of phase-change material assemblies comprises a container and a quantity of phase-change material contained in the container, the passively-controlled shipping system further comprising a plurality of heat-spreaders, the heat-spreaders being disposed interior to the phase-change material assemblies and defining the payload space.

24. The passively-controlled shipping system as claimed in claim 1 wherein the insulated container further comprises an outer shell and a plurality of vacuum insulated panels, the outer shell being positioned outside of the frame, the vacuum insulated panels being positioned outside of the frame, at least some of the vacuum insulated panels being positioned between the frame and the outer shell.

25. The passively-controlled shipping system as claimed in claim 24 wherein the quantity of phase-change material is distributed amongst a plurality of phase-change material assemblies, the phase-change material assemblies being coupled to the interior of the frame and comprising a plurality of containers containing the phase-change material.

26. The passively-controlled shipping system as claimed in claim 25 further comprising a plurality of heat-spreaders, the heat-spreaders being disposed interior to the phase-change material assemblies and defining the payload space.

27. A passively-controlled shipping system for temperature-sensitive materials, the passively-controlled shipping system comprising:
(a) a frame, the frame defining a closed space;
(b) an outer shell, the outer shell being disposed exterior to the frame;
(c) a plurality of vacuum insulated panels, the plurality of vacuum insulated panels being disposed exterior to the frame, with at least some of the vacuum insulated panels positioned between the frame and the outer shell;
(d) a plurality of phase-change material assemblies, the plurality of phase-change material assemblies being disposed interior to the frame, wherein each of the plurality of phase-change material assemblies comprises at least one container and a quantity of phase-change material disposed within the at least one container; and
(e) a plurality of heat-spreaders, the plurality of heat-spreaders being disposed interior to the phase-change material assemblies and defining an enclosed payload space bounded by a top, a bottom, a front, a rear, a left side and a right side, wherein at least one of the plurality of heat-spreaders is attached to the frame.

28. The shipping system as claimed in claim 27, wherein the frame comprises at least one thermal break to minimize heat conduction between the closed space and a space external to the frame.

29. The shipping system as claimed in claim 28 wherein the frame comprises at least one vertical wall, the vertical wall comprising at least one vertical rib.

30. The shipping system as claimed in claim 27 wherein the frame comprises a bottom, a top, a front, a rear, a left side, and a right side, and wherein at least one inwardly-facing cavity and at least one outwardly-facing cavity is provided in at least one of said bottom, said top, said front, said rear, said left side, and said right side, wherein at least one of the phase-change material assemblies is disposed within one of the at least one inwardly-facing cavity and wherein at least one vacuum insulated panel is disposed within one of the at least one outwardly-facing cavity.

31. The shipping system as claimed in claim 27 wherein at least one of the plurality of heat-spreaders comprises a first portion and a second portion, the first portion and the second portion being hingedly interconnected, the first portion being permanently attached to the frame, the second portion being removably attachable to the frame.

32. The shipping system as claimed in claim 27 wherein the front of the frame comprises a door, the door being hingedly connected to a remainder of the frame.

33. The shipping system as claimed in claim 32 wherein the door is hingedly connected to the remainder of the frame using a hinge, wherein the hinge comprises a pair of wings interconnected by a flexible bridge and wherein the wings are not mounted parallel to one another.

34. A phase-change material assembly comprising:
(a) a curtain, the curtain comprising a plurality of pockets, wherein each of the pockets has a pair of ends, each of the pair of ends being permanently closed, wherein at least one of the permanently closed ends is closed only at one or more spots, thereby permitting visual inspection of the contents of the pocket through the at least one permanently closed end that is closed only at one or more spots; and
(b) at least one phase-change material pack disposed within at least some of the pockets, the contents of the at least one phase-change material pack being visible through the end of the pocket closed only at one or more spots.

35. The passively-controlled shipping system as claimed in claim 1 wherein the door of the frame includes an exterior door, wherein the insulated container further comprises an interior door, and wherein the exterior door and the interior door are arranged so that access to the closed space within the frame requires that both the exterior door and the interior door be opened.

36. The passively-controlled shipping system as claimed in claim 35 wherein the interior door comprises one or more pieces of a foam material.

37. The passively-controlled shipping system as claimed in claim 36 wherein the interior door further comprises one or more handles.

38. The shipping system as claimed in claim 28 wherein the at least one thermal break comprises at least one through opening formed in at least one of the front and the bottom of the frame.

39. The shipping system as claimed in claim 27 wherein at least one of the plurality of phase-change assemblies further comprises a curtain, the curtain comprising a pocket in which one of the at least one container containing phase-change material is disposed.

40. The shipping system as claimed in claim 1 wherein the insulated container further comprises at least one foot positioned under the bottom of the frame.

* * * * *